US008733094B2

(12) United States Patent
McBride et al.

(10) Patent No.: US 8,733,094 B2
(45) Date of Patent: May 27, 2014

(54) SYSTEMS AND METHODS FOR ENERGY STORAGE AND RECOVERY USING RAPID ISOTHERMAL GAS EXPANSION AND COMPRESSION

(75) Inventors: Troy O. McBride, Norwich, VT (US); Benjamin R. Bollinger, Windsor, VT (US); Michael Izenson, Hanover, NH (US); Weibo Chen, Hanover, NH (US); Patrick Magari, Plainfield, NH (US); Benjamin Cameron, Hanover, NH (US); Robert Cook, West Lebanon, NH (US); Horst Richter, Norwich, VT (US)

(73) Assignee: Sustainx, Inc., Seabrook, NH (US)

( * ) Notice: Subject to any disclaimer, the term of this patent is extended or adjusted under 35 U.S.C. 154(b) by 102 days.

(21) Appl. No.: 13/532,474

(22) Filed: Jun. 25, 2012

(65) Prior Publication Data

US 2012/0299310 A1 Nov. 29, 2012

Related U.S. Application Data

(63) Continuation of application No. 12/639,703, filed on Dec. 16, 2009, now Pat. No. 8,225,606, which is a (Continued)

(51) Int. Cl.

| | |
|---|---|
| ***F02G 1/04*** | (2006.01) |
| ***F01K 21/04*** | (2006.01) |
| ***F01K 7/00*** | (2006.01) |
| ***F16D 31/02*** | (2006.01) |
| ***F01K 1/00*** | (2006.01) |
| ***F01K 3/00*** | (2006.01) |

(52) U.S. Cl.

USPC .................. 60/508; 60/511; 60/515; 60/413; 60/659

(58) Field of Classification Search

USPC ............ 60/371, 407–418, 508, 511, 515, 659

See application file for complete search history.

(56) References Cited

U.S. PATENT DOCUMENTS

| | | | |
|---|---|---|---|
| 114,297 | A | 5/1871 | Ivens et al. |
| 224,081 | A | 2/1880 | Eckart |

(Continued)

FOREIGN PATENT DOCUMENTS

| | | |
|---|---|---|
| BE | 898225 | 3/1984 |
| BE | 1008885 | 8/1996 |

(Continued)

OTHER PUBLICATIONS

"Hydraulic Transformer Supplies Continuous High Pressure," Machine Design, Penton Media, vol. 64, No. 17, (Aug. 1992), 1 page.

(Continued)

*Primary Examiner* — Christopher Jetton

(74) *Attorney, Agent, or Firm* — Occhiuti & Rohlicek LLP

(57) ABSTRACT

The invention relates to systems and methods for rapidly and isothermally expanding and compressing gas in energy storage and recovery systems that use open-air hydraulic-pneumatic cylinder assemblies, such as an accumulator and an intensifier in communication with a high-pressure gas storage reservoir on a gas-side of the circuits and a combination fluid motor/pump, coupled to a combination electric generator/motor on the fluid side of the circuits. The systems use heat transfer subsystems in communication with at least one of the cylinder assemblies or reservoir to thermally condition the gas being expanded or compressed.

14 Claims, 88 Drawing Sheets

Related U.S. Application Data continuation-in-part of application No. 12/421,057, filed on Apr. 9, 2009, now Pat. No. 7,832,207, said application No. 12/639,703 is a continuation-in-part of application No. 12/481,235, filed on Jun. 9, 2009, now Pat. No. 7,802,426.

(60) Provisional application No. 61/148,691, filed on Jan. 30, 2009, provisional application No. 61/043,630, filed on Apr. 9, 2008, provisional application No. 61/059,964, filed on Jun. 9, 2008, provisional application No. 61/166,448, filed on Apr. 3, 2009, provisional application No. 61/184,166, filed on Jun. 4, 2009, provisional application No. 61/223,564, filed on Jul. 7, 2009, provisional application No. 61/227,222, filed on Jul. 21, 2009, provisional application No. 61/251,965, filed on Oct. 15, 2009.

(56) References Cited

U.S. PATENT DOCUMENTS

| | | | | |
|---|---|---|---|---|
| 233,432 | A | 10/1880 | Pitchford | |
| 1,353,216 | A | 9/1920 | Carlson | |
| 1,635,524 | A | 7/1927 | Aikman | |
| 2,141,703 | A | 12/1938 | Bays | |
| 2,280,100 | A | 4/1942 | SinQleton | |
| 2,280,845 | A | 4/1942 | Parker | |
| 2,404,660 | A | 7/1946 | Rouleau | |
| 2,420,098 | A | 5/1947 | Rouleau | |
| 2,486,081 | A | 10/1949 | Weenen | |
| 2,539,862 | A | 1/1951 | Rushinq | |
| 2,628,564 | A | 2/1953 | Jacobs | |
| 2,632,995 | A | 3/1953 | Noe | |
| 2,712,728 | A | 7/1955 | Lewis et al. | |
| 2,813,398 | A | 11/1957 | Wilcox | |
| 2,829,501 | A | 4/1958 | Walls | |
| 2,880,759 | A | 4/1959 | Wisman | |
| 3,041,842 | A | 7/1962 | Heinecke | |
| 3,100,965 | A * | 8/1963 | Blackburn | 60/375 |
| 3,236,512 | A | 2/1966 | Caslav et al. | |
| 3,269,121 | A | 8/1966 | Ludwig | |
| 3,538,340 | A | 11/1970 | LanQ | |
| 3,608,311 | A | 9/1971 | Roesel, Jr. | |
| 3,648,458 | A | 3/1972 | McAlister | |
| 3,650,636 | A | 3/1972 | Eskeli | |
| 3,672,160 | A | 6/1972 | Kim | |
| 3,677,008 | A | 7/1972 | Koutz | |
| 3,704,079 | A | 11/1972 | Berlyn | |
| 3,757,517 | A | 9/1973 | RiQollot | |
| 3,793,848 | A | 2/1974 | Eskeli | |
| 3,801,793 | A | 4/1974 | Goebel | |
| 3,803,847 | A | 4/1974 | McAlister | |
| 3,839,863 | A | 10/1974 | Frazier | |
| 3,847,182 | A | 11/1974 | Greer | |
| 3,895,493 | A | 7/1975 | Riqollot | |
| 3,903,696 | A | 9/1975 | Carman | |
| 3,935,469 | A | 1/1976 | Haydock | |
| 3,939,356 | A | 2/1976 | Loane | |
| 3,942,323 | A | 3/1976 | Maillet | |
| 3,945,207 | A | 3/1976 | Hyatt | |
| 3,948,049 | A | 4/1976 | Ohms et al. | |
| 3,952,516 | A | 4/1976 | Lapp | |
| 3,952,723 | A | 4/1976 | Browning | |
| 3,958,899 | A | 5/1976 | Coleman, Jr. et al. | |
| 3,986,354 | A | 10/1976 | Erb | |
| 3,988,592 | A | 10/1976 | Porter | |
| 3,988,897 | A | 11/1976 | Strub | |
| 3,990,246 | A | 11/1976 | Wilmers | |
| 3,991,574 | A | 11/1976 | Frazier | |
| 3,996,741 | A | 12/1976 | HerberQ | |
| 3,998,049 | A | 12/1976 | McKinley et al. | |
| 3,999,388 | A | 12/1976 | Nystrom | |
| 4,008,006 | A | 2/1977 | Bea | |
| 4,027,993 | A | 6/1977 | Wolff | |
| 4,030,303 | A | 6/1977 | Kraus et al. | |
| 4,031,702 | A | 6/1977 | Burnett et al. | |
| 4,031,704 | A | 6/1977 | Moore et al. | |
| 4,041,708 | A | 8/1977 | Wolff | |
| 4,050,246 | A | 9/1977 | Bourquardez | |
| 4,055,950 | A | 11/1977 | Grossman | |
| 4,058,979 | A | 11/1977 | Germain | |
| 4,075,844 | A | 2/1978 | Schiferli | |
| 4,089,744 | A | 5/1978 | Cahn | |
| 4,094,356 | A | 6/1978 | Ash et al. | |
| 4,095,118 | A | 6/1978 | Ratbun | |
| 4,100,745 | A | 7/1978 | Gyarmathy et al. | |
| 4,104,955 | A | 8/1978 | Murphy | |
| 4,108,077 | A | 8/1978 | Laing | |
| 4,109,465 | A | 8/1978 | Plen | |
| 4,110,987 | A | 9/1978 | Cahn et al. | |
| 4,112,311 | A | 9/1978 | Theyse | |
| 4,117,342 | A | 9/1978 | Melley, Jr. | |
| 4,117,696 | A | 10/1978 | Fawcett et al. | |
| 4,118,637 | A | 10/1978 | Tackett | |
| 4,124,182 | A | 11/1978 | Loeb | |
| 4,126,000 | A | 11/1978 | Funk | |
| 4,136,432 | A | 1/1979 | Melley, Jr. | |
| 4,142,368 | A | 3/1979 | Mantegani | |
| 4,147,204 | A | 4/1979 | Pfenninger | |
| 4,149,092 | A | 4/1979 | Cros | |
| 4,150,547 | A | 4/1979 | Hobson | |
| 4,154,292 | A | 5/1979 | Herrick | |
| 4,167,372 | A | 9/1979 | Tackett | |
| 4,170,878 | A | 10/1979 | Jahniq | |
| 4,173,431 | A | 11/1979 | Smith | |
| 4,189,925 | A | 2/1980 | Long | |
| 4,194,889 | A | 3/1980 | Wanner | |
| 4,195,481 | A | 4/1980 | Gregory | |
| 4,197,700 | A | 4/1980 | Jahniq | |
| 4,197,715 | A | 4/1980 | Fawcett et al. | |
| 4,201,514 | A | 5/1980 | Huetter | |
| 4,204,126 | A | 5/1980 | Diggs | |
| 4,206,608 | A | 6/1980 | Bell | |
| 4,209,982 | A | 7/1980 | Pitts | |
| 4,220,006 | A | 9/1980 | Kindt | |
| 4,229,143 | A | 10/1980 | Pucher | |
| 4,229,661 | A | 10/1980 | Mead et al. | |
| 4,232,253 | A | 11/1980 | Mortelmans | |
| 4,237,692 | A | 12/1980 | Ahrens et al. | |
| 4,242,878 | A | 1/1981 | Brinkerhoff | |
| 4,246,978 | A | 1/1981 | Schulz et al. | |
| 4,262,735 | A | 4/1981 | Courrege | |
| 4,273,514 | A | 6/1981 | Shore et al. | |
| 4,274,010 | A | 6/1981 | Lawson-tancred | |
| 4,275,310 | A | 6/1981 | Summers et al. | |
| 4,281,256 | A | 7/1981 | Ahrens | |
| 4,293,323 | A | 10/1981 | Cohen | |
| 4,299,198 | A | 11/1981 | Woodhull | |
| 4,302,684 | A | 11/1981 | Gogins | |
| 4,304,103 | A | 12/1981 | Hamrick | |
| 4,311,011 | A | 1/1982 | Lewis | |
| 4,316,096 | A | 2/1982 | Syverson | |
| 4,317,439 | A | 3/1982 | Emmerlinq | |
| 4,335,867 | A | 6/1982 | Bihlmaier | |
| 4,340,822 | A | 7/1982 | Gregg | |
| 4,341,072 | A | 7/1982 | Clyne | |
| 4,348,863 | A | 9/1982 | Taylor et al. | |
| 4,353,214 | A | 10/1982 | Gardner | |
| 4,354,420 | A | 10/1982 | Bianchetta | |
| 4,355,956 | A | 10/1982 | Ringrose et al. | |
| 4,358,250 | A | 11/1982 | Payne | |
| 4,367,786 | A | 1/1983 | Hafner et al. | |
| 4,368,692 | A | 1/1983 | Kita | |
| 4,368,775 | A | 1/1983 | Ward | |
| 4,370,559 | A | 1/1983 | Langley, Jr. | |
| 4,372,114 | A | 2/1983 | Burnham | |
| 4,375,387 | A | 3/1983 | deFilippi et al. | |
| 4,380,419 | A | 4/1983 | Morton | |
| 4,392,062 | A | 7/1983 | Bervig | |
| 4,393,752 | A | 7/1983 | Meier | |
| 4,411,136 | A | 10/1983 | Funk | |
| 4,416,114 | A | 11/1983 | Martini | |
| 4,421,661 | A | 12/1983 | Claar et al. | |

(56) References Cited

U.S. PATENT DOCUMENTS

| | | | | |
|---|---|---|---|---|
| 4,428,711 | A | 1/1984 | Archer | |
| 4,435,131 | A | 3/1984 | Ruben | |
| 4,444,011 | A | 4/1984 | Kolin | |
| 4,446,698 | A | 5/1984 | Benson | |
| 4,447,738 | A | 5/1984 | Allison | |
| 4,449,372 | A | 5/1984 | Rilett | |
| 4,452,046 | A | 6/1984 | Valentin | |
| 4,452,047 | A | 6/1984 | Hunt et al. | |
| 4,454,429 | A | 6/1984 | Buonome | |
| 4,454,720 | A | 6/1984 | Leibowitz | |
| 4,455,834 | A | 6/1984 | Earle | |
| 4,462,213 | A | 7/1984 | Lewis | |
| 4,474,002 | A | 10/1984 | Perry | |
| 4,476,851 | A | 10/1984 | Brugger et al. | |
| 4,478,553 | A | 10/1984 | Leibowitz et al. | |
| 4,489,554 | A | 12/1984 | Otters | |
| 4,491,739 | A | 1/1985 | Watson | |
| 4,492,539 | A | 1/1985 | Specht | |
| 4,493,189 | A | 1/1985 | Slater | |
| 4,496,847 | A | 1/1985 | Parkings | |
| 4,498,848 | A | 2/1985 | Petrovsky | |
| 4,502,284 | A | 3/1985 | Chrisoqhilos | |
| 4,503,673 | A | 3/1985 | Schachle | |
| 4,515,516 | A | 5/1985 | Perrine et al. | |
| 4,520,840 | A | 6/1985 | Michel | |
| 4,525,631 | A | 6/1985 | Allison | |
| 4,530,208 | A | 7/1985 | Sato | |
| 4,547,209 | A | 10/1985 | Netzer | |
| 4,574,592 | A | 3/1986 | Eskeli | |
| 4,585,039 | A | 4/1986 | Hamilton | |
| 4,589,475 | A | 5/1986 | Jones | |
| 4,593,202 | A | 6/1986 | Dickinson | |
| 4,619,225 | A | 10/1986 | Lowther | |
| 4,624,623 | A | 11/1986 | Wagner | |
| 4,648,801 | A | 3/1987 | Wilson | |
| 4,651,525 | A | 3/1987 | Cestero | |
| 4,653,986 | A | 3/1987 | Ashton | |
| 4,671,742 | A | 6/1987 | Gyimesi | |
| 4,676,068 | A | 6/1987 | Funk | |
| 4,679,396 | A | 7/1987 | Heggie | |
| 4,691,524 | A | 9/1987 | Holscher | |
| 4,693,080 | A | 9/1987 | Van Hooff | |
| 4,706,456 | A | 11/1987 | Backe | |
| 4,707,988 | A | 11/1987 | Palmers | |
| 4,710,100 | A | 12/1987 | Laing et al. | |
| 4,735,552 | A | 4/1988 | Watson | |
| 4,739,620 | A | 4/1988 | Pierce | |
| 4,745,745 | A * | 5/1988 | Hagin | 60/414 |
| 4,760,697 | A | 8/1988 | Heggie | |
| 4,761,118 | A | 8/1988 | Zanarini et al. | |
| 4,765,142 | A | 8/1988 | Nakhamkin | |
| 4,765,143 | A | 8/1988 | Crawford et al. | |
| 4,767,938 | A | 8/1988 | Bervig | |
| 4,792,700 | A | 12/1988 | Ammons | |
| 4,849,648 | A | 7/1989 | Longardner | |
| 4,870,816 | A | 10/1989 | Nakhamkin | |
| 4,872,307 | A | 10/1989 | Nakhamkin | |
| 4,873,828 | A | 10/1989 | Lainq et al. | |
| 4,873,831 | A | 10/1989 | Dehne | |
| 4,876,992 | A | 10/1989 | Sobotowski | |
| 4,877,530 | A | 10/1989 | Moses | |
| 4,885,912 | A | 12/1989 | Nakhamkin | |
| 4,886,534 | A | 12/1989 | Castan | |
| 4,907,495 | A | 3/1990 | Sugahara | |
| 4,936,109 | A | 6/1990 | Longardner | |
| 4,942,736 | A | 7/1990 | Bronicki | |
| 4,947,977 | A | 8/1990 | Raymond | |
| 4,955,195 | A | 9/1990 | Jones et al. | |
| 4,984,432 | A | 1/1991 | Corey | |
| 5,056,601 | A | 10/1991 | Grimmer | |
| 5,058,385 | A | 10/1991 | Everett, Jr. | |
| 5,062,498 | A | 11/1991 | Tobias | |
| 5,107,681 | A | 4/1992 | Wolfbauer, III | |
| 5,133,190 | A | 7/1992 | Abdelmalek | |
| 5,138,838 | A | 8/1992 | Crosser | |
| 5,140,170 | A | 8/1992 | Henderson | |
| 5,152,260 | A | 10/1992 | Erickson et al. | |
| 5,161,449 | A | 11/1992 | Everett, Jr. | |
| 5,169,295 | A | 12/1992 | Stoqner et al. | |
| 5,182,086 | A | 1/1993 | Henderson et al. | |
| 5,203,168 | A | 4/1993 | Oshina | |
| 5,209,063 | A | 5/1993 | Shirai et al. | |
| 5,213,470 | A | 5/1993 | Lundquist | |
| 5,239,833 | A | 8/1993 | Fineblum | |
| 5,259,345 | A | 11/1993 | Richeson | |
| 5,271,225 | A | 12/1993 | Adamides | |
| 5,279,206 | A | 1/1994 | Krantz | |
| 5,296,799 | A | 3/1994 | Davis | |
| 5,309,713 | A | 5/1994 | Vassallo | |
| 5,321,946 | A | 6/1994 | Abdelmalek | |
| 5,327,987 | A | 7/1994 | Abdelmalek | |
| 5,339,633 | A | 8/1994 | Fujii et al. | |
| 5,341,644 | A | 8/1994 | Nelson | |
| 5,344,627 | A | 9/1994 | Fujii et al. | |
| 5,364,611 | A | 11/1994 | Iijima et al. | |
| 5,365,980 | A | 11/1994 | Deberardinis | |
| 5,375,417 | A | 12/1994 | Barth | |
| 5,379,589 | A | 1/1995 | Cohn et al. | |
| 5,384,489 | A | 1/1995 | Bellac | |
| 5,387,089 | A | 2/1995 | Stogner et al. | |
| 5,394,693 | A | 3/1995 | Plyter | |
| 5,427,194 | A | 6/1995 | Miller | |
| 5,436,508 | A | 7/1995 | Sorensen | |
| 5,448,889 | A | 9/1995 | Bronicki | |
| 5,454,408 | A | 10/1995 | Dibella et al. | |
| 5,454,426 | A | 10/1995 | Moseley | |
| 5,467,722 | A | 11/1995 | Meratla | |
| 5,477,677 | A | 12/1995 | Krnavek | |
| 5,491,969 | A | 2/1996 | Cohn et al. | |
| 5,491,977 | A | 2/1996 | Cho | |
| 5,524,821 | A | 6/1996 | Vie et al. | |
| 5,537,822 | A | 7/1996 | Shnaid et al. | |
| 5,544,698 | A | 8/1996 | Paulman | |
| 5,557,934 | A | 9/1996 | Beach | |
| 5,561,978 | A | 10/1996 | Buschur | |
| 5,562,010 | A | 10/1996 | McGuire | |
| 5,579,640 | A | 12/1996 | Gray, Jr. et al. | |
| 5,584,664 | A | 12/1996 | Elliott et al. | |
| 5,592,028 | A | 1/1997 | Pritchard | |
| 5,595,587 | A | 1/1997 | Steed | |
| 5,598,736 | A | 2/1997 | Erskine | |
| 5,599,172 | A | 2/1997 | Mccabe | |
| 5,600,953 | A | 2/1997 | Oshita et al. | |
| 5,616,007 | A | 4/1997 | Cohen | |
| 5,634,340 | A | 6/1997 | Grennan | |
| 5,641,273 | A | 6/1997 | Moseley | |
| 5,674,053 | A | 10/1997 | Paul et al. | |
| 5,685,154 | A | 11/1997 | Bronicki et al. | |
| 5,685,155 | A | 11/1997 | Brown | |
| 5,768,893 | A | 6/1998 | Hoshino et al. | |
| 5,769,610 | A | 6/1998 | Paul et al. | |
| 5,771,693 | A | 6/1998 | Coney | |
| 5,775,107 | A | 7/1998 | Sparkman | |
| 5,778,675 | A | 7/1998 | Nakhamkin | |
| 5,794,442 | A | 8/1998 | Lisniansky | |
| 5,797,980 | A | 8/1998 | Fillet | |
| 5,819,533 | A | 10/1998 | Moonen | |
| 5,819,635 | A | 10/1998 | Moonen | |
| 5,831,757 | A | 11/1998 | DiFrancesco | |
| 5,832,728 | A | 11/1998 | Buck | |
| 5,832,906 | A | 11/1998 | Douville et al. | |
| 5,839,270 | A | 11/1998 | Jirnov et al. | |
| 5,845,479 | A | 12/1998 | Nakhamkin | |
| 5,873,250 | A | 2/1999 | Lewis | |
| 5,901,809 | A | 5/1999 | Berkun | |
| 5,924,283 | A | 7/1999 | Burke, Jr. | |
| 5,934,063 | A | 8/1999 | Nakhamkin | |
| 5,934,076 | A | 8/1999 | Coney | |
| 5,937,652 | A | 8/1999 | Abdelmalek | |
| 5,971,027 | A | 10/1999 | Beachley et al. | |
| 6,012,279 | A | 1/2000 | Hines | |
| 6,023,105 | A | 2/2000 | Youssef | |
| 6,026,349 | A | 2/2000 | Heneman | |
| 6,029,445 | A | 2/2000 | Lech | |

(56) References Cited

U.S. PATENT DOCUMENTS 6,073,445 A 6/2000 Johnson
6,073,448 A 6/2000 Lozada
6,085,520 A 7/2000 Kohno
6,090,186 A 7/2000 Spencer
6,119,802 A 9/2000 Puett, Jr.
6,132,181 A 10/2000 Mccabe
6,145,311 A 11/2000 Cyphelly
6,148,602 A 11/2000 Demetri
6,153,943 A 11/2000 Mistr, Jr.
6,158,499 A 12/2000 Rhodes
6,170,443 B1 1/2001 Hofbauer
6,178,735 B1 1/2001 Frutschi
6,179,446 B1 1/2001 Sarmadi
6,188,182 B1 2/2001 Nickols et al.
6,202,707 B1 3/2001 Woodall et al.
6,206,660 B1 * 3/2001 Coney et al. .................. 417/438
6,210,131 B1 4/2001 Whitehead
6,216,462 B1 4/2001 Gray, Jr.
6,225,706 B1 5/2001 Keller
6,276,123 B1 8/2001 Chen et al.
6,327,858 B1 12/2001 Negre et al.
6,327,994 B1 12/2001 Labrador
6,349,543 B1 2/2002 Lisniansky
RE37,603 E 3/2002 Coney
6,352,576 B1 3/2002 Spencer et al.
6,360,535 B1 3/2002 Fisher
6,367,570 B1 4/2002 Long, III
6,372,023 B1 4/2002 Kiyono et al.
6,389,814 B2 5/2002 Viteri et al.
6,397,578 B2 6/2002 Tsukamoto
6,401,458 B2 6/2002 Jacobson
6,407,465 B1 6/2002 Peltz et al.
6,419,462 B1 7/2002 Horie et al.
6,422,016 B2 7/2002 Alkhamis
6,453,659 B1 9/2002 Van Liere et al.
6,478,289 B1 11/2002 Trewin
6,484,498 B1 11/2002 Bonar, II
6,512,966 B2 1/2003 Lof
6,513,326 B1 2/2003 Maceda et al.
6,516,615 B1 2/2003 Stockhausen et al.
6,516,616 B2 2/2003 Carver
6,554,088 B2 4/2003 Severinsky et al.
6,598,392 B2 7/2003 Majeres
6,598,402 B2 7/2003 Kataoka et al.
6,606,860 B2 8/2003 McFarland
6,612,348 B1 9/2003 Wiley
6,619,930 B2 9/2003 Jansen et al.
6,626,212 B2 9/2003 Morioka et al.
6,629,413 B1 10/2003 Wendt et al.
6,637,185 B2 10/2003 hatamiva et al.
6,652,241 B1 11/2003 Alder
6,652,243 B2 11/2003 Krasnov
6,666,024 B1 12/2003 Moskal
6,670,402 B1 12/2003 Lee et al.
6,672,056 B2 1/2004 Roth et al.
6,675,765 B2 1/2004 Endoh
6,688,108 B1 2/2004 Van Liere
6,698,472 B2 3/2004 Camacho et al.
6,711,984 B2 3/2004 Tagge et al.
6,712,166 B2 3/2004 Rush et al.
6,715,514 B2 4/2004 Parker, III
6,718,761 B2 4/2004 Merswolke et al.
6,739,131 B1 5/2004 Kershaw
6,739,419 B2 5/2004 Jain et al.
6,745,569 B2 6/2004 Gerdes
6,745,801 B1 6/2004 Cohen et al.
6,748,737 B2 6/2004 Lafferty
6,762,926 B1 7/2004 Shiue et al.
6,786,245 B1 9/2004 Eichelberger
6,789,387 B2 9/2004 Brinkman
6,789,576 B2 9/2004 Umetsu et al.
6,797,039 B2 9/2004 Spencer
6,815,840 B1 11/2004 Aldendeshe
6,817,185 B2 11/2004 Coney et al.
6,834,737 B2 12/2004 Bloxham
6,840,309 B2 1/2005 Wilson et al.
6,848,259 B2 2/2005 Kelller-sornig
6,857,450 B2 2/2005 Rupp
6,874,453 B2 4/2005 Coney et al.
6,883,775 B2 4/2005 Coney et al.
6,886,326 B2 5/2005 Holtzapple et al.
6,892,802 B2 5/2005 Kelly et al.
6,900,556 B2 5/2005 Provanzana
6,922,991 B2 8/2005 Polcuch
6,925,821 B2 8/2005 Sienel
6,927,503 B2 8/2005 Enish et al.
6,931,848 B2 8/2005 Maceda et al.
6,935,096 B2 8/2005 Haiun
6,938,415 B2 9/2005 Last
6,938,654 B2 9/2005 Gershtein et al.
6,946,017 B2 9/2005 Leppin et al.
6,948,328 B2 9/2005 Kidwell
6,952,058 B2 10/2005 Mccoin
6,959,546 B2 11/2005 Corcoran
6,963,802 B2 11/2005 Enis
6,964,165 B2 11/2005 Uhl et al.
6,964,176 B2 11/2005 Kidwell
6,974,307 B2 12/2005 Antoune et al.
7,000,389 B2 2/2006 Lewellin
7,007,474 B1 3/2006 Ochs et al.
7,017,690 B2 3/2006 Burke
7,028,934 B2 4/2006 Burynski, Jr.
7,040,083 B2 5/2006 Horii et al.
7,040,108 B1 5/2006 Flammang
7,040,859 B2 5/2006 Kane
7,043,920 B2 5/2006 Viteri et al.
7,047,744 B1 5/2006 Robertson et al.
7,055,325 B2 6/2006 Wolken
7,067,937 B2 6/2006 Enish et al.
7,075,189 B2 7/2006 Heronemus
RE39,249 E 8/2006 Link, Jr.
7,084,520 B2 8/2006 Zambrano
7,086,231 B2 8/2006 Pinkerton
7,093,450 B2 8/2006 Jimenez Haertel et al.
7,093,626 B2 8/2006 Li et al.
7,098,552 B2 8/2006 Mccoin
7,107,766 B2 9/2006 Zacche' et al.
7,107,767 B2 9/2006 Frazer et al.
7,116,006 B2 10/2006 Mccoin
7,124,576 B2 10/2006 Cherney et al.
7,124,586 B2 10/2006 Neqre et al.
7,127,887 B2 10/2006 Nakamura et al.
7,127,895 B2 10/2006 Pinkerton et al.
7,128,777 B2 10/2006 Spencer
7,134,279 B2 11/2006 White
7,155,912 B2 1/2007 Enis et al.
7,168,928 B1 1/2007 West
7,168,929 B2 1/2007 Sieqel et al.
7,169,489 B2 1/2007 Redmond
7,177,751 B2 2/2007 Froloff
7,178,337 B2 2/2007 Pflanz
7,191,603 B2 3/2007 Taube
7,197,871 B2 4/2007 Yoshino
7,201,095 B2 4/2007 Hughey
7,218,009 B2 5/2007 Hendrickson et al.
7,219,779 B2 5/2007 Bauer et al.
7,225,762 B2 6/2007 Mahlanen
7,228,690 B2 6/2007 Barker
7,230,348 B2 6/2007 Poole
7,231,998 B1 6/2007 Schechter
7,240,812 B2 7/2007 Kamikozuru
7,249,617 B2 7/2007 Musselman et al.
7,254,944 B1 8/2007 Goetzinger et al.
7,273,122 B2 9/2007 Rose
7,281,371 B1 10/2007 Heidenreich
7,308,361 B2 12/2007 Enis et al.
7,317,261 B2 1/2008 Rolt
7,322,377 B2 1/2008 Baltes
7,325,401 B1 2/2008 Kesseli et al.
7,328,575 B2 2/2008 Hedman
7,329,099 B2 2/2008 Hartman
7,347,049 B2 3/2008 Rajendran et al.
7,353,786 B2 4/2008 Scuderi et al.
7,353,845 B2 4/2008 Underwood et al.

(56) References Cited

U.S. PATENT DOCUMENTS

| | | | |
|---|---|---|---|
| 7,354,252 | B2 | 4/2008 | Baatrup et al. |
| 7,364,410 | B2 | 4/2008 | Link, Jr. |
| 7,392,871 | B2 | 7/2008 | Severinsky et al. |
| 7,406,828 | B1 | 8/2008 | Nakhamkin |
| 7,407,501 | B2 | 8/2008 | Zvuloni |
| 7,415,835 | B2 | 8/2008 | Cowans et al. |
| 7,415,995 | B2 | 8/2008 | Plummer et al. |
| 7,417,331 | B2 | 8/2008 | De La Torre et al. |
| 7,418,820 | B2 | 9/2008 | Harvey et al. |
| 7,436,086 | B2 | 10/2008 | Mcclintic |
| 7,441,399 | B2 | 10/2008 | Utamura |
| 7,448,213 | B2 | 11/2008 | Mitani |
| 7,453,164 | B2 | 11/2008 | Borden et al. |
| 7,469,527 | B2 | 12/2008 | Neqre et al. |
| 7,471,010 | B1 | 12/2008 | Fingersh |
| 7,481,337 | B2 | 1/2009 | Luharuka et al. |
| 7,488,159 | B2 | 2/2009 | Bhatt et al. |
| 7,527,483 | B1 | 5/2009 | Glauber |
| 7,579,700 | B1 | 8/2009 | Meller |
| 7,603,970 | B2 | 10/2009 | Scuderi et al. |
| 7,607,503 | B1 | 10/2009 | Schechter |
| 7,693,402 | B2 | 4/2010 | Hudson et al. |
| 7,694,514 | B2 | 4/2010 | Smith et al. |
| 7,802,426 | B2 | 9/2010 | Bollinger |
| 7,827,787 | B2 | 11/2010 | Cherney et al. |
| 7,832,207 | B2 | 11/2010 | McBride et al. |
| 7,843,076 | B2 | 11/2010 | Gogoana et al. |
| 7,874,155 | B2 | 1/2011 | McBride et al. |
| 7,900,444 | B1 | 3/2011 | McBride et al. |
| 7,958,731 | B2 | 6/2011 | McBride et al. |
| 7,963,110 | B2 | 6/2011 | McBride et al. |
| 8,037,678 | B2 | 10/2011 | McBride et al. |
| 8,046,990 | B2 | 11/2011 | Bollinger et al. |
| 8,104,274 | B2 | 1/2012 | McBride et al. |
| 8,109,085 | B2 | 2/2012 | McBride et al. |
| 8,117,842 | B2 | 2/2012 | McBride et al. |
| 8,122,718 | B2 | 2/2012 | McBride et al. |
| 8,171,728 | B2 | 5/2012 | Bollinger et al. |
| 8,191,362 | B2 | 6/2012 | McBride et al. |
| 8,225,606 | B2 | 7/2012 | McBride et al. |
| 8,234,862 | B2 | 8/2012 | McBride et al. |
| 8,234,863 | B2 | 8/2012 | McBride et al. |
| 8,234,868 | B2 | 8/2012 | Bollinger et al. |
| 8,240,140 | B2 | 8/2012 | McBride et al. |
| 8,240,146 | B1 | 8/2012 | Bollinger |
| 8,245,508 | B2 | 8/2012 | Bollinger et al. |
| 8,250,863 | B2 | 8/2012 | Bollinger et al. |
| 8,272,212 | B2 | 9/2012 | Blieske |
| 8,359,856 | B2 | 1/2013 | McBride et al. |
| 2001/0045093 | A1 | 11/2001 | Jacobson |
| 2003/0131599 | A1 | 7/2003 | Gerdes |
| 2003/0145589 | A1 | 8/2003 | Tillyer |
| 2003/0177767 | A1 | 9/2003 | Keller-sornig et al. |
| 2003/0180155 | A1 | 9/2003 | Coney et al. |
| 2004/0050042 | A1 | 3/2004 | Frazer |
| 2004/0050049 | A1 | 3/2004 | Wendt et al. |
| 2004/0146406 | A1 | 7/2004 | Last |
| 2004/0146408 | A1 | 7/2004 | Anderson |
| 2004/0148934 | A1 | 8/2004 | Pinkerton et al. |
| 2004/0211182 | A1 | 10/2004 | Gould |
| 2004/0244580 | A1 | 12/2004 | Coney et al. |
| 2004/0261415 | A1 | 12/2004 | Negre et al. |
| 2005/0016165 | A1 | 1/2005 | Enis et al. |
| 2005/0028529 | A1 | 2/2005 | Bartlett et al. |
| 2005/0047930 | A1 | 3/2005 | Schmid |
| 2005/0072154 | A1 | 4/2005 | Frutschi |
| 2005/0115234 | A1 | 6/2005 | Asano et al. |
| 2005/0155347 | A1 | 7/2005 | Lewellin |
| 2005/0166592 | A1 | 8/2005 | Larson et al. |
| 2005/0274334 | A1 | 12/2005 | Warren |
| 2005/0275225 | A1 | 12/2005 | Bertolotti |
| 2005/0279086 | A1 | 12/2005 | Hoos |
| 2005/0279292 | A1 | 12/2005 | Hudson et al. |
| 2005/0279296 | A1 | 12/2005 | Coney et al. |
| 2006/0055175 | A1 | 3/2006 | Grinblat |
| 2006/0059912 | A1* | 3/2006 | Romanelli et al. .............. 60/645 |
| 2006/0059936 | A1 | 3/2006 | Radke et al. |
| 2006/0059937 | A1 | 3/2006 | Perkins et al. |
| 2006/0075749 | A1 | 4/2006 | Cherney et al. |
| 2006/0090467 | A1 | 5/2006 | Crow |
| 2006/0090477 | A1 | 5/2006 | Rolff |
| 2006/0107664 | A1 | 5/2006 | Hudson et al. |
| 2006/0162543 | A1 | 7/2006 | Abe et al. |
| 2006/0162910 | A1 | 7/2006 | Kelly et al. |
| 2006/0175337 | A1 | 8/2006 | Defosset |
| 2006/0201148 | A1 | 9/2006 | Zabtcioqlu |
| 2006/0218924 | A1 | 10/2006 | Mitani |
| 2006/0248886 | A1 | 11/2006 | Ma |
| 2006/0248892 | A1 | 11/2006 | Ingersoll |
| 2006/0254281 | A1 | 11/2006 | Badeer et al. |
| 2006/0260311 | A1 | 11/2006 | Ingersoll |
| 2006/0260312 | A1 | 11/2006 | Ingersoll |
| 2006/0262465 | A1 | 11/2006 | Wiederhold |
| 2006/0266034 | A1 | 11/2006 | Ingersoll |
| 2006/0266035 | A1 | 11/2006 | Ingersoll et al. |
| 2006/0266036 | A1 | 11/2006 | Ingersoll |
| 2006/0266037 | A1 | 11/2006 | Ingersoll |
| 2006/0280993 | A1 | 12/2006 | Keefer et al. |
| 2006/0283967 | A1 | 12/2006 | Cho et al. |
| 2007/0006586 | A1 | 1/2007 | Hoffman et al. |
| 2007/0022754 | A1 | 2/2007 | Perkins et al. |
| 2007/0022755 | A1 | 2/2007 | Pinkerton et al. |
| 2007/0062194 | A1 | 3/2007 | Ingersoll |
| 2007/0074533 | A1 | 4/2007 | Hugenroth et al. |
| 2007/0095069 | A1 | 5/2007 | Joshi et al. |
| 2007/0113803 | A1 | 5/2007 | Froloff et al. |
| 2007/0116572 | A1 | 5/2007 | Barbu et al. |
| 2007/0137595 | A1 | 6/2007 | Greenwell |
| 2007/0151528 | A1 | 7/2007 | Hedman |
| 2007/0158946 | A1 | 7/2007 | Annen et al. |
| 2007/0181199 | A1 | 8/2007 | Weber |
| 2007/0182160 | A1 | 8/2007 | Enis et al. |
| 2007/0205298 | A1 | 9/2007 | Harrison et al. |
| 2007/0234749 | A1 | 10/2007 | Enis et al. |
| 2007/0243066 | A1 | 10/2007 | Baron |
| 2007/0245735 | A1 | 10/2007 | Ashikian |
| 2007/0258834 | A1 | 11/2007 | Froloff et al. |
| 2008/0000436 | A1 | 1/2008 | Goldman |
| 2008/0016868 | A1 | 1/2008 | Ochs et al. |
| 2008/0047272 | A1 | 2/2008 | Schoell |
| 2008/0050234 | A1 | 2/2008 | Ingersoll et al. |
| 2008/0072870 | A1 | 3/2008 | Chomyszak et al. |
| 2008/0087165 | A1 | 4/2008 | Wright et al. |
| 2008/0104939 | A1 | 5/2008 | Hoffmann et al. |
| 2008/0112807 | A1 | 5/2008 | Uphues et al. |
| 2008/0127632 | A1 | 6/2008 | Finkenrath et al. |
| 2008/0138265 | A1 | 6/2008 | Lackner et al. |
| 2008/0155975 | A1 | 7/2008 | Brinkman |
| 2008/0155976 | A1 | 7/2008 | Smith et al. |
| 2008/0157528 | A1 | 7/2008 | Wang et al. |
| 2008/0157537 | A1 | 7/2008 | Richard |
| 2008/0164449 | A1 | 7/2008 | Gray et al. |
| 2008/0185194 | A1 | 8/2008 | Leone |
| 2008/0202120 | A1 | 8/2008 | Karyambas |
| 2008/0211230 | A1 | 9/2008 | Gurin |
| 2008/0228323 | A1 | 9/2008 | Laumer et al. |
| 2008/0233029 | A1 | 9/2008 | Fan et al. |
| 2008/0238105 | A1 | 10/2008 | Ortiz et al. |
| 2008/0238187 | A1 | 10/2008 | Garnett et al. |
| 2008/0250788 | A1 | 10/2008 | Nuel et al. |
| 2008/0251302 | A1 | 10/2008 | Lynn et al. |
| 2008/0272597 | A1 | 11/2008 | Althaus |
| 2008/0272598 | A1 | 11/2008 | Nakhamkin |
| 2008/0272605 | A1 | 11/2008 | Borden et al. |
| 2008/0308168 | A1 | 12/2008 | O'Brien, II et al. |
| 2008/0308270 | A1 | 12/2008 | Wilson |
| 2008/0315589 | A1 | 12/2008 | Malmrup |
| 2009/0000290 | A1 | 1/2009 | Brinkman |
| 2009/0007558 | A1 | 1/2009 | Hall |
| 2009/0010772 | A1 | 1/2009 | Siemroth |
| 2009/0021012 | A1 | 1/2009 | Stull et al. |
| 2009/0056331 | A1 | 3/2009 | Zhao et al. |
| 2009/0071153 | A1 | 3/2009 | Boyapati et al. |
| 2009/0107784 | A1 | 4/2009 | Gabriel et al. |

(56) References Cited

U.S. PATENT DOCUMENTS

| | | | |
|---|---|---|---|
| 2009/0145130 | A1 | 6/2009 | Kaufman |
| 2009/0158740 | A1 | 6/2009 | Littau et al. |
| 2009/0178409 | A1 | 7/2009 | Shinnar |
| 2009/0200805 | A1 | 8/2009 | Kim et al. |
| 2009/0220364 | A1 | 9/2009 | Rigal et al. |
| 2009/0229902 | A1 | 9/2009 | Stansbury, III |
| 2009/0249826 | A1 | 10/2009 | Hugelman |
| 2009/0282822 | A1 | 11/2009 | McBride et al. |
| 2009/0282840 | A1 | 11/2009 | Chen et al. |
| 2009/0294096 | A1 | 12/2009 | Mills et al. |
| 2009/0301089 | A1 | 12/2009 | Bollinger |
| 2009/0317267 | A1 | 12/2009 | Gill et al. |
| 2009/0322090 | A1 | 12/2009 | Wolf |
| 2010/0018196 | A1 | 1/2010 | Li et al. |
| 2010/0077765 | A1 | 4/2010 | Japikse |
| 2010/0089063 | A1 | 4/2010 | McBride et al. |
| 2010/0133903 | A1 | 6/2010 | Rufer |
| 2010/0139277 | A1 | 6/2010 | McBride et al. |
| 2010/0193270 | A1 | 8/2010 | Deshaies et al. |
| 2010/0199652 | A1 | 8/2010 | Lemofouet et al. |
| 2010/0205960 | A1 | 8/2010 | McBride et al. |
| 2010/0229544 | A1 | 9/2010 | Bollinger et al. |
| 2010/0257862 | A1 | 10/2010 | Howes et al. |
| 2010/0307156 | A1 | 12/2010 | Bollinger |
| 2010/0326062 | A1 | 12/2010 | Fong et al. |
| 2010/0326064 | A1 | 12/2010 | Fong et al. |
| 2010/0326066 | A1 | 12/2010 | Fong et al. |
| 2010/0326068 | A1 | 12/2010 | Fong et al. |
| 2010/0326069 | A1 | 12/2010 | Fong et al. |
| 2010/0326075 | A1 | 12/2010 | Fong et al. |
| 2010/0329891 | A1 | 12/2010 | Fong et al. |
| 2010/0329903 | A1 | 12/2010 | Fong et al. |
| 2010/0329909 | A1 | 12/2010 | Fong et al. |
| 2011/0023488 | A1 | 2/2011 | Fong et al. |
| 2011/0023977 | A1 | 2/2011 | Fong et al. |
| 2011/0030359 | A1 | 2/2011 | Fong et al. |
| 2011/0030552 | A1 | 2/2011 | Fong et al. |
| 2011/0056193 | A1 | 3/2011 | McBride et al. |
| 2011/0056368 | A1 | 3/2011 | McBride et al. |
| 2011/0061741 | A1 | 3/2011 | Ingersoll et al. |
| 2011/0061836 | A1 | 3/2011 | Ingersoll et al. |
| 2011/0062166 | A1 | 3/2011 | Ingersoll et al. |
| 2011/0106321 | A1 | 5/2011 | Cherian et al. |
| 2011/0107755 | A1 | 5/2011 | McBride et al. |
| 2011/0115223 | A1 | 5/2011 | Stahlkopf et al. |
| 2011/0131966 | A1 | 6/2011 | McBride et al. |
| 2011/0138797 | A1 | 6/2011 | Bollinger et al. |
| 2011/0167813 | A1 | 7/2011 | McBride et al. |
| 2011/0204064 | A1 | 8/2011 | Crane et al. |
| 2011/0219760 | A1 | 9/2011 | McBride et al. |
| 2011/0219763 | A1 | 9/2011 | McBride et al. |
| 2011/0232281 | A1 | 9/2011 | McBride et al. |
| 2011/0233934 | A1 | 9/2011 | Crane et al. |
| 2011/0252777 | A1 | 10/2011 | Bollinger et al. |
| 2011/0258996 | A1 | 10/2011 | Ingersoll et al. |
| 2011/0258999 | A1 | 10/2011 | Ingersoll et al. |
| 2011/0259001 | A1 | 10/2011 | McBride et al. |
| 2011/0259442 | A1 | 10/2011 | McBride et al. |
| 2011/0266810 | A1 | 11/2011 | McBride et al. |
| 2011/0283690 | A1 | 11/2011 | McBride et al. |
| 2011/0296822 | A1 | 12/2011 | Bollinger et al. |
| 2011/0296823 | A1 | 12/2011 | McBride et al. |
| 2011/0314800 | A1 | 12/2011 | Fong et al. |
| 2011/0314804 | A1 | 12/2011 | Fong et al. |
| 2011/0314810 | A1 | 12/2011 | McBride et al. |
| 2012/0000557 | A1 | 1/2012 | McBride et al. |
| 2012/0006013 | A1 | 1/2012 | McBride et al. |
| 2012/0017580 | A1 | 1/2012 | Fong et al. |
| 2012/0019009 | A1 | 1/2012 | Fong et al. |
| 2012/0023919 | A1 | 2/2012 | Fong et al. |
| 2012/0036851 | A1 | 2/2012 | McBride et al. |
| 2012/0042772 | A1 | 2/2012 | Fong et al. |
| 2012/0047884 | A1 | 3/2012 | McBride et al. |
| 2012/0055147 | A1 | 3/2012 | Fong et al. |
| 2012/0057996 | A1 | 3/2012 | Fong et al. |
| 2012/0057998 | A1 | 3/2012 | Ingersoll et al. |
| 2012/0067036 | A1 | 3/2012 | Fong et al. |
| 2012/0073432 | A1 | 3/2012 | Ingersoll et al. |
| 2012/0085086 | A1 | 4/2012 | Bollinger et al. |
| 2012/0090314 | A1 | 4/2012 | Fong et al. |
| 2012/0096845 | A1 | 4/2012 | Ingersoll et al. |
| 2012/0102935 | A1 | 5/2012 | Ingersoll et al. |
| 2012/0102954 | A1 | 5/2012 | Ingersoll et al. |
| 2012/0118137 | A1 | 5/2012 | Fong et al. |
| 2012/0119513 | A1 | 5/2012 | McBride et al. |
| 2012/0119514 | A1 | 5/2012 | Crane et al. |
| 2012/0137668 | A1 | 6/2012 | McBride et al. |
| 2012/0174569 | A1 | 7/2012 | Ingersoll et al. |
| 2012/0197683 | A1 | 8/2012 | Marcus |
| 2012/0210705 | A1 | 8/2012 | McBride et al. |
| 2012/0222424 | A1 | 9/2012 | Ingersoll et al. |
| 2012/0255292 | A1 | 10/2012 | Fong et al. |
| 2012/0260645 | A1 | 10/2012 | Fong et al. |
| 2012/0269651 | A1 | 10/2012 | Fong et al. |
| 2012/0279209 | A1 | 11/2012 | McBride et al. |
| 2012/0285154 | A1 | 11/2012 | Bollinger et al. |
| 2012/0286522 | A1 | 11/2012 | Stahlkopf et al. |
| 2012/0291989 | A1 | 11/2012 | Fong et al. |
| 2012/0297772 | A1 | 11/2012 | McBride et al. |
| 2012/0297776 | A1 | 11/2012 | Bollinger et al. |
| 2012/0299310 | A1 | 11/2012 | McBride et al. |
| 2013/0001958 | A1 | 1/2013 | Crane et al. |
| 2013/0009408 | A1 | 1/2013 | Crane et al. |
| 2013/0032743 | A1 | 2/2013 | Fong et al. |
| 2013/0047597 | A1 | 2/2013 | Fong et al. |
| 2013/0074485 | A1 | 3/2013 | McBride et al. |
| 2013/0074488 | A1 | 3/2013 | McBride et al. |
| 2013/0074940 | A1 | 3/2013 | McBride et al. |
| 2013/0074941 | A1 | 3/2013 | McBride et al. |
| 2013/0074949 | A1 | 3/2013 | McBride et al. |

FOREIGN PATENT DOCUMENTS

| | | |
|---|---|---|
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 201125855 | 10/2008 |
| CN | 101377190 | 4/2009 |
| CN | 101408213 | 4/2009 |
| CN | 101435451 | 5/2009 |
| DE | 25 38 870 | 6/1977 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 047622 | 4/2007 |
| EP | 0204748 | 3/1981 |
| EP | 0091801 | 10/1983 |
| EP | 0097002 | 12/1983 |

(56) References Cited

FOREIGN PATENT DOCUMENTS

| | | |
|---|---|---|
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |
| EP | 0 857 877 | 8/1998 |
| EP | 1 388 442 | 2/2004 |
| EP | 1405662 | 4/2004 |
| EP | 1657452 | 11/2004 |
| EP | 1726350 | 11/2006 |
| EP | 1741899 | 1/2007 |
| EP | 1 780 058 | 5/2007 |
| EP | 1988294 | 11/2008 |
| EP | 2014896 | 1/2009 |
| EP | 2078857 | 7/2009 |
| FR | 2449805 | 9/1980 |
| FR | 2816993 | 5/2002 |
| FR | 2829805 | 3/2003 |
| GB | 722524 | 11/1951 |
| GB | 772703 | 4/1957 |
| GB | 1449076 | 9/1976 |
| GB | 1479940 | 7/1977 |
| GB | 2106992 | 4/1983 |
| GB | 2223810 | 4/1990 |
| GB | 2 300 673 | 11/1996 |
| GB | 2373546 | 9/2002 |
| GB | 2403356 | 12/2004 |
| JP | 57010778 | 1/1982 |
| JP | 57070970 | 5/1982 |
| JP | 57120058 | 7/1982 |
| JP | 58183880 | 10/1982 |
| JP | 58150079 | 9/1983 |
| JP | 58192976 | 11/1983 |
| JP | 60206985 | 10/1985 |
| JP | 62101900 | 5/1987 |
| JP | 63227973 | 9/1988 |
| JP | 2075674 | 3/1990 |
| JP | 2247469 | 10/1990 |
| JP | 3009090 | 1/1991 |
| JP | 3281984 | 12/1991 |
| JP | 4121424 | 4/1992 |
| JP | 6185450 | 7/1994 |
| JP | 8145488 | 6/1996 |
| JP | 9166079 | 6/1997 |
| JP | 10313547 | 11/1998 |
| JP | 2000-346093 | 6/1999 |
| JP | 11351125 | 12/1999 |
| JP | 2000166128 | 6/2000 |
| JP | 2000346093 | 12/2000 |
| JP | 2002127902 | 5/2002 |
| JP | 2003083230 | 3/2003 |
| JP | 2005023918 | 1/2005 |
| JP | 2005036769 | 2/2005 |
| JP | 2005068963 | 3/2005 |
| JP | 2006220252 | 8/2006 |
| JP | 2007001872 | 1/2007 |
| JP | 2007145251 | 6/2007 |
| JP | 2007211730 | 8/2007 |
| JP | 2008038658 | 2/2008 |
| KR | 840000180 | 2/1984 |
| KR | 2004004637 | 1/2004 |
| RU | 2101562 | 1/1998 |
| RU | 2169857 | 6/2001 |
| RU | 2213255 | 9/2003 |
| SU | 800438 | 1/1981 |
| UA | 69030 | 8/2004 |
| WO | WO-82/00319 | 2/1982 |
| WO | WO-8802818 | 4/1988 |
| WO | WO-92/22741 | 12/1992 |
| WO | WO-93/06367 | 4/1993 |
| WO | WO-93/11363 | 6/1993 |
| WO | WO-93/24754 | 12/1993 |
| WO | WO 9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-99/41498 | 8/1999 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO-01/75308 | 10/2001 |
| WO | WO 0175290 | 10/2001 |
| WO | WO-02/25083 | 3/2002 |
| WO | WO-02/46621 | 6/2002 |
| WO | WO-02/103200 | 12/2002 |
| WO | WO-03/021107 | 3/2003 |
| WO | WO-03021702 | 3/2003 |
| WO | WO-03/078812 | 9/2003 |
| WO | WO-03081011 | 10/2003 |
| WO | WO-2004/037391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |
| WO | WO-2007/086792 | 8/2007 |
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2007/140914 | 12/2007 |
| WO | WO-2008/003950 | 1/2008 |
| WO | WO-2008/014769 | 2/2008 |
| WO | WO-2008023901 | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2008045468 | 4/2008 |
| WO | WO-2008/051427 | 5/2008 |
| WO | WO-2008/074075 | 6/2008 |
| WO | WO-2008/084507 | 7/2008 |
| WO | WO-2008/091373 | 7/2008 |
| WO | WO 2008102292 | 8/2008 |
| WO | WO-2008/106967 | 9/2008 |
| WO | WO-2008/108870 | 9/2008 |
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267 | 11/2008 |
| WO | WO-2008/152432 | 12/2008 |
| WO | WO-2008/153591 | 12/2008 |
| WO | WO-2008/157327 | 12/2008 |
| WO | WO-2009/034548 | 3/2009 |
| WO | WO-2009/038973 | 3/2009 |
| WO | WO-2009034421 | 3/2009 |
| WO | WO-2009/045110 | 4/2009 |
| WO | WO-2009044139 | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO-2010/040890 | 4/2010 |

(56) References Cited

FOREIGN PATENT DOCUMENTS

| | | |
|---|---|---|
| WO | WO-2010/105155 | 9/2010 |
| WO | WO-2010/135658 | 11/2010 |
| WO | WO-2011/008321 | 1/2011 |
| WO | WO-2011/008325 | 1/2011 |
| WO | WO-2011/008500 | 1/2011 |
| WO | WO-2011/079267 | 6/2011 |
| WO | WO-2011/079271 | 6/2011 |

OTHER PUBLICATIONS

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report, May 2004, 14 pages.

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion issued Jan. 4, 2011 for International Application No. PCT/US2010/055279, 13 pages.

International Search Report and Written Opinion mailed May 25, 2011 for International Application No. PCT/US2010/027138, 12 pages.

Rufer et al., "Energetic Performance of a Hybrid Energy Storage System Based on Compressed Air and Super Capacitors," Power Electronics, Electrical Drives, Automation and Motion, (May 1, 2006), pp. 469-474.

Lemofouet et al. "Hybrid Energy Storage Systems based on Compressed Air and Supercapacitors with Maximum Efficiency Point Tracking," Industrial Electronics Laboratory (LEI), (2005), pp. 1-10.

Lemofouet et al. "Hybrid Energy Storage Systems based on Compressed Air and Supercapacitors with Maximum Efficiency Point Tracking," The International Power Electronics Conference, (2005), pp. 461-468.

International Preliminary Report on Patentability mailed Oct. 13, 2011 for International Application No. PCT/US2010/029795 (9 pages).

Stephenson et al., "Computer Modelling of Isothermal Compression in the Reciprocating Compressor of a Complete Isoengine," 9th International Conference on Liquid Atomization and Spray Systems (Jul. 13-17, 2003).

Coney et al., "Development of a Reciprocating Compressor Using Water Injection to Achieve Quasi-Isothermal Compression," Purdue University International Compressor Engineering Conference (2002).

Linnemann et al., "The Isoengine—A Novel High Efficiency Engine with Optional Compressed Air Energy Storage (CAES)," International Joint Power Generation Conference (Jun. 16-19, 2003).

Linnemann et al., "The Isoengine: Realisation of a High-Efficiency Power Cycle Based on Isothermal Compression," Int. J. Energy Tech. and Policy, vol. 3, Nos. 1-2, pp. 66-84 (2005).

Winterburn et al., "Mechanisms of Ultrasound Foam Interactions," Asia-Pac. J. Chem. Eng., vol. 4, pp. 184-190 (2009).

* cited by examiner

For the sake of simplicity
shutoff valves (—⧖—) are shown
and are small grid (—⧖—) to indicate open
and upward diagonal (—⧖—) indicate closed.
Air (▭) and fluid (▨) flows/connections
are shown by bold lines

| DEVICE | TIME INSTANCE | | | | | |
|---|---|---|---|---|---|---|
| | 1 | 2 | 3 | 4 | 5 | 6 |
| A1 | A1 drive | A1 drive | A1 drive | Drive I1 | A1 fill | A1 fill x2 |
| A2 | A2 fill | A2 fill x2 | A2 drive | A2 drive | A2 drive | Drive I1 |
| A3 | A3 drive | Drive I1 | A3 fill | A3 fill x2 | A3 drive | A3 drive |
| I1 | I1 fill | I1 drive | I1 fill | I1 drive | I1 fill | I1 drive |

FIG. 8

SYSTEMS AND METHODS FOR ENERGY STORAGE AND RECOVERY USING RAPID ISOTHERMAL GAS EXPANSION AND COMPRESSION

CROSS-REFERENCE TO RELATED APPLICATIONS

This application is a continuation of U.S. patent application Ser. No. 12/639,703, filed Dec. 16, 2009, which (i) is a continuation-in-part of U.S. patent application Ser. No. 12/421,057, filed Apr. 9, 2009, which claims the benefit of and priority to U.S. Provisional Patent Application No. 61/148,691, filed Jan. 30, 2009, and U.S. Provisional Patent Application No. 61/043,630, filed Apr. 9, 2008; (ii) is a continuation-in-part of U.S. patent application Ser. No. 12/481,235, filed Jun. 9, 2009, which claims the benefit of and priority to U.S. Provisional Patent Application No. 61/059,964, filed Jun. 9, 2008; and (iii) claims the benefit of and priority to U.S. Provisional Patent Application Nos. 61/166,448, filed on Apr. 3, 2009; 61/184,166, filed on Jun. 4, 2009; 61/223,564, filed on Jul. 7, 2009; 61/227,222, filed on Jul. 21, 2009; and 61/251,965, filed on Oct. 15, 2009. The entire disclosure of each of these applications is hereby incorporated herein by reference.

STATEMENT REGARDING FEDERALLY SPONSORED RESEARCH

This invention was made with government support under IIP-0810590 and IIP-0923633 awarded by the NSF. The government has certain rights in the invention.

FIELD OF THE INVENTION

This invention relates to systems and methods for storing and recovering electrical energy using compressed gas, and more particularly to systems and methods for improving such systems and methods by rapid isothermal expansion and compression of the gas.

BACKGROUND OF THE INVENTION

As the world's demand for electric energy increases, the existing power grid is being taxed beyond its ability to serve this demand continuously. In certain parts of the United States, inability to meet peak demand has led to inadvertent brownouts and blackouts due to system overload and deliberate "rolling blackouts" of non-essential customers to shunt the excess demand. For the most part, peak demand occurs during the daytime hours (and during certain seasons, such as summer) when business and industry employ large quantities of power for running equipment, heating, air conditioning, lighting, etc. During the nighttime hours, thus, demand for electricity is often reduced significantly, and the existing power grid in most areas can usually handle this load without problem.

To address the lack of power at peak demand, users are asked to conserve where possible. Power companies often employ rapidly deployable gas turbines to supplement production to meet demand. However, these units burn expensive fuel sources, such as natural gas, and have high generation costs when compared with coal-fired systems, and other large-scale generators. Accordingly, supplemental sources have economic drawbacks and, in any case, can provide only a partial solution in a growing region and economy. The most obvious solution involves construction of new power plants, which is expensive and has environmental side effects. In addition, because most power plants operate most efficiently when generating a relatively continuous output, the difference between peak and off-peak demand often leads to wasteful practices during off-peak periods, such as over-lighting of outdoor areas, as power is sold at a lower rate off peak. Thus, it is desirable to address the fluctuation in power demand in a manner that does not require construction of new plants and can be implemented either at a power-generating facility to provide excess capacity during periods of peak demand, or on a smaller scale on-site at the facility of an electric customer (allowing that customer to provide additional power to itself during peak demand, when the grid is over-taxed).

Another scenario in which the ability to balance the delivery of generated power is highly desirable is in a self-contained generation system with an intermittent generation cycle. One example is a solar panel array located remotely from a power connection. The array may generate well for a few hours during the day, but is nonfunctional during the remaining hours of low light or darkness.

In each case, the balancing of power production or provision of further capacity rapidly and on-demand can be satisfied by a local back-up generator. However, such generators are often costly, use expensive fuels, such as natural gas or diesel fuel, and are environmentally damaging due to their inherent noise and emissions. Thus, a technique that allows storage of energy when not needed (such as during off-peak hours), and can rapidly deliver the power back to the user is highly desirable.

A variety of techniques is available to store excess power for later delivery. One renewable technique involves the use of driven flywheels that are spun up by a motor drawing excess power. When the power is needed, the flywheels' inertia is tapped by the motor or another coupled generator to deliver power back to the grid and/or customer. The flywheel units are expensive to manufacture and install, however, and require a degree of costly maintenance on a regular basis.

Another approach to power storage is the use of batteries. Many large-scale batteries use a lead electrode and acid electrolyte, however, and these components are environmentally hazardous. Batteries must often be arrayed to store substantial power, and the individual batteries may have a relatively short life (3-7 years is typical). Thus, to maintain a battery storage system, a large number of heavy, hazardous battery units must be replaced on a regular basis and these old batteries must be recycled or otherwise properly disposed of.

Energy can also be stored in ultracapacitors. A capacitor is charged by line current so that it stores charge, which can be discharged rapidly when needed. Appropriate power-conditioning circuits are used to convert the power into the appropriate phase and frequency of AC. However, a large array of such capacitors is needed to store substantial electric power. Ultracapacitors, while more environmentally friendly and longer lived than batteries, are substantially more expensive, and still require periodic replacement due to the breakdown of internal dielectrics, etc.

Another approach to storage of energy for later distribution involves the use of a large reservoir of compressed air. By way of background, a so-called compressed-air energy storage (CAES) system is shown and described in the published thesis entitled "Investigation and Optimization of Hybrid Electricity Storage Systems Based Upon Air and Supercapacitors," by Sylvain Lemofouet-Gatsi, Ecole Polytechnique Federale de Lausanne (20 Oct. 2006) (hereafter "Lemofouet-Gatsi"), Section 2.2.1, the disclosure of which is hereby incorporated herein by reference in its entirety. As stated by Lemofouet-Gatsi, "the principle of CAES derives from the splitting of the normal gas turbine cycle—where roughly 66% of the produced power is used to compress air-into two separated phases: The compression phase where lower-cost energy from off-peak base-load facilities is used to compress air into underground salt caverns and the generation phase where the pre-compressed air from the storage cavern is preheated through a heat recuperator, then mixed with oil or gas and burned to feed a multistage expander turbine to produce electricity during peak demand. This functional separation of the compression cycle from the combustion cycle allows a CAES plant to generate three times more energy with the same quantity of fuel compared to a simple cycle natural gas power plant.

Lemofouet-Gatsi continue, "CAES has the advantages that it doesn't involve huge, costly installations and can be used to store energy for a long time (more than one year). It also has a fast start-up time (9 to 12 minutes), which makes it suitable for grid operation, and the emissions of greenhouse gases are lower than that of a normal gas power plant, due to the reduced fuel consumption. The main drawback of CAES is probably the geological structure reliance, which substantially limits the usability of this storage method. In addition, CAES power plants are not emission-free, as the pre-compressed air is heated up with a fossil fuel burner before expansion. Moreover, [CAES plants] are limited with respect to their effectiveness because of the loss of the compression heat through the inter-coolers, which must be compensated during expansion by fuel burning. The fact that conventional CAES still rely on fossil fuel consumption makes it difficult to evaluate its energy round-trip efficiency and to compare it to conventional fuel-free storage technologies."

A number of variations on the above-described compressed air energy storage approach have been proposed, some of which attempt to heat the expanded air with electricity, rather than fuel. Others employ heat exchange with thermal storage to extract and recover as much of the thermal energy as possible, therefore attempting to increase efficiencies. Still other approaches employ compressed gas-driven piston motors that act both as compressors and generator drives in opposing parts of the cycle. In general, the use of highly compressed gas as a working fluid for the motor poses a number of challenges due to the tendency for leakage around seals at higher pressures, as well as the thermal losses encountered in rapid expansion. While heat exchange solutions can deal with some of these problems, efficiencies are still compromised by the need to heat compressed gas prior to expansion from high pressure to atmospheric pressure.

It has been recognized that gas is a highly effective medium for storage of energy. Liquids are incompressible and flow efficiently across an impeller or other moving component to rotate a generator shaft. One energy storage technique that uses compressed gas to store energy, but which uses a liquid, for example, hydraulic fluid, rather than compressed gas to drive a generator is a so-called closed-air hydraulic-pneumatic system. Such a system employs one or more high-pressure tanks (accumulators) having a charge of compressed gas, which is separated by a movable wall or flexible bladder membrane from a charge of hydraulic fluid. The hydraulic fluid is coupled to a bi-directional impeller (or other hydraulic motor/pump), which is itself coupled to a combined electric motor/generator. The other side of the impeller is connected to a low-pressure reservoir of hydraulic fluid. During a storage phase, the electric motor and impeller force hydraulic fluid from the low-pressure hydraulic fluid reservoir into the high-pressure tank(s), against the pressure of the compressed air. As the incompressible liquid fills the tank, it forces the air into a smaller space, thereby compressing it to an even higher pressure. During a generation phase, the fluid circuit is run in reverse and the impeller is driven by fluid escaping from the high-pressure tank(s) under the pressure of the compressed gas.

This closed-air approach has an advantage in that the gas is never expanded to or compressed from atmospheric pressure, as it is sealed within the tank. An example of a closed-air system is shown and described in U.S. Pat. No. 5,579,640, the disclosure of which is hereby incorporated herein by reference in its entirety. Closed-air systems tend to have low energy densities. That is, the amount of compression possible is limited by the size of the tank space. In addition, since the gas does not completely decompress when the fluid is removed, there is still additional energy in the system that cannot be tapped. To make a closed air system desirable for large-scale energy storage, many large accumulator tanks would be needed, increasing the overall cost to implement the system and requiring more land to do so.

Another approach to hybrid hydraulic-pneumatic energy storage is the open-air system. In an exemplary open-air system, compressed air is stored in a large, separate high-pressure tank (or plurality of tanks) A pair of accumulators is provided, each having a fluid side separated from a gas side by a movable piston wall. The fluid sides of a pair (or more) of accumulators are coupled together through an impeller/generator/motor combination. The air side of each of the accumulators is coupled to the high pressure air tanks, and also to a valve-driven atmospheric vent. Under expansion of the air chamber side, fluid in one accumulator is driven through the impeller to generate power, and the spent fluid then flows into the second accumulator, whose air side is now vented to atmospheric, thereby allowing the fluid to collect in the second accumulator. During the storage phase, electrical energy can used to directly recharge the pressure tanks via a compressor, or the accumulators can be run in reverse to pressurize the pressure tanks. A version of this open-air concept is shown and described in U.S. Pat. No. 6,145,311 (the '311 patent), the disclosure of which is hereby incorporated herein by reference in its entirety. Disadvantages of this design of an open-air system can include gas leakage, complexity, expense and, depending on the intended deployment, potential impracticality.

Additionally, it is desirable for solutions that address the fluctuations in power demand to also address environmental concerns and include using renewable energy sources. As demand for renewable energy increases, the intermittent nature of some renewable energy sources (e.g., wind and solar) places an increasing burden on the electric grid. The use of energy storage is a key factor in addressing the intermittent nature of the electricity produced by renewable sources, and more generally in shifting the energy produced to the time of peak demand.

As discussed, storing energy in the form of compressed air has a long history. However, most of the discussed methods for converting potential energy in the form of compressed air to electrical energy utilize turbines to expand the gas, which is an inherently adiabatic process. As gas expands, it cools off if there is no input of heat (adiabatic gas expansion), as is the case with gas expansion in a turbine. The advantage of adiabatic gas expansion is that it can occur quickly, thus resulting in the release of a substantial quantity of energy in a short time frame.

However, if the gas expansion occurs slowly relative to the time with which it takes for heat to flow into the gas, then the gas remains at a relatively constant temperature as it expands (isothermal gas expansion). High pressure gas (e.g. 3000 psig air) stored at ambient temperature, which is expanded isothermally, recovers approximately two and a half times the energy of ambient temperature gas expanded adiabatically. Therefore, there is a significant energy advantage to expanding gas isothermally.

In the case of certain compressed gas energy storage systems according to prior implementations, gas is expanded from a high-pressure, high-capacity source, such as a large underground cavern, and directed through a multi-stage gas turbine. Because significant expansion occurs at each stage of the operation, the gas cools down at each stage. To increase efficiency, the gas is mixed with fuel and ignited, pre-heating it to a higher temperature, thereby increasing power and final gas temperature. However, the need to burn fossil fuel (or apply another energy source, such as electric heating) to compensate for adiabatic expansion substantially defeats the purpose of an otherwise clean and emission-free energy-storage and recovery process.

While it is technically possible to provide a direct heat-exchange subsystem to a hydraulic/pneumatic cylinder, an external jacket, for example, is not particularly effective given the thick walls of the cylinder. An internalized heat exchange subsystem could conceivably be mounted directly within the cylinder's pneumatic side; however, size limitations would reduce such a heat exchanger's effectiveness and the task of sealing a cylinder with an added subsystem installed therein would be significant, and make the use of a conventional, commercially available component difficult or impossible.

Thus, the prior art does not disclose systems and methods for rapidly compressing and expanding gas isothermally that can be used in power storage and recovery, as well as other applications, that allow for the use of conventional, lower cost components in an environmentally friendly manner.

SUMMARY OF THE INVENTION

In various embodiments, the invention provides an energy storage system, based upon an open-air hydraulic-pneumatic arrangement, using high-pressure gas in tanks that is expanded in small batches from a high pressure of several hundred atmospheres to atmospheric pressure. The systems may be sized and operated at a rate that allows for near isothermal expansion and compression of the gas. The systems may also be scalable through coupling of additional accumulator circuits and storage tanks as needed. Systems and methods in accordance with the invention may allow for efficient near-isothermal high compression and expansion to/from high pressure of several hundred atmospheres down to atmospheric pressure to provide a much higher energy density.

Embodiments of the invention overcome the disadvantages of the prior art by providing a system for storage and recovery of energy using an open-air hydraulic-pneumatic accumulator and intensifier arrangement implemented in at least one circuit that combines an accumulator and an intensifier in communication with a high-pressure gas storage reservoir on the gas-side of the circuit, and a combination fluid motor/pump coupled to a combination electric generator/motor on the fluid side of the circuit. In a representative embodiment, an expansion/energy recovery mode, the accumulator of a first circuit is first filled with high-pressure gas from the reservoir, and the reservoir is then cut off from the air chamber of the accumulator. This gas causes fluid in the accumulator to be driven through the motor/pump to generate electricity. Exhausted fluid is driven into either an opposing intensifier or an accumulator in an opposing second circuit, whose air chamber is vented to atmosphere. As the gas in the accumulator expands to mid-pressure, and fluid is drained, the mid-pressure gas in the accumulator is then connected to an intensifier with a larger-area air piston acting on a smaller area fluid piston. Fluid in the intensifier is then driven through the motor/pump at still-high fluid pressure, despite the mid-pressure gas in the intensifier air chamber. Fluid from the motor/pump is exhausted into either the opposing first accumulator or an intensifier of the second circuit, whose air chamber may be vented to atmosphere as the corresponding fluid chamber fills with exhausted fluid. In a compression/energy storage stage, the process is reversed and the fluid motor/pump is driven by the electric component to force fluid into the intensifier and the accumulator to compress gas and deliver it to the tank reservoir under high pressure.

The power output of these systems is governed by how fast the gas can expand isothermally. Therefore, the ability to expand/compress the gas isothermally at a faster rate will result in a greater power output of the system. By adding a heat transfer subsystems to these systems, the power density of said system can be increased substantially.

In one aspect, the invention relates to a system for substantially isothermal expansion and compression of a gas. The system includes a cylinder assembly including a staged pneumatic side and a hydraulic side, the sides being separated by a movable mechanical boundary mechanism that transfers energy therebetween, and a heat transfer subsystem in fluid communication with the pneumatic side of the cylinder assembly. The movable mechanical boundary mechanism can be capable of, for example, slidable movement within the cylinder (e.g., a piston), expansion/contraction (e.g., a bladder), and/or mechanically coupling the hydraulic and pneumatic sides via a rectilinear translator.

In various embodiments, the cylinder assembly includes at least one of an accumulator or an intensifier. In one embodiment, the heat transfer subsystem further includes a circulation apparatus in fluid communication with the pneumatic side of the cylinder assembly for circulating a fluid through the heat transfer subsystem and a heat exchanger. The heat exchanger includes a first side in fluid communication with the circulation apparatus and the pneumatic side of the cylinder assembly and a second side in fluid communication with a liquid source having a substantially constant temperature. The circulation apparatus circulates the fluid from the pneumatic side of the cylinder assembly, through the heat exchanger, and back to the pneumatic side of the cylinder assembly. The circulation apparatus can be a positive displacement pump and the heat exchanger can be a shell and tube type or a plate type heat exchanger.

Additionally, the system can include at least one temperature sensor in communication with at least one of the pneumatic side of the cylinder assembly or the fluid exiting the heat transfer subsystem and a control system for receiving telemetry from the at least one temperature sensor to control operation of the heat transfer subsystem based at least in part on the received telemetry. The temperature sensor can be implemented by a direct temperature measurement (e.g., thermocouple or thermistor) or through indirect measurement based on pressure, position, and/or flow sensors.

In other embodiments, the heat transfer subsystem includes a fluid circulation apparatus and a heat transfer fluid reservoir. The fluid circulation apparatus can be arranged to pump a heat transfer fluid from the reservoir into the pneumatic side of the cylinder assembly. In various embodiments, the heat transfer subsystem includes a spray mechanism disposed in the pneumatic side of the cylinder assembly for introducing the heat transfer fluid. The spray mechanism can be a spray head and/or a spray rod.

In another aspect, the invention relates to a staged hydraulic-pneumatic energy conversion system that stores and recovers electrical energy using thermally conditioned compressed fluids, for example, a gas that undergoes a heat exchange. The system includes first and second coupled cylinder assemblies. The system includes at least one pneumatic side comprising a plurality of stages and at least one hydraulic side and a heat transfer subsystem in fluid communication with the at least one pneumatic side. The at least one pneumatic side and the at least one hydraulic side are separated by at least one movable mechanical boundary mechanism that transfers energy therebetween.

In one embodiment, the first cylinder assembly includes at least one pneumatic cylinder and the second cylinder assembly includes at least one hydraulic cylinder and the first and second cylinder assemblies are mechanically coupled via the at least one movable mechanical boundary mechanism. In another embodiment, the first cylinder assembly includes an accumulator that transfers the mechanical energy at a first pressure ratio and the second cylinder assembly includes an intensifier that transfers the mechanical energy at a second pressure ratio greater than the first pressure ratio. The first and second cylinder assemblies can be fluidly coupled.

In various embodiments, the heat transfer subsystem can include a circulation apparatus in fluid communication with the at least one pneumatic side for circulating a fluid through the heat transfer subsystem and a heat exchanger. The heat exchanger can include a first side in fluid communication with the circulation apparatus and the at least one pneumatic side and a second side in fluid communication with a liquid source having a substantially constant temperature. The circulation apparatus circulates the fluid from the at least one pneumatic side, through the heat exchanger, and back to the at least one pneumatic side. In addition, the system can include a control valve arrangement for connecting selectively between stages of the at least one pneumatic side of the system.

In another embodiment, the heat transfer subsystem includes a fluid circulation apparatus and a heat transfer fluid reservoir. The fluid circulation apparatus is arranged to pump a heat transfer fluid from the reservoir into the at least one pneumatic sides of the system. In one embodiment, each of the cylinder assemblies has a pneumatic side, and the system includes a control valve arrangement for connecting selectively the pneumatic side of the first cylinder and the pneumatic side of the second cylinder assembly to the fluid circulation apparatus. The system can also include a spray mechanism disposed in the at least one pneumatic side for introducing the heat transfer fluid.

In another aspect, the invention relates to a staged hydraulic-pneumatic energy conversion system that stores and recovers electrical energy using thermally conditioned compressed fluids. The system includes at least one cylinder assembly including a pneumatic side and a hydraulic side separated by a mechanical boundary mechanism that transfers energy therebetween, a source of compressed gas, and a heat transfer subsystem in fluid communication with at least one of the pneumatic side of the cylinder assembly or the source of compressed gas.

These and other objects, along with the advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In addition, the drawings are not necessarily to scale, emphasis instead generally being placed upon illustrating the principles of the invention. In the following description, various embodiments of the present invention are described with reference to the following drawings, in which:

FIG. 8 is a table illustrating the expansion phase for the system of FIGS. 7A-7F;

DETAILED DESCRIPTION

In the following, various embodiments of the present invention are generally described with reference to a two-stage system, e.g., a single accumulator and a single intensifier, an arrangement with two accumulators and two intensifiers and simplified valve arrangements, or one or more pneumatic cylinders coupled with one or more hydraulic cylinders. It is, however, to be understood that the present invention can include any number of stages and combination of cylinders, accumulators, intensifiers, and valve arrangements. In addition, any dimensional values given are exemplary only, as the systems according to the invention are scalable and customizable to suit a particular application. Furthermore, the terms pneumatic, gas, and air are used interchangeably and the terms hydraulic and liquid are also used interchangeably. Fluid is used to refer to both gas and liquid.

Figure 1:
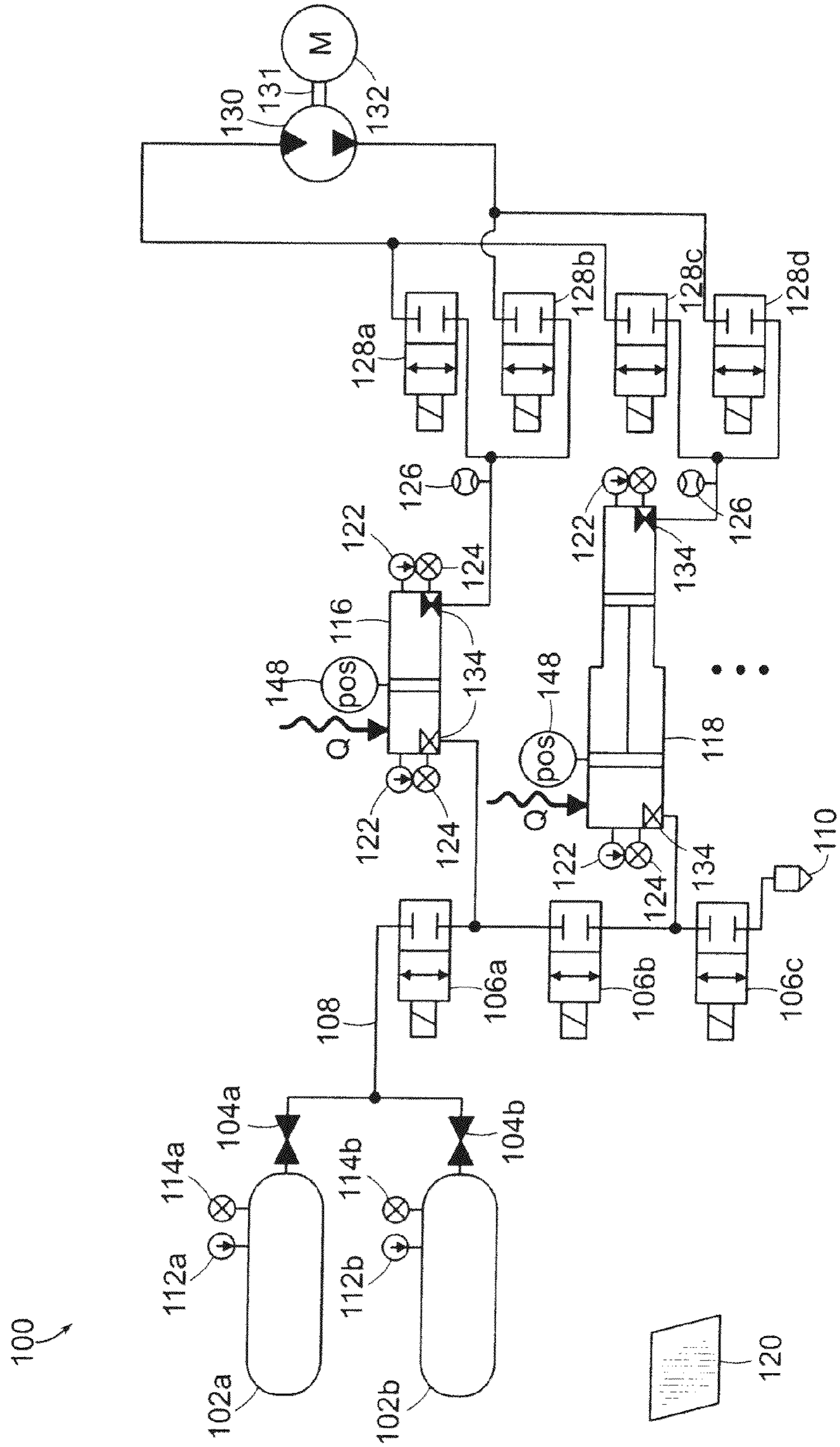
FIG. 1 is a schematic diagram of an open-air hydraulic-pneumatic energy storage and recovery system in accordance with one embodiment of the invention.

FIG. 1 depicts one embodiment of an open-air hydraulic-pneumatic energy storage and recovery system 100 in accordance with the invention in a neutral state (i.e., all of the valves are closed and energy is neither being stored nor recovered. The system 100 includes one or more high-pressure gas/air storage tanks 102*a*, 102*b*, . . . 102*n*. Each tank 102 is joined in parallel via a manual valve(s) 104*a*, 104*b*, . . . 104*n*, respectively, to a main air line 108. The valves 104 are not limited to manual operation, as the valves can be electrically, hydraulically, or pneumatically actuated, as can all of the valves described herein. The tanks 102 are each provided with a pressure sensor 112*a*, 112*b* . . . 112*n* and a temperature sensor 114*a*, 114*b* . . . 114*n*. These sensors 112, 114 can output electrical signals that can be monitored by a control system 120 via appropriate wired and wireless connections/communications. Additionally, the sensors 112, 114 could include visual indicators.

Figure 4:
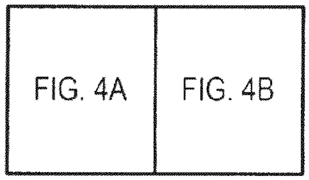
FIG. 4 is a schematic diagram of an open-air hydraulic-pneumatic energy storage and recovery system in accordance with an alternative embodiment of the invention.
Figure 4A:
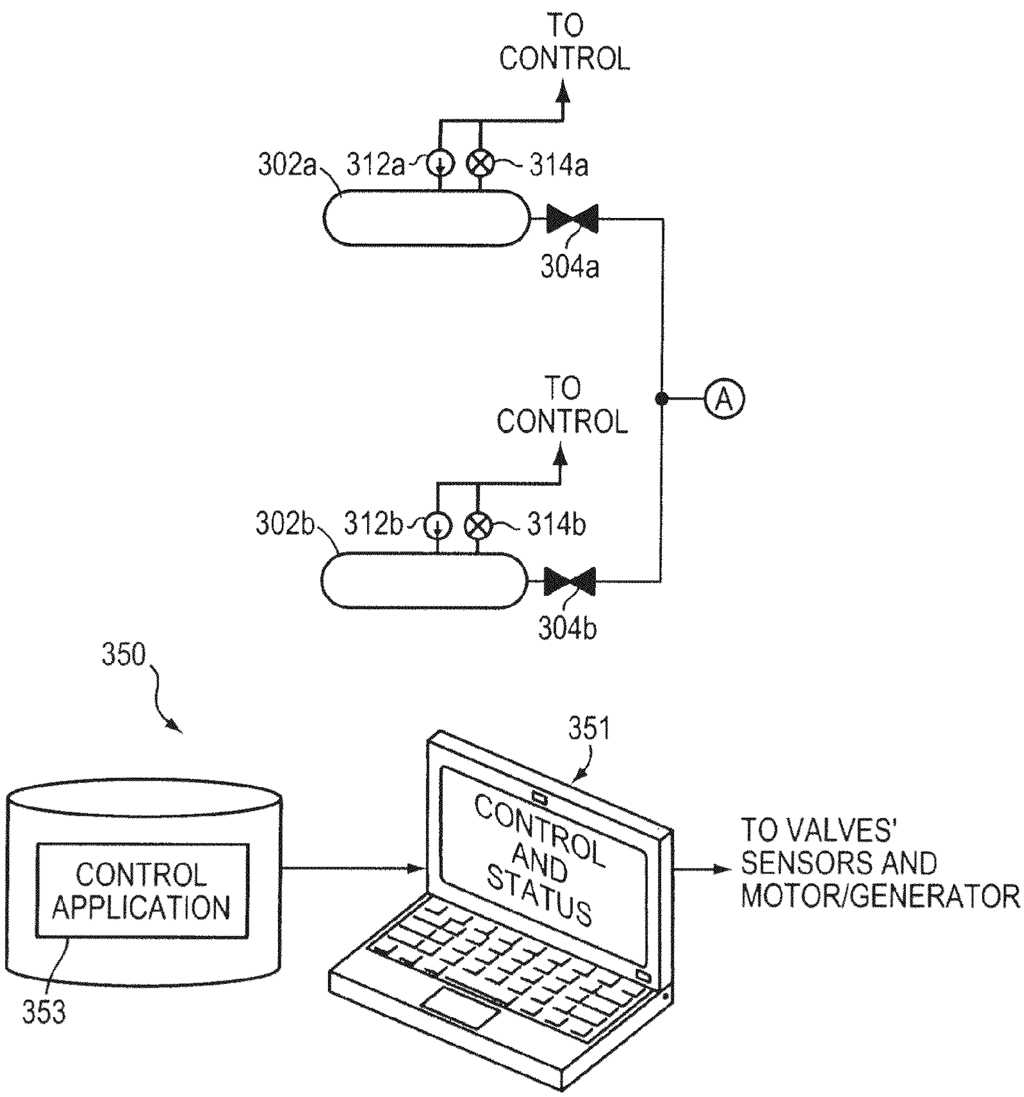
Figure 4B:
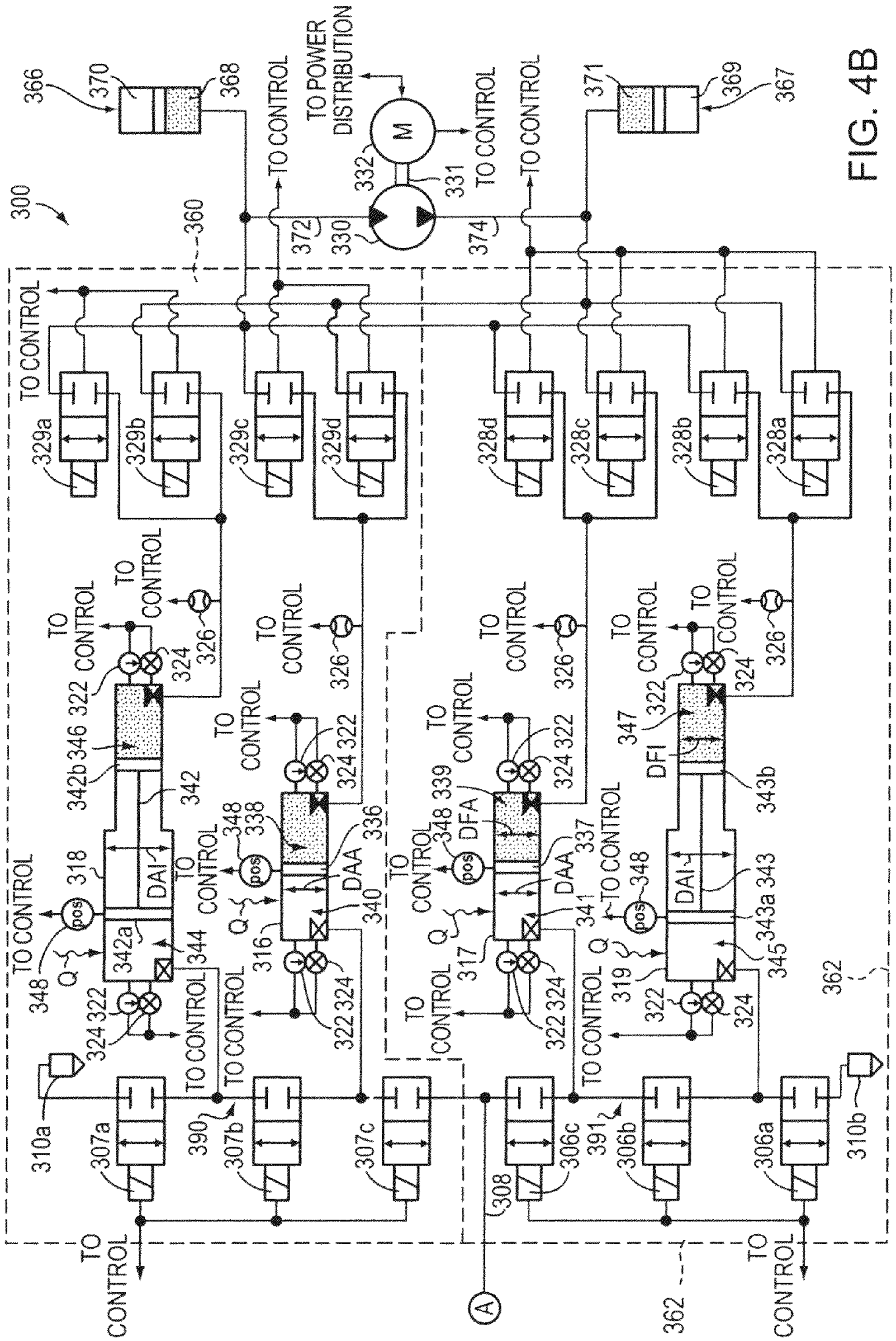

The control system 120, which is described in greater detail with respect to FIG. 4, can be any acceptable control device with a human-machine interface. For example, the control system 120 could include a computer (for example a PC-type) that executes a stored control application in the form of a computer-readable software medium. The control application receives telemetry from the various sensors to be described below, and provides appropriate feedback to control valve actuators, motors, and other needed electromechanical/electronic devices.

The system 100 further includes pneumatic valves 106*a*, 106*b*, 106*c*, . . . 106*n* that control the communication of the main air line 108 with an accumulator 116 and an intensifier 118. As previously stated, the system 100 can include any number and combination of accumulators 116 and intensifiers 118 to suit a particular application. The pneumatic valves 106 are also connected to a vent 110 for exhausting air/gas from the accumulator 116, the intensifier 118, and/or the main air line 108.

Figure 1B:
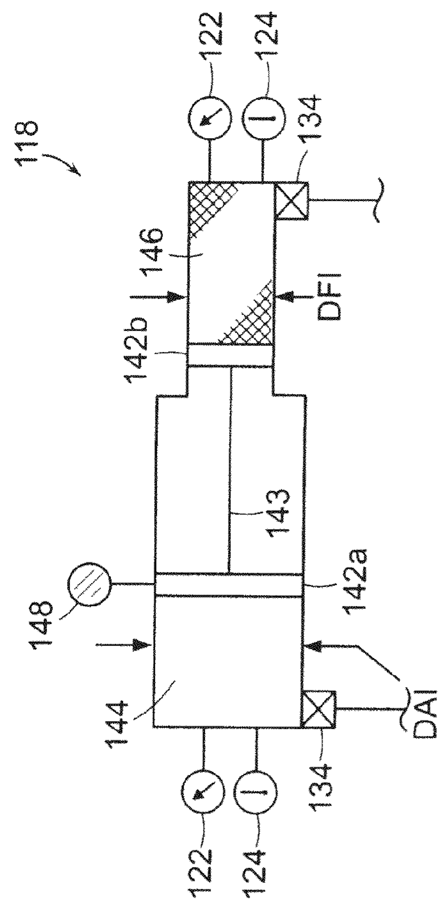
FIGS. 1A and 1B are enlarged schematic views of the accumulator and intensifier components of the system of FIG. 1.
Figure 1A:
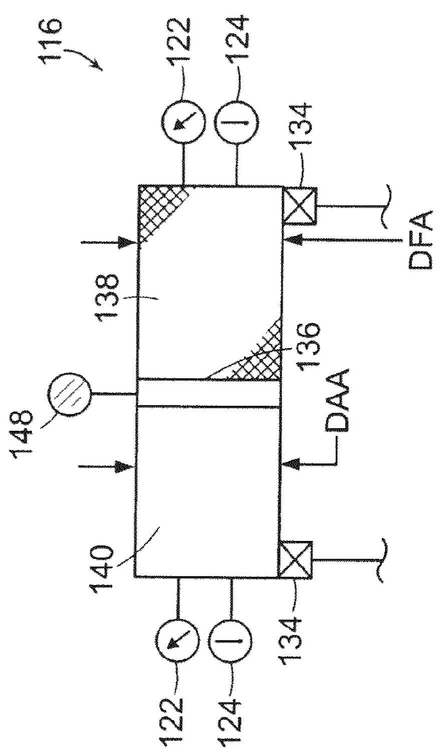

As shown in FIG. 1A, the accumulator 116 includes an air chamber 140 and a fluid chamber 138 divided by a movable piston 136 having an appropriate sealing system using sealing rings and other components (not shown) that are known to those of ordinary skill in the art. Alternatively, a bladder type, diaphragm type or bellows type barrier could be used to divide the air and fluid chambers 140, 138 of the accumulator 116. The piston 136 moves along the accumulator housing in response to pressure differentials between the air chamber 140 and the opposing fluid chamber 138. In this example, hydraulic fluid (or another liquid, such as water) is indicated by a shaded volume in the fluid chamber 138. The accumulator 116 can also include optional shut-off valves 134 that can be used to isolate the accumulator 116 from the system 100. The valves 134 can be manually or automatically operated.

As shown in FIG. 1B, the intensifier 118 includes an air chamber 144 and a fluid chamber 146 divided by a movable piston assembly 142 having an appropriate sealing system using sealing rings and other components that are known to those of ordinary skill in the art. Similar to the accumulator piston 136, the intensifier piston 142 moves along the intensifier housing in response to pressure differentials between the air chamber 144 and the opposing fluid chamber 146.

However, the intensifier piston assembly 142 is actually two pistons: an air piston 142*a* connected by a shaft, rod, or other coupling means 143 to a respective fluid piston 142*b*. The fluid piston 142*b* moves in conjunction with the air piston 142*a*, but acts directly upon the associated intensifier fluid chamber 146. Notably, the internal diameter (and/or volume) (DAI) of the air chamber for the intensifier 118 is greater than the diameter (DAA) of the air chamber for the accumulator 116. In particular, the surface of the intensifier piston 142*a* is greater than the surface area of the accumulator piston 136. The diameter of the intensifier fluid piston (DFI) is approximately the same as the diameter of the accumulator piston 136 (DFA). Thus in this manner, a lower air pressure acting upon the intensifier piston 142*a* generates a similar pressure on the associated fluid chamber 146 as a higher air pressure acting on the accumulator piston 136. As such, the ratio of the pressures of the intensifier air chamber 144 and the intensifier fluid chamber 146 is greater than the ratio of the pressures of the accumulator air chamber 140 and the accumulator fluid chamber 138. In one example, the ratio of the pressures in the accumulator could be 1:1, while the ratio of pressures in the intensifier could be 10:1. These ratios will vary depending on the number of accumulators and intensifiers used and the particular application. In this manner, and as described further below, the system 100 allows for at least two stages of air pressure to be employed to generate similar levels of fluid pressure. Again, a shaded volume in the fluid chamber 146 indicates the hydraulic fluid and the intensifier 118 can also include the optional shut-off valves 134 to isolate the intensifier 118 from the system 100.

As also shown in FIGS. 1A and 1B, the accumulator 116 and the intensifier 118 each include a temperature sensor 122 and a pressure sensor 124 in communication with each air chamber 140, 144 and each fluid chamber 138, 146. These sensors are similar to sensors 112, 114 and deliver sensor telemetry to the control system 120, which in turn can send signals to control the valve arrangements. In addition, the pistons 136, 142 can include position sensors 148 that report the present position of the pistons 136, 142 to the control system 120. The position and/or rate of movement of the pistons 136, 142 can be used to determine relative pressure and flow of both the gas and the fluid.

Referring back to FIG. 1, the system 100 further includes hydraulic valves 128*a*, 128*b*, 128*c*, 128*d* . . . 128*n* that control the communication of the fluid connections of the accumulator 116 and the intensifier 118 with a hydraulic motor 130. The specific number, type, and arrangement of the hydraulic valves 128 and the pneumatic valves 106 are collectively referred to as the control valve arrangements. In addition, the valves are generally depicted as simple two way valves (i.e., shut-off valves); however, the valves could essentially be any configuration as needed to control the flow of air and/or fluid in a particular manner. The hydraulic line between the accumulator 116 and valves 128*a*, 128*b* and the hydraulic line between the intensifier 118 and valves 128*c*, 128*d* can include flow sensors 126 that relay information to the control system 120.

The motor/pump 130 can be a piston-type assembly having a shaft 131 (or other mechanical coupling) that drives, and is driven by, a combination electrical motor and generator assembly 132. The motor/pump 130 could also be, for example, an impeller, vane, or gear type assembly. The motor/generator assembly 132 is interconnected with a power distribution system and can be monitored for status and output/input level by the control system 120.

One advantage of the system depicted in FIG. 1, as opposed, for example, to the system of FIGS. 4 and 5, is that it achieves approximately double the power output in, for example, a 3000-300 psig range without additional components. Shuffling the hydraulic fluid back and forth between the intensifier 118 and the accumulator 116 allows for the same power output as a system with twice the number of intensifiers and accumulators while expanding or compressing in the 250-3000 psig pressure range. In addition, this system arrangement can eliminate potential issues with self-priming for certain the hydraulic motors/pumps when in the pumping mode (i.e., compression phase).

Figure 2A:
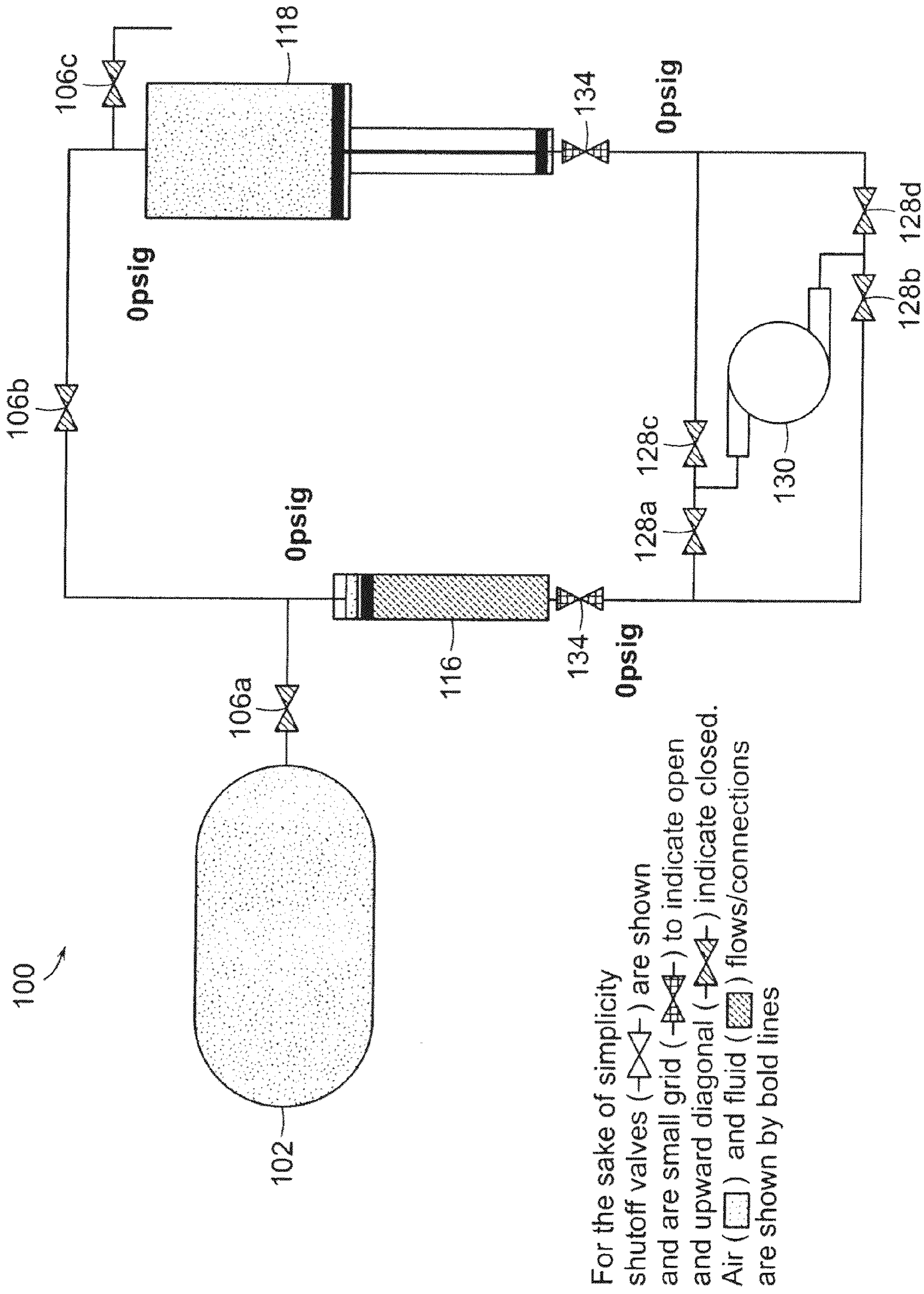
FIGS. 2A-2Q are simplified graphical representations of the system of FIG. 1 illustrating the various operational stages of the system during compression.
Figure 2B:
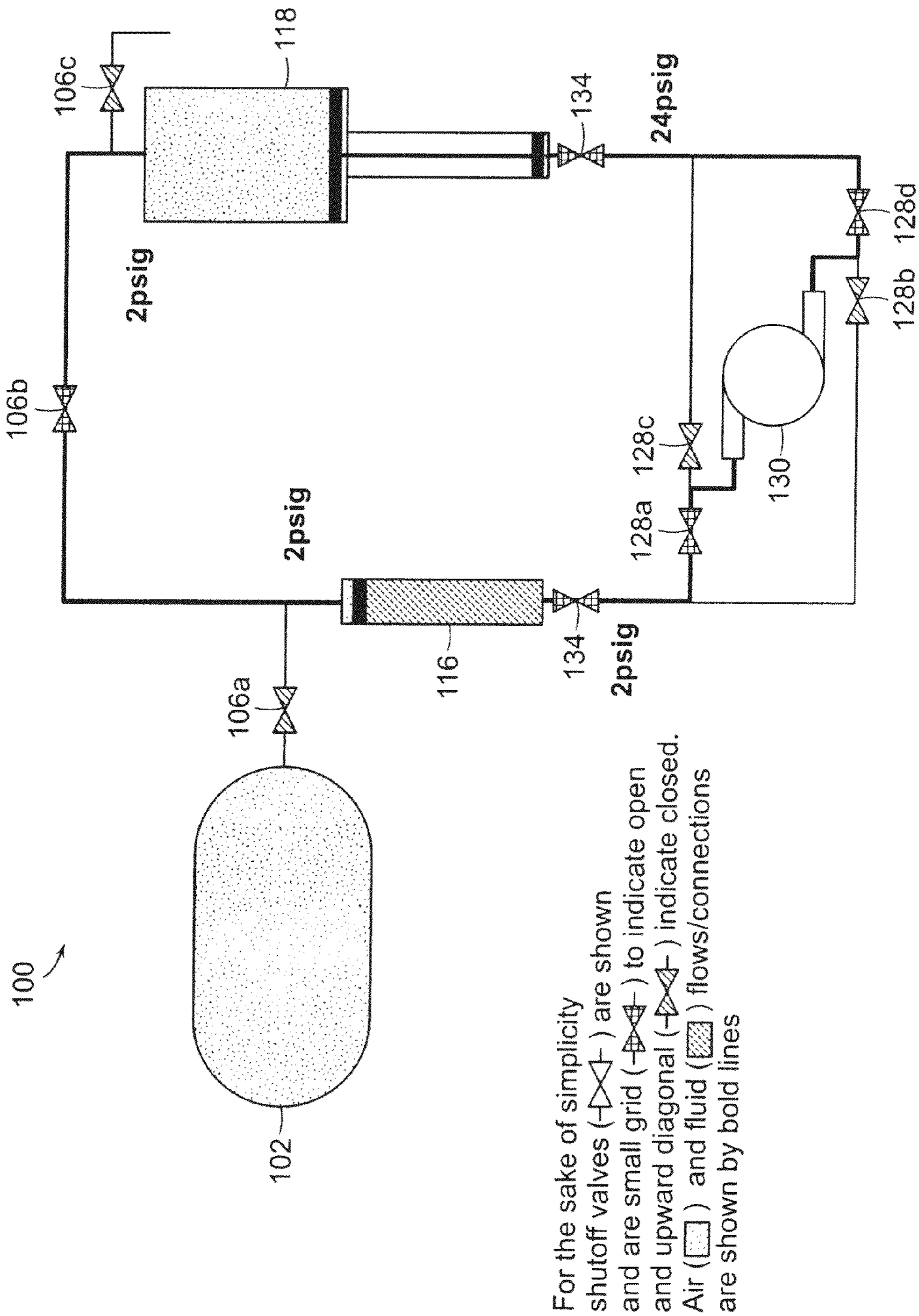
Figure 2C:
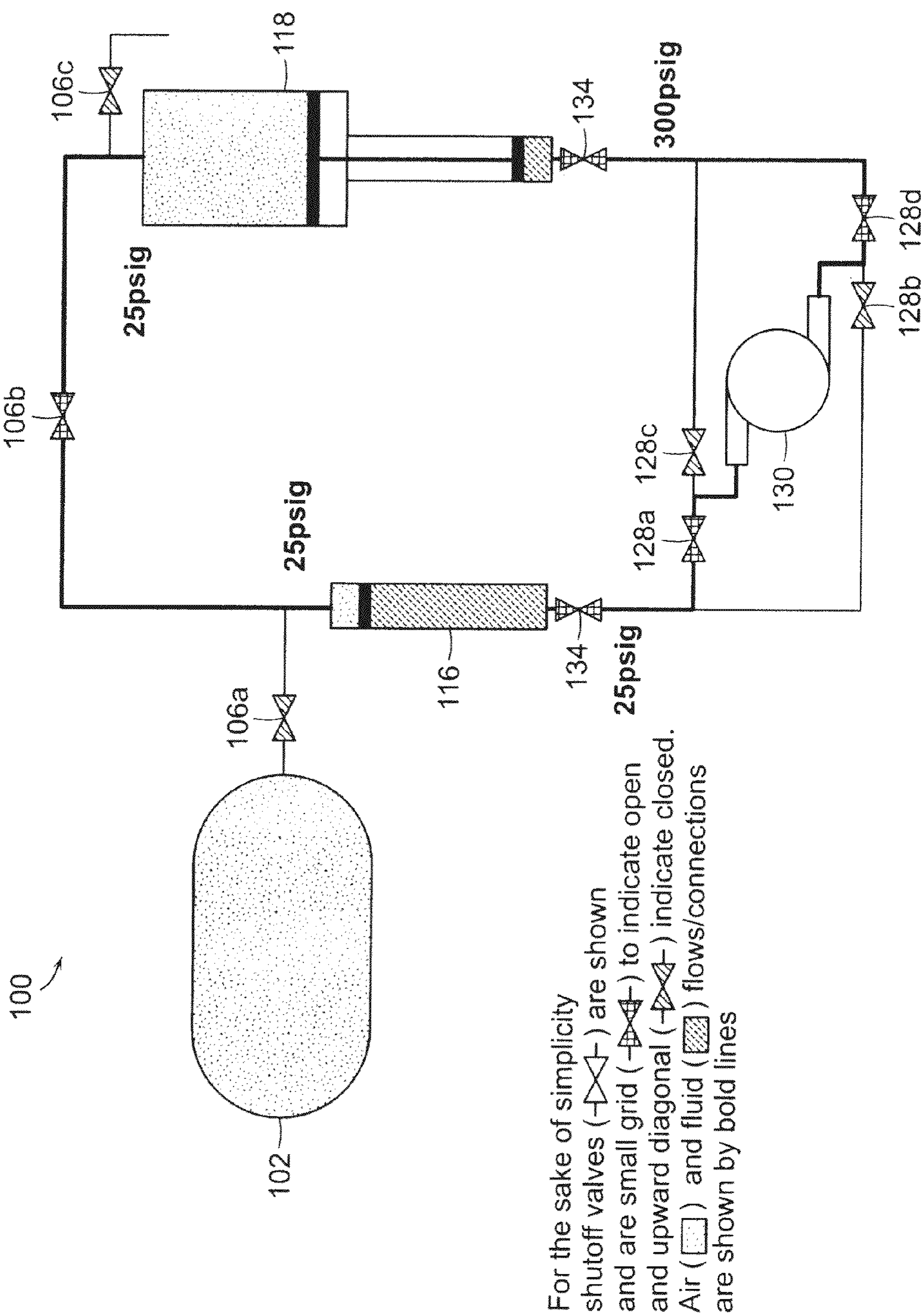
Figure 2D:
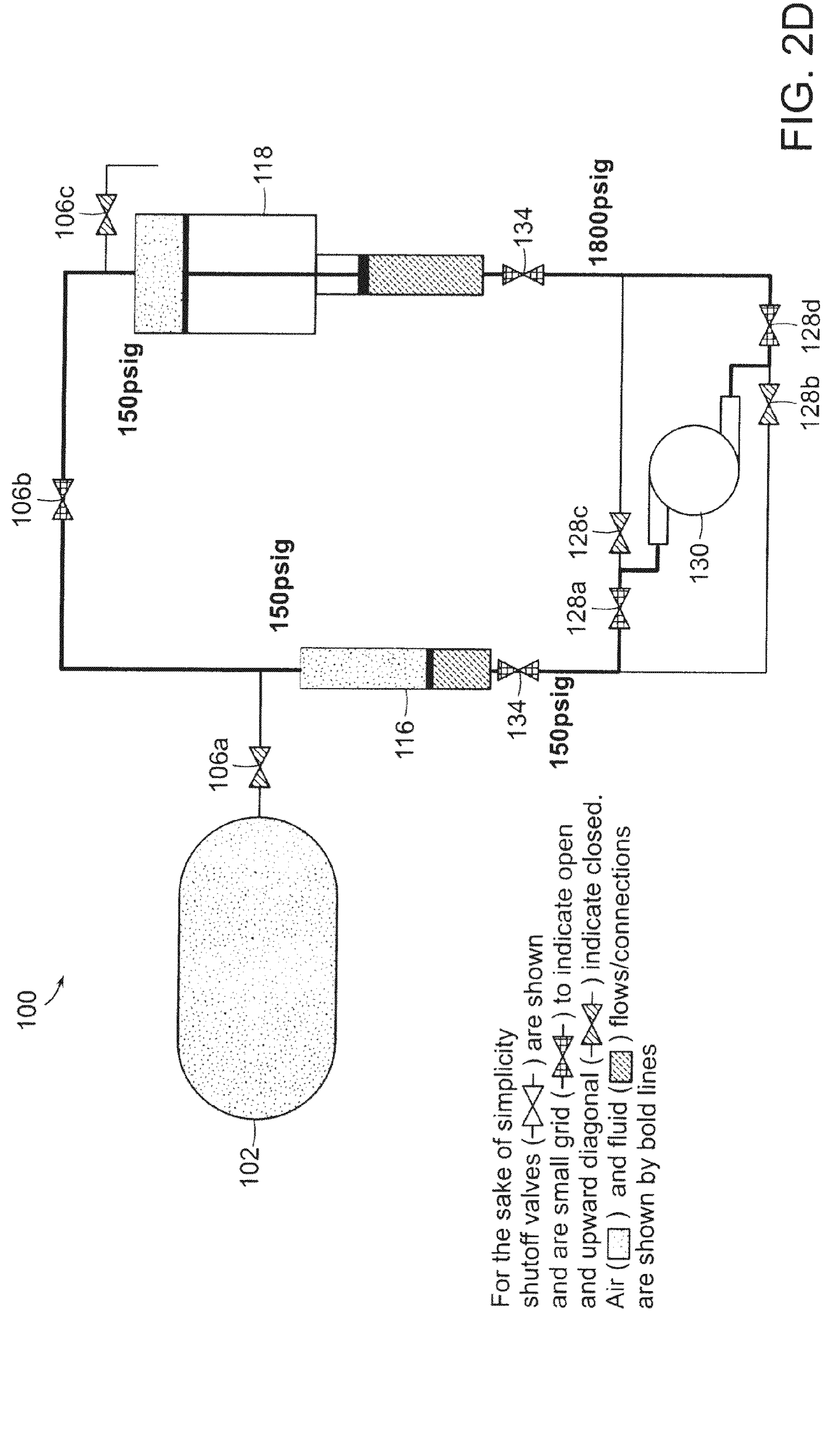
Figure 2E:
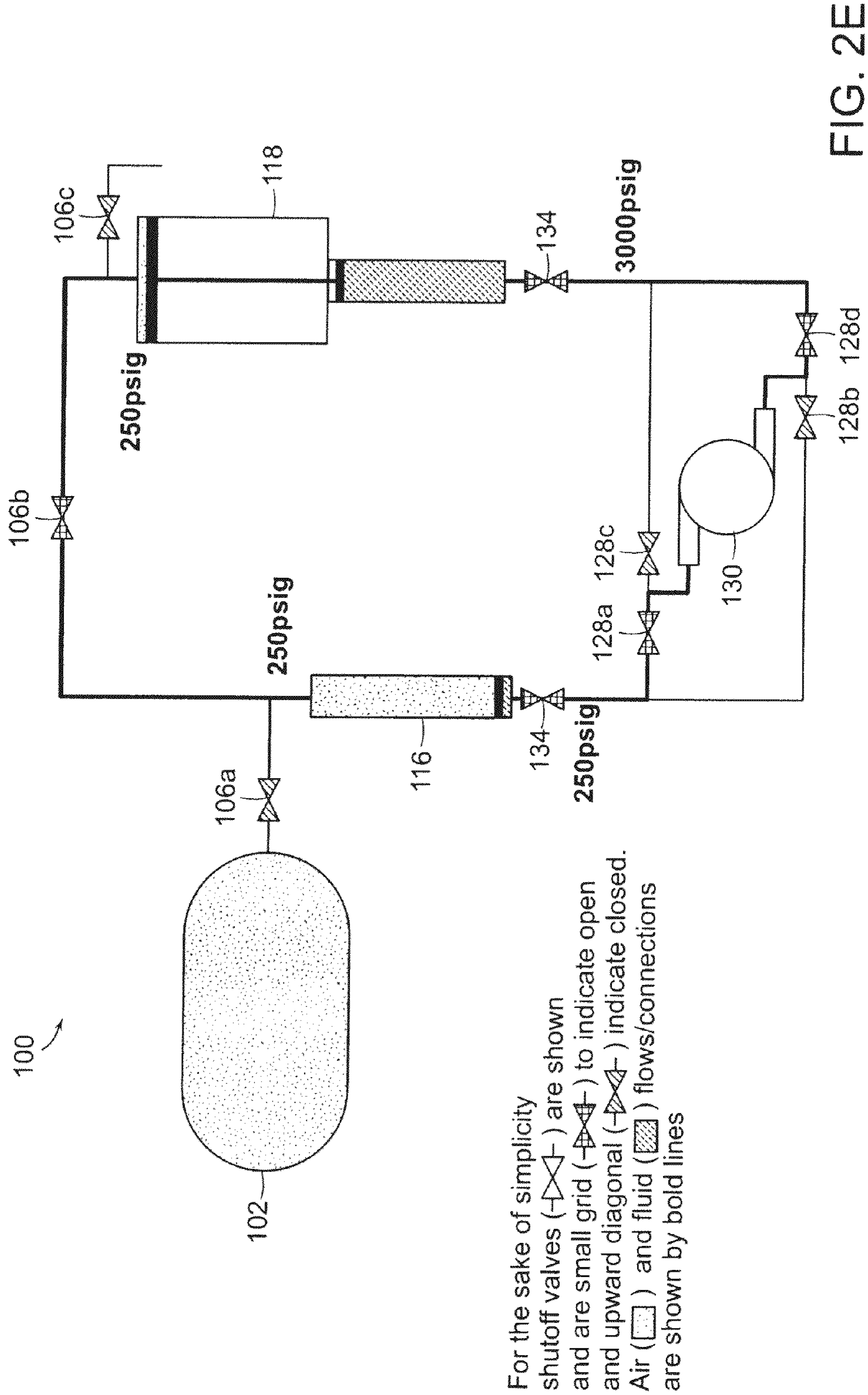
Figure 2F:
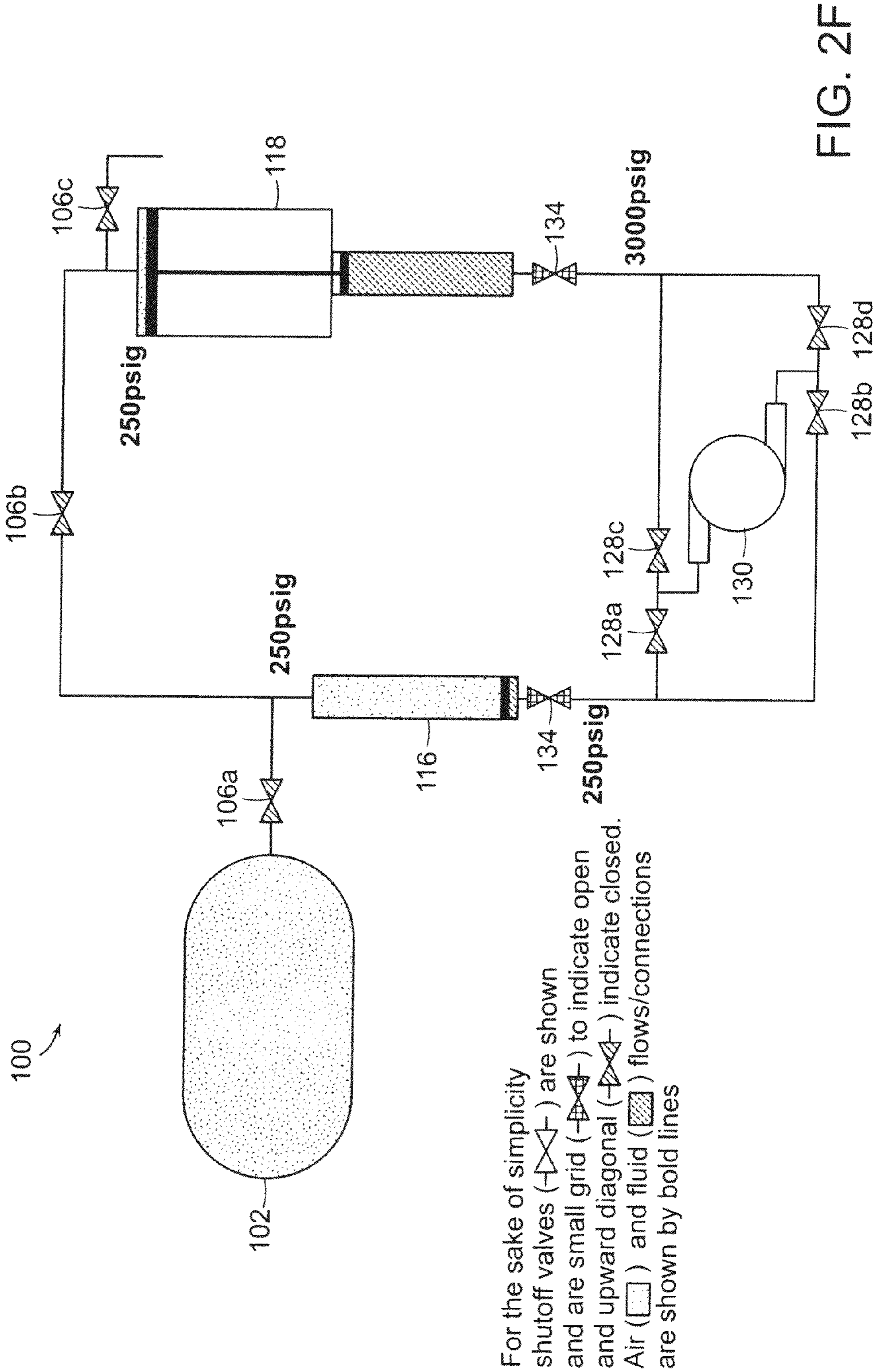
Figure 2G:
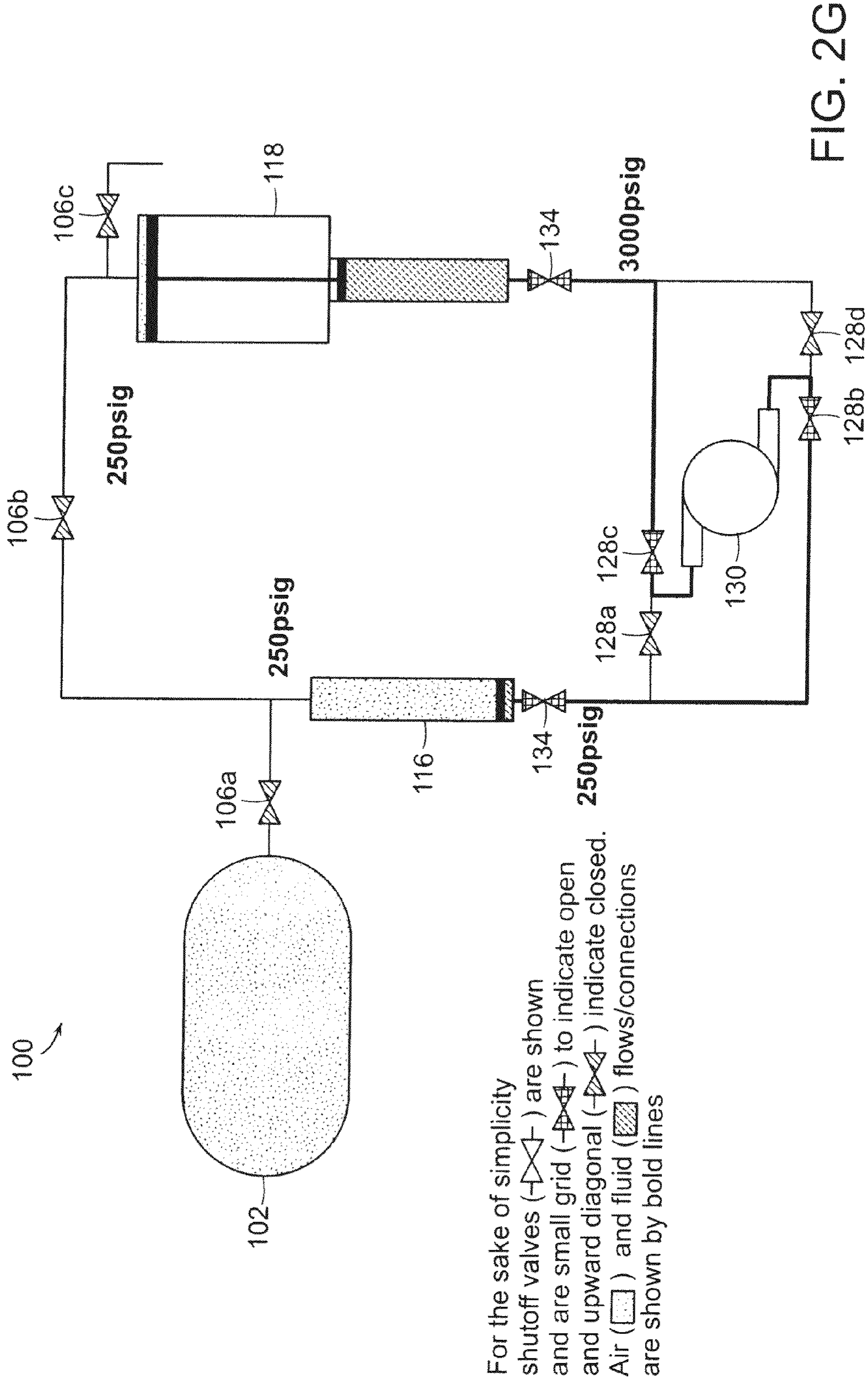
Figure 2H:
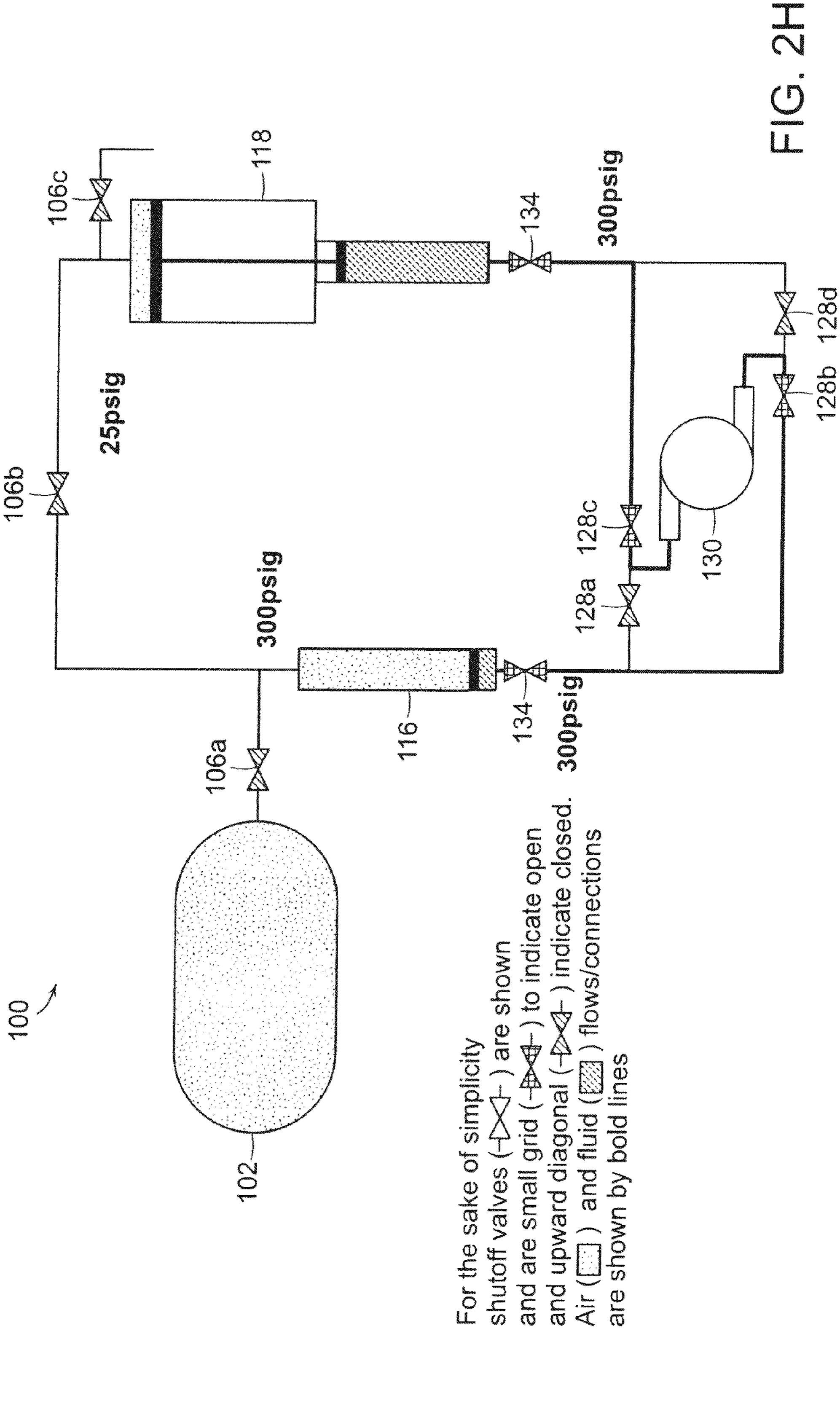
Figure 2I:
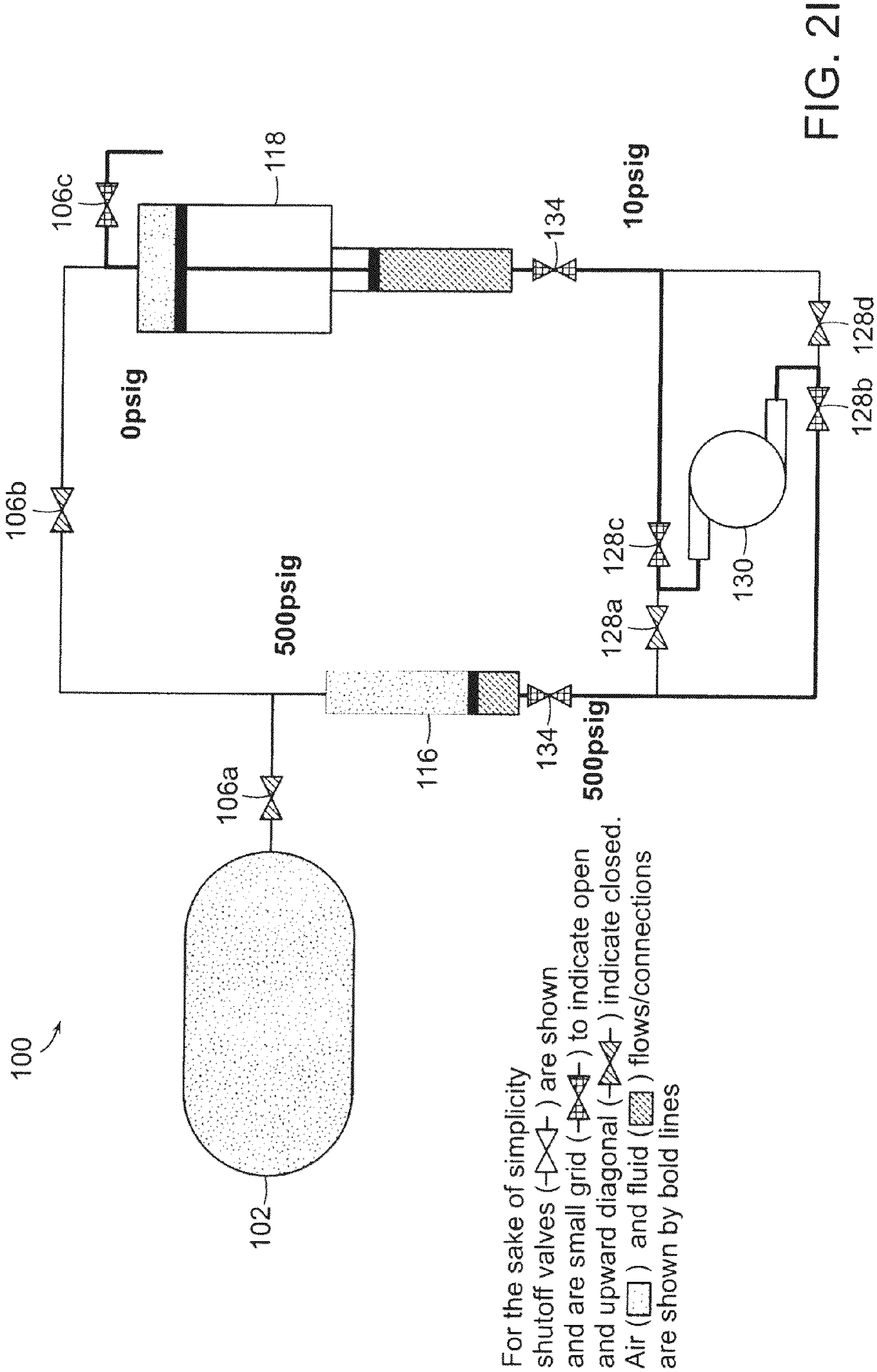
Figure 2J:
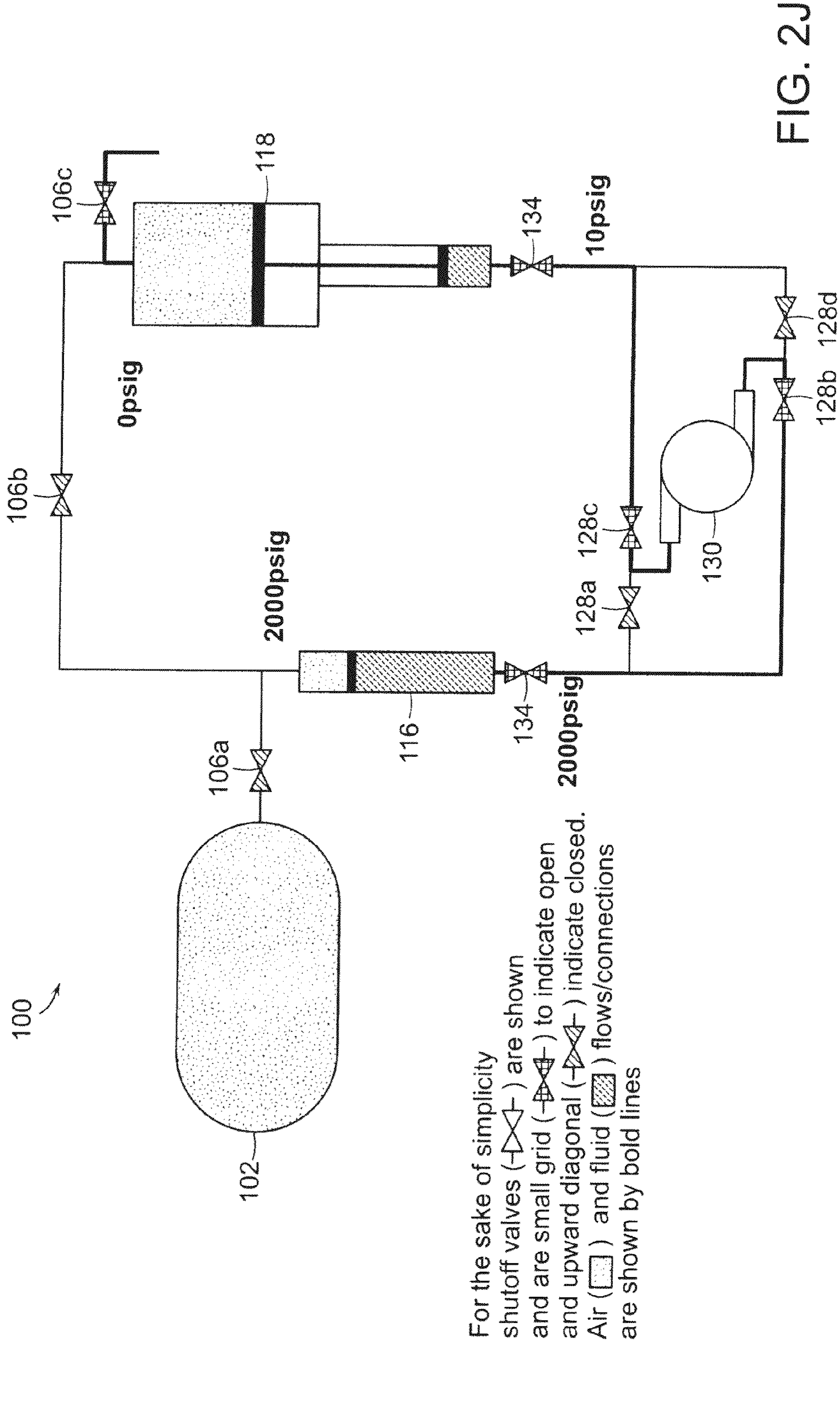
Figure 2K:
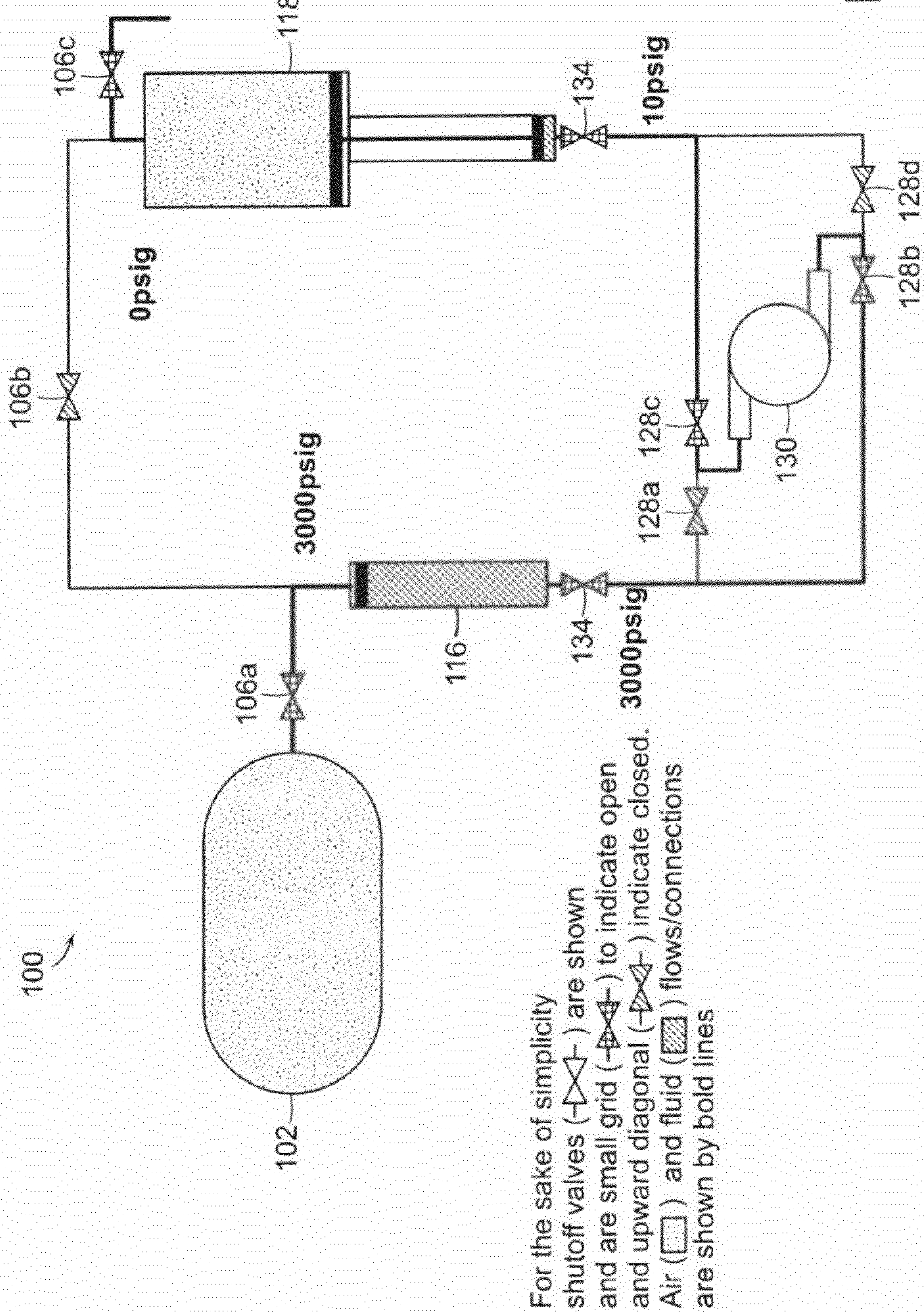
Figure 2L:
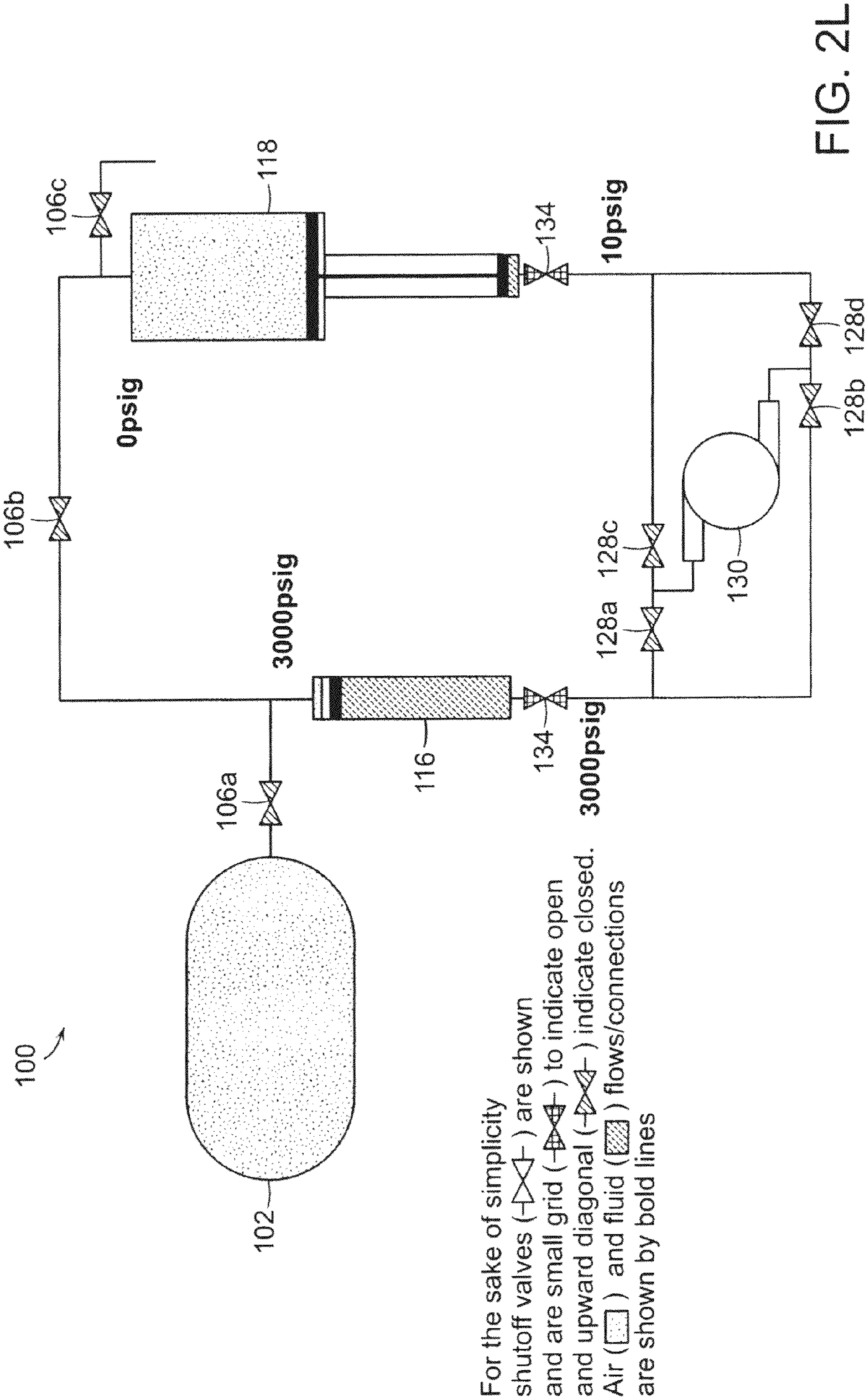
Figure 2M:
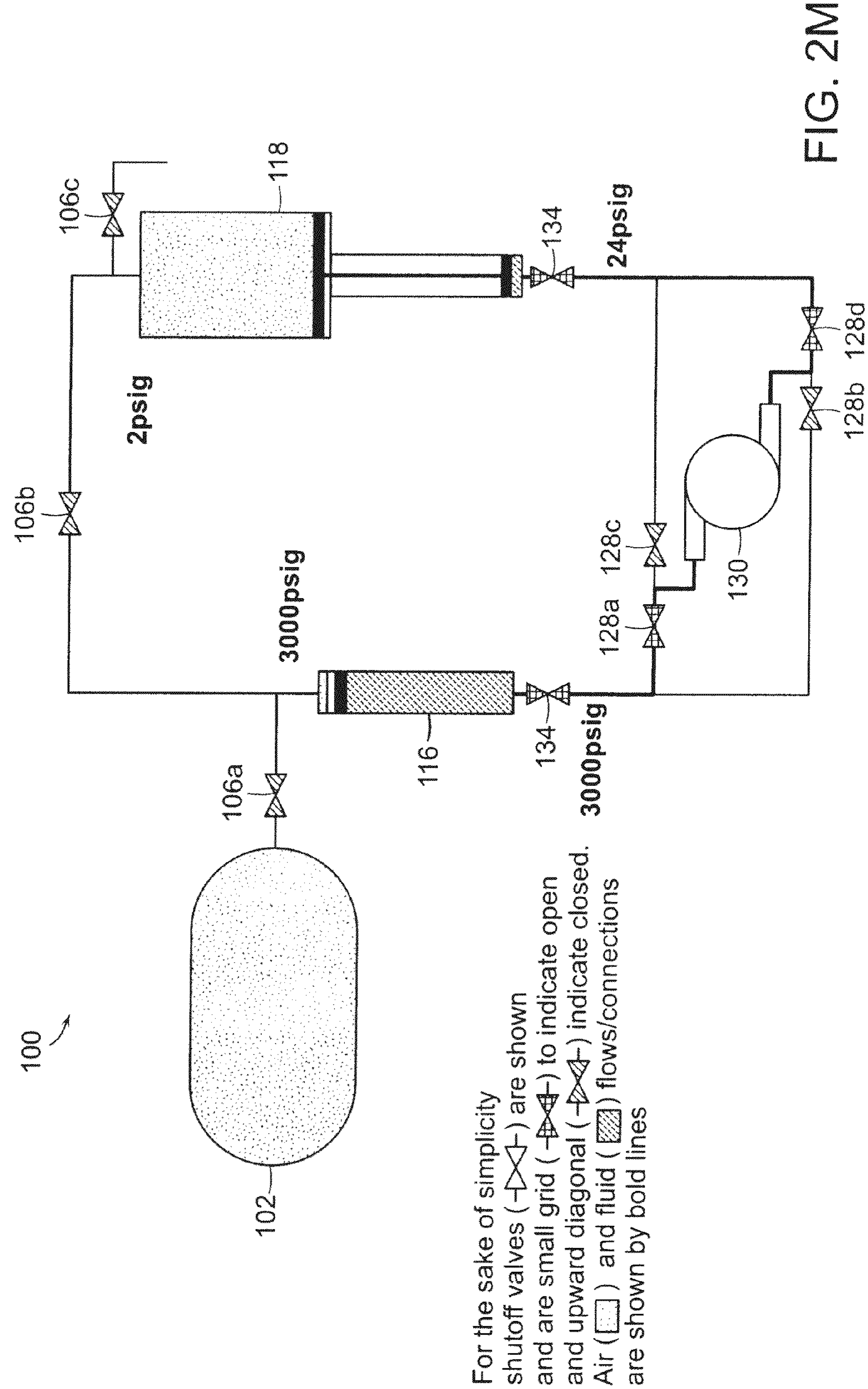
Figure 2N:
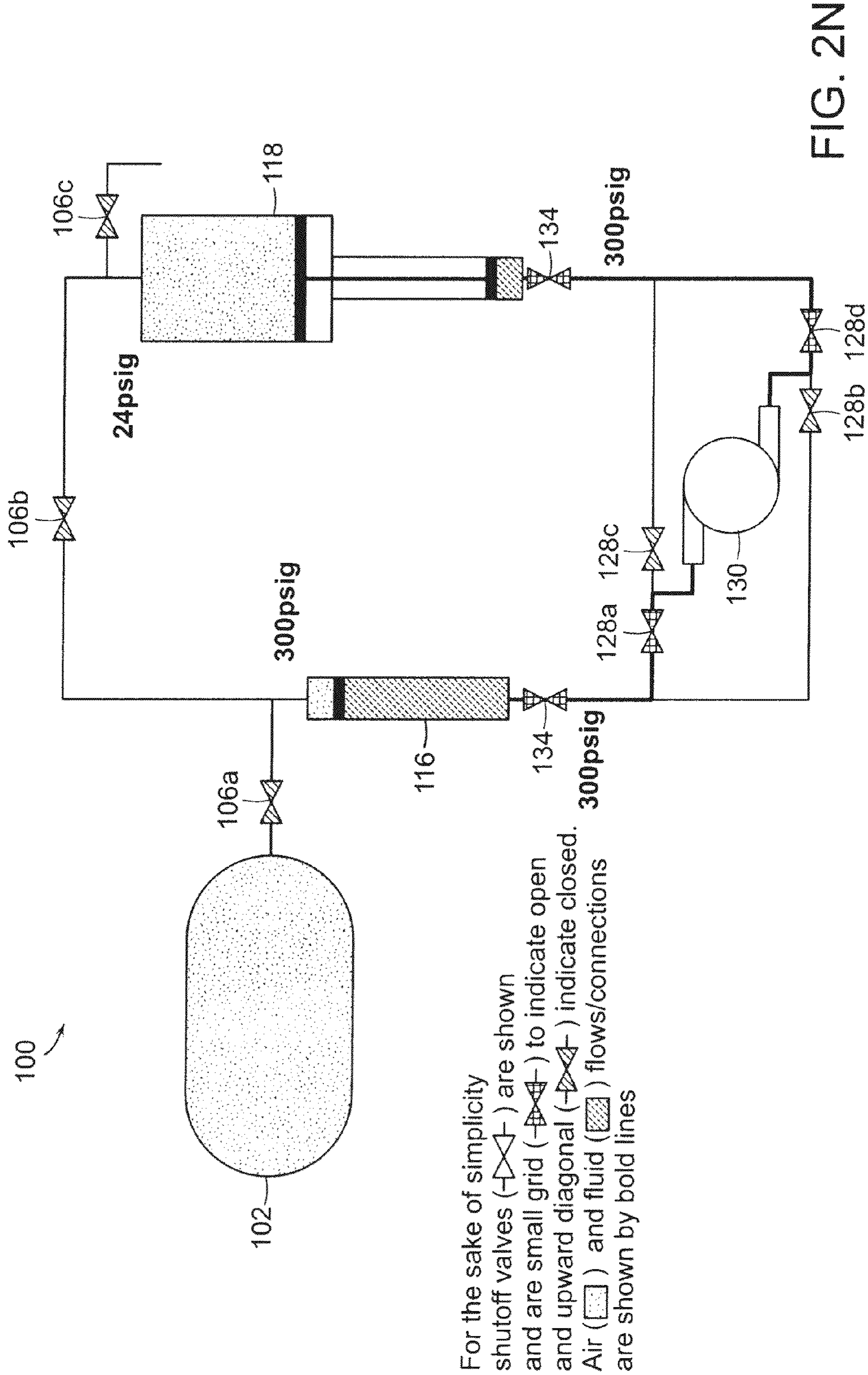
Figure 2O:
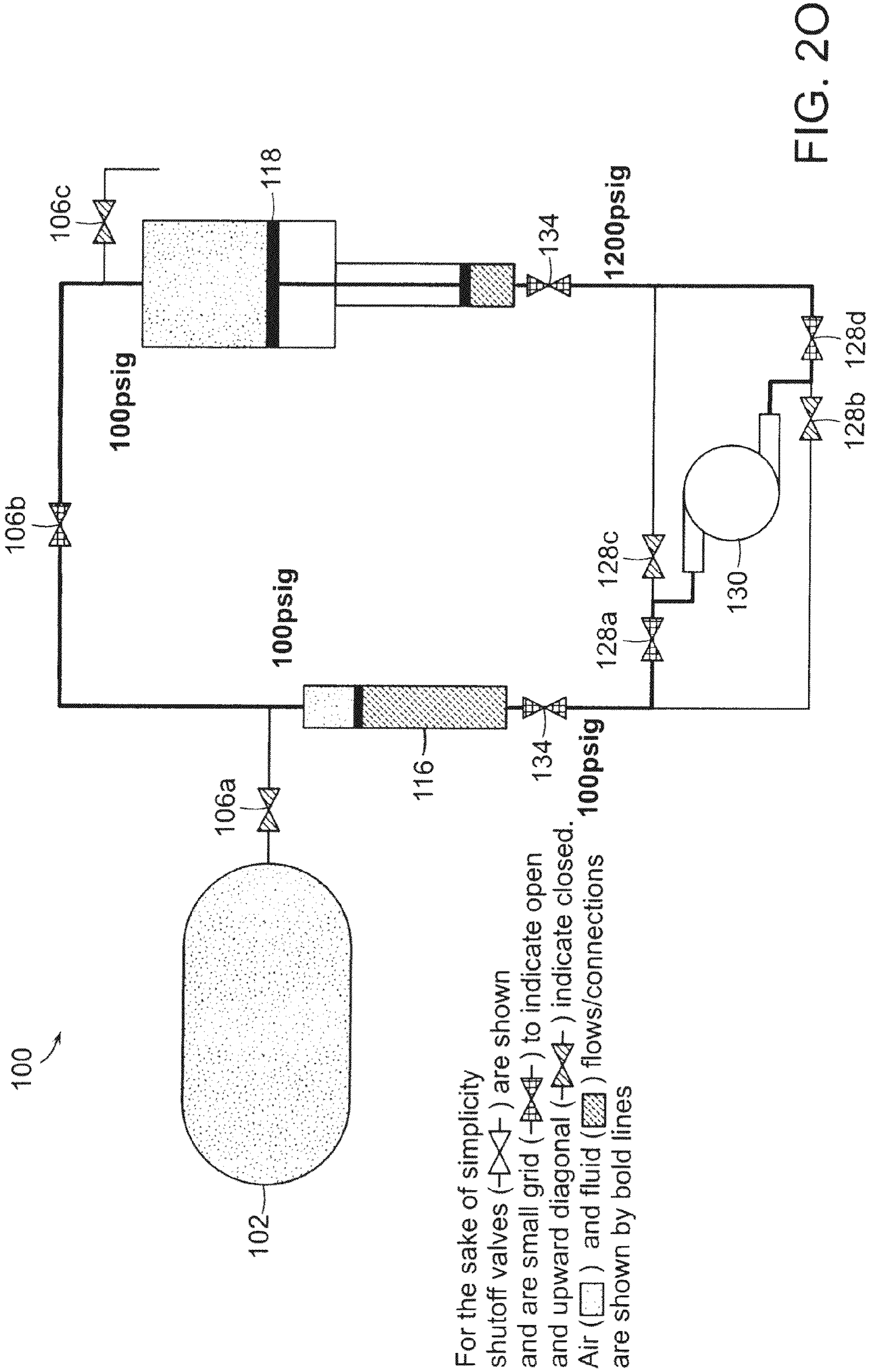
Figure 2P:
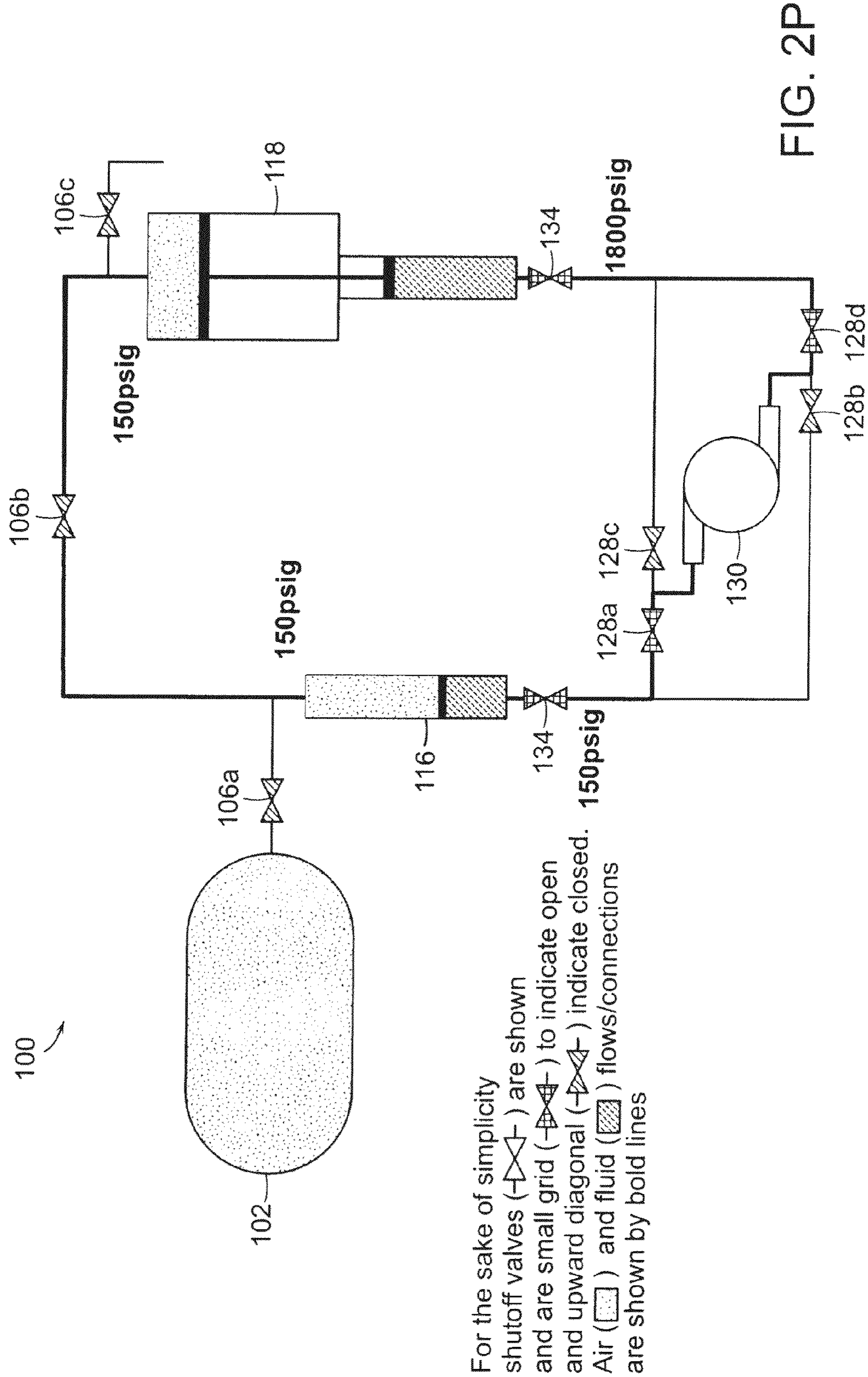
Figure 2Q:
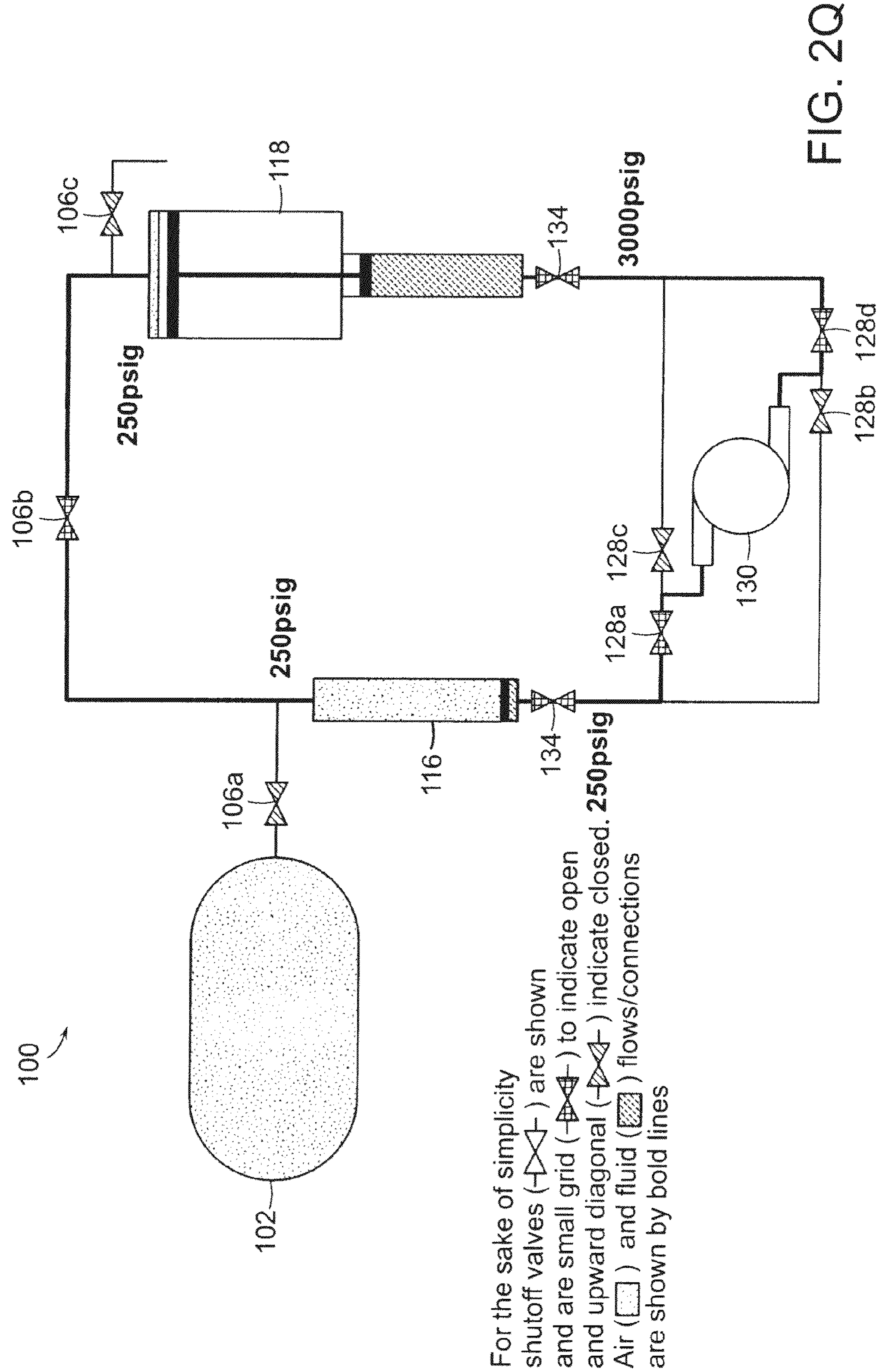

FIGS. 2A-2Q represent, in a simplified graphical manner, the various operational stages of the system 100 during a compression phase, where the storage tanks 102 are charged with high pressure air/gas (i.e., energy is stored). In addition, only one storage tank 102 is shown and some of the valves and sensors are omitted for clarity. Furthermore, the pressures shown are for reference only and will vary depending on the specific operating parameters of the system 100.

As shown in FIG. 2A, the system 100 is in a neutral state, where the pneumatic valves 106 and the hydraulic valves 128 are closed. Shut-off valves 134 are open in every operational stage to maintain the accumulator 116 and intensifier 118 in communication with the system 100. The accumulator fluid chamber 138 is substantially filled, while the intensifier fluid chamber is substantially empty. The storage tank 102 is typically at a low pressure (approximately 0 psig) prior to charging and the hydraulic motor/pump 130 is stationary.

As shown in FIGS. 2B and 2C, as the compression phase begins, pneumatic valve 106*b* is open, thereby allowing fluid communication between the accumulator air chamber 140 and the intensifier air chamber 144, and hydraulic valves 128*a*, 128*d* are open, thereby allowing fluid communication between the accumulator fluid chamber 138 and the intensifier fluid chamber 146 via the hydraulic motor/pump 130. The motor/generator 132 (see FIG. 1) begins to drive the motor/pump 130, and the air pressure between the intensifier 118 and the accumulator 116 begins to increase, as fluid is driven to the intensifier fluid chamber 144 under pressure. The pressure or mechanical energy is transferred to the air chamber 146 via the piston 142. This increase of air pressure in the accumulator air chamber 140 pressurizes the fluid chamber 138 of the accumulator 116, thereby providing pressurized fluid to the motor/pump 130 inlet, which can eliminate self-priming concerns.

As shown in FIGS. 2D, 2E, and 2F, the motor/generator 132 continues to drive the motor/pump 130, thereby transferring the hydraulic fluid from the accumulator 116 to the intensifier 118, which in turn continues to pressurize the air between the accumulator and intensifier air chamber 140, 146. FIG. 2F depicts the completion of the first stage of the compression phase. The pneumatic and hydraulic valves 106, 128 are all closed. The fluid chamber 144 of the intensifier 118 is substantially filled with fluid at a high pressure (for example, about 3000 psig) and the accumulator fluid chamber 138 is substantially empty and maintained at a mid-range pressure (for example, about 250 psig). The pressures in the accumulator and intensifier air chambers 140, 146 are maintained at the mid-range pressure.

The beginning of the second stage of the compression phase is shown in FIG. 2G, where hydraulic valves 128*b*, 128*c* are open and the pneumatic valves 106 are all closed, thereby putting the intensifier fluid chamber 144 at high pressure in communication with the motor/pump 130. The pressure of any gas remaining in the intensifier air chamber 146 will assist in driving the motor/pump 130. Once the hydraulic pressure equalizes between the accumulator and intensifier fluid chambers 138, 144 (as shown in FIG. 2H) the motor/generator will draw electricity to drive the motor/pump 130 and further pressurize the accumulator fluid chamber 138.

As shown in FIGS. 2I and 2J, the motor/pump 130 continues to pressurize the accumulator fluid chamber 138, which in turn pressurizes the accumulator air chamber 140. The intensifier fluid chamber 146 is at a low pressure and the intensifier air chamber 144 is at substantially atmospheric pressure. Once the intensifier air chamber 144 reaches substantially atmospheric pressure, pneumatic vent valve 106*c* is opened. For a vertical orientation of the intensifier, the weight of the intensifier piston 142 can provide the necessary back-pressure to the motor/pump 130, which would overcome potential self-priming issues for certain motors/pumps.

As shown in FIG. 2K, the motor/pump 130 continues to pressurize the accumulator fluid chamber 138 and the accumulator air chamber 140, until the accumulator air and fluid chambers are at the high pressure for the system 100. The intensifier fluid chamber 146 is at a low pressure and is substantially empty. The intensifier air chamber 144 is at substantially atmospheric pressure. FIG. 2K also depicts the change-over in the control valve arrangement when the accumulator air chamber 140 reaches the predetermined high pressure for the system 100. Pneumatic valve 106*a* is opened to allow the high pressure gas to enter the storage tanks 102.

FIG. 2L depicts the end of the second stage of one compression cycle, where all of the hydraulic and the pneumatic valves 128, 106 are closed. The system 100 will now begin another compression cycle, where the system 100 shuttles the hydraulic fluid back to the intensifier 118 from the accumulator 116.

FIG. 2M depicts the beginning of the next compression cycle. The pneumatic valves 106 are closed and hydraulic valves 128*a*, 128*d* are open. The residual pressure of any gas remaining in the accumulator fluid chamber 138 drives the motor/pump 130 initially, thereby eliminating the need to draw electricity. As shown in FIG. 2N, and described with respect to FIG. 2G, once the hydraulic pressure equalizes between the accumulator and intensifier fluid chambers 138, 144 the motor/generator 132 will draw electricity to drive the motor/pump 130 and further pressurize the intensifier fluid chamber 144. During this stage, the accumulator air chamber 140 pressure decreases and the intensifier air chamber 146 pressure increases.

As shown in FIG. 2O, when the gas pressures at the accumulator air chamber 140 and the intensifier air chamber 146 are equal, pneumatic valve 106*b* is opened, thereby putting the accumulator air chamber 140 and the intensifier air chamber 146 in fluid communication. As shown in FIGS. 2P and 2Q, the motor/pump 130 continues to transfer fluid from the accumulator fluid chamber 138 to the intensifier fluid chamber 146 and pressurize the intensifier fluid chamber 146. As described above with respect to FIGS. 2D-2F, the process continues until substantially all of the fluid has been transferred to the intensifier 118 and the intensifier fluid chamber 146 is at the high pressure and the intensifier air chamber 144 is at the mid-range pressure. The system 100 continues the process as shown and described in FIGS. 2G-2K to continue storing high pressure air in the storage tanks 102. The system 100 will perform as many compression cycles (i.e., the shuttling of hydraulic fluid between the accumulator 116 and the intensifier 118) as necessary to reach a desired pressure of the air in the storage tanks 102 (i.e., a full compression phase).

FIGS. 3A-3M represent, in a simplified graphical manner, the various operational stages of the system 100 during an expansion phase, where energy (i.e., the stored compressed gas) is recovered. FIGS. 3A-3M use the same designations, symbols, and exemplary numbers as shown in FIGS. 2A-2Q. It should be noted that while the system 100 is described as being used to compress the air in the storage tanks 102, alternatively, the tanks 102 could be charged (for example, an initial charge) by a separate compressor unit.

Figure 3A:
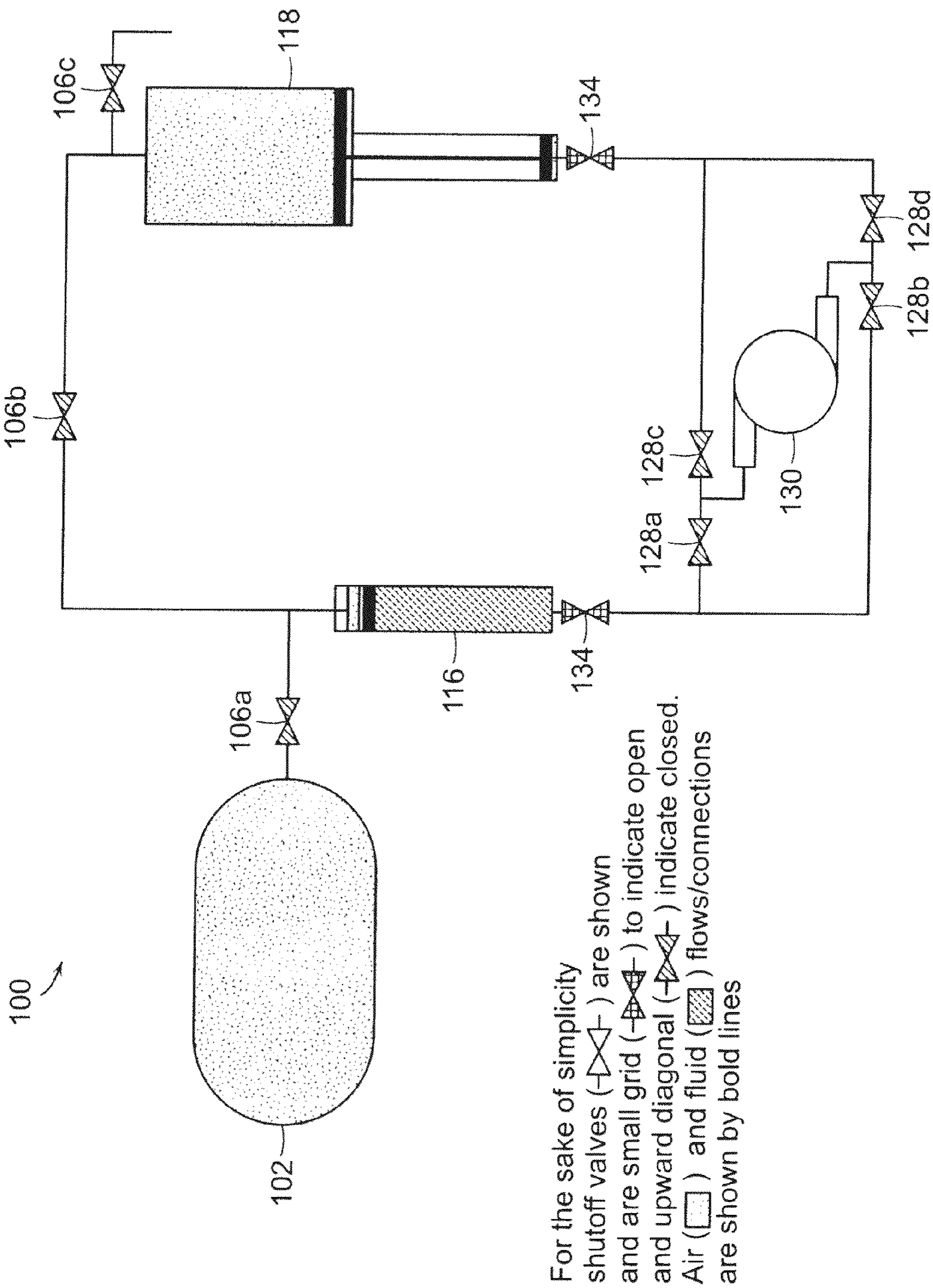
FIGS. 3A-3M are simplified graphical representations of the system of FIG. 1 illustrating the various operational stages of the system during expansion.

As shown in FIG. 3A, the system 100 is in a neutral state, where the pneumatic valves 106 and the hydraulic valves 128 are all closed. The same as during the compression phase, the shut-off valves 134 are open to maintain the accumulator 116 and intensifier 118 in communication with the system 100. The accumulator fluid chamber 138 is substantially filled, while the intensifier fluid chamber 146 is substantially empty. The storage tank 102 is at a high pressure (for example, 3000 psig) and the hydraulic motor/pump 130 is stationary.

Figure 3B:
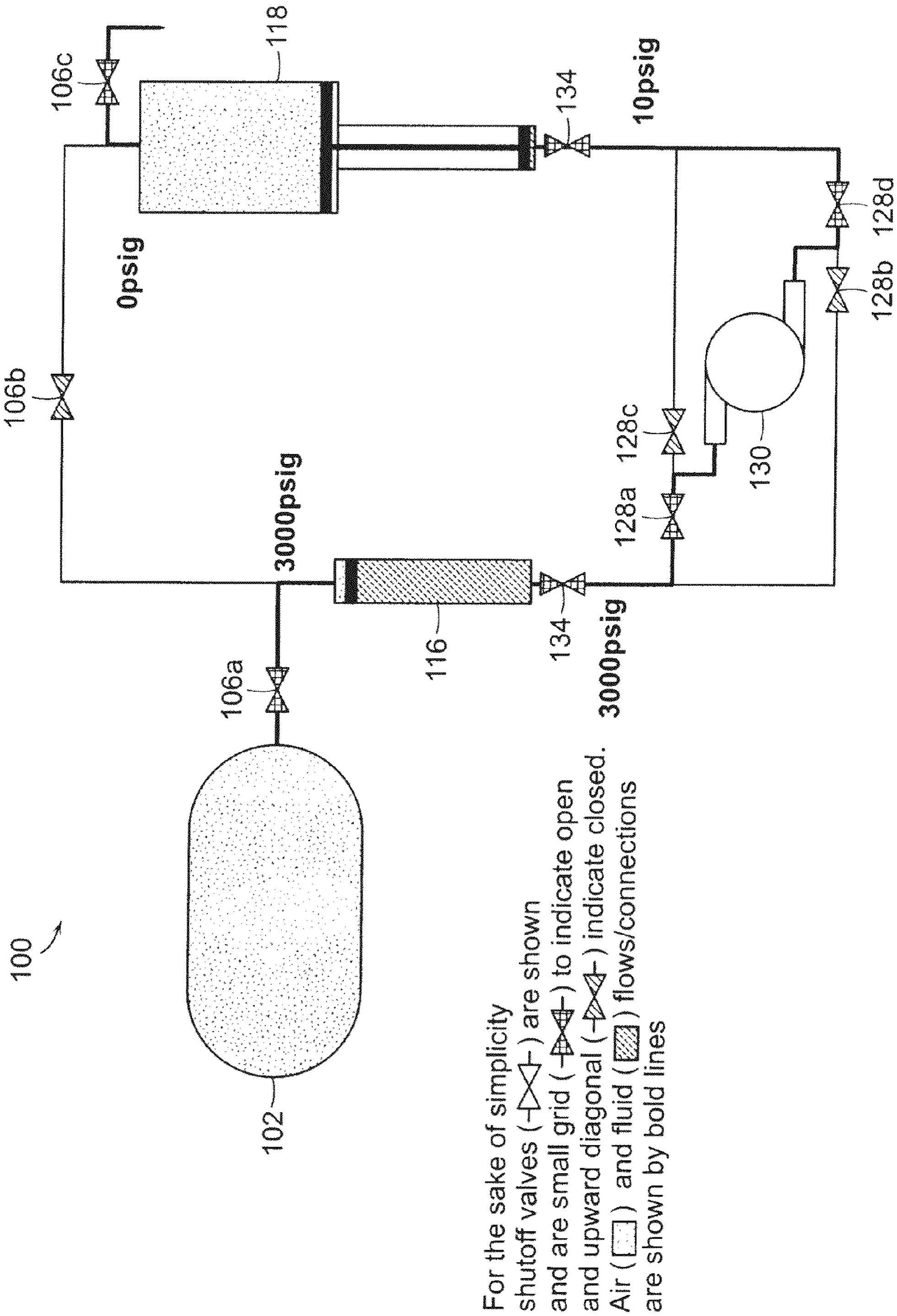

FIG. 3B depicts a first stage of the expansion phase, where pneumatic valves 106*a*, 106*c* are open. Open pneumatic valve 106*a* connects the high pressure storage tanks 102 in fluid communication with the accumulator air chamber 140, which in turn pressurizes the accumulator fluid chamber 138. Open pneumatic valve 106*c* vents the intensifier air chamber 146 to atmosphere. Hydraulic valves 128*a*, 128*d* are open to allow fluid to flow from the accumulator fluid chamber 138 to drive the motor/pump 130, which in turn drives the motor/generator 132, thereby generating electricity. The generated electricity can be delivered directly to a power grid or stored for later use, for example, during peak usage times.

Figure 3C:
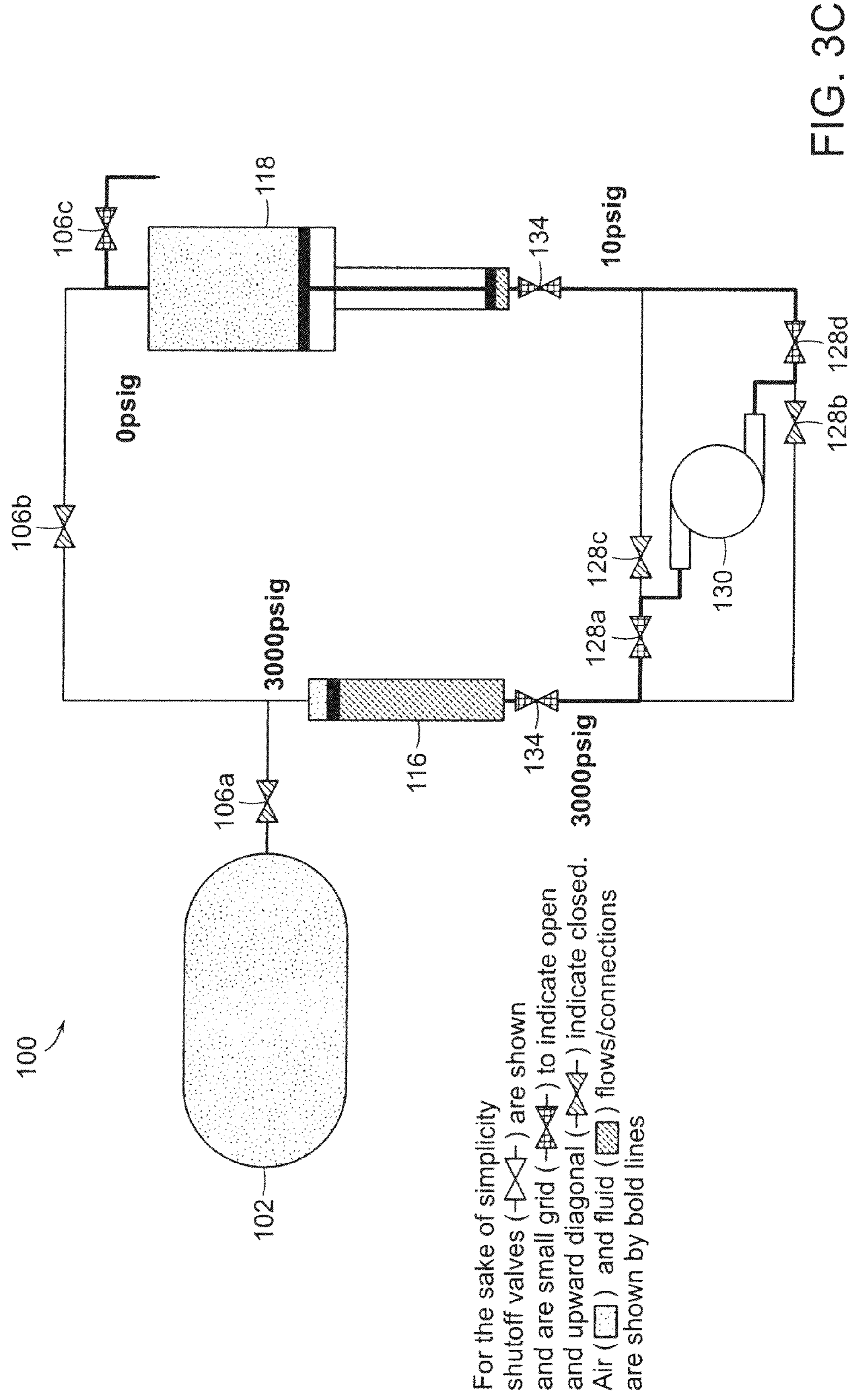
Figure 3D:
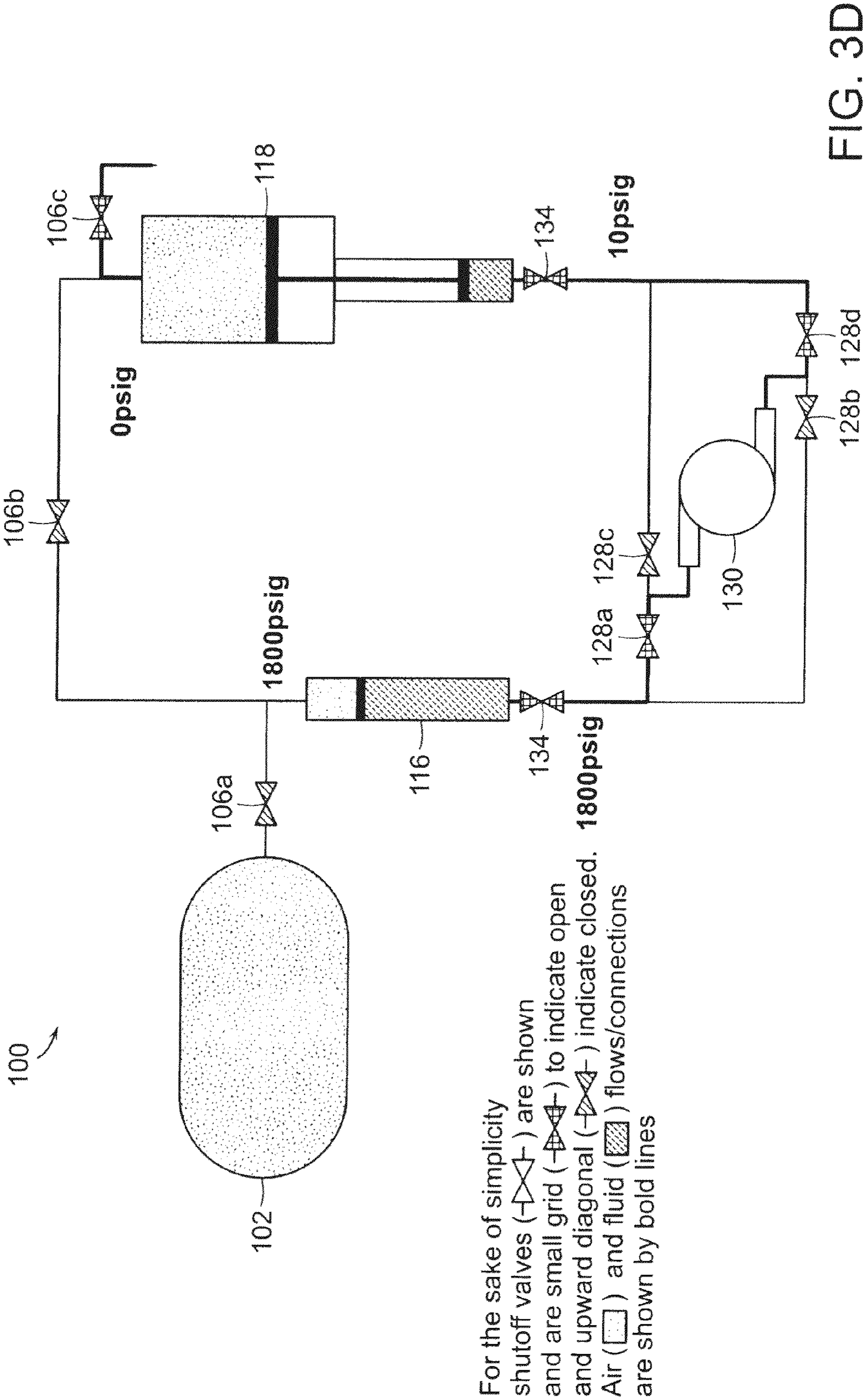
Figure 3E:
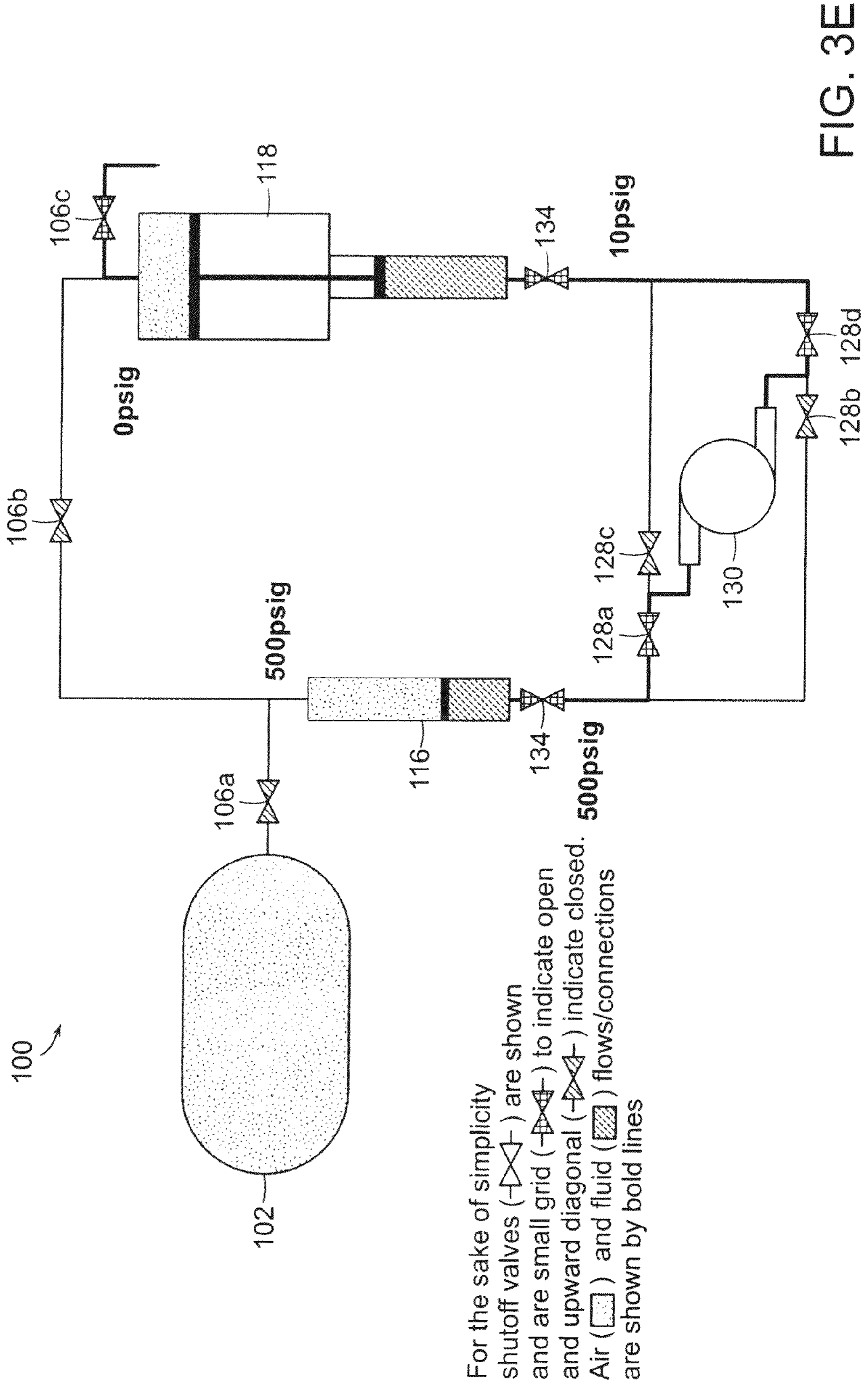
Figure 3F:
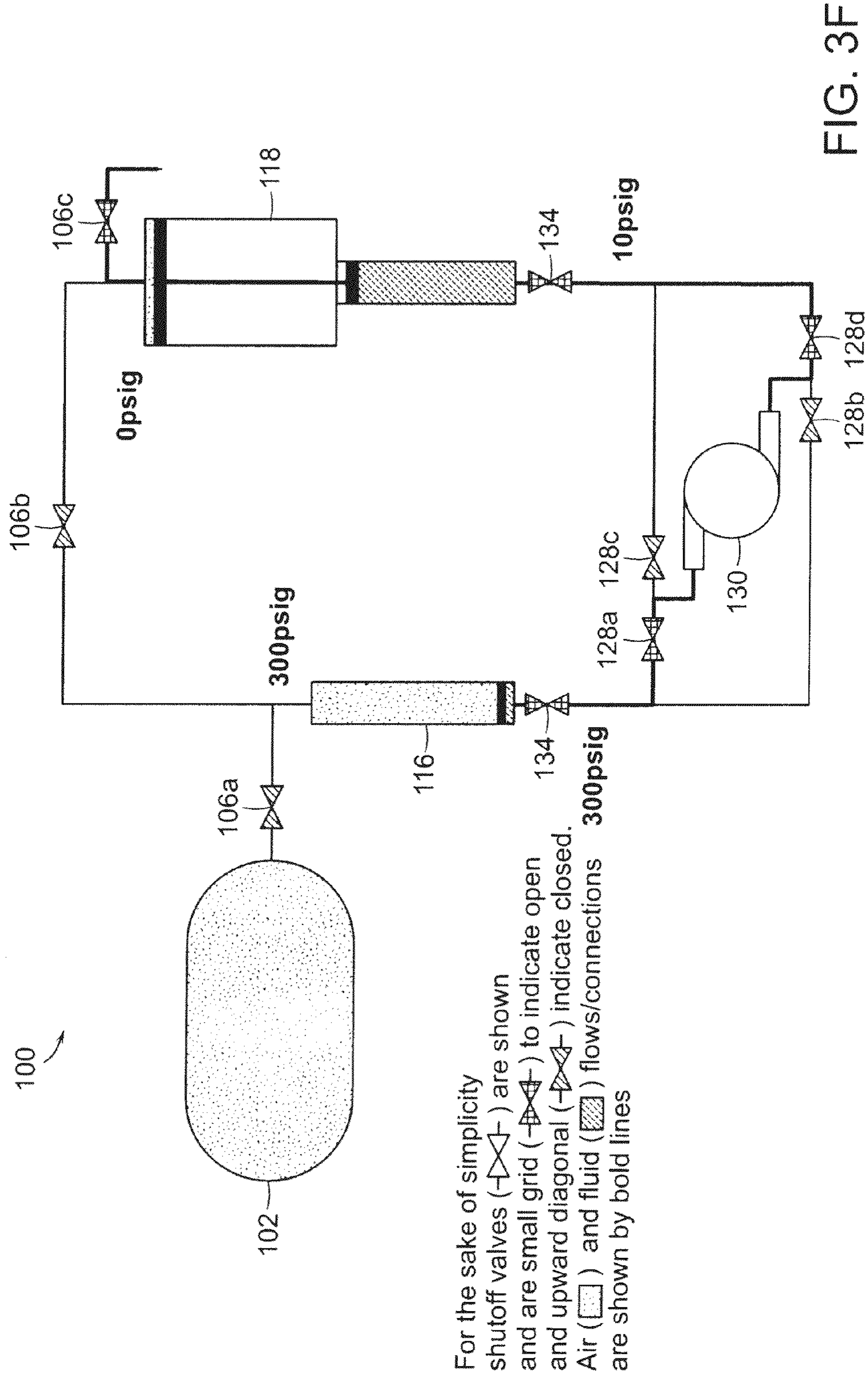

As shown in FIG. 3C, once the predetermined volume of pressurized air is admitted to the accumulator air chamber 140 (for example, 3000 psig), pneumatic valve 106*a* is closed to isolate the storage tanks 102 from the accumulator air chamber 140. As shown in FIGS. 3C-3F, the high pressure in the accumulator air chamber 140 continues to drive the hydraulic fluid from the accumulator fluid chamber 138 through the motor/pump 130 and to the intensifier fluid chamber 146, thereby continuing to drive the motor/generator 132 and generate electricity. As the hydraulic fluid is transferred from the accumulator 116 to the intensifier 118, the pressure in the accumulator air chamber 140 decreases and the air in the intensifier air chamber 144 is vented through pneumatic valve 106C.

Figure 3G:
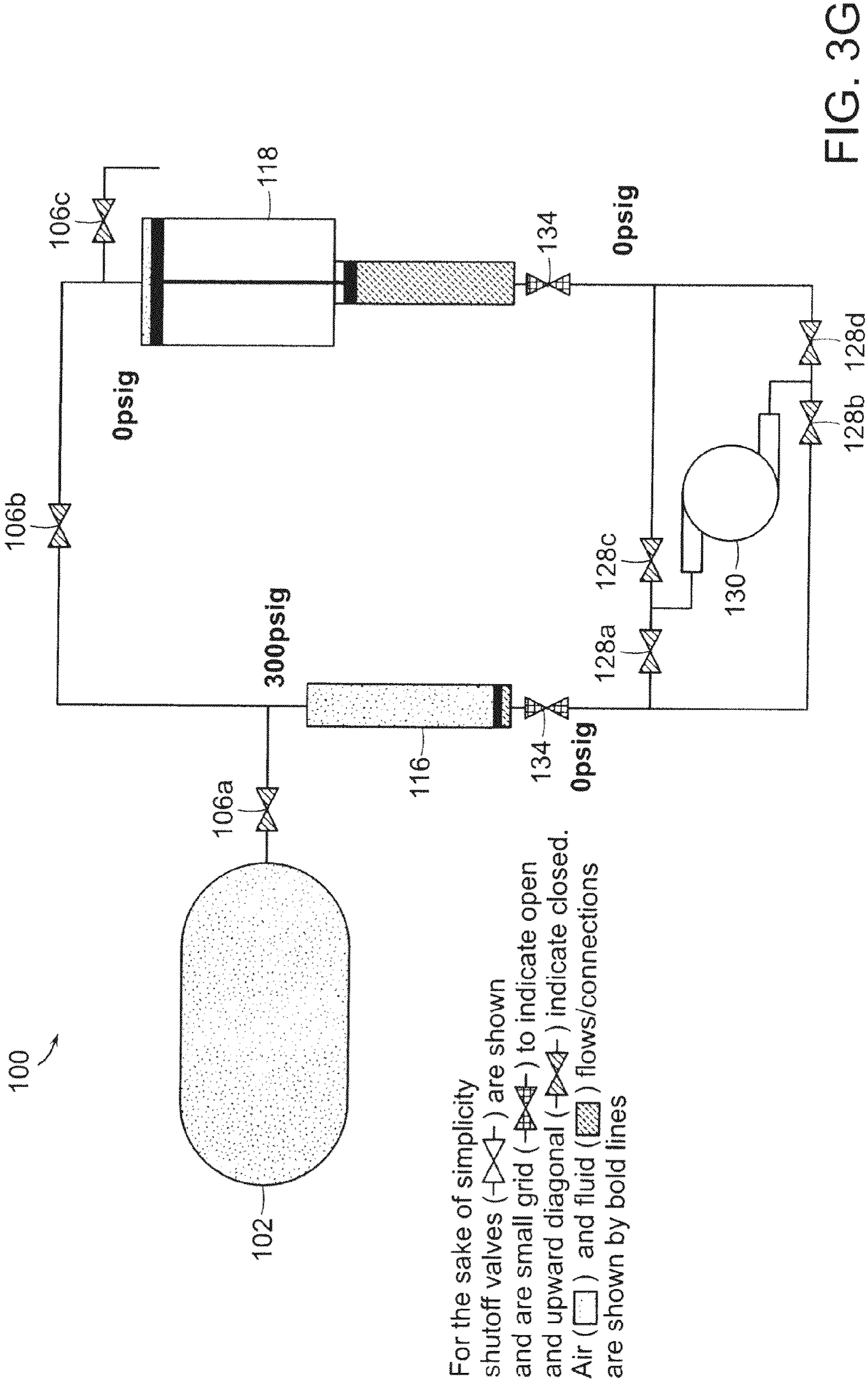

FIG. 3G depicts the end of the first stage of the expansion phase. Once the accumulator air chamber 140 reaches a second predetermined mid-pressure (for example, about 300 psig), all of the hydraulic and pneumatic valves 128, 106 are closed. The pressure in the accumulator fluid chamber 138, the intensifier fluid chamber 146, and the intensifier air chamber 144 are at approximately atmospheric pressure. The pressure in the accumulator air chamber 140 is maintained at the predetermined mid-pressure.

Figure 3H:
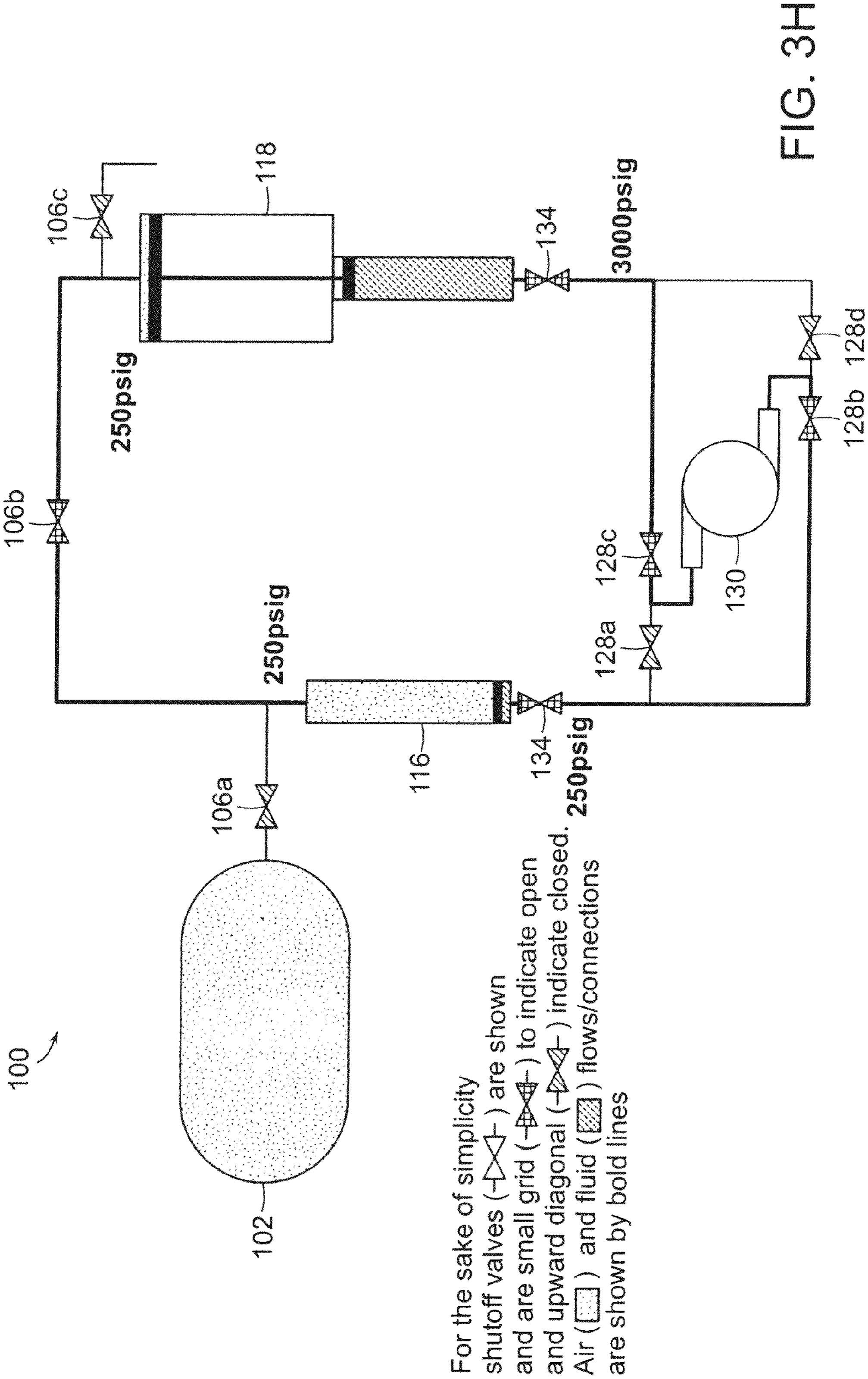

FIG. 3H depicts the beginning of the second stage of the expansion phase. Pneumatic valve 106*b* is opened to allow fluid communication between the accumulator air chamber 140 and the intensifier air chamber 144. The predetermined pressure will decrease slightly when the valve 106*b* is opened and the accumulator air chamber 140 and the intensifier air chamber 144 are connected. Hydraulic valves 128*b*, 128*d* are opened, thereby allowing the hydraulic fluid stored in the intensifier to transfer to the accumulator fluid chamber 138 through the motor/pump 130, which in turn drives the motor/generator 132 and generates electricity. The air transferred from the accumulator air chamber 140 to the intensifier air chamber 144 to drive the fluid from the intensifier fluid chamber 146 to the accumulator fluid chamber 138 is at a lower pressure than the air that drove the fluid from the accumulator fluid chamber 138 to the intensifier fluid chamber 146. The area differential between the air piston 142*a* and the fluid piston 142*b* (for example, 10:1) allows the lower pressure air to transfer the fluid from the intensifier fluid chamber 146 at a high pressure.

Figure 3I:
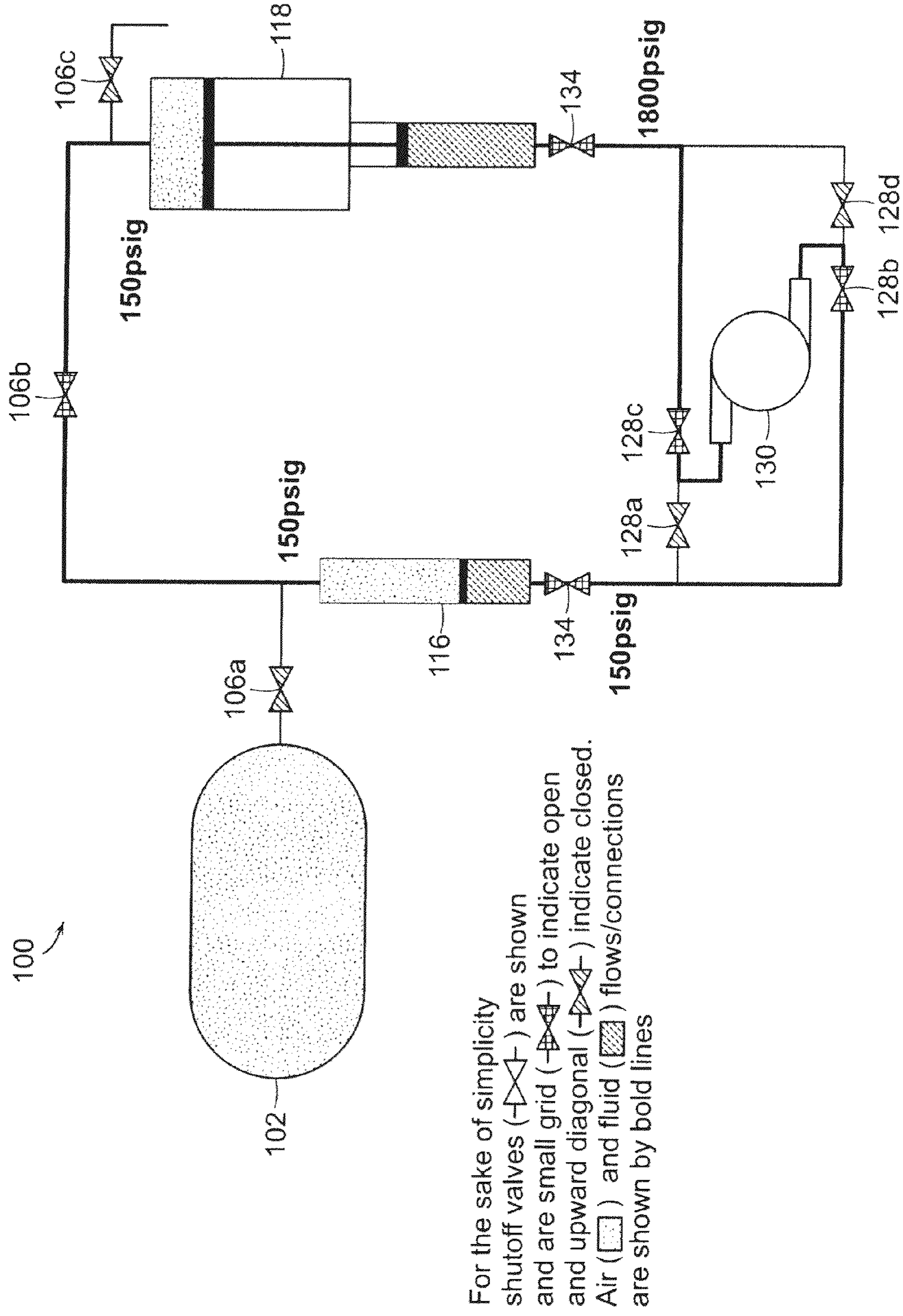
Figure 3J:
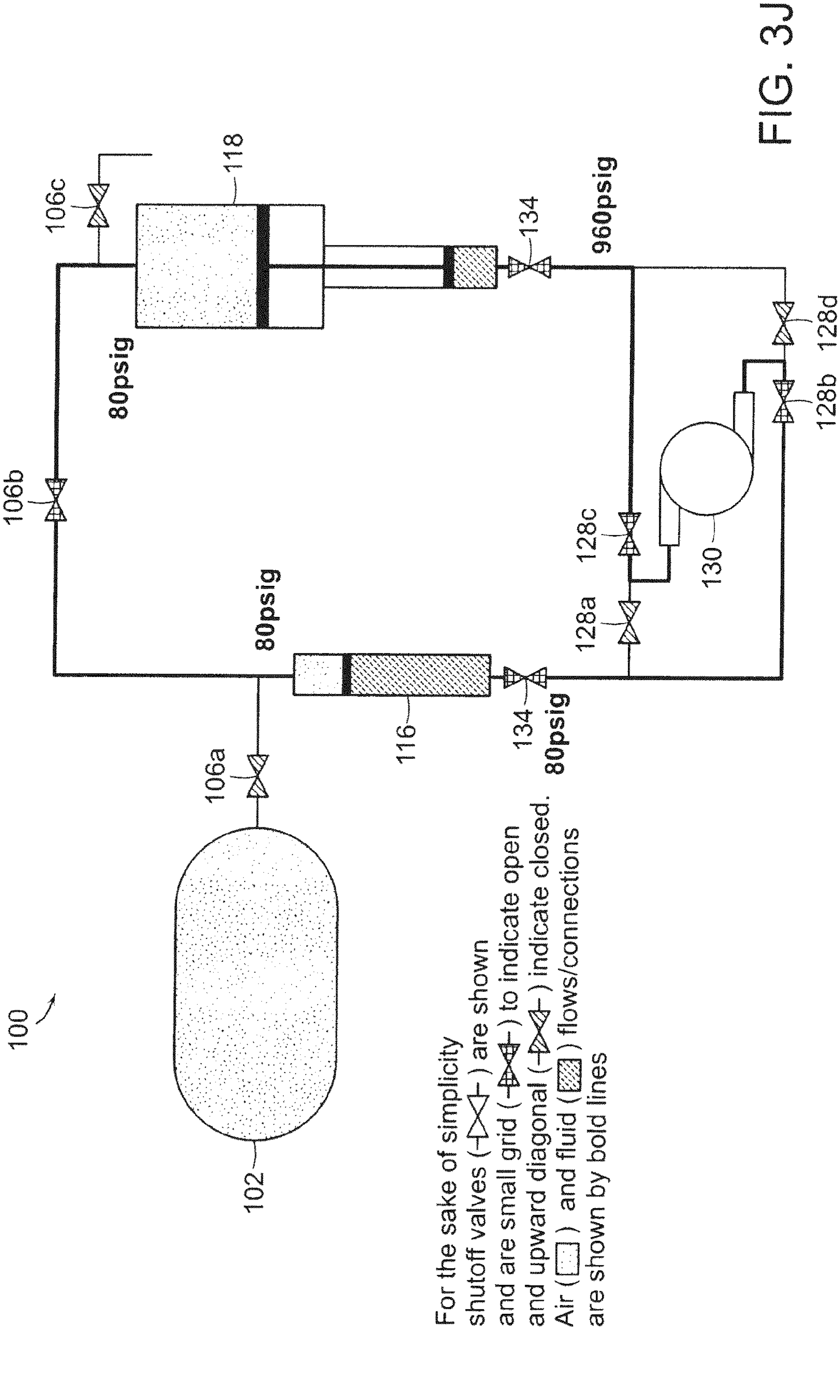
Figure 3K:
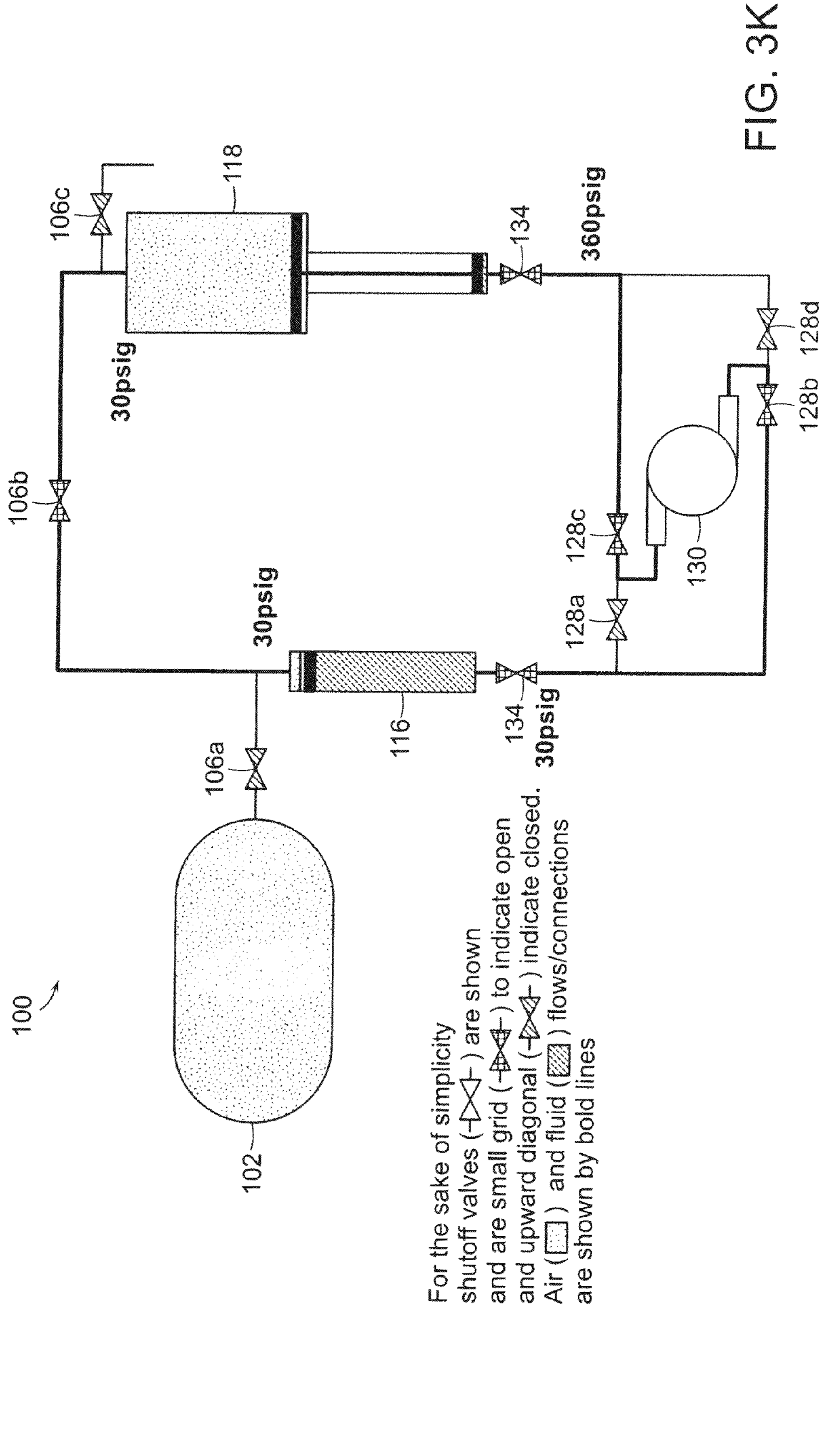

As shown in FIGS. 3I-3K, the pressure in the intensifier air chamber 144 continues to drive the hydraulic fluid from the intensifier fluid chamber 146 through the motor/pump 130 and to the accumulator fluid chamber 138, thereby continuing to drive the motor/generator 132 and generate electricity. As the hydraulic fluid is transferred from the intensifier 118 to the accumulator 116, the pressures in the intensifier air chamber 144, the intensifier fluid chamber 146, the accumulator air chamber 140, and the accumulator fluid chamber 138 decrease.

Figure 3L:
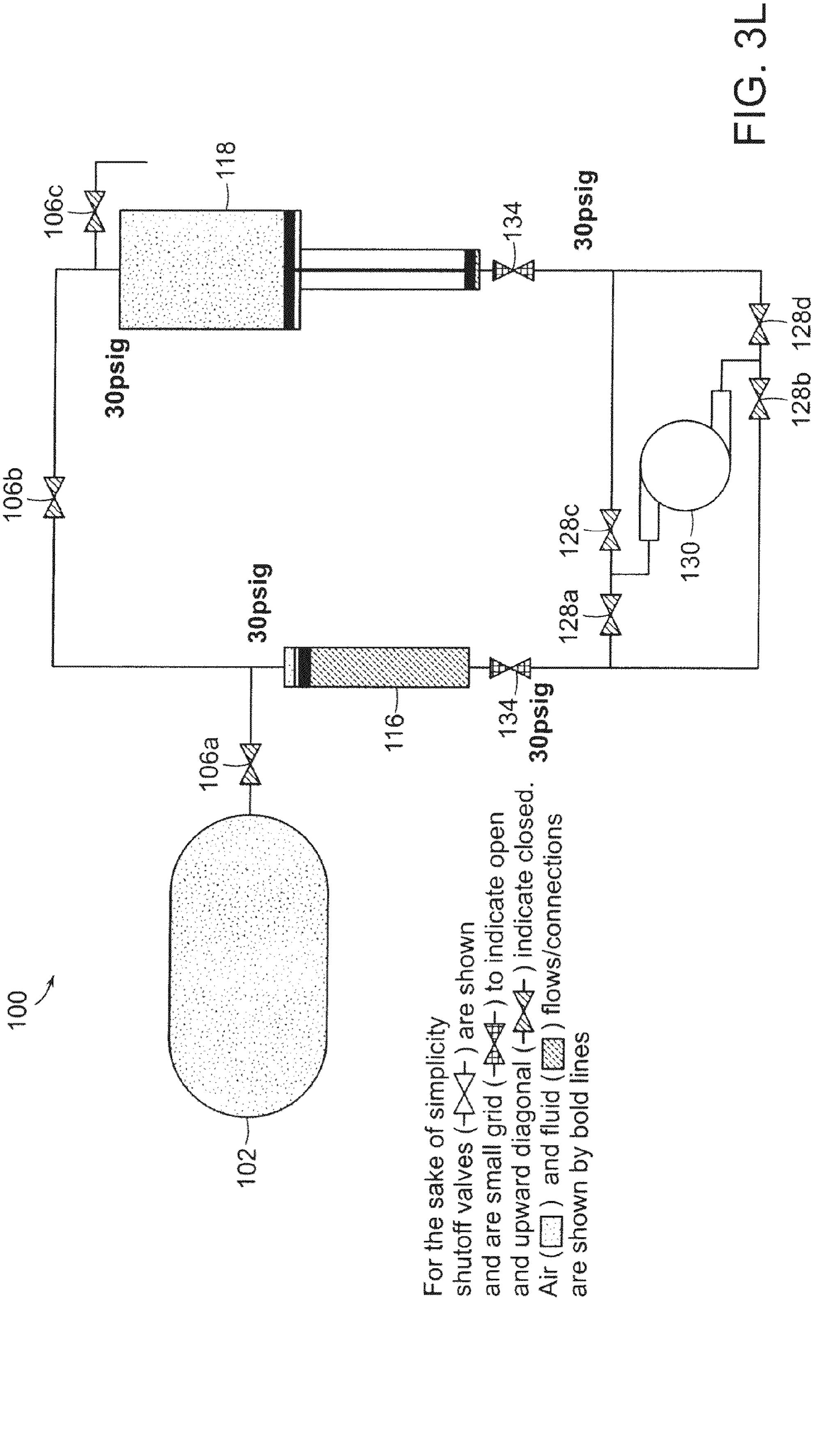

FIG. 3L depicts the end of the second stage of the expansion cycle, where substantially all of the hydraulic fluid has been transferred to the accumulator 116 and all of the valves 106, 128 are closed. In addition, the accumulator air chamber 140, the accumulator fluid chamber 138, the intensifier air chamber 144, and the intensifier fluid chamber 146 are all at low pressure. In an alternative embodiment, the hydraulic fluid can be shuffled back and forth between two intensifiers for compressing and expanding in the low pressure (for example, about 0-250 psig) range. Using a second intensifier and appropriate valving to utilize the energy stored at the lower pressures can produce additional electricity. Using a second intensifier and appropriate valving to utilize the energy stored at the lower pressures can allow for a greater depth of discharge from the gas storage tanks, storing and recovering additional energy for a given storage volume.

Figure 3M:
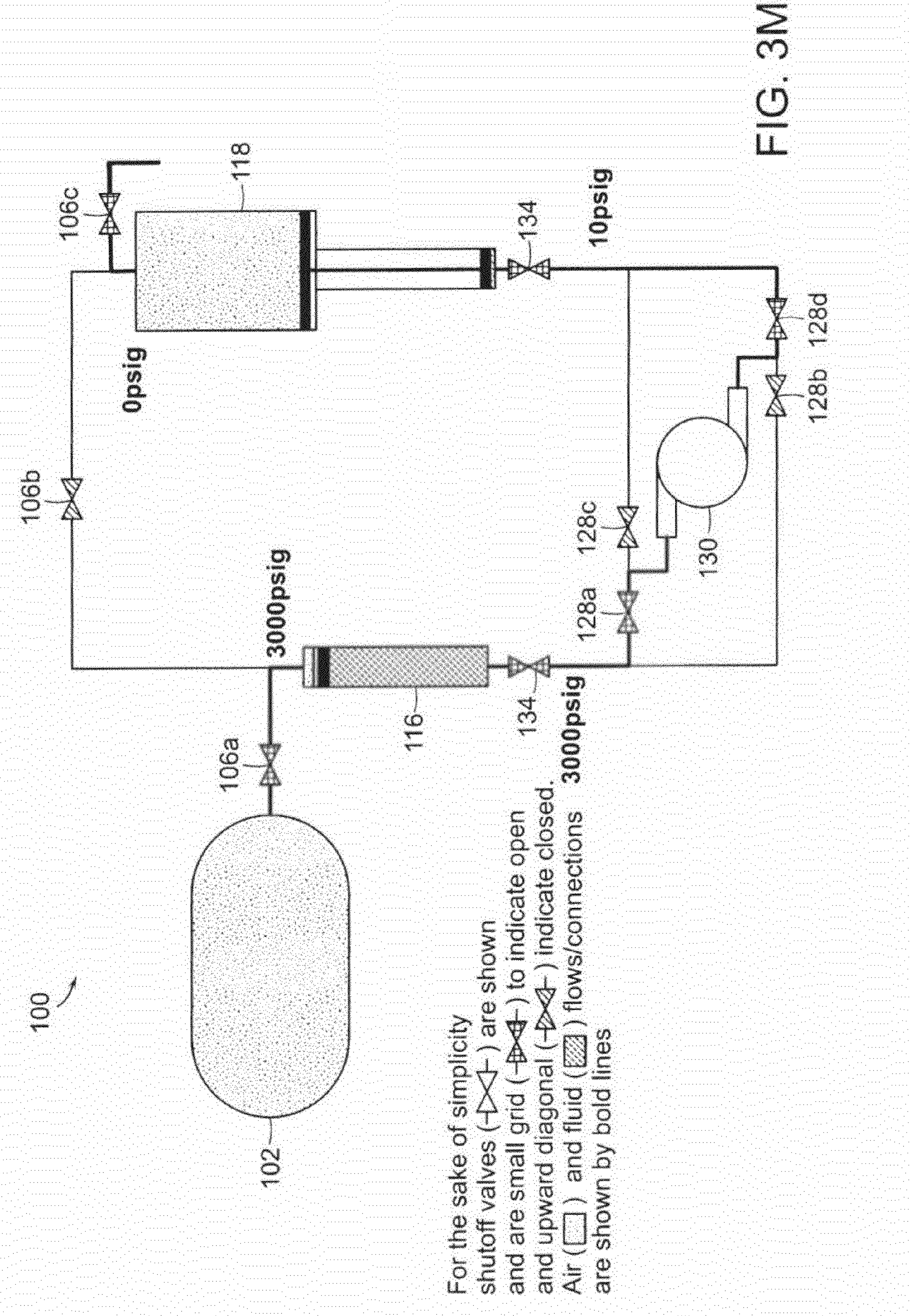

FIG. 3M depicts the start of another expansion phase, as described with respect to FIG. 3B. The system 100 can continue to cycle through expansion phases as necessary for the production of electricity, or until all of the compressed air in the storage tanks 102 has been exhausted.

FIG. 4 is a schematic diagram of an energy storage system 300, employing open-air hydraulic-pneumatic principles according to one embodiment of this invention. The system 300 consists of one or more high-pressure gas/air storage tanks 302*a*, 302*b*, . . . 302*n* (the number being highly variable to suit a particular application). Each tank 302*a*, 302*b* is joined in parallel via a manual valve(s) 304*a*, 304*b*, . . . 304*n* respectively to a main air line 308. The tanks 302*a*, 302*b* are each provided with a pressure sensor 312*a*, 312*b* . . . 312*n* and a temperature sensor 314*a*, 314*b* . . . 314*n* that can be monitored by a system controller 350 via appropriate connections (shown generally herein as arrows indicating "TO CONTROL"). The controller 350, the operation of which is described in further detail below, can be any acceptable control device with a human-machine interface. In one embodiment, the controller 350 includes a computer 351 (for example a PC-type) that executes a stored control application 353 in the form of a computer-readable software medium. The control application 353 receives telemetry from the various sensors and provides appropriate feedback to control valve actuators, motors, and other needed electromechanical/electronic devices. An appropriate interface can be used to convert data from sensors into a form readable by the computer controller 351 (such as RS-232 or network-based interconnects). Likewise, the interface converts the computer's control signals into a form usable by valves and other actuators to perform an operation. The provision of such interfaces should be clear to those of ordinary skill in the art.

The main air line 308 from the tanks 302*a*, 302*b* is coupled to a pair of multi-stage (two stages in this example) accumulator/intensifier circuits (or hydraulic-pneumatic cylinder circuits) (dashed boxes 360, 362) via automatically controlled (via controller 350), two-position valves 307*a*, 307*b*, 307*c* and 306*a*, 306*b* and 306*c*. These valves are coupled to respective accumulators 316 and 317 and intensifiers 318 and 319 according to one embodiment of the system. Pneumatic valves 306*a* and 307*a* are also coupled to a respective atmospheric air vent 310*b* and 310*a*. In particular, valves 306*c* and 307*c* connect along a common air line 390, 391 between the main air line 308 and the accumulators 316 and 317, respectively. Pneumatic valves 306*b* and 307*b* connect between the respective accumulators 316 and 317, and intensifiers 318 and 319. Pneumatic valves 306*a*, 307*a* connect along the common lines 390, 391 between the intensifiers 318 and 319, and the atmospheric vents 310*b* and 310*a*.

The air from the tanks 302, thus, selectively communicates with the air chamber side of each accumulator and intensifier (referenced in the drawings as air chamber 340 for accumulator 316, air chamber 341 for accumulator 317, air chamber 344 for intensifier 318, and air chamber 345 for intensifier 319). An air temperature sensor 322 and a pressure sensor 324 communicate with each air chamber 341, 344, 345, 322, and deliver sensor telemetry to the controller 350.

The air chamber 340, 341 of each accumulator 316, 317 is enclosed by a movable piston 336, 337 having an appropriate sealing system using sealing rings and other components that are known to those of ordinary skill in the art. The piston 336, 337 moves along the accumulator housing in response to pressure differentials between the air chamber 340, 341 and an opposing fluid chamber 338, 339, respectively, on the opposite side of the accumulator housing. In this example, hydraulic fluid (or another liquid, such as water) is indicated by a shaded volume in the fluid chamber. Likewise, the air chambers 344, 345 of the respective intensifiers 318, 319 are enclosed by a moving piston assembly 342, 343. However, the intensifier air piston 342_a_, 343_a_ is connected by a shaft, rod, or other coupling to a respective fluid piston, 342_b_, 343_b_. This fluid piston 342_b_, 343_b_ moves in conjunction with the air piston 342_a_, 343_a_, but acts directly upon the associated intensifier fluid chamber 346, 347. Notably, the internal diameter (and/or volume) of the air chamber (DAI) for the intensifier 318, 319 is greater than the diameter of the air chamber (DAA) for the accumulator 316, 317 in the same circuit 360, 362. In particular, the surface area of the intensifier pistons 342_a_, 343_a_ is greater than the surface area of the accumulator pistons 336, 337. The diameter of each intensifier fluid piston (DFI) is approximately the same as the diameter of each accumulator (DFA). Thus in this manner, a lower air pressure acting upon the intensifier piston generates a similar pressure on the associated fluid chamber as a higher air pressure acting on the accumulator piston. In this manner, and as described further below, the system allows for at least two stages of pressure to be employed to generate similar levels of fluid pressure.

In one example, assuming that the initial gas pressure in the accumulator is at 200 atmospheres (ATM) (3000 PSI—high-pressure), with a final mid-pressure of 20 ATM (300 PSI) upon full expansion, and that the initial gas pressure in the intensifier is then 20 ATM (with a final pressure of 1.5-2 ATM (25-30 PSI)), then the area of the gas piston in the intensifier would be approximately 10 times the area of the piston in the accumulator (or 3.16 times the radius). However, the precise values for initial high-pressure, mid-pressure and final low-pressure are highly variable, depending in part upon the operating specifications of the system components, scale of the system and output requirements. Thus, the relative sizing of the accumulators and the intensifiers is variable to suit a particular application.

Each fluid chamber 338, 339, 346, 347 is interconnected with an appropriate temperature sensor 322 and pressure sensor 324, each delivering telemetry to the controller 350. In addition, each fluid line interconnecting the fluid chambers can be fitted with a flow sensor 326, which directs data to the controller 350. The pistons 336, 337, 342 and 343 can include position sensors 348 that report their present position to the controller 350. The position of the piston can be used to determine relative pressure and flow of both gas and fluid. Each fluid connection from a fluid chamber 338, 339, 346, 347 is connected to a pair of parallel, automatically controlled valves. As shown, fluid chamber 338 (accumulator 316) is connected to valve pair 328_c_ and 328_d_; fluid chamber 339 (accumulator 317) is connected to valve pair 329_a_ and 329_b_; fluid chamber 346 (intensifier 318) is connected to valve pair 328_a_ and 328_b_; and fluid chamber 347 (intensifier 319) is connected to valve pair 329_c_ and 329_d_. One valve from each chamber 328_b_, 328_d_, 329_a_ and 329_c_ is connected to one connection side 372 of a hydraulic motor/pump 330. This motor/pump 330 can be piston-type (or other suitable type, including vane, impeller, and gear) assembly having a shaft 331 (or other mechanical coupling) that drives, and is driven by, a combination electrical motor/generator assembly 332. The motor/generator assembly 332 is interconnected with a power distribution system and can be monitored for status and output/input level by the controller 350. The other connection side 374 of the hydraulic motor/pump 330 is connected to the second valve in each valve pair 328_a_, 328_c_, 329_b_ and 329_d_. By selectively toggling the valves in each pair, fluid is connected between either side 372, 374 of the hydraulic motor/pump 330. Alternatively, some or all of the valve pairs can be replaced with one or more three position, four way valves or other combinations of valves to suit a particular application.

The number of circuits 360, 362 can be increased as necessary. Additional circuits can be interconnected to the tanks 302 and each side 372, 374 of the hydraulic motor/pump 330 in the same manner as the components of the circuits 360, 362. Generally, the number of circuits should be even so that one circuit acts as a fluid driver while the other circuit acts as a reservoir for receiving the fluid from the driving circuit.

An optional accumulator 366 is connected to at least one side (e.g., inlet side 372) of the hydraulic motor/pump 330. The optional accumulator 366 can be, for example, a closed-air-type accumulator with a separate fluid side 368 and precharged air side 370. As will be described below, the accumulator 366 acts as a fluid capacitor to deal with transients in fluid flow through the motor/pump 330. In another embodiment, a second optional accumulator or other low-pressure reservoir 371 is placed in fluid communication with the outlet side 374 of the motor/pump 330 and can also include a fluid side 371 and a precharged air side 369. The foregoing optional accumulators can be used with any of the systems described herein.

Having described the general arrangement of one embodiment of an open-air hydraulic-pneumatic energy storage system 300 in FIG. 4, the exemplary functions of the system 300 during an energy recovery phase will now be described with reference to FIGS. 5A-5N. For the purposes of this operational description, the illustrations of the system 300 in FIGS. 5A-5N have been simplified, omitting the controller 350 and interconnections with valves, sensors, etc. It should be understood, that the steps described are under the control and monitoring of the controller 350 based upon the rules established by the application 353.

Figure 5A:
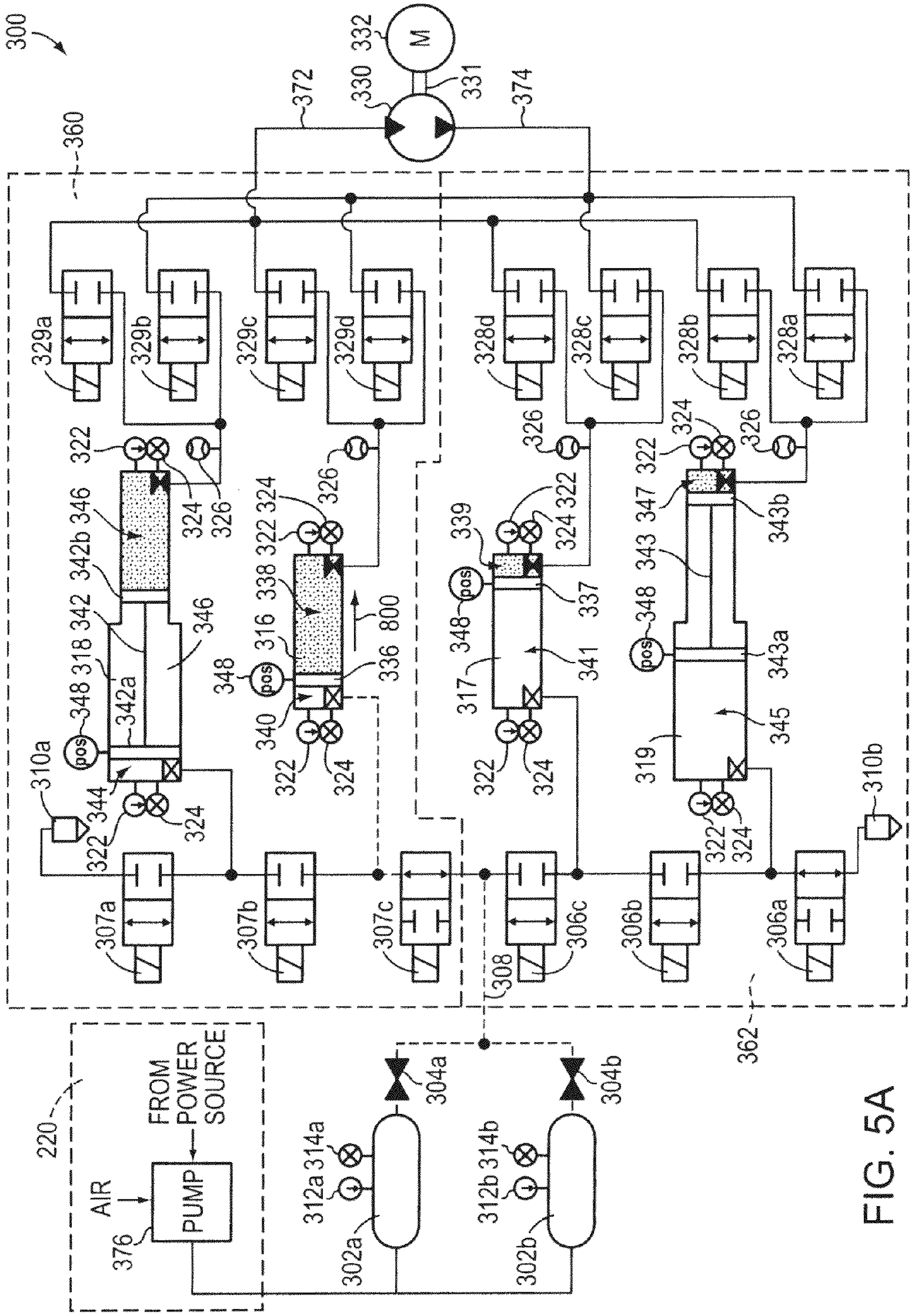
FIGS. 5A-5N are schematic diagrams of the system of FIG. 4 illustrating the cycling of the various components during an expansion phase of the system.

FIG. 5A is a schematic diagram of the energy storage and recovery system of FIG. 4 showing an initial physical state of the system 300 in which an accumulator 316 of a first circuit is filled with high-pressure gas from the high-pressure gas storage tanks 302. The tanks 302 have been filled to full pressure, either by the cycle of the system 300 under power input to the hydraulic motor/pump 330, or by a separate high-pressure air pump 376. This air pump 376 is optional, as the air tanks 302 can be filled by running the recovery cycle in reverse. The tanks 302 in this embodiment can be filled to a pressure of 200 ATM (3000 psi) or more. The overall, collective volume of the tanks 302 is highly variable and depends in part upon the amount of energy to be stored.

In FIG. 5A, the recovery of stored energy is initiated by the controller 350. To this end, pneumatic valve 307_c_ is opened allowing a flow of high-pressure air to pass into the air chamber 340 of the accumulator 316. Note that where a flow of compressed gas or fluid is depicted, the connection is indicated as a dashed line. The level of pressure is reported by the sensor 324 in communication with the chamber 340. The pressure is maintained at the desired level by valve 307_c_. This pressure causes the piston 336 to bias (arrow 800) toward the fluid chamber 338, thereby generating a comparable pressure in the incompressible fluid. The fluid is prevented from moving out of the fluid chamber 338 at this time by valves 329_c_ and 329_d_).

Figure 5B:
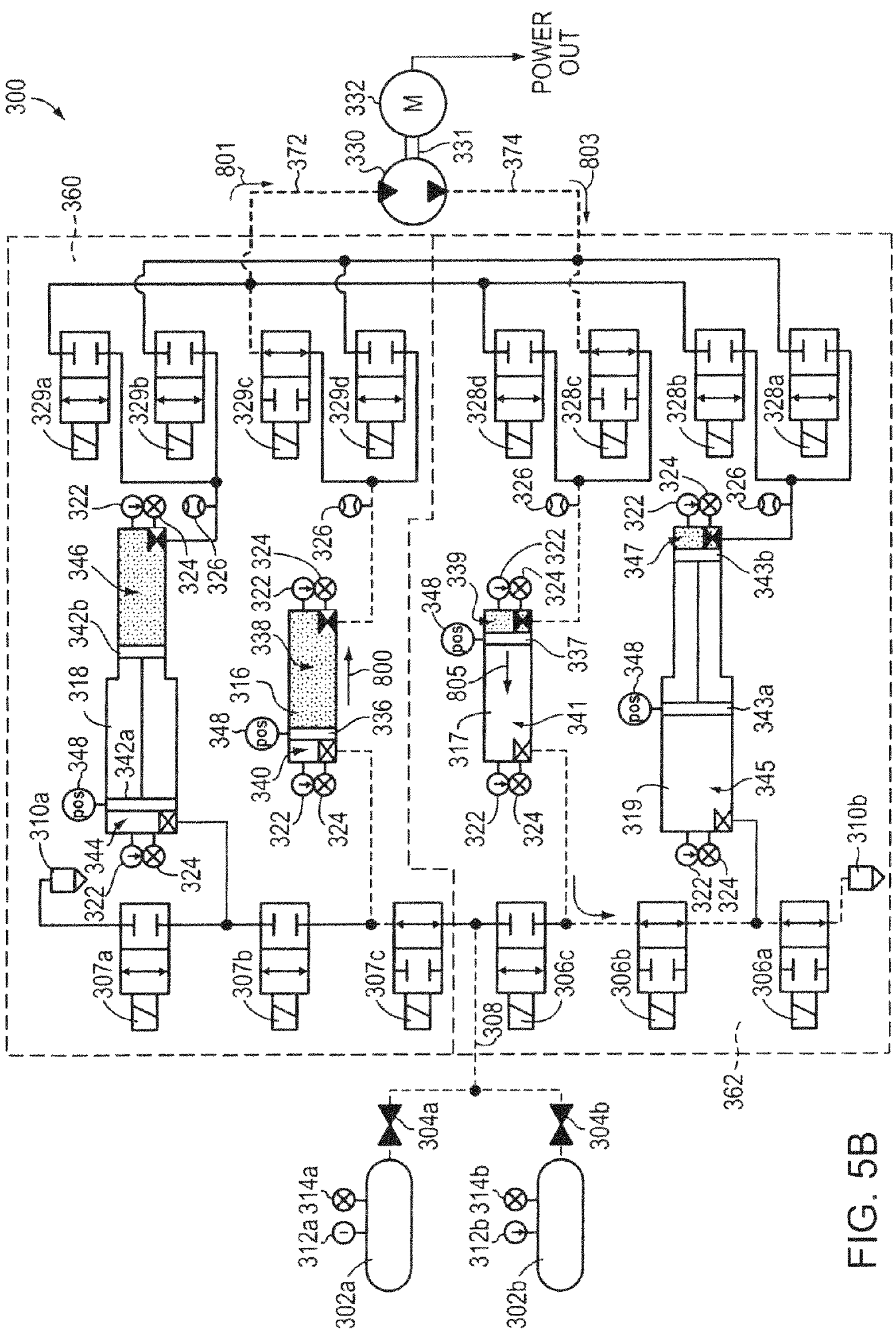

FIG. 5B is a schematic diagram of the energy storage and recovery system of FIG. 4 showing a physical state of the system 300 following the state of FIG. 5A, in which valves are opened to allow fluid to flow from the accumulator 316 of the first circuit to the fluid motor/pump 330 to generate electricity therefrom. As shown in FIG. 5B, pneumatic valve 307_c_ remains open. When a predetermined pressure is obtained in the air chamber 340, the fluid valve 329_c_ is opened by the controller, causing a flow of fluid (arrow 801) to the inlet side 372 of the hydraulic motor/pump 330 (which operates in motor mode during the recovery phase). The motion of the motor 330 drives the electric motor/generator 332 in a generation mode, providing power to the facility or grid as shown by the term "POWER OUT." To absorb the fluid flow (arrow 803) from the outlet side 374 of the hydraulic motor/pump 330, fluid valve 328*c* is opened to the fluid chamber 339 by the controller 350 to route fluid to the opposing accumulator 317. To allow the fluid to fill accumulator 317 after its energy has been transferred to the motor/pump 330, the air chamber 341 is vented by opening pneumatic vent valves 306*a*, 306*b*. This allows any air in the chamber 341, to escape to the atmosphere via the vent 310*b* as the piston 337 moves (arrow 805) in response to the entry of fluid.

Figure 5C:
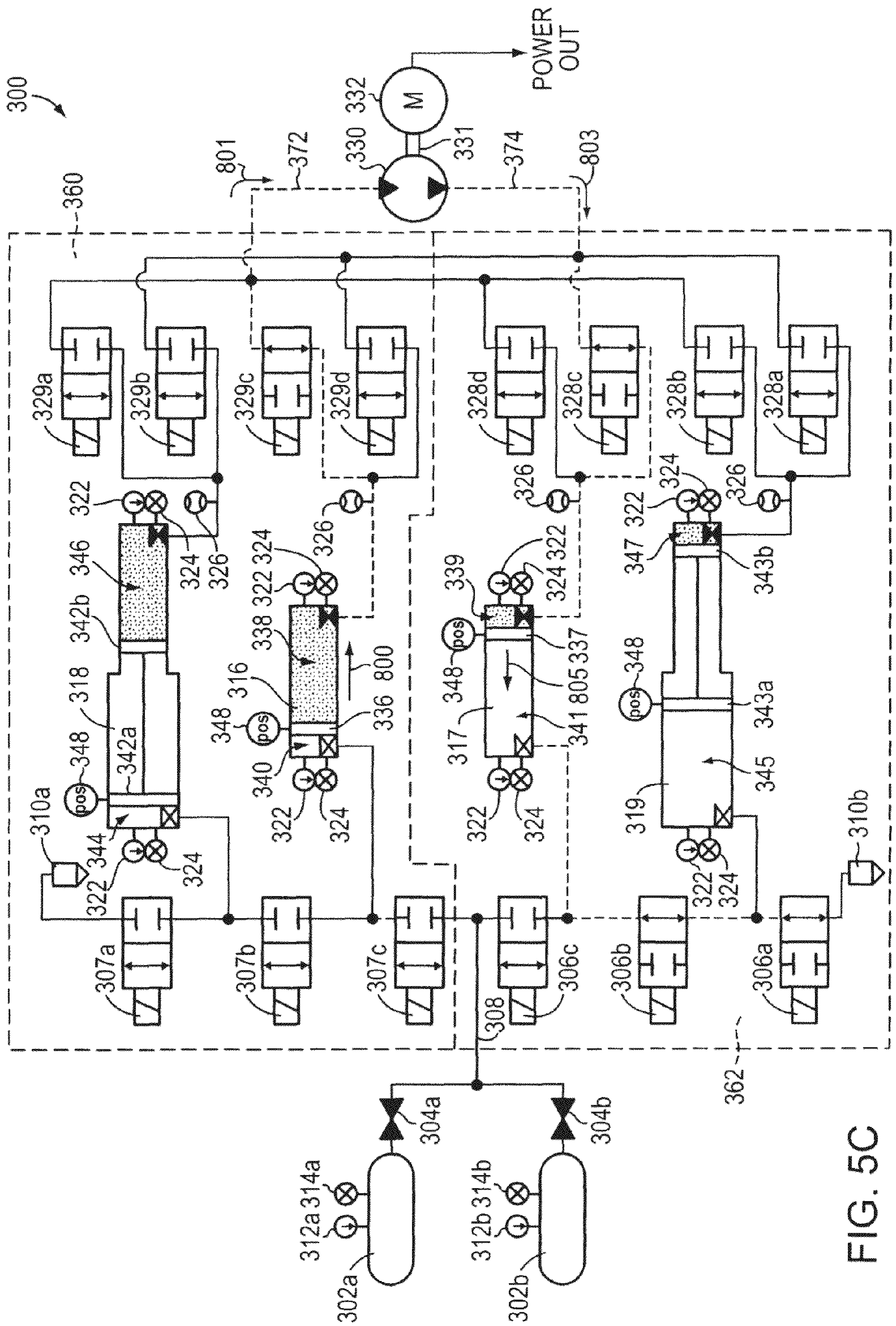

FIG. 5C is a schematic diagram of the energy storage and recovery system of FIG. 4 showing a physical state of the system 300 following the state of FIG. 5B, in which the accumulator 316 of the first circuit directs fluid to the fluid motor/pump 330 while the accumulator 317 of the second circuit receives exhausted fluid from the motor/pump 330, as gas in its air chamber 341 is vented to atmosphere. As shown in FIG. 5C, a predetermined amount of gas has been allowed to flow from the high-pressure tanks 302 to the accumulator 316 and the controller 350 now closes pneumatic valve 307*c*. Other valves remain open so that fluid can continue to be driven by the accumulator 316 through the motor/pump 330.

Figure 5D:
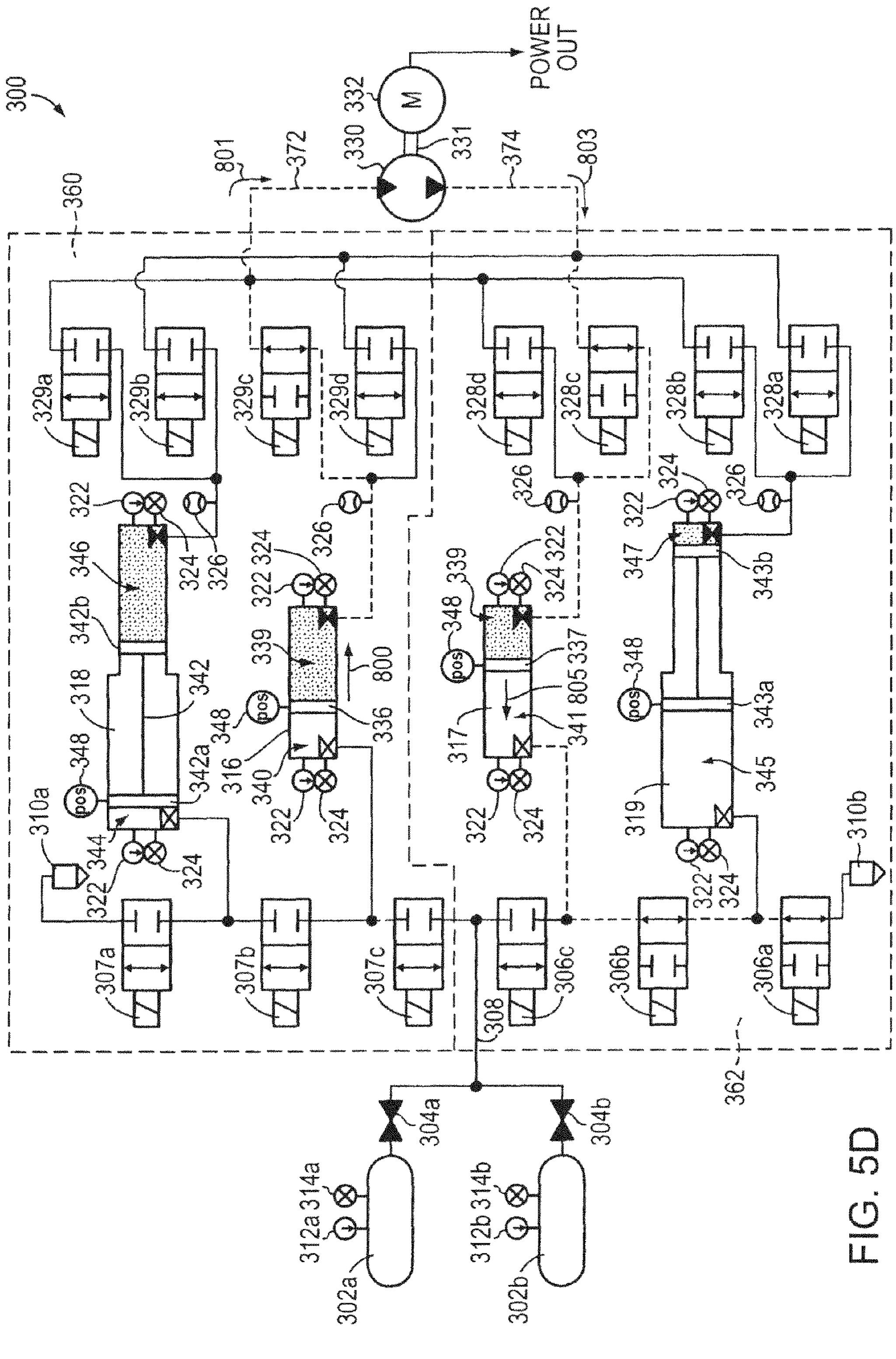

FIG. 5D is a schematic diagram of the energy storage and recovery system of FIG. 4 showing a physical state of the system 300 following the state of FIG. 5C, in which the accumulator 316 of the first circuit continues to direct fluid to the fluid motor/pump 330 while the accumulator 317 of the second circuit continues to receive exhausted fluid from the motor/pump 330, as gas in its air chamber 341 is vented to atmosphere. As shown in FIG. 5D, the operation continues, where the accumulator piston 136 drives additional fluid (arrow 800) through the motor/pump 330 based upon the charge of gas pressure placed in the accumulator air chamber 340 by the tanks 302. The fluid causes the opposing accumulator's piston 337 to move (arrow 805), displacing air through the vent 310*b*.

Figure 5E:
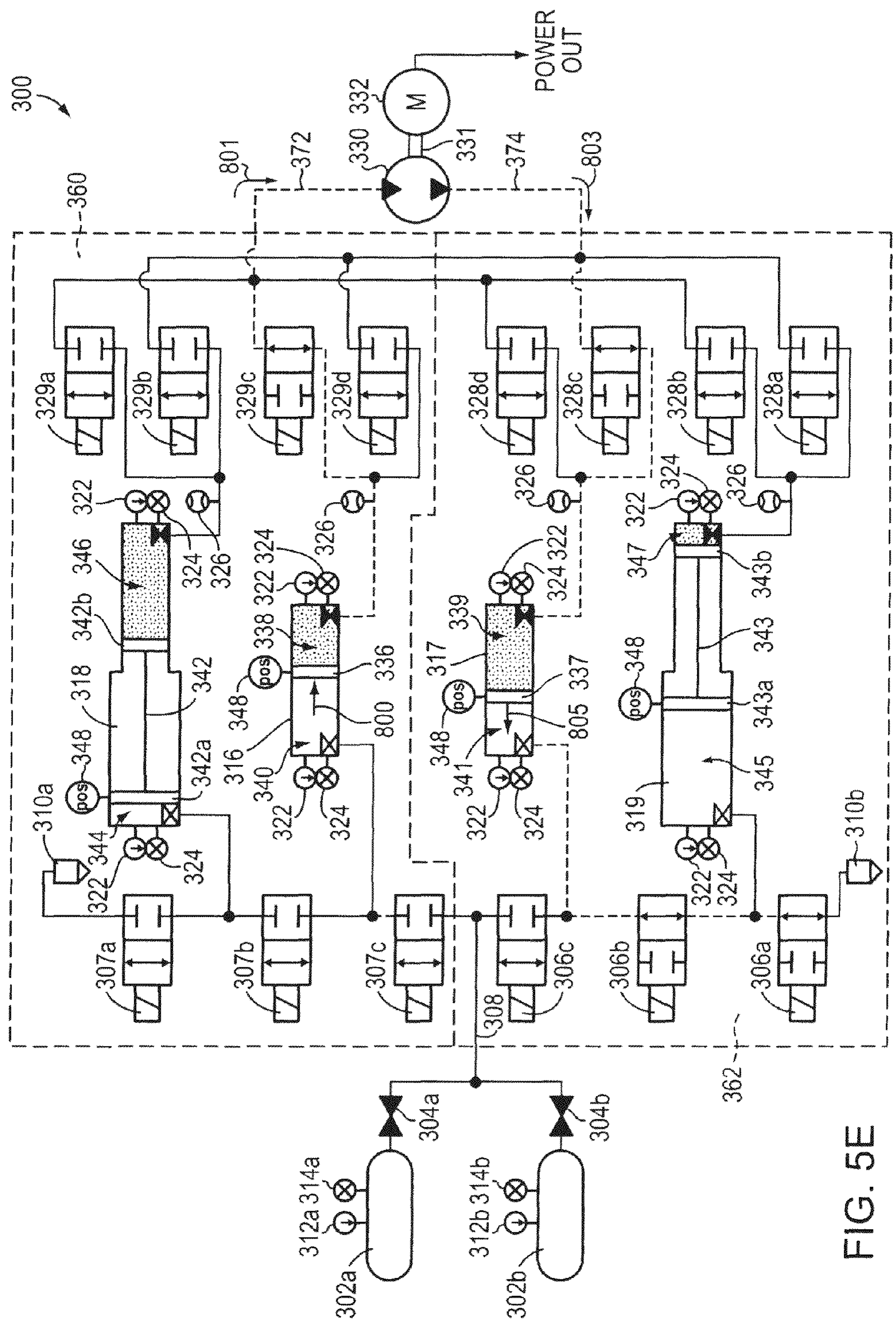

FIG. 5E is a schematic diagram of the energy storage and recovery system of FIG. 4 showing a physical state of the system 300 following the state of FIG. 5D, in which the accumulator 316 of the first circuit has nearly exhausted the fluid in its fluid chamber 338 and the gas in its air chamber 340 has expanded to nearly mid-pressure from high-pressure. As shown in FIG. 5E, the charge of gas in the air chamber 340 of the accumulator 316 has continued to drive fluid (arrows 800, 801) through the motor/pump 330 while displacing air via the air vent 310*b*. The gas has expanded from high-pressure to mid-pressure during this portion of the energy recovery cycle. Consequently, the fluid has ranged from high to mid-pressure. By sizing the accumulators appropriately, the rate of expansion can be controlled.

This is part of the significant parameter of heat transfer. For maximum efficiency, the expansion should remain substantially isothermal. That is heat from the environment replaces the heat lost by the expansion. In general, isothermal compression and expansion is critical to maintaining high round-trip system efficiency, especially if the compressed gas is stored for long periods. In various embodiments of the systems described herein, heat transfer can occur through the walls of the accumulators and/or intensifiers, or heat-transfer mechanisms can act upon the expanding or compressing gas to absorb or radiate heat from or to an environmental or other source. The rate of this heat transfer is governed by the thermal properties and characteristics of the accumulators/intensifiers, which can be used to determine a thermal time constant. If the compression of the gas in the accumulators/intensifiers occurs slowly relative to the thermal time constant, then heat generated by compression of the gas will transfer through the accumulator/intensifier walls to the surroundings, and the gas will remain at approximately constant temperature. Similarly, if expansion of the gas in the accumulators/intensifiers occurs slowly relative to the thermal time constant, then the heat absorbed by the expansion of the gas will transfer from the surroundings through the accumulator/intensifier walls and to the gas, and the gas will remain at approximately constant temperature. If the gas remains at a relatively constant temperature during both compression and expansion, then the amount of heat energy transferred from the gas to the surroundings during compression will equal the amount of heat energy recovered during expansion via heat transfer from the surroundings to the gas. This property is represented by the Q and the arrow in FIG. 4. As noted, a variety of mechanisms can be employed to maintain an isothermal expansion/compression. In one example, the accumulators can be submerged in a water bath or water/fluid flow can be circulated around the accumulators and intensifiers. The accumulators can alternatively be surrounded with heating/cooling coils or a flow of warm air can be blown past the accumulators/intensifiers. However, any technique that allows for mass flow transfer of heat to and from the accumulators can be employed.

Figure 5F:
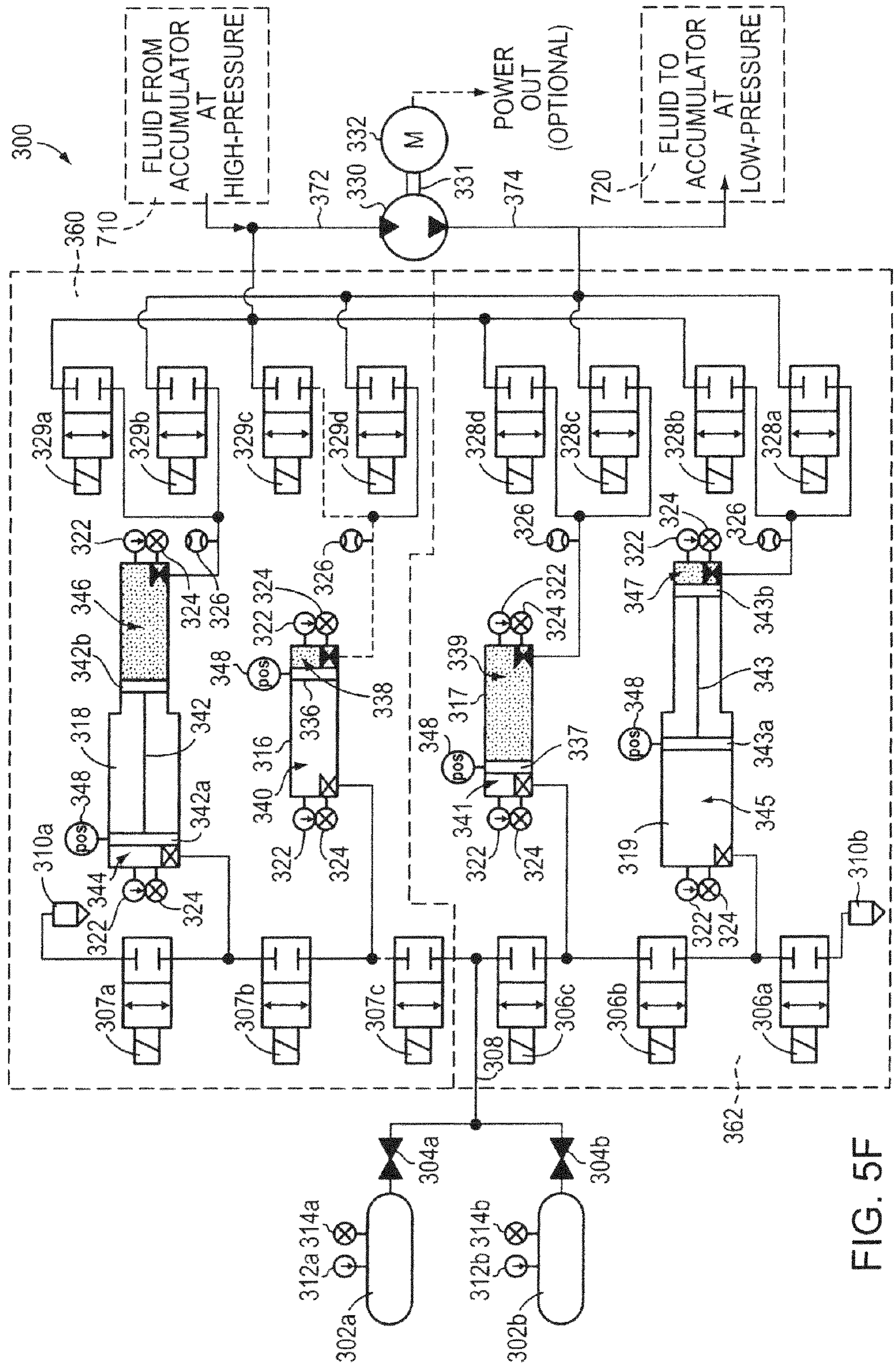

FIG. 5F is a schematic diagram of the energy storage and recovery system of FIG. 4, showing a physical state of the system 300 following the state of FIG. 5E in which the accumulator 316 of the first circuit has exhausted the fluid in its fluid chamber 338 and the gas in its air chamber 340 has expanded to mid-pressure from high-pressure, and the valves have been momentarily closed on both the first circuit and the second circuit, while the optional accumulator 366 delivers fluid through the motor/pump 330 to maintain operation of the electric motor/generator 332 between cycles. As shown in FIG. 5F, the piston 336 of the accumulator 316 has driven all fluid out of the fluid chamber 338 as the gas in the air chamber 340 has fully expanded (to mid-pressure of 20 ATM, per the example). Fluid valves 329*c* and 328*c* are closed by the controller 350. In practice, the opening and closing of valves is carefully timed so that a flow through the motor/pump 330 is maintained. However, in an optional implementation, brief interruptions in fluid pressure can be accommodated by pressurized fluid flow 710 from the optional accumulator (366 in FIG. 4), which is directed through the motor/pump 330 to the second optional accumulator (367 in FIG. 4) at low-pressure as an exhaust fluid flow 720. In one embodiment, the exhaust flow can be directed to a simple low-pressure reservoir that is used to refill the first accumulator 366. Alternatively, the exhaust flow can be directed to the second optional accumulator (367 in FIG. 4) at low-pressure, which is subsequently pressurized by excess electricity (driving a compressor) or air pressure from the storage tanks 302 when it is filled with fluid. Alternatively, where a larger number of accumulator/intensifier circuits (e.g., three or more) are employed in parallel in the system 300, their expansion cycles can be staggered so that only one circuit is closed off at a time, allowing a substantially continuous flow from the other circuits.

Figure 5G:
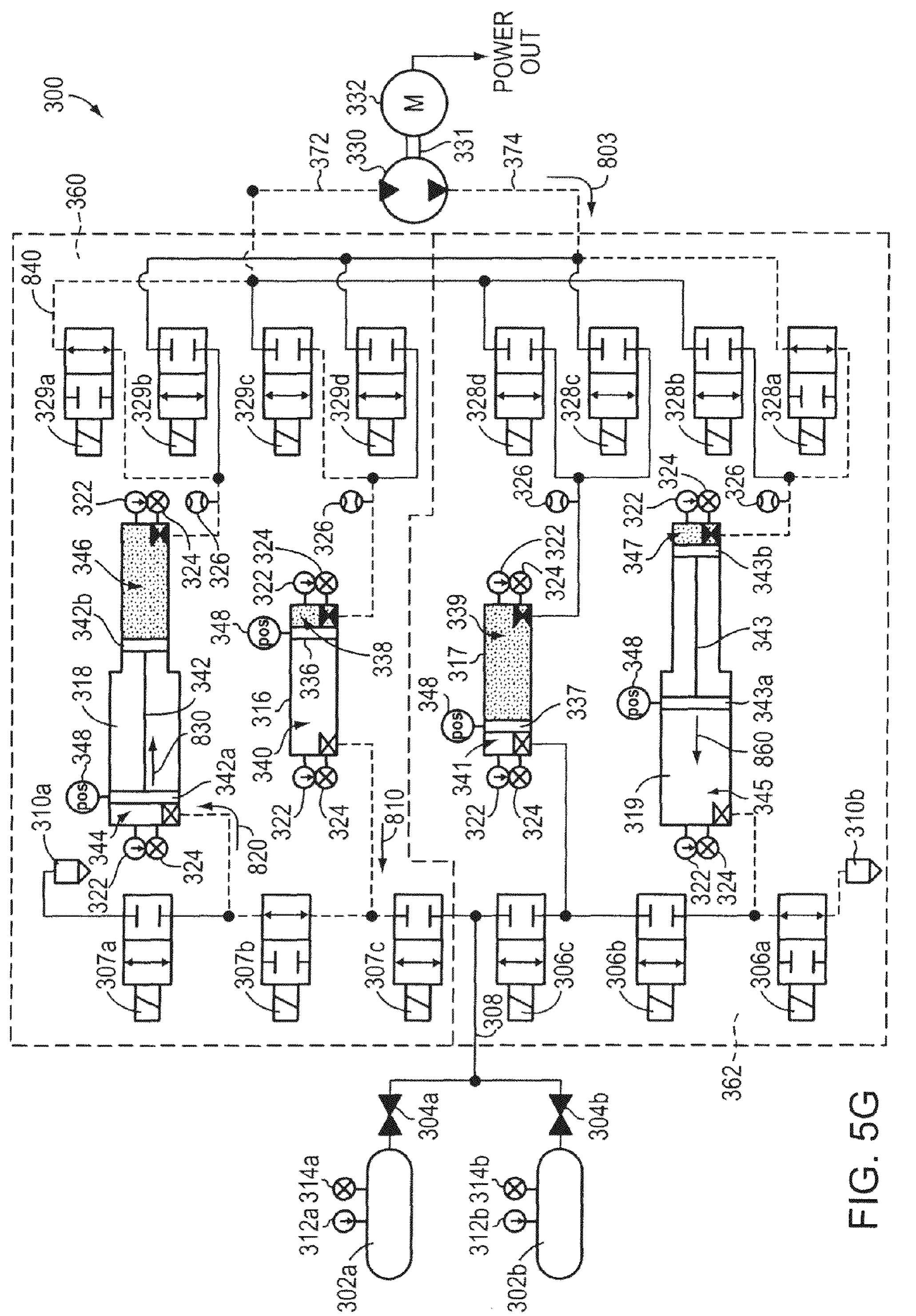

FIG. 5G is a schematic diagram of the energy storage and recovery system of FIG. 4 showing a physical state of the system 300 following the state of FIG. 5F, in which pneumatic valves 307*b*, 306*a* are opened to allow mid-pressure gas from the air chamber 340 of the first circuit's accumulator 316 to flow into the air chamber 344 of the first circuit's intensifier 318, while fluid from the first circuit's intensifier 318 is directed through the motor/pump 330 and exhausted fluid fills the fluid chamber 347 of second circuit's intensifier 319, whose air chamber 345 is vented to atmosphere. As shown in FIG. 5G, pneumatic valve 307*b* is opened, while the tank outlet valve 307*c* remains closed. Thus, the volume of the air chamber 340 of accumulator 316 is coupled to the air chamber 344 of the intensifier 318. The accumulator's air pressure has been reduced to a mid-pressure level, well below the initial charge from the tanks 302. The air, thus, flows (arrow 810) through valve 307*b* to the air chamber 344 of the intensifier 318. This drives the air piston 342*a* (arrow 830). Since the area of the air-contacting piston 342*a* is larger than that of the piston 336 in the accumulator 316, the lower air pressure still generates a substantially equivalent higher fluid pressure on the smaller-area, coupled fluid piston 342*b* of the intensifier 318. The fluid in the fluid chamber 346 thereby flows under pressure through opened fluid valve 329*a* (arrow 840) and into the inlet side 372 of the motor/pump 330. The outlet fluid from the motor pump 330 is directed (arrow 850) through now-opened fluid valve 328*a* to the opposing intensifier 319. The fluid enters the fluid chamber 347 of the intensifier 319, biasing (arrow 860) the fluid piston 343*b* (and interconnected gas piston 343*a*). Any gas in the air chamber 345 of the intensifier 319 is vented through the now opened vent valve 306*a* to atmosphere via the vent 310*b*. The mid-level gas pressure in the accumulator 316 is directed (arrow 820) to the intensifier 318, the piston 342*a* of which drives fluid from the chamber 346 using the coupled, smaller-diameter fluid piston 342*b*. This portion of the recovery stage maintains a reasonably high fluid pressure, despite lower gas pressure, thereby ensuring that the motor/pump 330 continues to operate within a predetermined range of fluid pressures, which is desirable to maintain optimal operating efficiencies for the given motor. Notably, the multi-stage circuits of this embodiment effectively restrict the operating pressure range of the hydraulic fluid delivered to the motor/pump 330 above a predetermined level despite the wide range of pressures within the expanding gas charge provided by the high-pressure tank.

Figure 5H:
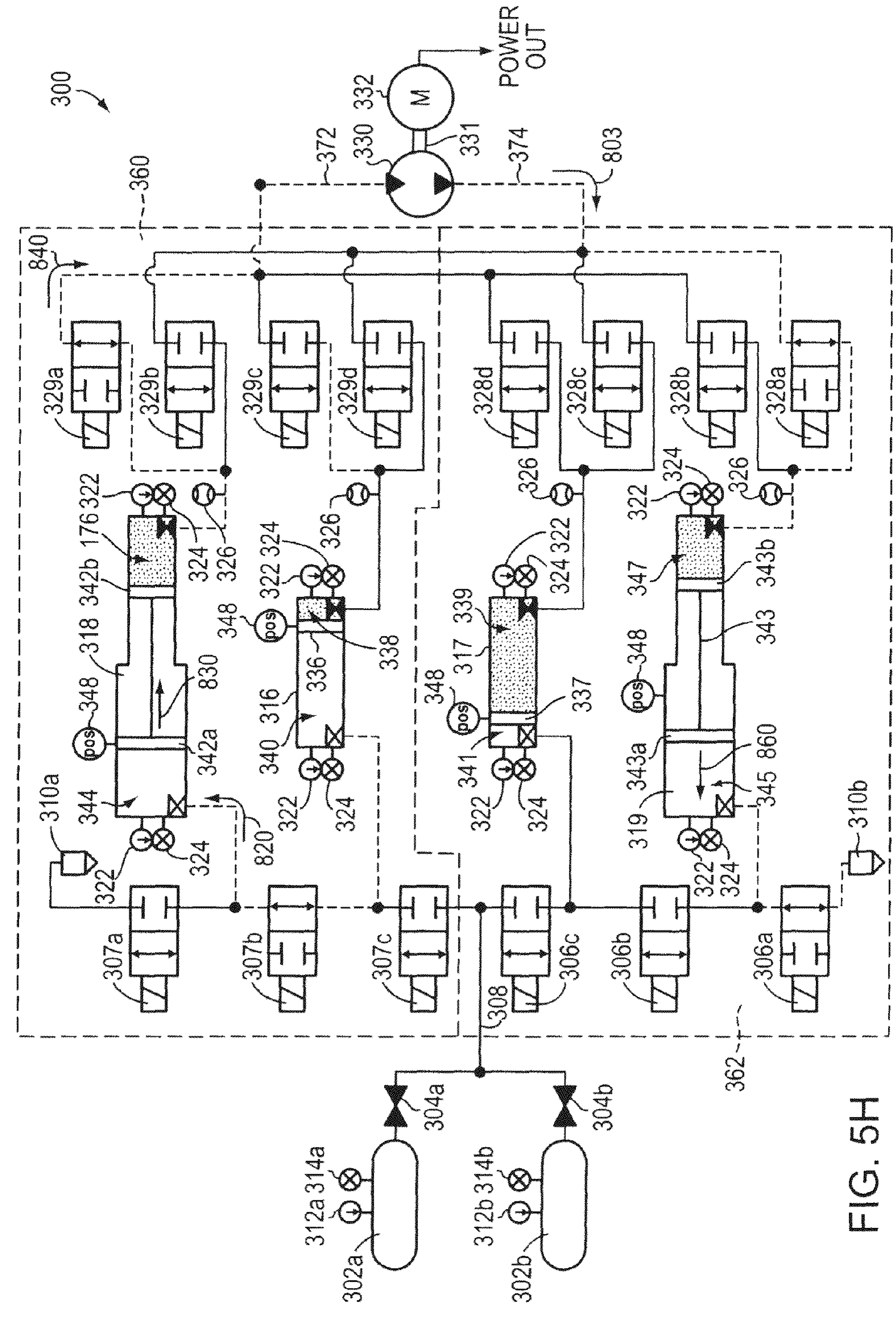

FIG. 5H is a schematic diagram of the energy storage and recovery system of FIG. 4 showing a physical state of the system following the state of FIG. 5G, in which the intensifier 318 of the first circuit directs fluid to the fluid motor/pump 330 based upon mid-pressure gas from the first circuit's accumulator 316 while the intensifier 319 of the second circuit receives exhausted fluid from the motor/pump 330, as gas in its air chamber 345 is vented to atmosphere. As shown in FIG. 5H, the gas in intensifier 318 continues to expand from mid-pressure to low-pressure. Conversely, the size differential between coupled air and fluid pistons 342*a* and 342*b*, respectively, causes the fluid pressure to vary between high and mid-pressure. In this manner, motor/pump operating efficiency is maintained.

Figure 5I:
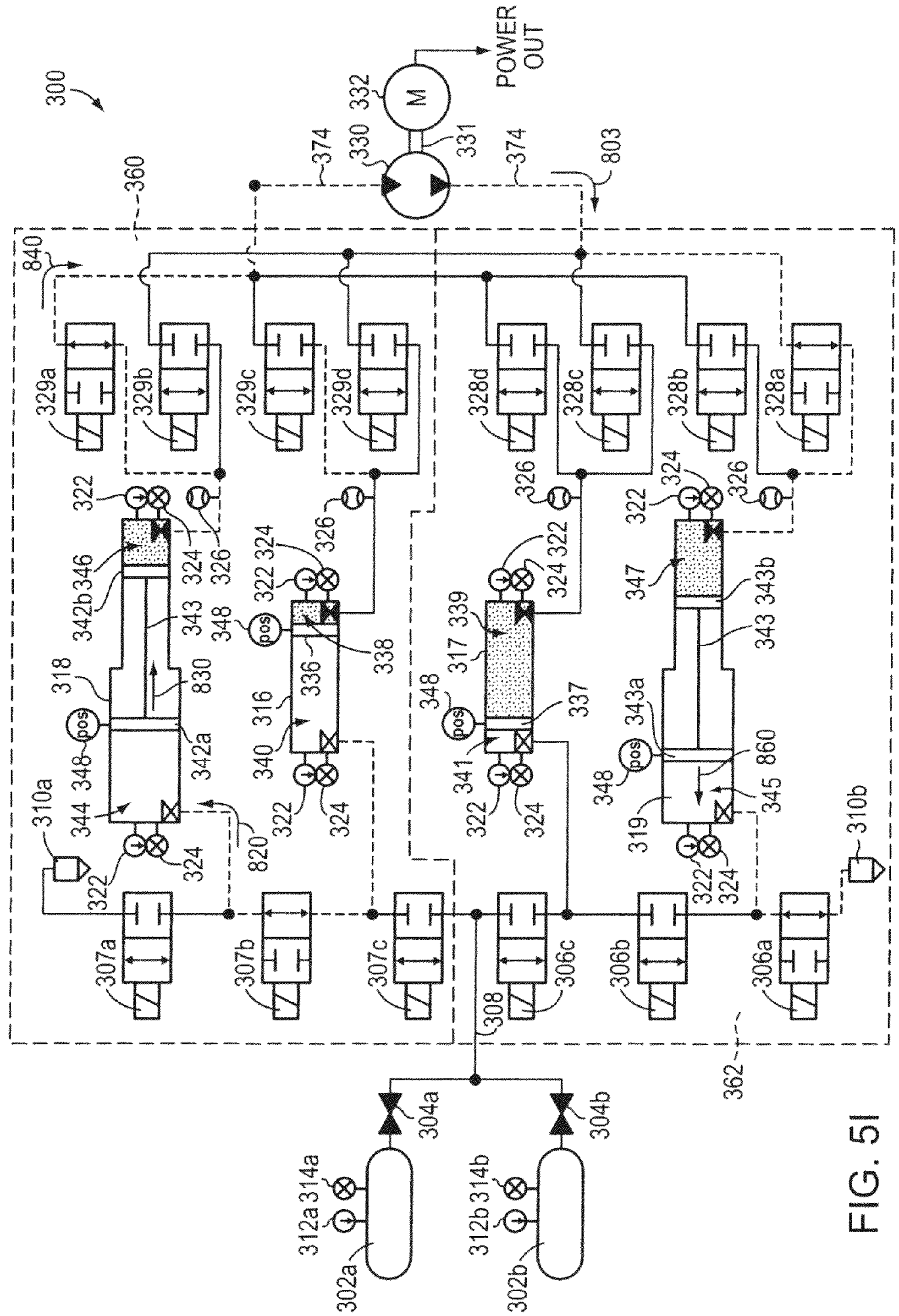

FIG. 5I is a schematic diagram of the energy storage and recovery system of FIG. 4 showing a physical state of the system following the state of FIG. 5H, in which the intensifier 318 of the first circuit has almost exhausted the fluid in its fluid chamber 346 and the gas in its air chamber 344, delivered from the first circuit's accumulator 316, has expanded to nearly low-pressure from the mid-pressure. As discussed with respect to FIG. 5H, the gas in intensifier 318 continues to expand from mid-pressure to low-pressure. Again, the size differential between coupled air and fluid pistons 342*a* and 342*b*, respectively, causes the fluid pressure to vary between high and mid-pressure to maintain motor/pump operating efficiency.

Figure 5J:
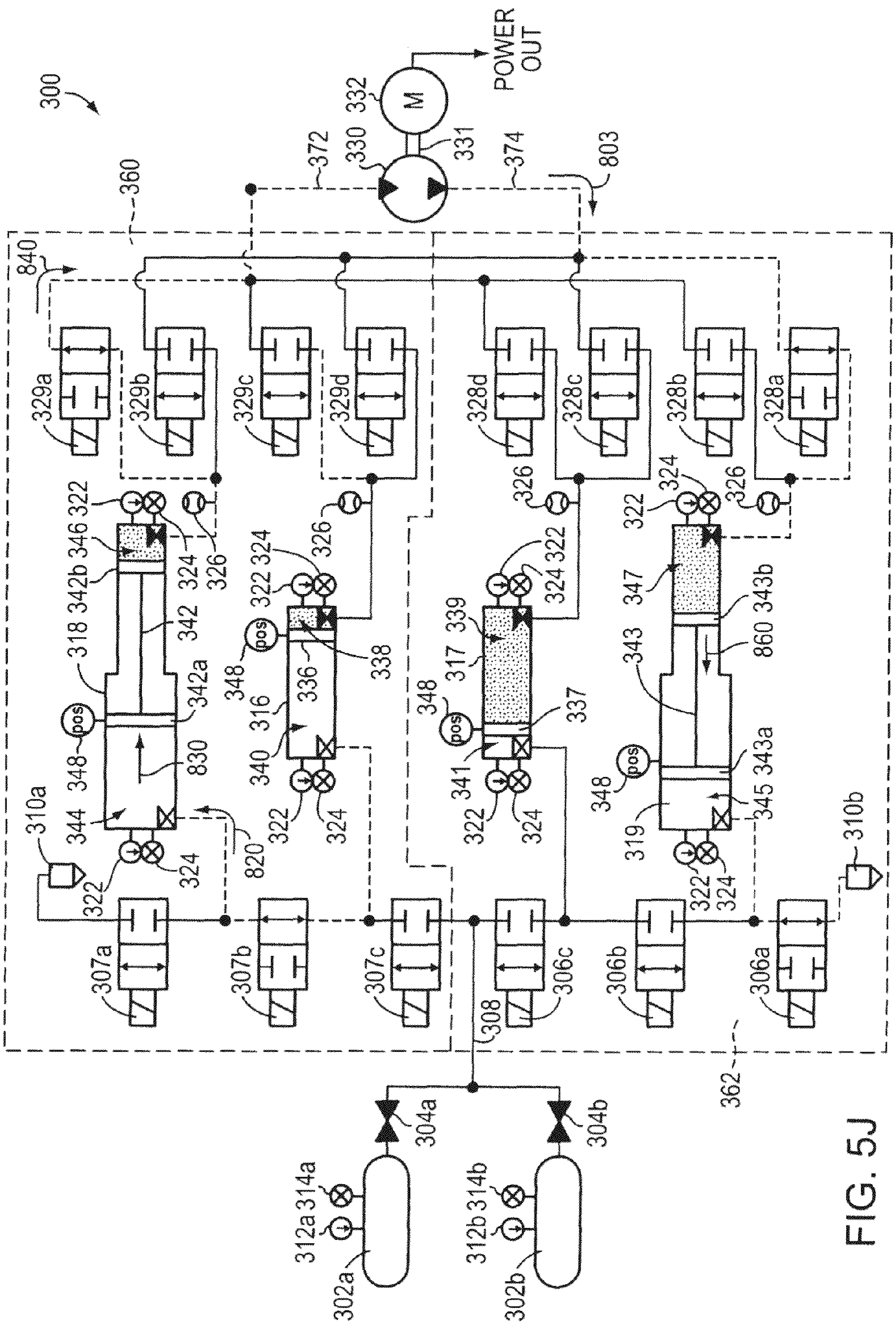

FIG. 5J is a schematic diagram of the energy storage and recovery system of FIG. 4 showing a physical state of the system 300 following the state of FIG. 5I, in which the intensifier 318 of the first circuit has essentially exhausted the fluid in its fluid chamber 346 and the gas in its air chamber 344, delivered from the first circuit's accumulator 316, has expanded to low-pressure from the mid-pressure. As shown in FIG. 5J, the intensifier's piston 342 reaches full stroke, while the fluid is driven fully from high to mid-pressure in the fluid chamber 346. Likewise, the opposing intensifier's fluid chamber 347 has filled with fluid from the outlet side 374 of the motor/pump 330.

Figure 5K:
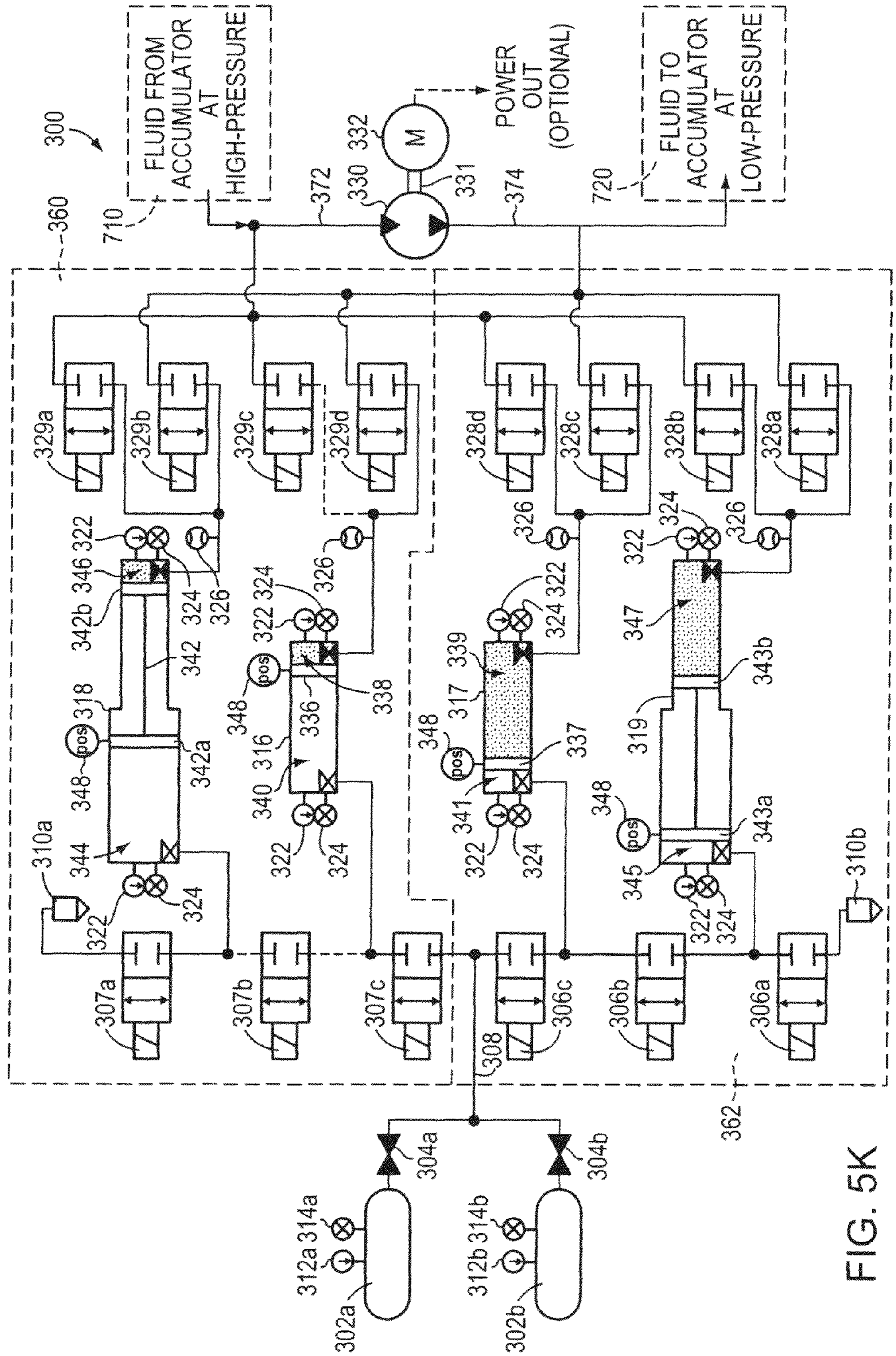

FIG. 5K is a schematic diagram of the energy storage and recovery system of FIG. 4 showing a physical state of the system following the state of FIG. 5J, in which the intensifier 318 of the first circuit has exhausted the fluid in its fluid chamber 346 and the gas in its air chamber 344 has expanded to low-pressure, and the valves have been momentarily closed on both the first circuit and the second circuit in preparation of switching-over to an expansion cycle in the second circuit, whose accumulator and intensifier fluid chambers 339, 347 are now filled with fluid. At this time, the optional accumulator 366 can deliver fluid through the motor/pump 330 to maintain operation of the motor/generator 332 between cycles. As shown in FIG. 5K, pneumatic valve 307*b*, located between the accumulator 316 and the intensifier 318 of the circuit 362, is closed. At this point in the above-described portion of the recovery stage, the gas charge initiated in FIG. 5A has been fully expanded through two stages with relatively gradual, isothermal expansion characteristics, while the motor/pump 330 has received fluid flow within a desirable operating pressure range. Along with pneumatic valve 307*b*, the fluid valves 329*a* and 328*a* (and outlet gas valve 307*a*) are momentarily closed. The above-described optional accumulator 366, and/or other interconnected pneumatic/hydraulic accumulator/intensifier circuits can maintain predetermined fluid flow through the motor/pump 330 while the valves of the subject circuits 360, 362 are momentarily closed. At this time, the optional accumulators and reservoirs 366, 367, as shown in FIG. 4, can provide a continuing flow 710 of pressurized fluid through the motor/pump 330, and into the reservoir or low-pressure accumulator (exhaust fluid flow 720). The full range of pressure in the previous gas charge being utilized by the system 300.

Figure 5L:
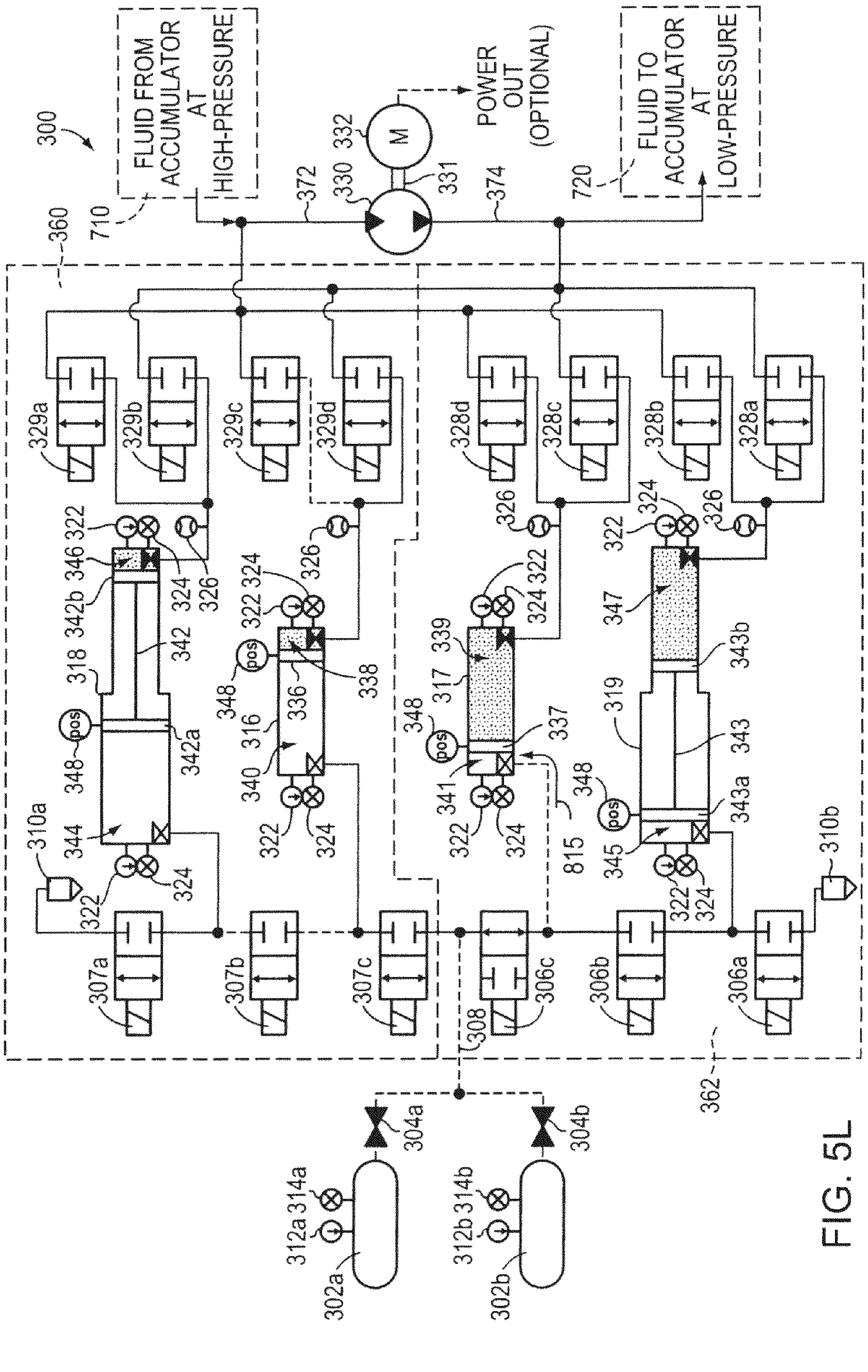

FIG. 5L is a schematic diagram of the energy storage and recovery system of FIG. 4 showing a physical state of the system following the state of FIG. 5K, in which the accumulator 317 of the second circuit is filled with high-pressure gas from the high-pressure tanks 302 as part of the switch-over to the second circuit as an expansion circuit, while the first circuit receives exhausted fluid and is vented to atmosphere while the optional accumulator 366 delivers fluid through the motor/pump 330 to maintain operation of the motor/generator between cycles. As shown in FIG. 5L, the cycle continues with a new charge of high-pressure (slightly lower) gas from the tanks 302 delivered to the opposing accumulator 317. As shown, pneumatic valve 306*c* is now opened by the controller 350, allowing a charge of relatively high-pressure gas to flow (arrow 815) into the air chamber 341 of the accumulator 317, which builds a corresponding high-pressure charge in the air chamber 341.

Figure 5M:
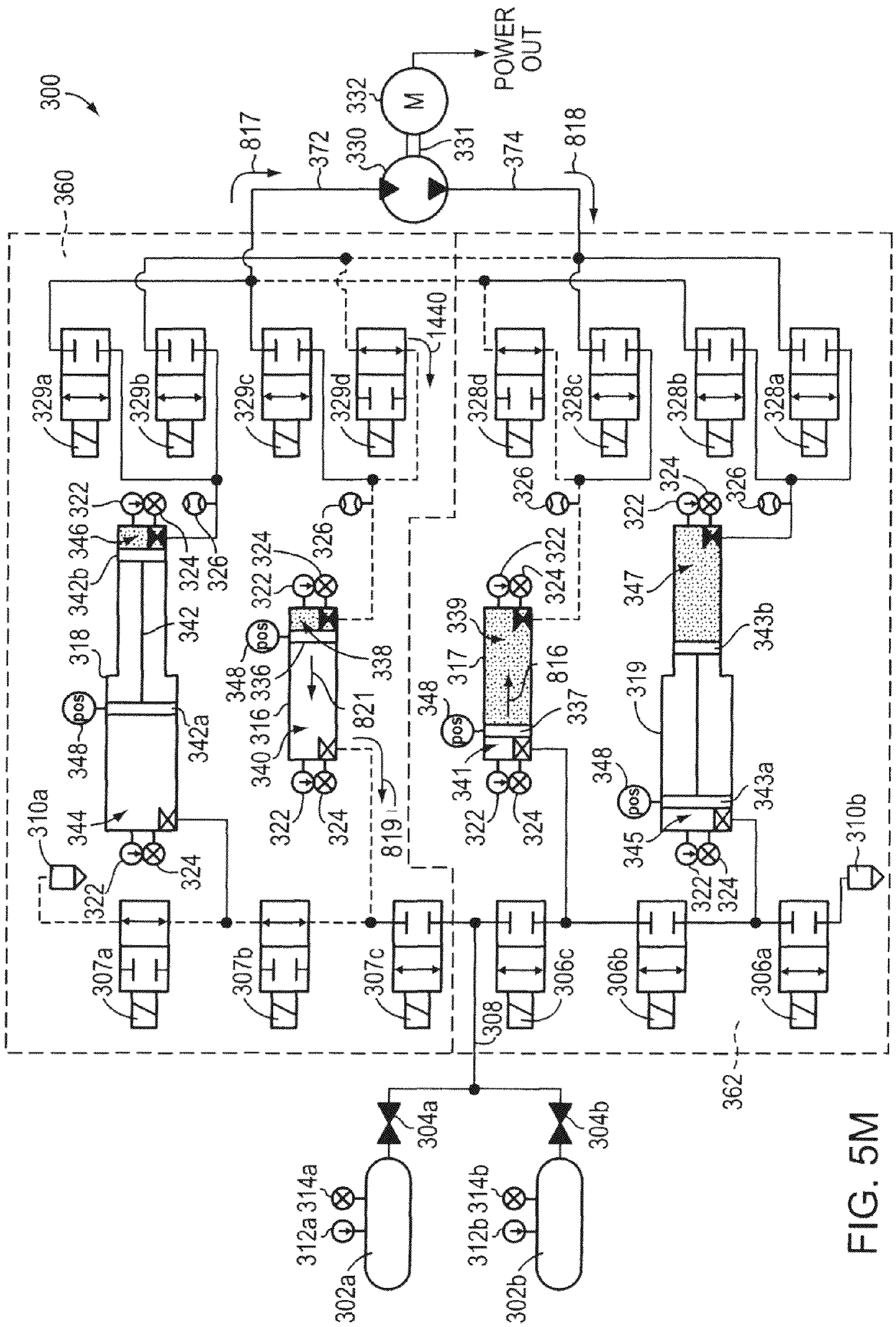

FIG. 5M is a schematic diagram of the energy storage and recovery system of FIG. 4 showing a physical state of the system following the state of FIG. 5L, in which valves are opened to allow fluid to flow from the accumulator 317 of the second circuit to the fluid motor/pump 330 to generate electricity therefrom, while the first circuit's accumulator 316, whose air chamber 340 is vented to atmosphere, receives exhausted fluid from the motor/pump 330. As shown in FIG.

5M, the pneumatic valve 306*c* is closed and the fluid valves 328*d* and 329*d* are opened on the fluid side of the circuits 360, 362, thereby allowing the accumulator piston 337 to move (arrow 816) under pressure of the charged air chamber 341. This directs fluid under high pressure through the inlet side 372 of the motor/pump 330 (arrow 817), and then through the outlet 374. The exhausted fluid is directed (arrow 818) now to the fluid chamber 338 of accumulator 316. Pneumatic valves 307*a* and 307*b* have been opened, allowing the low-pressure air in the air chamber 340 of the accumulator 316 to vent (arrow 819) to atmosphere via vent 310*a*. In this manner, the piston 336 of the accumulator 316 can move (arrow 821) without resistance to accommodate the fluid from the motor/pump outlet 374.

Figure 5N:
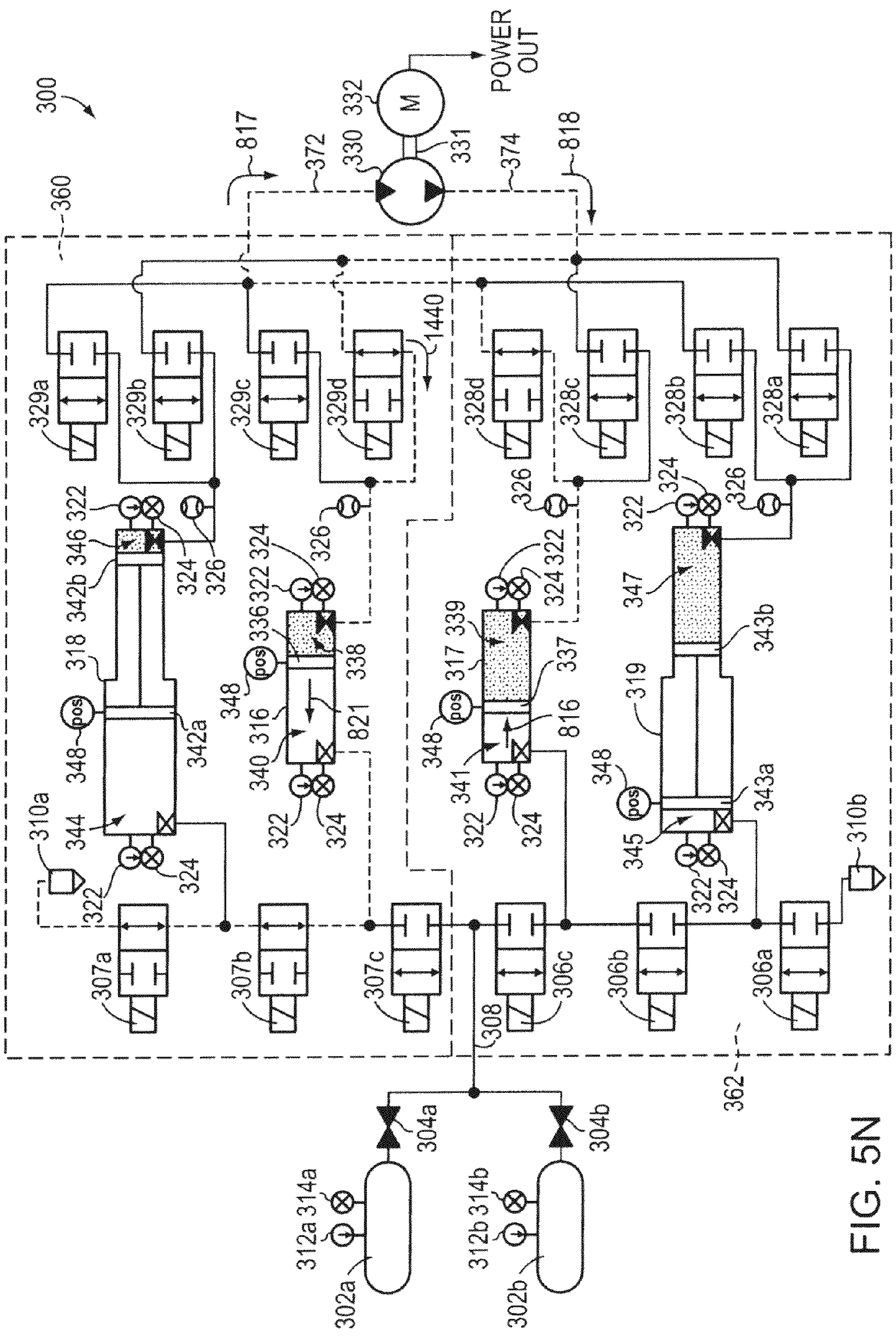

FIG. 5N is a schematic diagram of the energy storage and recovery system of FIG. 4 showing a physical state of the system following the state of FIG. 5M, in which the accumulator 317 of the second circuit 362 continues to direct fluid to the fluid motor/pump 330 while the accumulator 316 of the first circuit continues to receive exhausted fluid from the motor/pump 330, as gas in its air chamber 340 is vented to atmosphere, the cycle eventually directing mid-pressure air to the second circuit's intensifier 319 to drain the fluid therein. As shown in FIG. 5N, the high-pressure gas charge in the accumulator 317 expands more fully within the air chamber 341 (arrow 816). Eventually, the charge in the air chamber 341 is fully expanded. The mid-pressure charge in the air chamber 341 is then coupled via open pneumatic valve 306*b* to the intensifier 319, which fills the opposing intensifier 318 with spent fluid from the outlet 374. The process repeats until a given amount of energy is recovered or the pressure in the tanks 302 drops below a predetermined level.

It should be clear that the system 300, as described with respect to FIGS. 4 and 5A-5N, could be run in reverse to compress gas in the tanks 302 by powering the electric generator/motor 332 to drive the motor/pump 330 in pump mode. In this case, the above-described process occurs in reverse order, with driven fluid causing compression within both stages of the air system in turn. That is, air is first compressed to a mid-pressure after being drawn into the intensifier from the environment. This mid-pressure air is then directed to the air chamber of the accumulator, where fluid then forces it to be compressed to high pressure. The high-pressure air is then forced into the tanks 302. Both this compression/energy storage stage and the above-described expansion/energy recovery stages are discussed with reference to the general system state diagram shown in FIG. 6.

Note that in the above-described systems 100, 300 (one or more stages), the compression and expansion cycle is predicated upon the presence of gas in the storage tanks 302 that is currently at a pressure above the mid-pressure level (e.g., above 20 ATM). For system 300, for example, when the prevailing pressure in the storage tanks 302 falls below the mid-pressure level (based, for example, upon levels sensed by tank sensors 312, 314), then the valves can be configured by the controller to employ only the intensifier for compression and expansion. That is, lower gas pressures are accommodated using the larger-area gas pistons on the intensifiers, while higher pressures employ the smaller-area gas pistons of the accumulators, 316, 317.

Before discussing the state diagram, it should be noted that one advantage of the described systems according to this invention is that, unlike various prior art systems, this system can be implemented using generally commercially available components. In the example of a system having a power output of 10 to 500 kW, for example, high-pressure storage tanks can be implemented using standard steel or composite cylindrical pressure vessels (e.g. Compressed Natural Gas 5500-psi steel cylinders). The accumulators can be implemented using standard steel or composite pressure cylinders with moveable pistons (e.g., a four-inch-inner-diameter piston accumulator). Intensifiers (pressure boosters/multipliers) having characteristics similar to the exemplary accumulator can be implemented (e.g., a fourteen-inch booster diameter and four-inch bore diameter single-acting pressure booster available from Parker-Hannifin of Cleveland, Ohio). A fluid motor/pump can be a standard high-efficiency axial piston, radial piston, or gear-based hydraulic motor/pump, and the associated electrical generator is also available commercially from a variety of industrial suppliers. Valves, lines, and fittings are commercially available with the specified characteristics as well.

Figure 6:
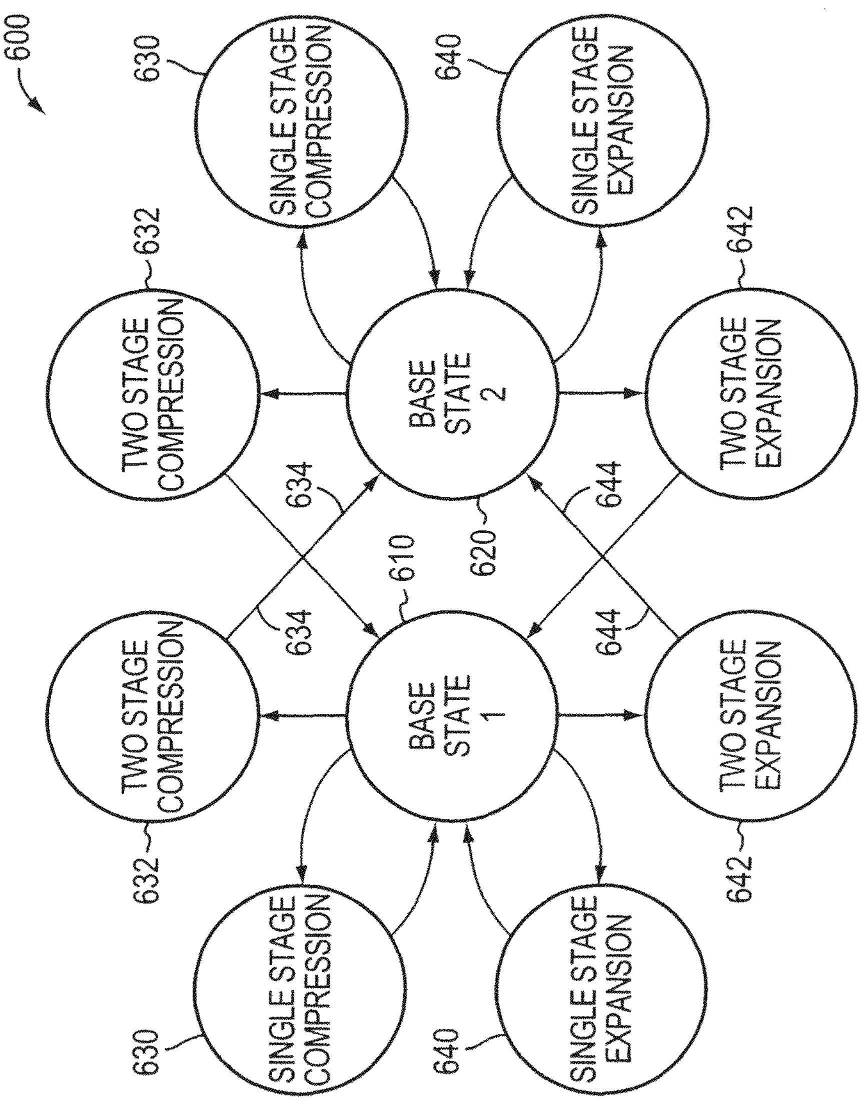
FIG. 6 is a generalized diagram of the various operational states of an open-air hydraulic-pneumatic energy storage and recovery system in accordance with one embodiment of the invention in both an expansion/energy recovery cycle and a compression/energy storage cycle.

Having discussed the exemplary sequence of physical steps in various embodiments of the system, the following is a more general discussion of operating states for the system 300 in both the expansion/energy recovery mode and the compression/energy storage mode. Reference is now made to FIG. 6.

In particular, FIG. 6 details a generalized state diagram 600 that can be employed by the control application 353 to operate the system's valves and motor/generator based upon the direction of the energy cycle (recovery/expansion or storage/compression) based upon the reported states of the various pressure, temperature, piston-position, and/or flow sensors. Base State 1 (610) is a state of the system in which all valves are closed and the system is neither compressing nor expanding gas. A first accumulator and intensifier (e.g., 316, 318) are filled with the maximum volume of hydraulic fluid and second accumulator and intensifier 1 (e.g., 317, 319) are filled with the maximum volume of air, which may or may not be at a pressure greater than atmospheric. The physical system state corresponding to Base State 1 is shown in FIG. 5A. Conversely, Base State 2 (620) of FIG. 6 is a state of the system in which all valves are closed and the system is neither compressing nor expanding gas. The second accumulator and intensifier are filled with the maximum volume of hydraulic fluid and the first accumulator and intensifier are filled with the maximum volume of air, which may or may not be at a pressure greater than atmospheric. The physical system state corresponding to Base State 2 is shown in FIG. 5K.

As shown further in the diagram of FIG. 6, Base State 1 and Base State 2 each link to a state termed Single Stage Compression 630. This general state represents a series of states of the system in which gas is compressed to store energy, and which occurs when the pressure in the storage tanks 302 is less than the mid-pressure level. Gas is admitted (from the environment, for example) into the intensifier (318 or 319-depending upon the current base state), and is then pressurized by driving hydraulic fluid into that intensifier. When the pressure of the gas in the intensifier reaches the pressure in the storage tanks 302, the gas is admitted into the storage tanks 302. This process repeats for the other intensifier, and the system returns to the original base state (610 or 620).

The Two Stage Compression 632 shown in FIG. 6 represents a series of states of the system in which gas is compressed in two stages to store energy, and which occurs when the pressure in the storage tanks 302 is greater than the mid-pressure level. The first stage of compression occurs in an intensifier (318 or 319) in which gas is pressurized to mid-pressure after being admitted at approximately atmospheric (from the environment, for example). The second stage of compression occurs in accumulator (316 or 317) in which gas is compressed to the pressure in the storage tanks 302 and then allowed to flow into the storage tanks 302. Following two stage compression, the system returns to the other base state from the current base state, as symbolized on the diagram by the crossing-over process arrows 634.

The Single State Expansion 640, as shown in FIG. 6, represents a series of states of the system in which gas is expanded to recover stored energy and which occurs when the pressure in the storage tanks 302 is less than the mid-pressure level. An amount of gas from storage tanks 302 is allowed to flow directly into an intensifier (318 or 319). This gas then expands in the intensifier, forcing hydraulic fluid through the hydraulic motor/pump 330 and into the second intensifier, where the exhausted fluid moves the piston with the gas-side open to atmospheric (or another low-pressure environment). The Single Stage Expansion process is then repeated for the second intensifier, after which the system returns to the original base state (610 or 620).

Likewise, the Two Stage Expansion 642, as shown in FIG. 6, represents a series of states of the system in which gas is expanded in two stages to recover stored energy and which occurs when pressure in the storage tanks is greater than the mid-pressure level. An amount of gas from storage tanks 302 is allowed into an accumulator (316 or 317), wherein the gas expands to mid-pressure, forcing hydraulic fluid through the hydraulic motor/pump 330 and into the second accumulator. The gas is then allowed into the corresponding intensifier (318 or 319), wherein the gas expands to near-atmospheric pressure, forcing hydraulic fluid through the hydraulic motor/pump 330 and into the second intensifier. The series of states comprising two-stage expansion are shown in the above-described FIGS. 5A-5N. Following two-stage expansion, the system returns to the other base state (610 or 620) as symbolized by the crossing process arrows 644.

It should be clear that the above-described system for storing and recovering energy is highly efficient in that it allows for gradual expansion of gas over a period that helps to maintain isothermal characteristics. The system particularly deals with the large expansion and compression of gas between high-pressure to near atmospheric (and the concomitant thermal transfer) by providing this compression/expansion in two or more separate stages that allow for more gradual heat transfer through the system components. Thus little outside energy is required to run the system (heating gas, etc.), rendering the system more environmentally friendly, capable of being implemented with commercially available components, and scalable to meet a variety of energy storage/recovery needs. However, it is possible to further improve the efficiency of the systems described above by incorporating a heat transfer subsystem as described with respect to FIG. 9.

FIGS. 7A-7F depict the major systems of an alternative system/method of expansion/compression cycling an open-air staged hydraulic-pneumatic system, where the system 400 includes at least three accumulators 416*a*, 416*b*, 416*c*, at least one intensifier 418, and two motors/pumps 430*a*, 430*b*. The compressed gas storage tanks, valves, sensors, etc. are not shown for clarity. FIGS. 7A-7F illustrate the operation of the accumulators 416, intensifier 418, and the motors/pumps 430 during various stages of expansion (stages 101-106). The system 400 returns to stage 101 after stage 106 is complete.

As shown in the figures, the designations D, F, AI, and F2 refer to whether the accumulator or intensifier is driving (D) or filling (F), with the additional labels for the accumulators where AI refers to accumulator to intensifier—the accumulator air side attached to and driving the intensifier air side, and F2 refers to filling at twice the rate of the standard filling.

Figure 7B:
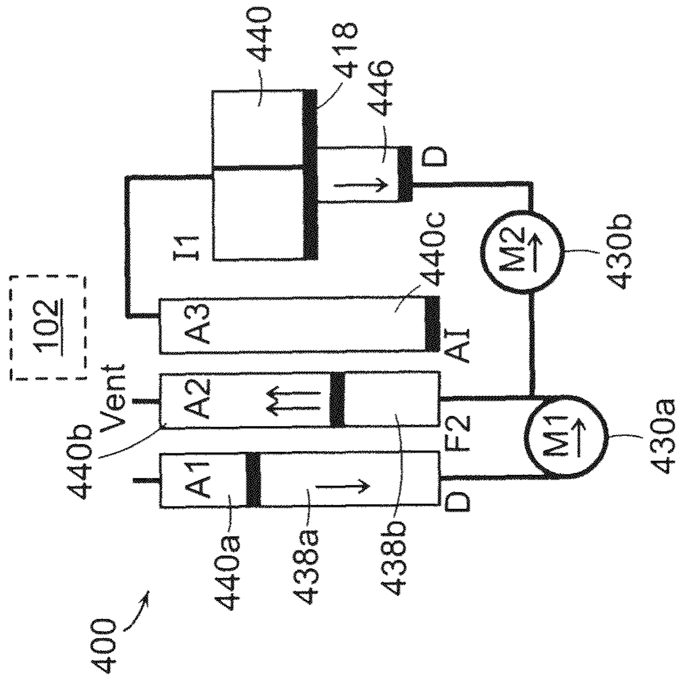
FIGS. 7A-7F are partial schematic diagrams of an open-air hydraulic-pneumatic energy storage and recovery system in accordance with another alternative embodiment of the invention, illustrating the various operational stages of the system during an expansion phase.
Figure 7A:
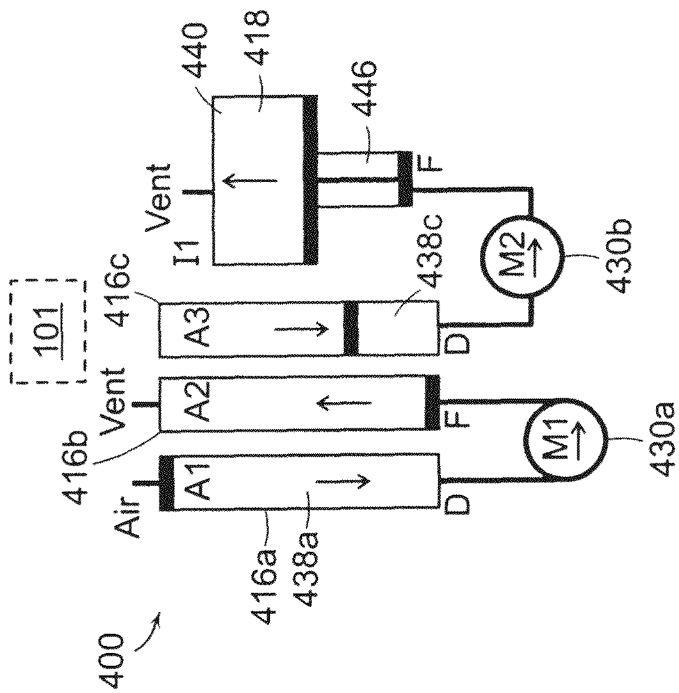

As shown in FIG. 7A the layout consists of three equally sized hydraulic-pneumatic accumulators 416*a*, 416*b*, 416*c*, one intensifier 418 having a hydraulic fluid side 446 with a capacity of about ⅓ of the accumulator capacity, and two hydraulic motor/pumps 430*a*, 430*b*.

Figure 7C:
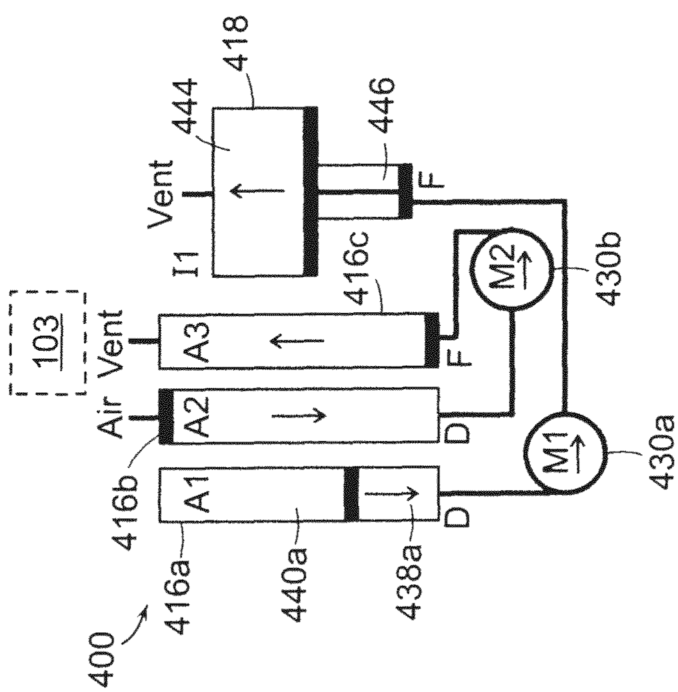

FIG. 7A represents stage or time instance 101, where accumulator 416*a* is being driven with high pressure gas from a pressure vessel. After a specific amount of compressed gas is admitted (based on the current vessel pressure), a valve will be closed, disconnecting the pressure vessel and the high pressure gas will continue to expand in accumulator 416*a* as shown in FIGS. 7B and 7C (i.e., stages 102 and 103). Accumulator 416*b* is empty of hydraulic fluid and its air chamber 440*b* is unpressurized and being vented to the atmosphere. The expansion of the gas in accumulator 416*a* drives the hydraulic fluid out of the accumulator, thereby driving the hydraulic motor 430*a*, with the output of the motor 430*a* refilling accumulator 416*b* with hydraulic fluid. At the time point shown in 101, accumulator 416*c* is at a state where gas has already been expanding for two units of time and is continuing to drive motor 430*b* while filling intensifier 418. Intensifier 418, similar to accumulator 416*b*, is empty of hydraulic fluid and its air chamber 444 is unpressurized and being vented to the atmosphere.

Continuing to time instance 102, as shown in FIG. 7B, the air chamber 440*a* of accumulator 416*a* continues to expand, thereby forcing fluid out of the fluid chamber 438*a* and driving motor/pump 430*a* and filling accumulator 416*b*. Accumulator 416*c* is now empty of hydraulic fluid, but remains at mid-pressure. The air chamber 440*c* of accumulator 416*c* is now connected to the air chamber 444 of intensifier 418. Intensifier 418 is now full of hydraulic fluid and the mid-pressure gas in accumulator 416*c* drives the intensifier 418, which provides intensification of the mid-pressure gas to high pressure hydraulic fluid. The high pressure hydraulic fluid drives motor/pump 430*b* with the output of motor/pump 430*b* also connected to and filling accumulator 416*b* through appropriate valving. Thus, accumulator 416*b* is filled at twice the normal rate when a single expanding hydraulic pneumatic device (accumulator or intensifier) is providing the fluid for filling.

At time instance 103, as shown in FIG. 7C, the system 400 has returned to a state similar to stage 101, but with different accumulators at equivalent stages. Accumulator 416*b* is now full of hydraulic fluid and is being driven with high pressure gas from a pressure vessel. After a specific amount of compressed gas is admitted (based on the current vessel pressure), a valve will be closed, disconnecting the pressure vessel. The high pressure gas will continue to expand in accumulator 416*b* as shown in stages 104 and 105. Accumulator 416*c* is empty of hydraulic fluid and the air chamber 440*c* is unpressurized and being vented to the atmosphere. The expansion of the gas in accumulator 416*b* drives the hydraulic fluid out of the accumulator, driving the hydraulic motor motor/pump 430*b*, with the output of the motor refilling accumulator 416*c* with hydraulic fluid via appropriate valving. At the time point shown in 103, accumulator 416*a* is at a state where gas has already been expanding for two units of time and is continuing to drive motor/pump 430*a* while now filling intensifier 418. Intensifier 418, similar to accumulator 416*c*, is again empty of hydraulic fluid and the air chamber 444 is unpressurized and being vented to the atmosphere.

Figure 7D:
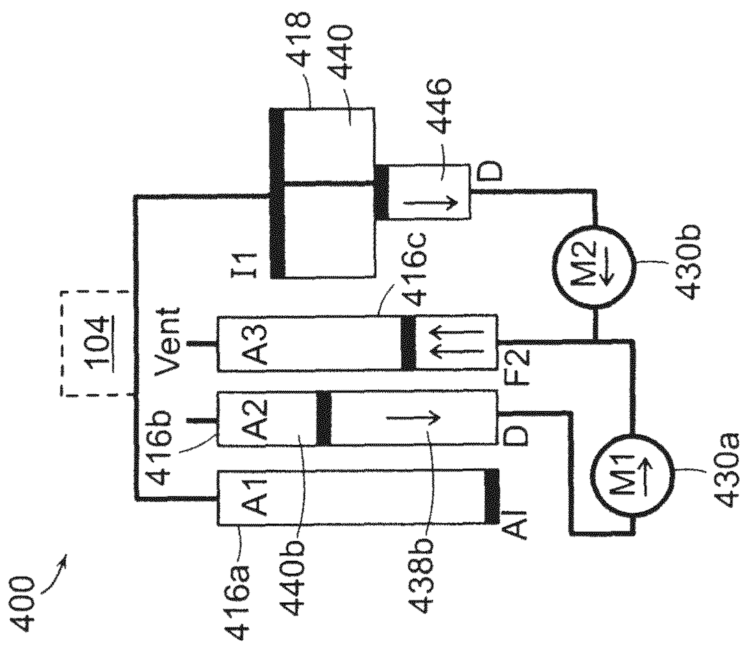

Continuing to time instance 104, as shown in FIG. 7D, the air chamber 440*b* of accumulator 416*b* continues to expand, thereby forcing fluid out of the fluid chamber 438*b* and driving motor/pump 430*a* and filling accumulator 416*c*. Accumulator 416*a* is now empty of hydraulic fluid, but remains at mid-pressure. The air chamber 440*a* of accumulator 416*a* is now connected to the air chamber 444 of intensifier 418. Intensifier 418 is now full of hydraulic fluid and the mid-pressure gas in accumulator 416*a* drives the intensifier 418, which provides intensification of the mid-pressure gas to high pressure hydraulic fluid. The high pressure hydraulic fluid drives motor/pump 430*b* with the output of motor/pump 430*b* also connected to and filling accumulator 416*c* through appropriate valving. Thus, accumulator 416*c* is filled at twice the normal rate when a single expanding hydraulic pneumatic device (accumulator or intensifier) is providing the fluid for filling.

Figure 7F:
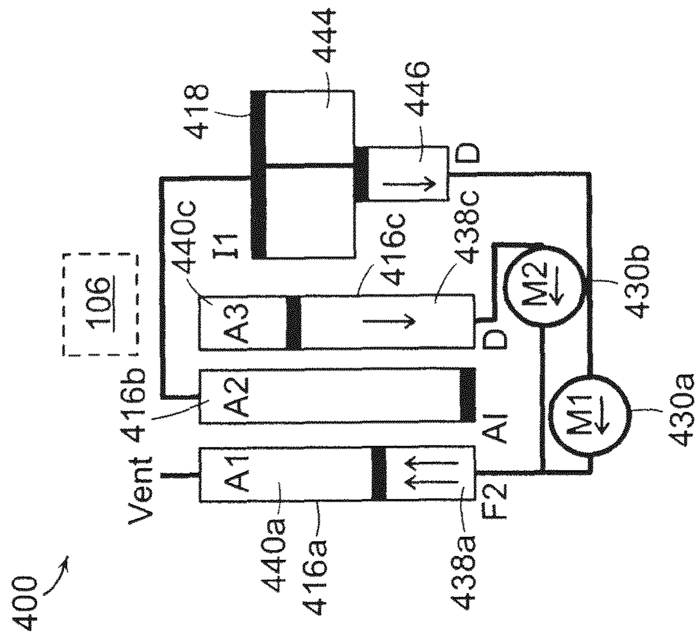
Figure 7E:
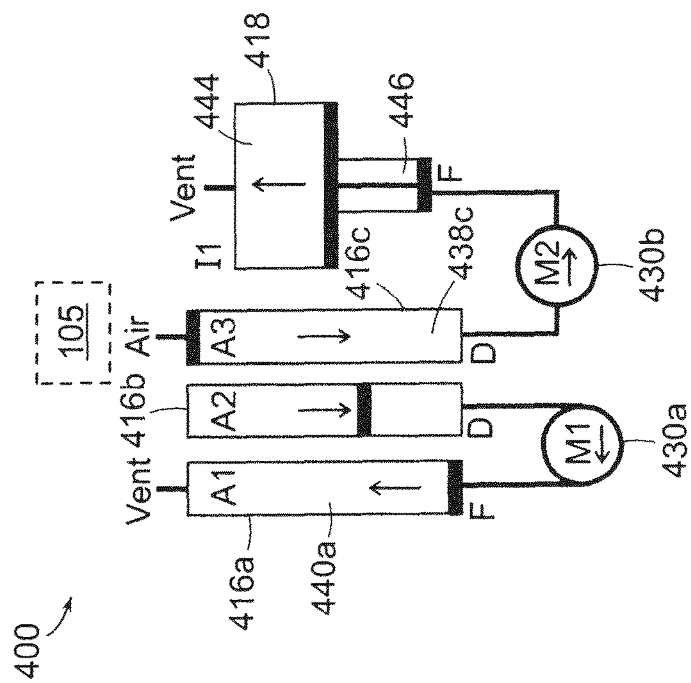

At time instance 105, as shown in FIG. 7E, the system 400 has returned to a state similar to stage 103, but with different accumulators at equivalent stages. Accumulator 416*c* is now full of hydraulic fluid and is being driven with high pressure gas from a pressure vessel. After a specific amount of compressed gas is admitted (based on the current vessel pressure), a valve will be closed, disconnecting the pressure vessel. The high pressure gas will continue to expand in accumulator 416*c*. Accumulator 416*a* is empty of hydraulic fluid and the air chamber 440*a* is unpressurized and being vented to the atmosphere. The expansion of the gas in accumulator 416*c* drives the hydraulic fluid out of the accumulator, driving the hydraulic motor motor/pump 430*b*, with the output of the motor refilling intensifier 418 with hydraulic fluid via appropriate valving. At the time point shown in 105, accumulator 416*b* is at a state where gas has already been expanding for two units of time and is continuing to drive motor/pump 430*a* while filling accumulator 416*a* with hydraulic fluid via appropriate valving. Intensifier 418, similar to accumulator 416*a*, is again empty of hydraulic fluid and the air chamber 444 is unpressurized and being vented to the atmosphere.

Continuing to time instance 106, as shown in FIG. 7F, the air chamber 440*c* of accumulator 416*c* continues to expand, thereby forcing fluid out of the fluid chamber 438*c* and driving motor/pump 430*b* and filling accumulator 416*a*. Accumulator 416*b* is now empty of hydraulic fluid, but remains at mid-pressure. The air chamber 440*b* of accumulator 416*b* is now connected to the air chamber 444 of intensifier 418. Intensifier 418 is now full of hydraulic fluid and the mid-pressure gas in accumulator 416*b* drives the intensifier 418, which provides intensification of the mid-pressure gas to high pressure hydraulic fluid. The high pressure hydraulic fluid drives motor/pump 430*a* with the output of motor/pump 430*a* also connected to and filling accumulator 416*a* through appropriate valving. Thus, accumulator 416*a* is filled at twice the normal rate when a single expanding hydraulic pneumatic device (accumulator or intensifier) is providing the fluid for filling. Following the states shown in 106, the system returns to the states shown in 101 and the cycle continues.

FIG. 8 is a table illustrating the expansion scheme described above and illustrated in FIGS. 7A-7F for a three accumulator, one intensifier system. It should be noted that throughout the cycle, two hydraulic-pneumatic devices (two accumulators or one intensifier plus one accumulator) are always expanding and the two motors are always being driven, but at different points in the expansion, such that the overall power remains relatively constant.

Figure 9:
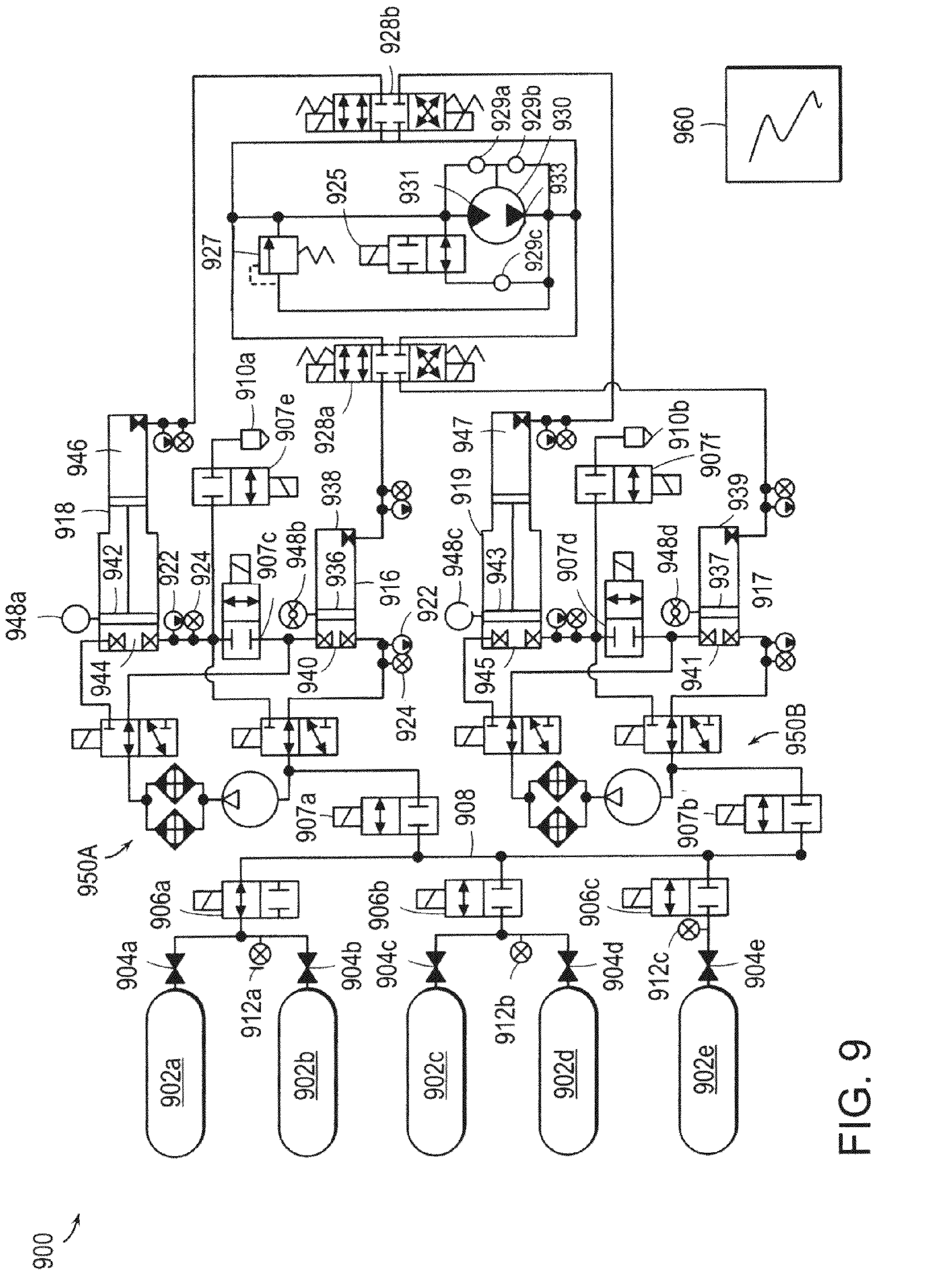
FIG. 9 is a schematic diagram of an open-air hydraulic-pneumatic energy storage and recovery system including a heat transfer subsystem in accordance with one embodiment of the invention.

FIG. 9 depicts generally a staged hydraulic-pneumatic energy conversion system that stores and recovers electrical energy using thermally conditioned compressed fluids and incorporates various embodiments of the invention, for example, those described with respect to FIGS. 1, 4, and 7. As shown in FIG. 9, the system 900 includes five high-pressure gas/air storage tanks 902*a*-902*e*. Tanks 902*a* and 902*b* and tanks 902*c* and 902*d* are joined in parallel via manual valves 904*a*, 904*b* and 904*c*, 904*d*, respectively. Tank 902*e* also includes a manual shut-off valve 904*e*. The tanks 902 are joined to a main air line 908 via pneumatic two-way (i.e., shut-off) valves 906*a*, 906*b*, 906*c*. The tank output lines include pressure sensors 912*a*, 912*b*, 912*c*. The lines/tanks 902 could also include temperature sensors. The various sensors can be monitored by a system controller 960 via appropriate connections, as described above with respect to FIGS. 1 and 4. The main air line 908 is coupled to a pair of multi-stage (two stages in this example) accumulator circuits via automatically controlled pneumatic shut-off valves 907*a*, 907*b*. These valves 907*a*, 907*b* are coupled to respective accumulators 916 and 917. The air chambers 940, 941 of the accumulators 916, 917 are connected, via automatically controlled pneumatic shut-offs 907*c*, 907*d*, to the air chambers 944, 945 of the intensifiers 918, 919. Pneumatic shut-off valves 907*e*, 907*f* are also coupled to the air line connecting the respective accumulator and intensifier air chambers and to a respective atmospheric air vent 910*a*, 910*b*. This arrangement allows for air from the various tanks 902 to be selectively directed to either accumulator air chamber 944, 945. In addition, the various air lines and air chambers can include pressure and temperature sensors 922 924 that deliver sensor telemetry to the controller 960.

Figure 9A:
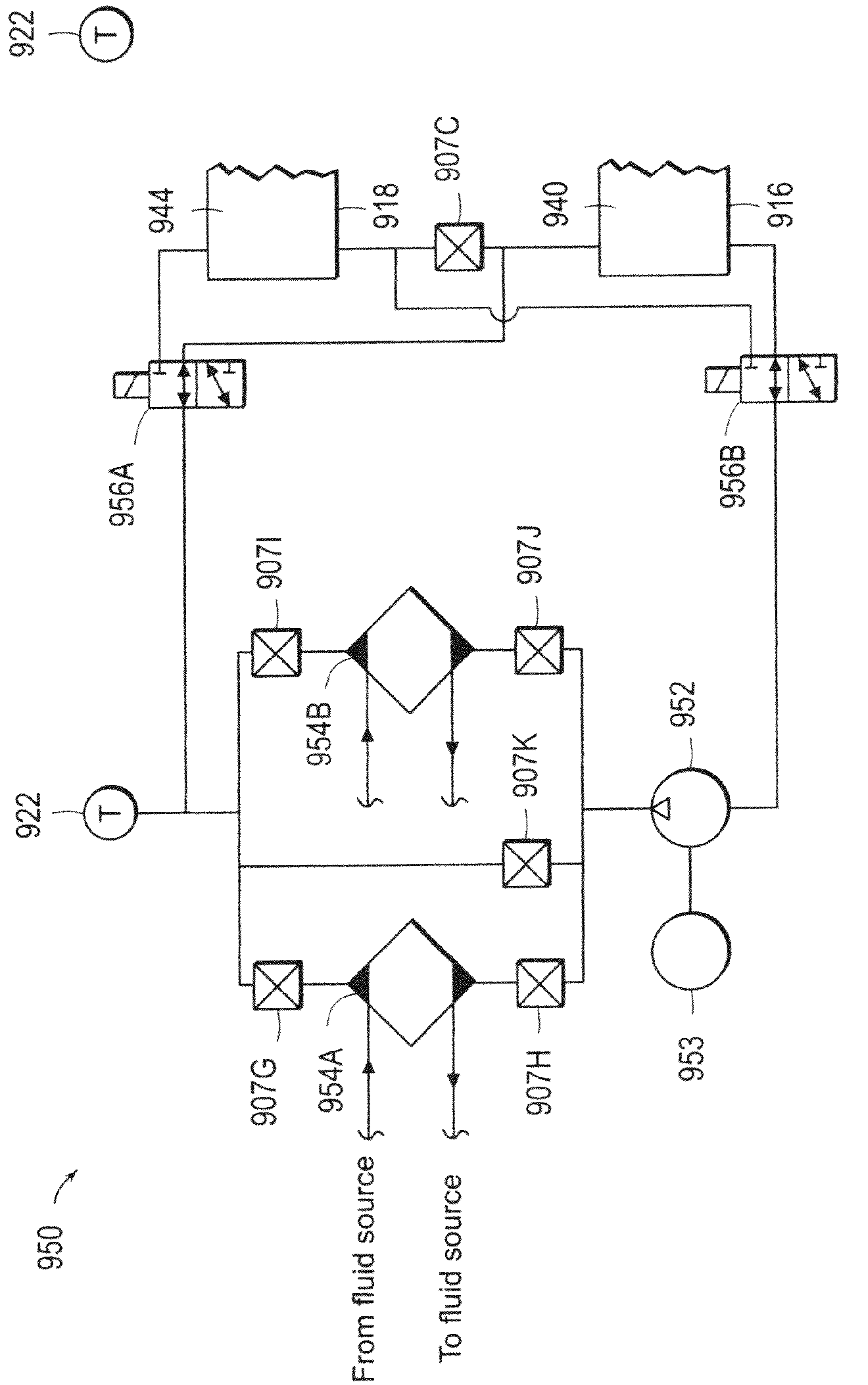
FIG. 9A is an enlarged schematic diagram of the heat transfer subsystem portion of the system of FIG. 9.

The system 900 also includes two heat transfer subsystems 950 in fluid communication with the air chambers 940, 941, 944, 945 of the accumulators and intensifiers 916-919 and the high pressure storage tanks 902 that provide improved isothermal expansion and compression of the gas. A simplified schematic of one of the heat transfer subsystems 950 is shown in greater detail in FIG. 9A. Each heat transfer subsystem 950 includes a circulation apparatus 952, at least one heat exchanger 954, and pneumatic valves 956. One circulation apparatus 952, two heat exchanger 954 and two pneumatic valves 956 are shown in FIGS. 9 and 9A, however, the number and type of circulation apparatus 952, heat exchangers 954, and valves 956 can vary to suit a particular application. The various components and the operation of the heat transfer subsystem 950 are described in greater detail hereinbelow. Generally, in one embodiment, the circulation apparatus 952 is a positive displacement pump capable of operating at pressures up to 3000 PSI or more and the two heat exchangers 954 are tube in shell type (also known as a shell and tube type) heat exchangers 954 also capable of operating at pressures up to 3000 PSI or more. The heat exchangers 954 are shown connected in parallel, although they could also be connected in series. The heat exchangers 954 can have the same or different heat exchange areas. For example, where the heat exchangers 954 are connected in parallel and the first heat exchanger 954A has a heat transfer area of X and the second heat exchanger 954B has a heat transfer area of 2X, a control valve arrangement can be used to selectively direct the gas flow to one or both of the heat exchangers 954 to obtain different heat transfer areas (e.g., X, 2X, or 3X) and thus different thermal efficiencies.

The basic operation of the system 950 is described with respect to FIG. 9A. As shown, the system 950 includes the circulation apparatus 952, which can be driven by, for example, an electric motor 953 mechanically coupled thereto. Other types of and means for driving the circulation apparatus are contemplated and within the scope of the invention. For example, the circulation apparatus 952 could be a combination of accumulators, check valves, and an actuator. The circulation apparatus 952 is in fluid communication with each of the air chambers 940, 944 via a three-way, two position pneumatic valve 956B and draws gas from either air chamber 940, 944 depending on the position of the valve 956B. The circulation apparatus 952 circulates the gas from the air chamber 940, 944 to the heat exchanger 954.

As shown in FIG. 9A, the two heat exchangers 954 are connected in parallel with a series of pneumatic shut-off valves 907G-907J, that can regulate the flow of gas to heat exchanger 954A, heat exchanger 954B, or both. Also included is a by-pass pneumatic shut-off valve 907K that can be used to by-pass the heat exchangers 954 (i.e., the heat transfer subsystem 950 can be operated without circulating gas through either heat exchanger. In use, the gas flows through a first side of the heat exchanger 954, while a constant temperature fluid source flows through a second side of the heat exchanger 954. The fluid source is controlled to maintain the gas at ambient temperature. For example, as the temperature of the gas increases during compression, the gas can be directed through the heat exchanger 954, while the fluid source (at ambient or colder temperature) counter flows through the heat exchanger 954 to remove heat from the gas. The gas output of the heat exchanger 954 is in fluid communication with each of the air chambers 940, 944 via a three-way, two position pneumatic valve 956A that returns the thermally conditioned gas to either air chamber 940, 944, depending on the position of the valve 956A. The pneumatic valves 956 are used to control from which hydraulic cylinder the gas is being thermally conditioned.

The selection of the various components will depend on the particular application with respect to, for example, fluid flows, heat transfer requirements, and location. In addition, the pneumatic valves can be electrically, hydraulically, pneumatically, or manually operated. In addition, the heat transfer subsystem 950 can include at least one temperature sensor 922 that, in conjunction with the controller 960, controls the operation of the various valves 907, 956 and, thus the operation of the heat transfer subsystem 950.

In one exemplary embodiment, the heat transfer subsystem is used with a staged hydraulic-pneumatic energy conversion system as shown and described above, where the two heat exchangers are connected in series. The operation of the heat transfer subsystem is described with respect to the operation of a 1.5 gallon capacity piston accumulator having a 4-inch bore. In one example, the system is capable of producing 1-1.5 kW of power during a 10 second expansion of the gas from 2900 PSI to 350 PSI. Two tube-in-shell heat exchange units (available from Sentry Equipment Corp., Oconomowoc, Wis.), one with a heat exchange area of 0.11 $m^2$ and the other with a heat exchange area of 0.22 $m^2$, are in fluid communication with the air chamber of the accumulator. Except for the arrangement of the heat exchangers, the system is similar to that shown in FIG. 9A, and shut-off valves can be used to control the heat exchange counter flow, thus providing for no heat exchange, heat exchange with a single heat exchanger (i.e., with a heat exchange area of 0.11 $m^2$ or 0.22 $m^2$), or heat exchange with both heat exchangers (i.e., with a heat exchange area of 0.33 $m^2$.)

During operation of the systems 900, 950, high-pressure air is drawn from the accumulator 916 and circulated through the heat exchangers 954 by the circulation apparatus 952. Specifically, once the accumulator 916 is filled with hydraulic fluid and the piston is at the top of the cylinder, the gas circulation/heat exchanger sub-circuit and remaining volume on the air side of the accumulator is filled with 3,000 PSI air. The shut-off valves 907G-907J are used to select which, if any, heat exchanger to use. Once this is complete, the circulation apparatus 952 is turned on as is the heat exchanger counter-flow. Additional heat transfer subsystems are described hereinbelow with respect to FIGS. 11-23.

During gas expansion in the accumulator 916, the three-way valves 956 are actuated as shown in FIG. 9A and the gas expands. Pressure and temperature transducers/sensors on the gas side of the accumulator 916 are monitored during the expansion, as well as temperature transducers/sensors located on the heat transfer subsystem 950. The thermodynamic efficiency of the gas expansion can be determined when the total fluid power energy output is compared to the theoretical energy output that could have been obtained by expanding the known volume of gas in a perfectly isothermal manner.

Figure 10:
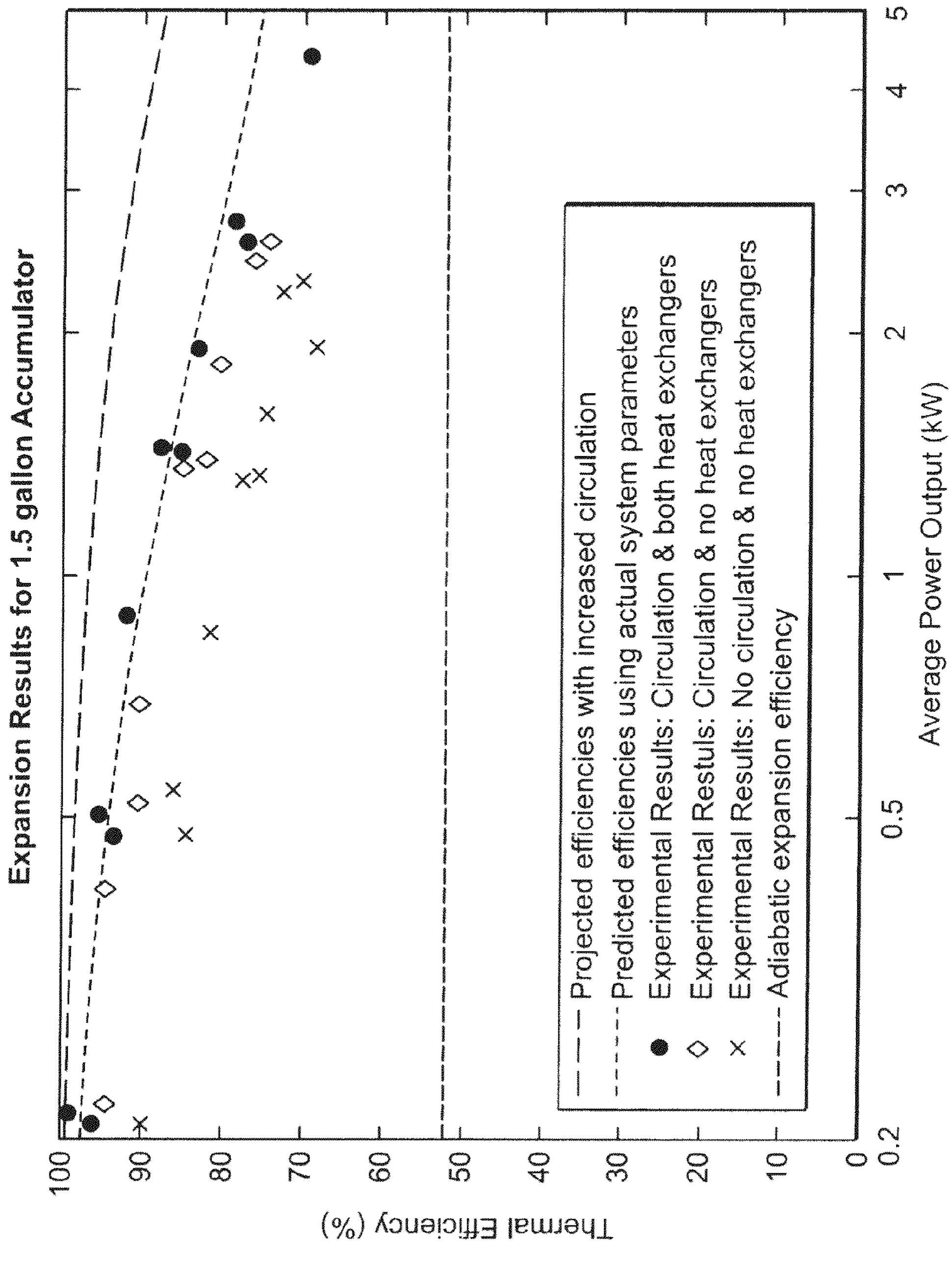
FIG. 10 is a graphical representation of the thermal efficiencies obtained by the system of FIG. 9 at different operating parameters.

The overall work output and thermal efficiency can be controlled by adjusting the hydraulic fluid flow rate and the heat exchanger area. FIG. 10 depicts the relationship between power output, thermal efficiency, and heat exchanger surface area for this exemplary embodiment of the systems 900, 950. As shown in FIG. 10, there is a trade-off between power output and efficiency. By increasing heat exchange area (e.g., by adding heat exchangers to the heat transfer subsystem 950), greater thermal efficiency is achieved over the power output range. For this exemplary embodiment, thermal efficiencies above 90% can be achieved when using both heat exchangers 954 for average power outputs of ~1.0 kW. Increasing the gas circulation rate through the heat exchangers will also provide additional efficiencies. Based on the foregoing, the selection and sizing of the components can be accomplished to optimize system design, by balancing cost and size with power output and efficiency.

The basic operation and arrangement of the system 900 is substantially similar to systems 100 and 300; however, there are differences in the arrangement of the hydraulic valves, as described herein. Referring back to FIG. 9 for the remaining description of the basic staged hydraulic-pneumatic energy conversion system 900, the air chamber 940, 941 of each accumulator 916, 917 is enclosed by a movable piston 936, 937 having an appropriate sealing system using sealing rings and other components that are known to those of ordinary skill in the art. The piston 936, 937 moves along the accumulator housing in response to pressure differentials between the air chamber 940, 941 and an opposing fluid chamber 938, 939, respectively, on the opposite side of the accumulator housing. Likewise, the air chambers 944, 945 of the respective intensifiers 918, 919 are also enclosed by a moving piston assembly 942, 943. However, the piston assembly 942, 943 includes an air piston connected by a shaft, rod, or other coupling to a respective fluid piston that move in conjunction. The differences between the piston diameters allows a lower air pressure acting upon the air piston to generate a similar pressure on the associated fluid chamber as the higher air pressure acting on the accumulator piston. In this manner, and as previously described, the system allows for at least two stages of pressure to be employed to generate similar levels of fluid pressure.

The accumulator fluid chambers 938, 939 are interconnected to a hydraulic motor/pump arrangement 930 via a hydraulic valve 928*a*. The hydraulic motor/pump arrangement 930 includes a first port 931 and a second port 933. The arrangement 930 also includes several optional valves, including a normally open shut-off valve 925, a pressure relief valve 927, and three check valves 929 that can further control the operation of the motor/pump arrangement 930. For example, check valves 929*a*, 929*b*, direct fluid flow from the motor/pump's leak port to the port 931, 933 at a lower pressure. In addition, valves 925, 929*c* prevent the motor/pump from coming to a hard stop during an expansion cycle.

The hydraulic valve 928*a* is shown as a 3-position, 4-way directional valve that is electrically actuated and spring returned to a center closed position, where no flow through the valve 928*a* is possible in the unactuated state. The directional valve 928*a* controls the fluid flow from the accumulator fluid chambers 938, 939 to either the first port 931 or the second port 933 of the motor/pump arrangement 930. This arrangement allows fluid from either accumulator fluid chamber 938, 939 to drive the motor/pump 930 clockwise or counter-clockwise via a single valve.

The intensifier fluid chambers 946, 947 are also interconnected to the hydraulic motor/pump arrangement 930 via a hydraulic valve 928*b*. The hydraulic valve 928*b* is also a 3-position, 4-way directional valve that is electrically actuated and spring returned to a center closed position, where no flow through the valve 928*b* is possible in the unactuated state. The directional valve 928*b* controls the fluid flow from the intensifier fluid chambers 946, 947 to either the first port 931 or the second port 933 of the motor/pump arrangement 930. This arrangement allows fluid from either intensifier fluid chamber 946, 947 to drive the motor/pump 930 clockwise or counter-clockwise via a single valve.

The motor/pump 930 can be coupled to an electrical generator/motor and that drives, and is driven by the motor/pump 930. As discussed with respect to the previously described embodiments, the generator/motor assembly can be interconnected with a power distribution system and can be monitored for status and output/input level by the controller 960.

In addition, the fluid lines and fluid chambers can include pressure, temperature, or flow sensors and/or indicators 922, 924 that deliver sensor telemetry to the controller 960 and/or provide visual indication of an operational state. In addition, the pistons 936, 937, 942, 943 can include position sensors 948 that report their present position to the controller 960. The position of the piston can be used to determine relative pressure and flow of both gas and fluid.

Figure 11:
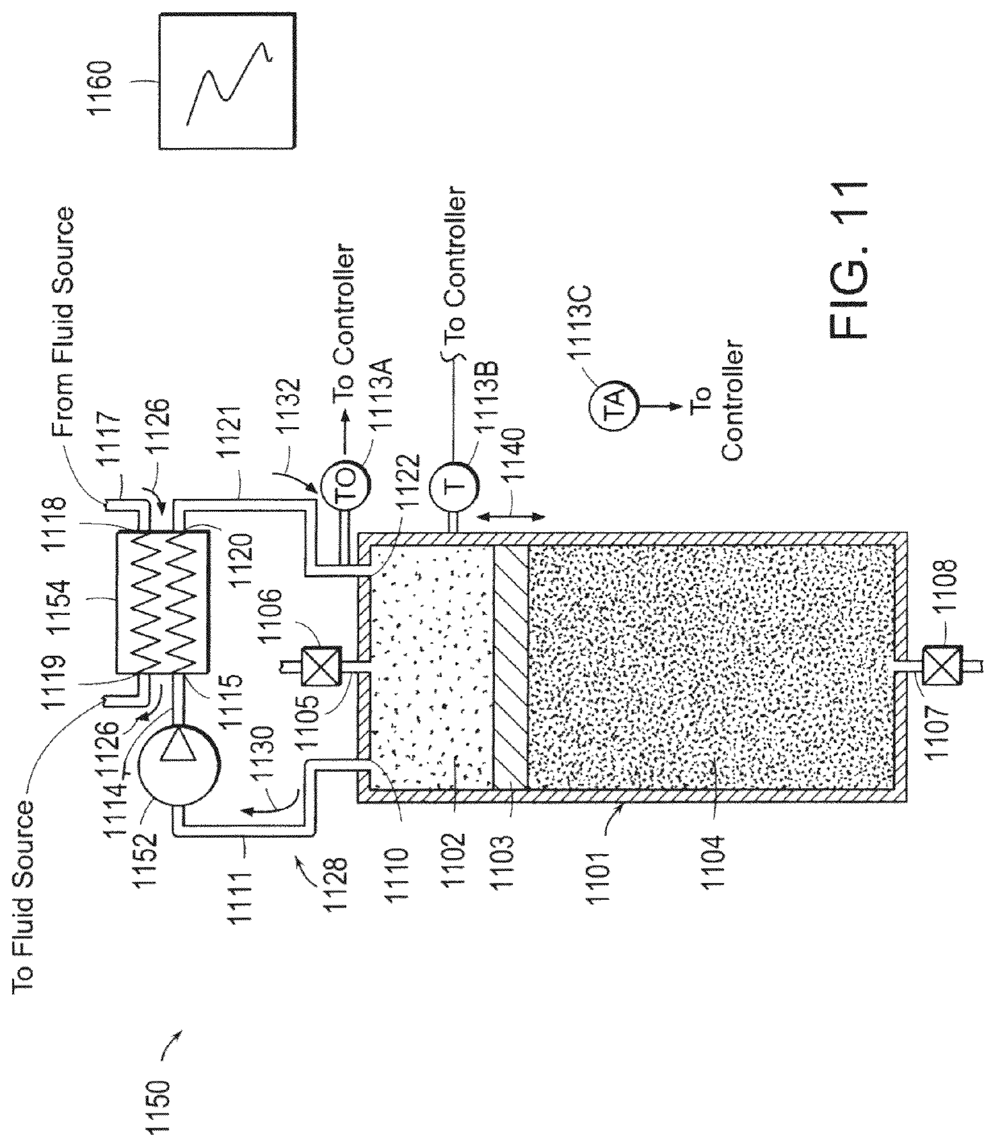
FIG. 11 is a schematic partial cross section of a hydraulic/pneumatic cylinder assembly including a heat transfer subsystem that facilities isothermal expansion within the pneumatic side of the cylinder in accordance with one embodiment of the invention.

FIG. 11 is an illustrative embodiment of an isothermal-expansion hydraulic/pneumatic system in accordance with one simplified embodiment of the invention. The system consists of a cylinder 1101 containing a gas chamber or "pneumatic side" 1102 and a fluid chamber or "hydraulic side" 1104 separated by a movable (double arrow 1140) piston 1103 or other force/pressure-transmitting barrier that isolates the gas from the fluid. The cylinder 1101 can be a conventional, commercially available component, modified to receive additional ports as described below. As will also be described in further detail below, any of the embodiments described herein can be implemented as an accumulator or intensifier in the hydraulic and pneumatic circuits of the energy storage and recovery systems described above (e.g., accumulator 316, intensifier 318). The cylinder 1101 includes a primary gas port 1105, which can be closed via valve 1106 and that connects with a pneumatic circuit, or any other pneumatic source/storage system. The cylinder 1101 further includes a primary fluid port 1107 that can be closed by valve 1108. This fluid port connects with a source of fluid in the hydraulic circuit of the above-described storage system, or any other fluid reservoir.

With reference now to the heat transfer subsystem 1150, the cylinder 1101 has one or more gas circulation output ports 1110 that are connected via piping 1111 to the gas circulator 1152. Note, as used herein the term "pipe," "piping" and the like shall refer to one or more conduits that are rated to carry gas or other fluids between two points. Thus, the singular term should be taken to include a plurality of parallel conduits where appropriate. The gas circulator 1152 can be a conventional or customized low-head pneumatic pump, fan, or any other device for circulating gas. The gas circulator 1152 should be sealed and rated for operation at the pressures contemplated within the gas chamber 1102. Thus, the gas circulator 1152 creates a predetermined flow (arrow 1130) of gas up the piping 1111 and therethrough. The gas circulator 1152 can be powered by electricity from a power source or by another drive mechanism, such as a fluid motor. The mass-flow speed and on/off functions of the circulator 1152 can be controlled by a controller 1160 acting on the power source for the circulator 1152. The controller 1160 can be a software and/or hardware-based system that carries out the heat-exchange procedures described herein. The output of the gas circulator 1152 is connected via a pipe 1114 to the gas input 1115 of a heat exchanger 1154.

The heat exchanger 1154 of the illustrative embodiment can be any acceptable design that allows energy to be efficiently transferred to and from a high-pressure gas flow contained within a pressure conduit to another mass flow (fluid). The rate of heat exchange is based, in part on the relative flow rates of the gas and fluid, the exchange surface area between the gas and fluid and the thermal conductivity of the interface therebetween. In particular, the gas flow is heated in the heat exchanger 1154 by the fluid counter-flow 1117 (arrows 1126), which enters the fluid input 1118 of heat exchanger 1154 at ambient temperature and exits the heat exchanger 1154 at the fluid exit 1119 equal or approximately equal in temperature to the gas in piping 1114. The gas flow at gas exit 1120 of heat exchanger 1154 is at ambient or approximately ambient temperature, and returns via piping 1121 through one or more gas circulation input ports 1122 to gas chamber 1102. By "ambient" it is meant the temperature of the surrounding environment, or another desired temperature at which efficient performance of the system can be achieved. The ambient-temperature gas reentering the cylinder's gas chamber 1102 at the circulation input ports 1122 mixes with the gas in the gas chamber 1102, thereby bringing the temperature of the fluid in the gas chamber 1102 closer to ambient temperature.

The controller 1160 manages the rate of heat exchange based, for example, on the prevailing temperature (T) of the gas contained within the gas chamber 1102 using a temperature sensor 1113B of conventional design that thermally communicates with the gas within the chamber 1102. The sensor 1113B can be placed at any location along the cylinder including a location that is at, or adjacent to, the heat exchanger gas input port 1110. The controller 1160 reads the value T from the cylinder sensor and compares it to an ambient temperature value (TA) derived from a sensor 1113C located somewhere within the system environment. When T is greater than TA, the heat transfer subsystem 1150 is directed to move gas (by powering the circulator 1152) therethrough at a rate that can be partly dependent upon the temperature differential (so that the exchange does not overshoot or undershoot the desired setting). Additional sensors can be located at various locations within the heat exchange subsystem to provide additional telemetry that can be used by a more complex control algorithm. For example, the output gas temperature (TO) from the heat exchanger can measured by a sensor 1113A that is placed upstream of the outlet port 1122.

The heat exchanger's fluid circuit can be filled with water, a coolant mixture, and/or any acceptable heat-transfer medium. In alternative embodiments, a gas, such as air or refrigerant, can be used as the heat-transfer medium. In general, the fluid is routed by conduits to a large reservoir of such fluid in a closed or open loop. One example of an open loop is a well or body of water from which ambient water is drawn and the exhaust water is delivered to a different location, for example, downstream in a river. In a closed loop embodiment, a cooling tower can cycle the water through the air for return to the heat exchanger. Likewise, water can pass through a submerged or buried coil of continuous piping where a counter heat-exchange occurs to return the fluid flow to ambient before it returns to the heat exchanger for another cycle.

It should also be clear that the isothermal operation of the invention works in two directions thermodynamically. While the gas is warmed to ambient by the fluid during expansion, the gas can also be cooled to ambient by the heat exchanger during compression, as significant internal heat can build up via compression. The heat exchanger components should be rated, thus, to handle the temperature range expected to be encountered for entering gas and exiting fluid. Moreover, since the heat exchanger is external of the hydraulic/pneumatic cylinder, it can be located anywhere that is convenient and can be sized as needed to deliver a high rate of heat exchange. In addition it can be attached to the cylinder with straightforward taps or ports that are readily installed on the base end of an existing, commercially available hydraulic/pneumatic cylinder.

Figure 12:
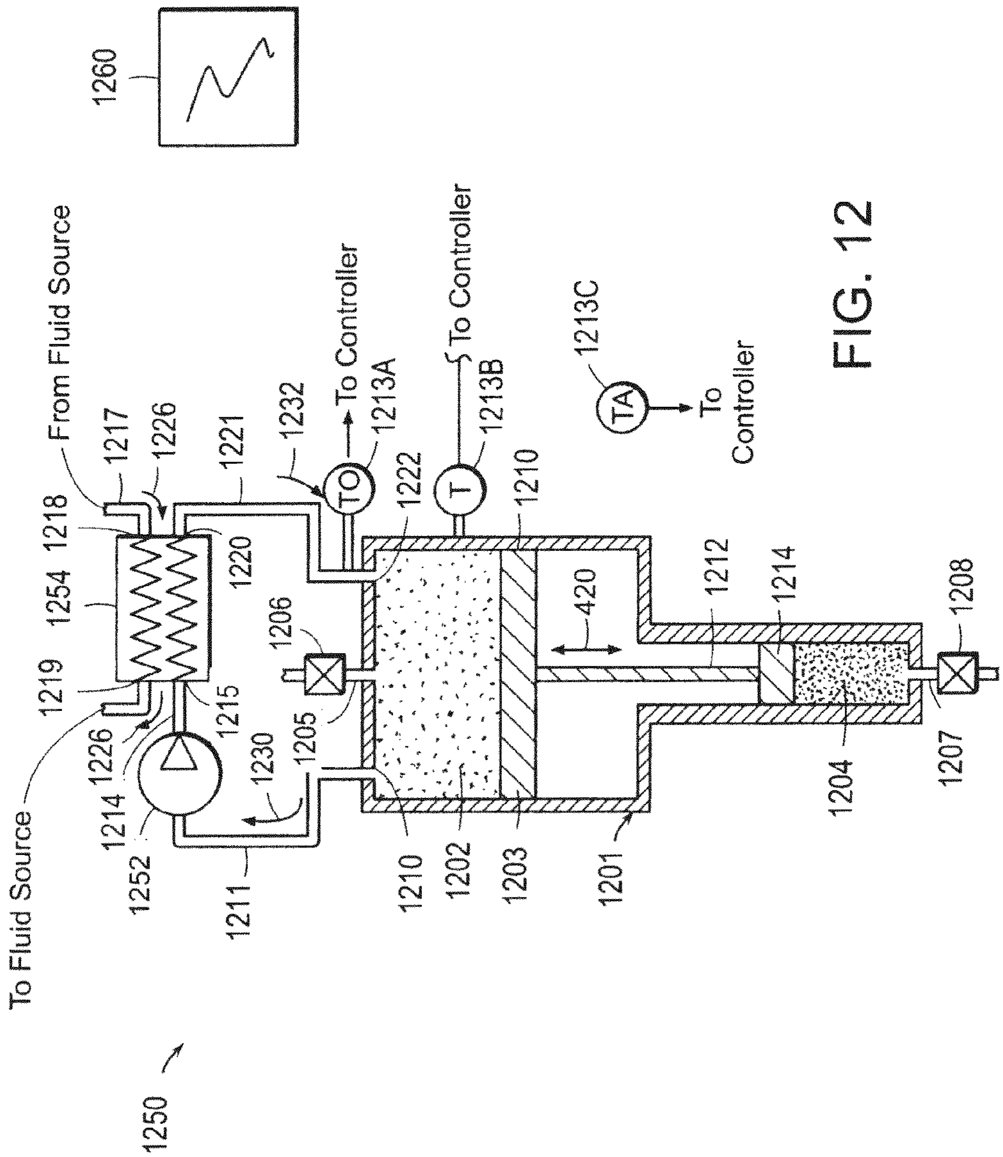
FIG. 12 is a schematic partial cross section of a hydraulic/pneumatic intensifier assembly including a heat transfer subsystem that facilities isothermal expansion within the pneumatic side of the cylinder in accordance with an alternative embodiment of the invention.

Reference is now made to FIG. 12, which details a second illustrative embodiment of an isothermal-expansion hydraulic/pneumatic system in accordance with one simplified embodiment of the invention. In this embodiment, the heat transfer subsystem 1250 is similar or identical to the heat transfer subsystems 950, 1150 described above. Thus, where like components are employed, they are given like reference numbers herein. The illustrative system in this embodiment comprises an "intensifier" consisting of a cylinder assembly 1201 containing a gas chamber 1202 and a fluid chamber 1204 separated by a piston assembly 1203. The piston assembly 1203 in this arrangement consists of a larger diameter/area pneumatic piston member 1210 tied by a shaft 1212 to a smaller diameter/area hydraulic piston 1214. The corresponding gas chamber 1202 is thus larger in cross section that the fluid chamber 1204 and is separated by a moveable (double arrow 1220) piston assembly 1203. The relative dimensions of the piston assembly 1203 result in a differential pressure response on each side of the cylinder 1201. That is the pressure in the gas chamber 1202 can be lower by some predetermined fraction relative to the pressure in the fluid chamber as a function of each piston members' 1210, 1214 relative surface area.

As previously discussed, any of the embodiments described herein can be implemented as an accumulator or intensifier in the hydraulic and pneumatic circuits of the energy storage and recovery systems described above. For example, intensifier cylinder 1201 can be used as a stage along with the cylinder 1101 of FIG. 11, in the previously described systems. To interface with those systems or another application, the cylinder 1201 can include a primary gas port 1205 that can be closed via valve 1206 and a primary fluid port 1207 that can be closed by valve 1208.

With reference now to the heat transfer subsystem 1250, the intensifier cylinder 1201 also has one or more gas circulation output ports 1210 that are connected via piping 1211 to a gas circulator 1252. Again, the gas circulator 1252 can be a conventional or customized low-head pneumatic pump, fan, or any other device for circulating gas. The gas circulator 1252 should be sealed and rated for operation at the pressures contemplated within the gas chamber 1202. Thus, the gas circulator 1252 creates a predetermined flow (arrow 1230) of gas up the piping 1211 and therethrough. The gas circulator 1252 can be powered by electricity from a power source or by another drive mechanism, such as a fluid motor. The mass-flow speed and on/off functions of the circulator 1252 can be controlled by a controller 1260 acting on the power source for the circulator 1252. The controller 1260 can be a software and/or hardware-based system that carries out the heat-exchange procedures described herein. The output of the gas circulator 1252 is connected via a pipe 1214 to the gas input 1215 of a heat exchanger 1254.

Again, the gas flow is heated in the heat exchanger 1254 by the fluid counter-flow 1217 (arrows 1226), which enters the fluid input 1218 of heat exchanger 1254 at ambient temperature and exits the heat exchanger 1254 at the fluid exit 1219 equal or approximately equal in temperature to the gas in piping 1214. The gas flow at gas exit 1220 of heat exchanger 1254 is at approximately ambient temperature, and returns via piping 1221 through one or more gas circulation input ports 1222 to gas chamber 1202. By "ambient" it is meant the temperature of the surrounding environment, or another desired temperature at which efficient performance of the system can be achieved. The ambient-temperature gas reentering the cylinder's gas chamber 1202 at the circulation input ports 1222 mixes with the gas in the gas chamber 1202, thereby bringing the temperature of the fluid in gas chamber 1202 closer to ambient temperature. Again, the heat transfer subsystem 1250 when used in conjunction with the intensifier of FIG. 12 may be particularly sized and arranged to accommodate the performance of the intensifier's gas chamber 1202, which may differ thermodynamically from that of the cylinder's gas chamber 1102 in the embodiment shown in FIG. 11. Nevertheless, it is contemplated that the basic structure and function of heat exchangers in both embodiments is generally similar. Likewise, the controller 1260 can be adapted to deal with the performance curve of the intensifier cylinder. As such, the temperature readings of the chamber sensor 1213B, ambient sensor 1213C, and exchanger output sensor 1213A are similar to those described with respect to sensors 1113 in FIG. 11. A variety of alternate sensor placements are expressly contemplated in this embodiment.

Figure 13:
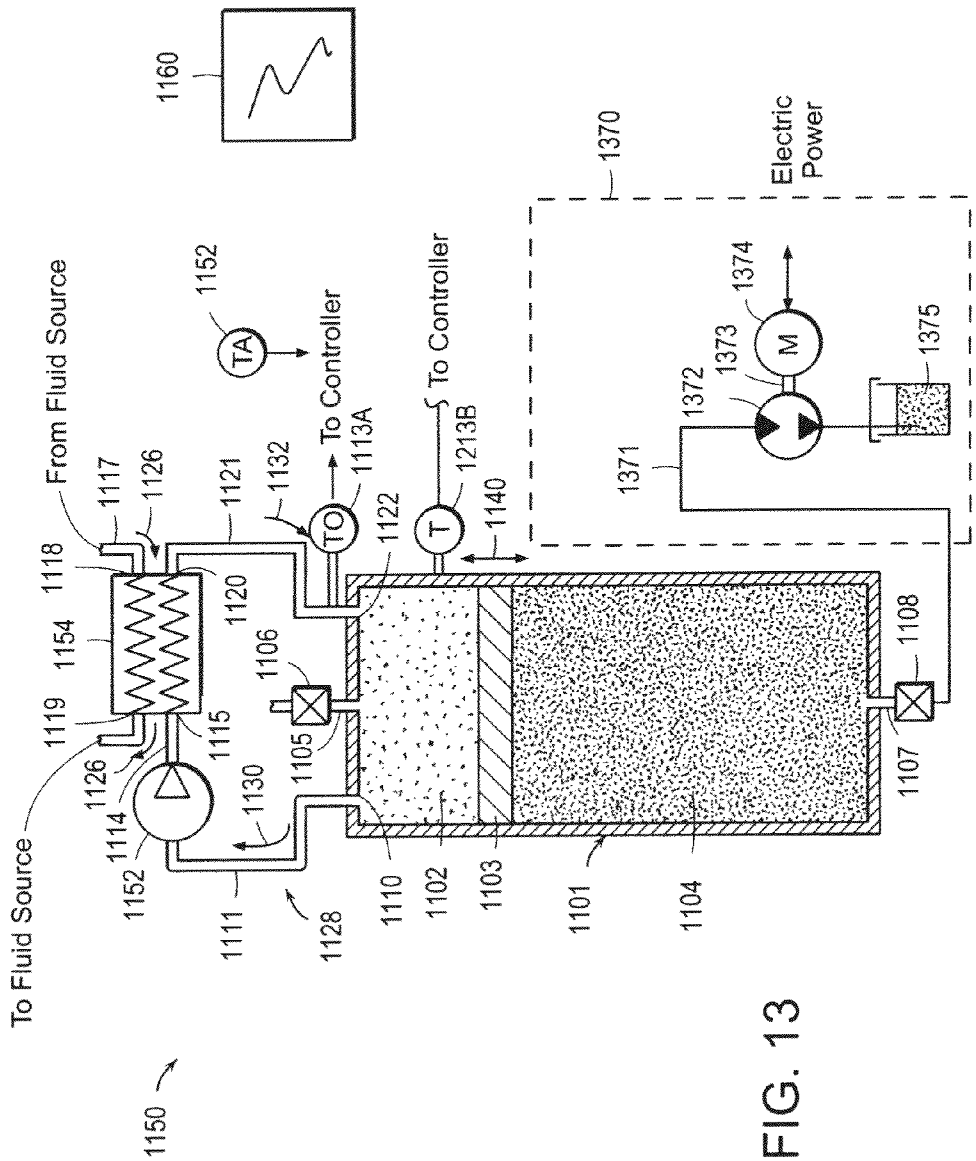
FIG. 13 is a schematic partial cross section of a hydraulic/pneumatic cylinder assembly having a heat transfer subsystem that facilitates isothermal expansion within the pneumatic side of the cylinder in accordance with another alternative embodiment of the invention in which the cylinder is part of a power generating system.

Reference is now made to FIG. 13, which shows the cylinder 1101 and heat transfer subsystem 1150 shown and described in FIG. 11, in combination with a potential circuit 1370. This embodiment illustrates the ability of the cylinder 1101 to perform work. The above-described intensifier 1201 can likewise be arranged to perform work in the manner shown in FIG. 13. In summary, as the pressurized gas in the gas chamber 1102 expands, the gas performs work on piston assembly 1103 as shown (or on piston assembly 1203 in the embodiment of FIG. 12), which performs work on fluid in fluid chamber 1104 (or fluid chamber 1204), thereby forcing fluid out of fluid chamber 1104 (1204). Fluid forced out of fluid chamber 1104 (1204) flows via piping 1371 to a hydraulic motor 1372 of conventional design, causing the hydraulic motor 1372 to drive a shaft 1373. The shaft 1373 drives an electric motor/generator 1374, generating electricity. The fluid entering the hydraulic the motor 1372 exits the motor and flows into fluid receptacle 1375. In such a manner, energy released by the expansion of gas in gas chamber 1102 (1202) is converted to electric energy. The gas may be sourced from an array of high-pressure storage tanks as described above. Of course, the heat transfer subsystem maintains ambient temperature in the gas chamber 1102 (1202) in the manner described above during the expansion process.

In a similar manner, electric energy can be used to compress gas, thereby storing energy. Electric energy supplied to the electric motor/generator 1374 drives the shaft 1373 that, in turn, drives the hydraulic motor 1372 in reverse. This action forces fluid from fluid receptacle 1375 into piping 1371 and further into fluid chamber 1104 (1204) of the cylinder 1101. As fluid enters fluid chamber 1104 (1204), it performs work on the piston assembly 1103, which thereby performs work on the gas in the gas chamber 1102 (1202), i.e., compresses the gas. The heat transfer subsystem 1150 can be used to remove heat produced by the compression and maintain the temperature at ambient or near-ambient by proper reading by the controller 1160 (1260) of the sensors 1113 (1213), and throttling of the circulator 1152 (1252).

Figure 14A:
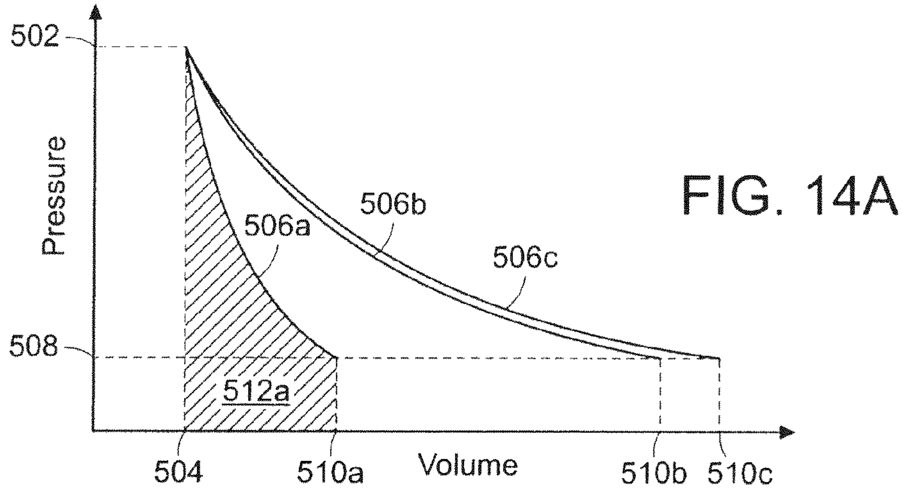
FIG. 14A is a graphical representation of the amount of work produced based upon an adiabatic expansion of gas within the pneumatic side of a cylinder or intensifier for a given pressure versus volume.
Figure 14B:
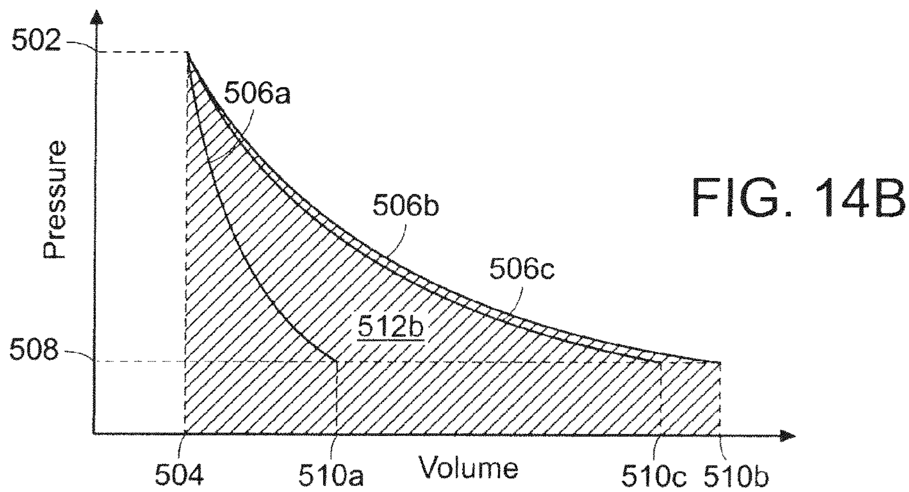
FIG. 14B is a graphical representation of the amount of work produced based upon an ideal isothermal expansion of gas within the pneumatic side of a cylinder or intensifier for a given pressure versus volume.
Figure 14C:
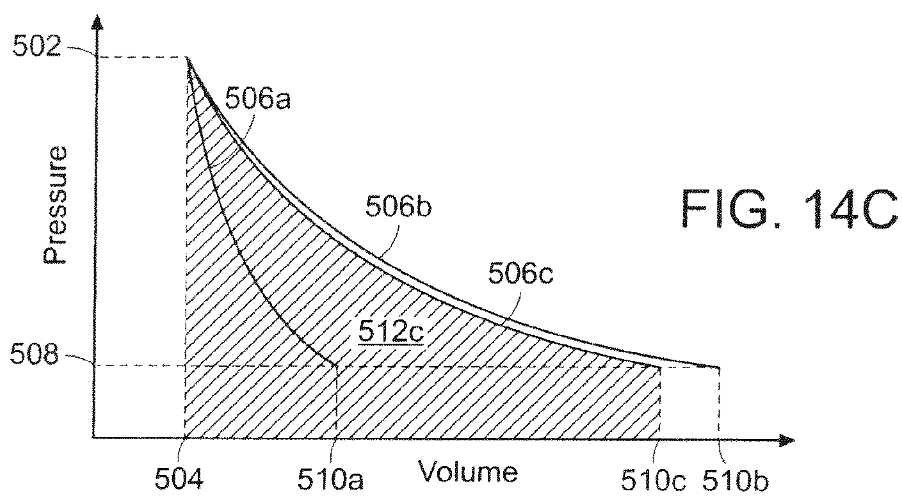
FIG. 14C is a graphical representation of the amount of work produced based upon a near-isothermal expansion of gas within the pneumatic side of a cylinder or intensifier for a given pressure versus volume.

Reference is now made to FIGS. 14A, 14B, and 14C, which respectively show the ability to perform work when the cylinder or intensifier expands gas adiabatically, isothermally, or nearly isothermally. With reference first to FIG. 14A, if the gas in a gas chamber expands from an initial pressure 502 and an initial volume 504 quickly enough that there is virtually no heat input to the gas, then the gas expands adiabatically following adiabatic curve 506*a* until the gas reaches atmospheric pressure 508 and adiabatic final volume 510*a*. The work performed by this adiabatic expansion is shaded area 512*a*. Clearly, a small portion of the curve becomes shaded, indicating a smaller amount of work performed and an inefficient transfer of energy.

Conversely, as shown in FIG. 14B, if the gas in the gas chamber expands from the initial pressure 502 and the initial volume 504 slowly enough that there is perfect heat transfer into the gas, then the gas will remain at a constant temperature and will expand isothermally, following isothermal curve 506*b* until the gas reaches atmospheric pressure 508 and isothermal final volume 510*b*. The work performed by this isothermal expansion is shaded area 512*b*. The work 512*b* achieved by isothermal expansion 506*b* is significantly greater than the work 512*a* achieved by adiabatic expansion 506*a*. Actual gas expansion may reside between isothermal and adiabatic.

The heat transfer subsystems 950, 1150, 1250 in accordance with the invention contemplate the creation of at least an approximate or near-perfect isothermal expansion as indicated by the graph of FIG. 14C. Gas in the gas chamber expands from the initial pressure 502 and the initial volume 504 following actual expansion curve 506*c*, until the gas reaches atmospheric pressure 508 and actual final volume 510*c*. The actual work performed by this expansion is shaded area 512*c*. If actual expansion 506*c* is near-isothermal, then the actual work 512*c* performed will be approximately equal to the isothermal work 512*b* (when comparing the area in FIG. 14B). The ratio of the actual work 512*c* divided by the perfect isothermal work 512*b* is the thermal efficiency of the expansion as plotted on the y-axis of FIG. 10.

The power output of the system is equal to the work done by the expansion of the gas divided by the time it takes to expand the gas. To increase the power output, the expansion time needs to be decreased. As the expansion time decreases, the heat transfer to the gas will decrease, the expansion will be more adiabatic, and the actual work output will be less, i.e., closer to the adiabatic work output. In the inventions described herein, heat transfer to the gas is increased by increasing the surface area over which heat transfer can occur in a circuit external to, but in fluid communication with, the primary air chamber, as well as the rate at which that gas is passed over the heat exchange surface area. This arrangement increases the heat transfer to/from the gas and allows the work output to remain constant and approximately equal to the isothermal work output even as the expansion time decreases, resulting in a greater power output. Moreover, the systems and methods described herein enable the use of commercially available components that, because they are located externally, can be sized appropriately and positioned anywhere that is convenient within the footprint of the system.

It should be clear to those of ordinary skill that the design of the heat exchanger and flow rate of the pump can be based upon empirical calculations of the amount of heat absorbed or generated by each cylinder during a given expansion or compression cycle so that the appropriate exchange surface area and fluid flow is provided to satisfy the heat transfer demands. Likewise, an appropriately sized heat exchanger can be derived, at least in part, through experimental techniques, after measuring the needed heat transfer and providing the appropriate surface area and flow rate.

Figure 15:
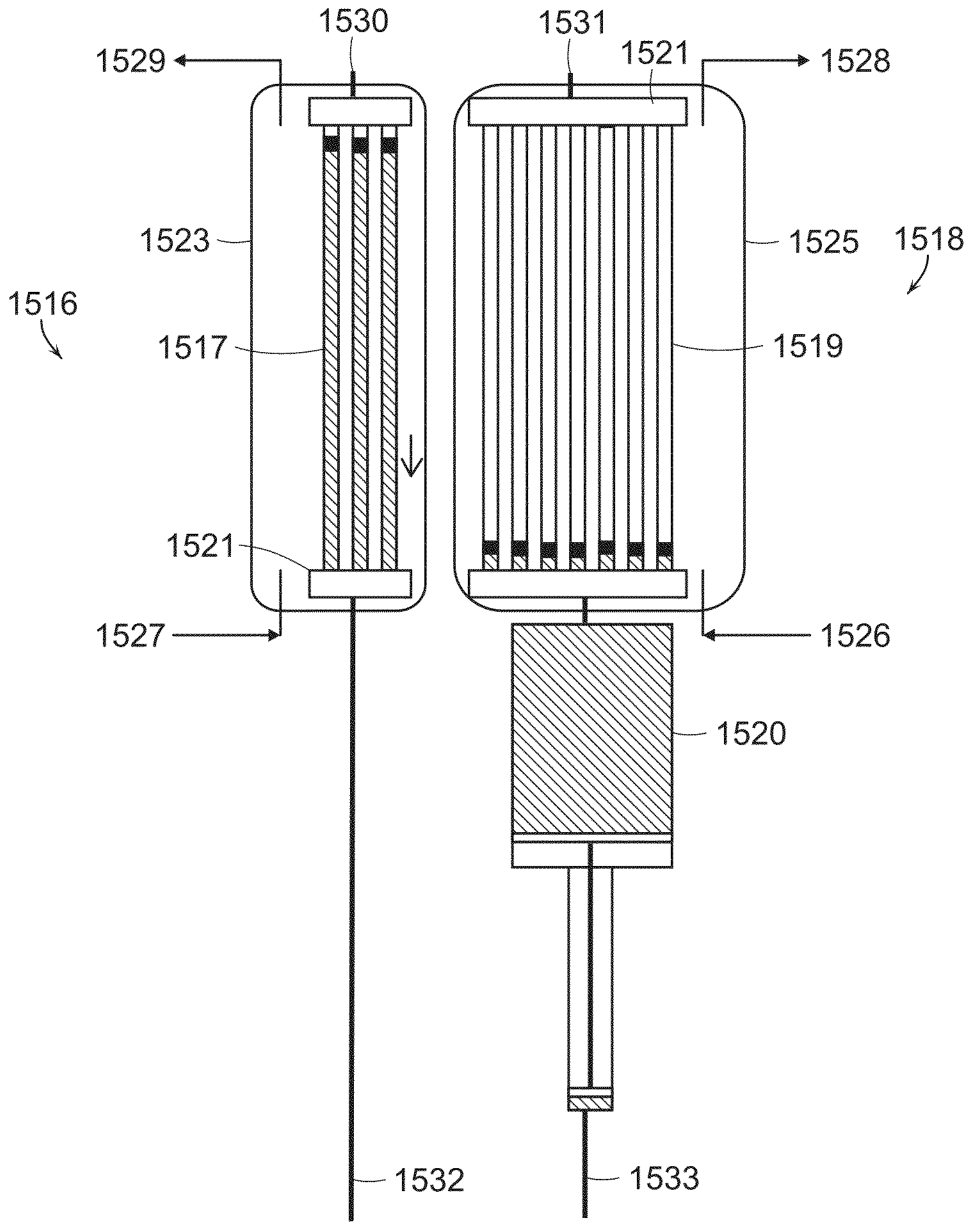
FIG. 15 is a schematic diagram of a system and method for expedited heat transfer to gas expanding (or being compressed) in an open-air staged hydraulic-pneumatic system in accordance with one embodiment of the invention.

FIG. 15 is a schematic diagram of a system and method for expedited heat transfer to gas expanding (or being compressed) in an open-air staged hydraulic-pneumatic system. The systems and methods previously described can be modified to improve heat transfer by replacing the single hydraulic-pneumatic accumulators with a series of long narrow piston-based accumulators 1517. The air and hydraulic fluid sides of these piston-based accumulators are tied together at the ends (e.g., by a machined metal block 1521 held in place with tie rods) to mimic a single accumulator with one air input/output 1532 and one hydraulic fluid input/output 1532. The bundle of piston-based accumulators 1517 are enclosed in a shell 1523, which can contain a fluid (e.g., water) that can be circulated past the bundle of accumulators 1517 (e.g., similar to a tube in shell heat exchanger) during air expansion or compression to expedite heat transfer. This entire bundle and shell arrangement forms the modified accumulator 1516. The fluid input 1527 and fluid output 1529 from the shell 1523 can run to an environmental heat exchanger or to a source of process heat, cold water, or other external heat exchange medium.

Also shown in FIG. 15 is a modified intensifier 1518. The function of the intensifier is identical to those previously described; however, heat exchange between the air expanding (or being compressed) is expedited by the addition of a bundle of long narrow low-pressure piston-based accumulators 1519. This bundle of accumulators 1519 allows for expedited heat transfer to the air. The hydraulic fluid from the bundle of piston-based accumulators 1519 is low pressure (equal to the pressure of the expanding air). The pressure is intensified in a hydraulic-fluid to hydraulic-fluid intensifier (booster) 1520, thus mimicking the role of the air-to-hydraulic fluid intensifiers described above, except for the increased surface area for heat exchange during expansion/compression. Similar to modified accumulator 1516, this bundle of piston-based accumulators 1519 is enclosed in a shell 1525 and, along with the booster, mimics a single intensifier with one air input/output 1531 and one hydraulic fluid input/output 1533. The shell 1525 can contain a fluid (e.g., water) that can be circulated past the bundle of accumulators 1519 during air expansion or compression to expedite heat transfer. The fluid input 1526 and fluid output 1528 from the shell 1525 can run to an environmental heat exchanger or to a source of process heat, cold water, or other external heat exchange medium.

Figure 16:
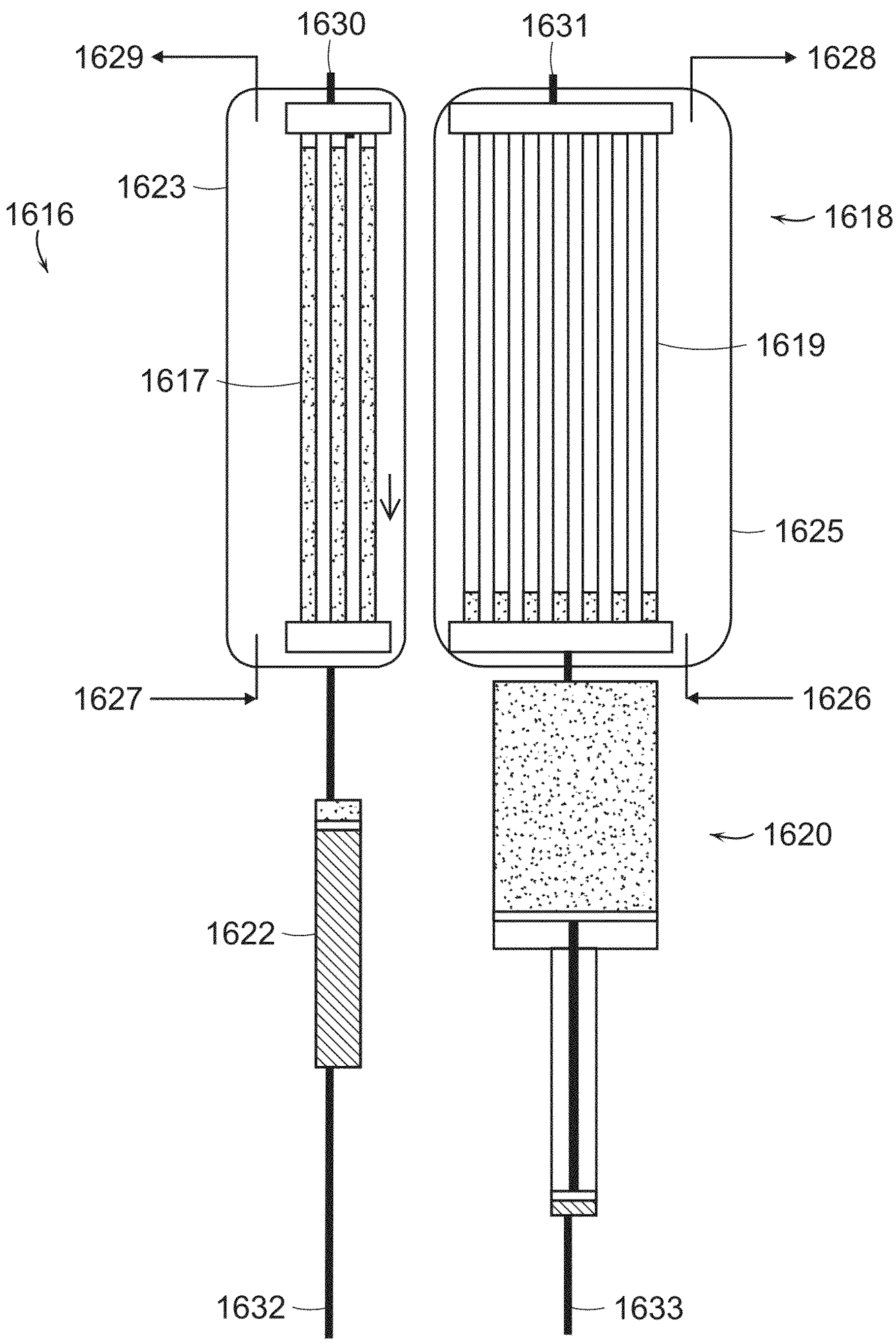
FIG. 16 is a schematic diagram of a system and method for expedited heat transfer to gas expanding (or being compressed) in an open-air staged hydraulic-pneumatic system in accordance with another embodiment of the invention.

FIG. 16 is a schematic diagram of an alternative system and method for expedited heat transfer of gas expanding (or being compressed) in an open-air staged hydraulic-pneumatic system. In this setup, the system described in FIG. 15 is modified to reduce costs and potential issues with piston friction as the diameter of the long narrow piston-based accumulators is further reduced. In this embodiment, a series of long narrow fluid-filled (e.g. water) tubes (e.g. piston-less accumulators) 1617 is used in place of the many piston-based accumulators 1517 in FIG. 15. In this way, cost is substantially reduced, as the tubes no longer need to be honed to a high-precision diameter and no longer need to be straight for piston travel. Similar to those described in FIG. 15, these bundles of fluid-filled tubes 1617 are tied together at the ends to mimic a single tube (piston-less accumulator) with one air input/output 1630 and one hydraulic fluid input/output 1632. The bundle of tubes 1617 are enclosed in a shell 1623, which can contain a fluid (e.g., water) at low pressure, which can be circulated past the bundle of tubes 1617 during air expansion or compression to expedite heat transfer. This entire bundle and shell arrangement forms the modified accumulator 1616. The input 1627 and output 1629 from the shell 1623 can run to an environmental heat exchanger or to a source of process heat, cold water, or other external heat exchange medium. In addition, a fluid (e.g., water) to hydraulic fluid piston-based accumulator 1622 can be used to transmit the pressure from the fluid (water) in accumulator 1616 to a hydraulic fluid, eliminating worries about air in the hydraulic fluid.

Also shown in FIG. 16 is a modified intensifier 1618. The function of the intensifier 1618 is identical to those previously described; however, heat exchange between the air expanding (or being compressed) is expedited by the addition of a bundle of the long narrow low-pressure tubes (piston-less accumulators) 1619. This bundle of accumulators 1619 allows for expedited heat transfer to the air. The hydraulic fluid from the bundle of piston-based accumulators 1619 is low pressure (equal to the pressure of the expanding air). The pressure is intensified in a hydraulic-fluid to hydraulic-fluid intensifier (booster) 1620, thus mimicking the role of the air-to-hydraulic fluid intensifiers described above, except for the increased surface area for heat exchange during expansion/compression and with reduced cost and friction as compared with the intensifier 1518 described in FIG. 15. Similar to modified accumulator 1616, this bundle of piston-based accumulators 1619 is enclosed in a shell 1625 and, along with the booster 1620, mimics a single intensifier with one air input/output 1631 and one hydraulic fluid input/output 1633. The shell 1625 can contain a fluid (e.g., water) that can be circulated past the bundle of accumulators 1619 during air expansion or compression to expedite heat transfer. The fluid input 1626 and fluid output 1628 from the shell 1625 can run to an environmental heat exchanger or to a source of process heat, cold water, or other external heat exchange medium.

Figure 17:
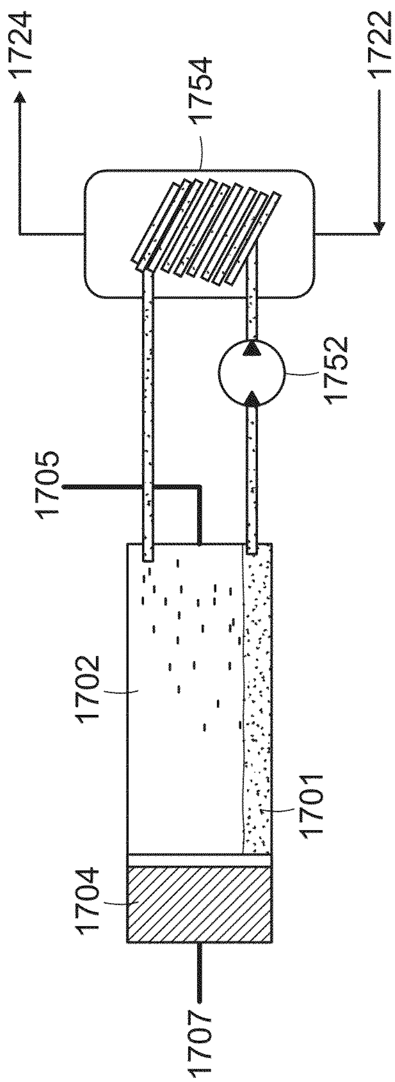
FIG. 17 is a schematic diagram of a system and method for expedited heat transfer to gas expanding (or being compressed) in an open-air staged hydraulic-pneumatic system in accordance with yet another embodiment of the invention.

FIG. 17 is a schematic diagram of another alternative system and method for expedited heat transfer to gas expanding (or being compressed) in an open-air staged hydraulic-pneumatic system. In this setup, the system of FIG. 11 is modified to eliminate dead air space and potentially improve heat transfer by using a liquid to liquid heat exchanger. As shown in FIG. 11, an air circulator 1152 is connected to the air space of pneumatic-hydraulic cylinder 1101. One possible drawback of the air circulator system is that some "dead air space" is present and can reduce the energy efficiency by having some air expansion without useful work being extracted.

Similar to the cylinder 1101 shown in FIG. 11, the cylinder 1701 includes a primary gas port 1705, which can be closed via a valve and connected with a pneumatic circuit, or any other pneumatic source/storage system. The cylinder 1701 further includes a primary fluid port 1707 that can be closed by a valve. This fluid port connects with a source of fluid in the hydraulic circuit of the above-described storage systems, or any other fluid reservoir.

As shown in FIG. 17, a water circulator 1752 is attached to the pneumatic side 1702 of the hydraulic-pneumatic cylinder (accumulator or intensifier) 1701. Sufficient fluid (e.g., water) is added to the pneumatic side of 1702, such that no dead space is present (e.g., the heat transfer subsystem 1750 (i.e., circulator 1752 and heat exchanger 1754) are filled with fluid) when the piston 1701 is fully to the top (e.g., hydraulic side 1704 is filled with hydraulic fluid). Additionally, enough extra liquid is present in the pneumatic side 1702 such that liquid can be drawn out of the bottom of the cylinder 1701 when the piston is fully at the bottom (e.g., hydraulic side 1704 is empty of hydraulic fluid). As the gas is expanded (or being compressed) in the cylinder 1701, the liquid is circulated by liquid circulator 1752 through a liquid to liquid heat exchanger 1754, which may be a shell and tube type with the input 1722 and output 1724 from the shell running to an environmental heat exchanger or to a source of process heat, cold water, or other external heat exchange medium. The liquid that is circulated by circulator 1752 (at a pressure similar to the expanding gas) is sprayed back into the pneumatic side 1702 after passing through the heat exchanger 1754, thus increasing the heat exchange between the liquid and the expanding air. Overall, this method allows for dead-space volume to be filled with an incompressible liquid and thus the heat exchanger volume can be large and it can be located anywhere that is convenient. By removing all heat exchangers, the overall efficiency of the energy storage system can be increased. Likewise, as liquid to liquid heat exchangers tend to more efficient than air to liquid heat exchangers, heat transfer may be improved. It should be noted that in this particular arrangement, the hydraulic pneumatic cylinder 1701 would be oriented horizontally, so that liquid pools on the lengthwise base of the cylinder 1701 to be continually drawn into circulator 1752.

Figure 18:
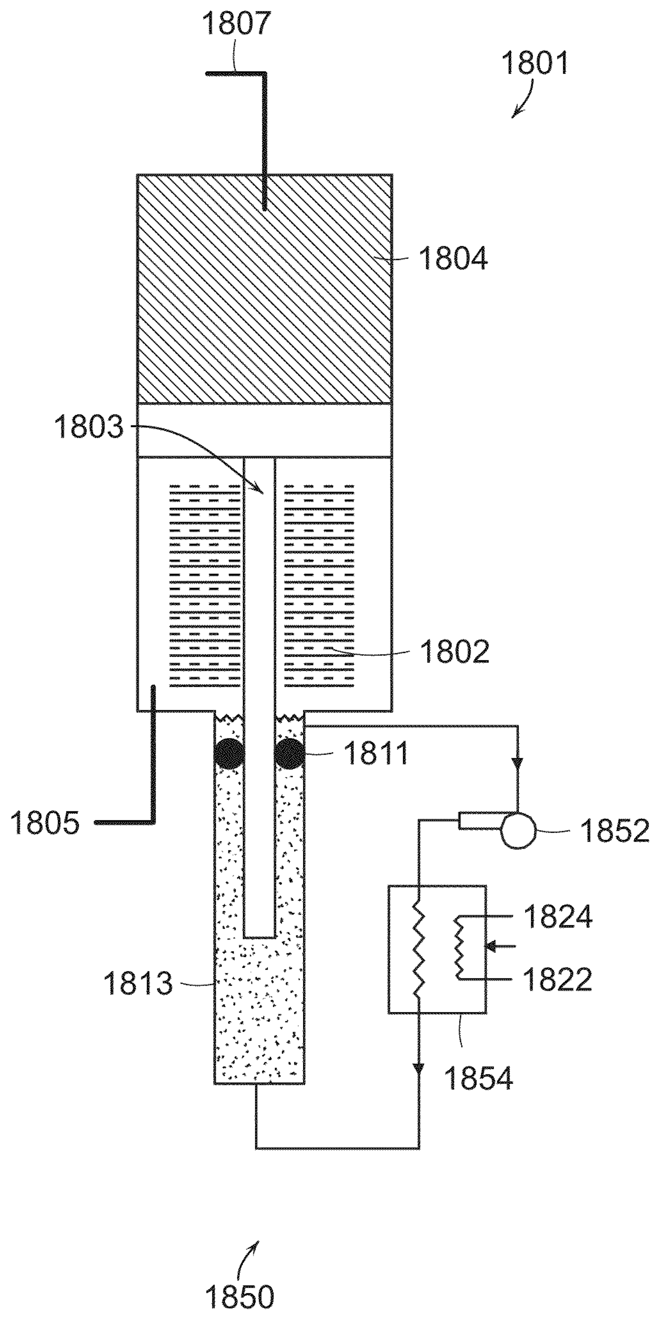
FIG. 18 is a schematic diagram of a system and method for expedited heat transfer to gas expanding (or being compressed) in an open-air staged hydraulic-pneumatic system in accordance with another embodiment of the invention.

FIG. 18 is a schematic diagram of another alternative system and method for expedited heat transfer to gas expanding (or being compressed) in an open-air staged hydraulic-pneumatic system. In this setup, the system of FIG. 11 is again modified to eliminate dead air space and potentially improve heat transfer by using a liquid to liquid heat exchanger in a similar manner as described with respect to FIG. 17. Also, the cylinder 1801 can include a primary gas port 1805, which can be closed via a valve and connected with a pneumatic circuit, or any other pneumatic source/storage system, and a primary fluid port 1807 that can be closed by a valve and connected with a source of fluid in the hydraulic circuit of the above-described storage systems, or any other fluid reservoir.

The heat transfer subsystem shown in FIG. 18, however, includes a hollow rod 1803 attached to the piston of the hydraulic-pneumatic cylinder (accumulator or intensifier) 1801 such that liquid can be sprayed throughout the entire volume of the pneumatic side 1802 of the cylinder 1801, thereby increasing the heat exchange between the liquid and the expanding air over FIG. 17, where the liquid is only sprayed from the end cap. Rod 1803 is attached to the pneumatic side 1802 of the cylinder 1801 and runs through a seal 1811, such that the liquid in a pressurized reservoir or vessel 1813 (e.g., a metal tube with an end cap attached to the cylinder 1801) can be pumped to a slightly higher pressure than the gas in the cylinder 1801.

As the gas is expanded (or being compressed) in the cylinder 1801, the liquid is circulated by circulator 1852 through a liquid to liquid heat exchanger 1854, which may be a shell and tube type with the input 1822 and output 1824 from the shell running to an environmental heat exchanger or to a source of process heat, cold water, or other external heat exchange medium. Alternatively, a liquid to air heat exchanger could be used. The liquid is circulated by circulator 1852 through a heat exchanger 1854 and then sprayed back into the pneumatic side 1802 of the cylinder 1801 through the rod 1803, which has holes drilled along its length. Overall, this set-up allows for dead-space volume to be filled with an incompressible liquid and thus the heat exchanger volume can be large and it can be located anywhere. Likewise, as liquid to liquid heat exchangers tend to more efficient than air to liquid heat exchangers, heat transfer may be improved. By adding the spray rod 1803, the liquid can be sprayed throughout the entire gas volume increasing heat transfer over the set-up shown in FIG. 17.

Figure 19:
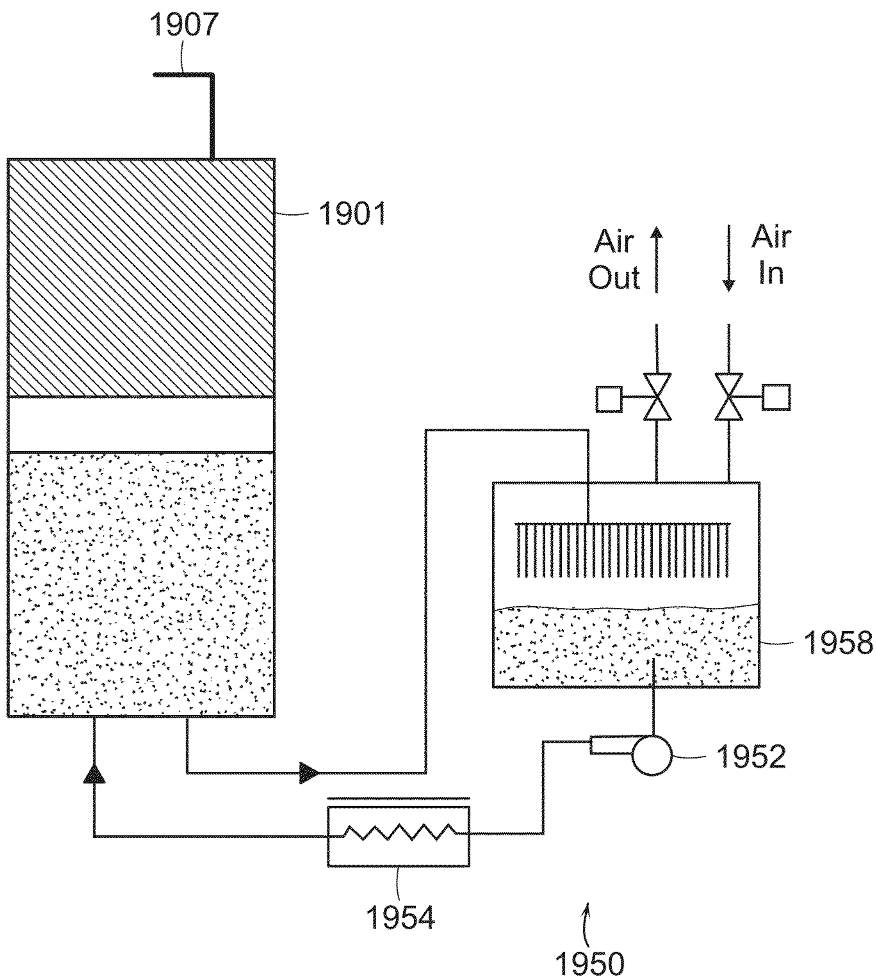
FIG. 19 is a schematic diagram of a system and method for expedited heat transfer to gas expanding (or being compressed) in an open-air staged hydraulic-pneumatic system in accordance with another embodiment of the invention.

FIG. 19 is a schematic diagram of another alternative system and method for expedited heat transfer to gas expanding (or being compressed) in an open-air staged hydraulic-pneumatic system. In this setup, the system is arranged to eliminate dead air space and potentially improve heat transfer by using a liquid to liquid heat exchanger in a similar manner as described with respect to FIG. 18. As shown in FIG. 19, however, the heat transfer subsystem 1950 includes a separate pressure reservoir or vessel 1958 containing a liquid (e.g., water), in which the air expansion occurs. As the gas expands (or is being compressed) in the reservoir 1958, liquid is forced into a liquid to hydraulic fluid cylinder 1901. The liquid (e.g., water) in reservoir 1958 and cylinder 1901 is also circulated via a circulator 1952 through a heat exchanger 1954, and sprayed back into the vessel 1958 allowing for heat exchange between the air expanding (or being compressed) and the liquid. Overall, this embodiment allows for dead-space volume to be filled with an incompressible liquid and thus the heat exchanger volume can be large and it can be located anywhere. Likewise, as liquid to liquid heat exchangers tend to be more efficient than air to liquid heat exchangers, heat transfer may be improved. By adding a separate larger liquid reservoir 1958, the liquid can be sprayed throughout the entire gas volume increasing heat transfer over the set-up shown in FIG. 17.

Figure 20A:
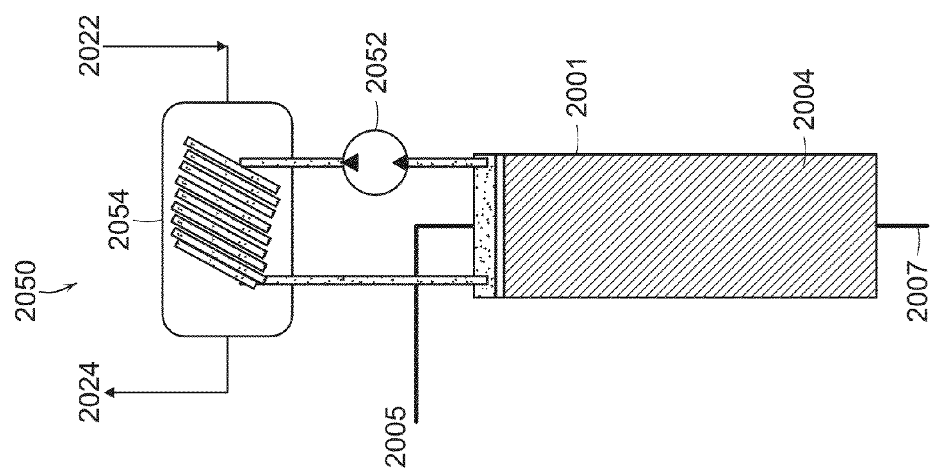
FIGS. 20A and 20B are schematic diagrams of a system and method for expedited heat transfer to gas expanding (or being compressed) in an open-air staged hydraulic-pneumatic system in accordance with another embodiment of the invention.
Figure 20B:
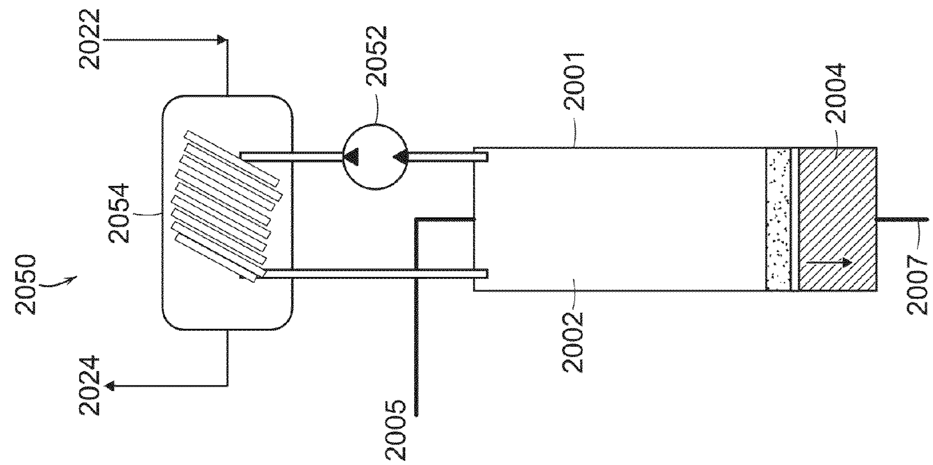

FIGS. 20A and 20B are schematic diagrams of another alternative system and method for expedited heat transfer to gas expanding (or being compressed) in an open-air staged hydraulic-pneumatic system. In this setup, the system is arranged to eliminate dead air space and use a similar type of heat transfer subsystem as described with respect to FIG. 11. Similar to the cylinder 1101 shown in FIG. 11, the cylinder 2001 includes a primary gas port 2005, which can be closed via a valve and connected with a pneumatic circuit, or any other pneumatic source/storage system. The cylinder 2001 further includes a primary fluid port 2007 that can be closed by a valve. This fluid port connects with a source of fluid in the hydraulic circuit of the above-described storage systems, or any other fluid reservoir. In addition, as the gas is expanded (or being compressed) in the cylinder 2001, the gas is also circulated by circulator 2052 through an air to liquid heat exchanger 2054, which may be a shell and tube type with the input 2022 and output 2024 from the shell running to an environmental heat exchanger or to a source of process heat, cold water, or other external heat exchange medium.

As shown in FIG. 20A, a sufficient amount of a liquid (e.g., water) is added to the pneumatic side 2002 of the cylinder 2001, such that no dead space is present (e.g., the heat transfer subsystem 2050 (i.e., the circulator 2052 and heat exchanger 2054) are filled with liquid) when the piston is fully to the top (e.g., hydraulic side 2004 is filled with hydraulic fluid). The circulator 2052 must be capable of circulating both liquid (e.g., water) and air. During the first part of the expansion, a mix of liquid and air is circulated through the heat exchanger 2054. Because the cylinder 2001 is mounted vertically, however, gravity will tend to empty circulator 2052 of liquid and mostly air will be circulated during the remainder of the expansion cycle shown in FIG. 20B. Overall, this set-up allows for dead-space volume to be filled with an incompressible liquid and thus the heat exchanger volume can be large and it can be located anywhere.

Figure 21C:
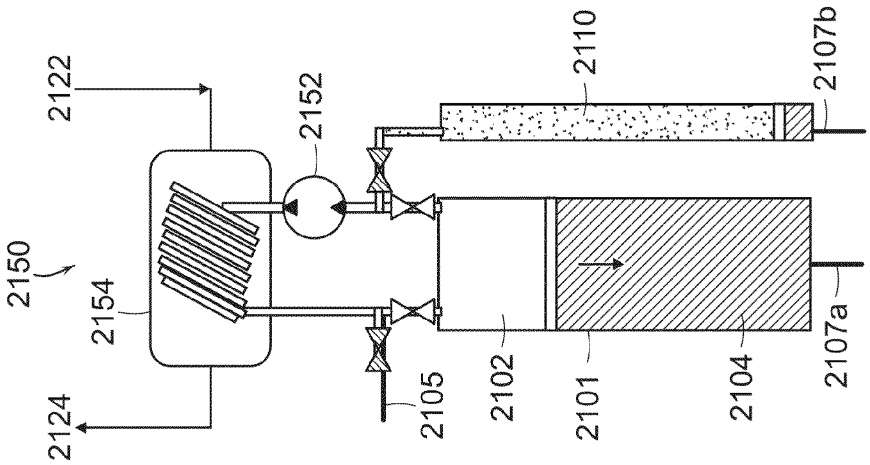
FIGS. 21A-21C are schematic diagrams of a system and method for expedited heat transfer to gas expanding (or being compressed) in an open-air staged hydraulic-pneumatic system in accordance with another embodiment of the invention.
Figure 21B:
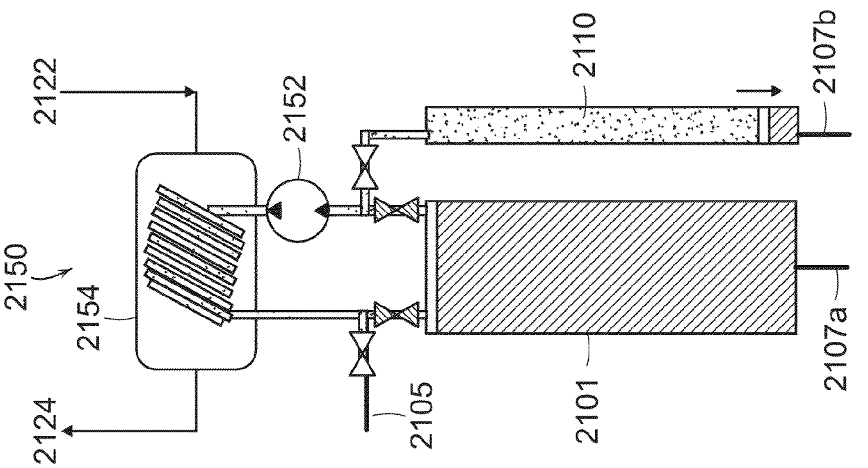
Figure 21A:
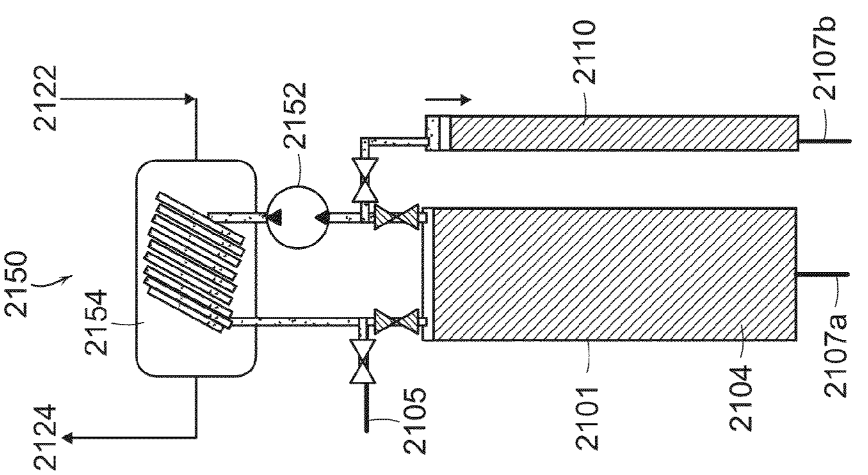

FIGS. 21A-21C are schematic diagrams of another alternative system and method for expedited heat transfer to gas expanding (or being compressed) in an open-air staged hydraulic-pneumatic system. In this setup, the system is arranged to eliminate dead air space and use a similar heat transfer subsystem as described with respect to FIG. 11. In addition, this set-up uses an auxiliary accumulator 2110 to store and recover energy from the liquid initially filing an air circulator 2152 and a heat exchanger 2154. Similar to the cylinder 1101 shown in FIG. 11, the cylinder 2101 includes a primary gas port 2105, which can be closed via a valve and connected with a pneumatic circuit, or any other pneumatic source/storage system. The cylinder 2101 further includes a primary fluid port 2107*a* that can be closed by a valve. This fluid port 2107*a* connects with a source of fluid in the hydraulic circuit of the above-described storage systems, or any other fluid reservoir. The auxiliary accumulator 2110 also includes a fluid port 2107*b* that can be closed by a valve and connected to a source of fluid. In addition, as the gas is expanded (or being compressed) in the cylinder 2101, the gas is also circulated by circulator 2152 through an air to liquid heat exchanger 2154, which may be a shell and tube type with the input 2122 and output 2124 from the shell running to an environmental heat exchanger or to a source of process heat, cold water, or other external heat exchange medium.

Additionally, as opposed to the set-up shown in FIGS. 20A and 20B, the circulator 2152 circulates almost entirely air and not liquid. As shown in FIG. 21A, sufficient liquid (e.g., water) is added to the pneumatic side 2102 of cylinder 2101, such that no dead space is present (e.g., the heat transfer subsystem 2150 (i.e., the circulator 2152 and the heat exchanger 2154) are filled with liquid) when the piston is fully to the top (e.g., hydraulic side 2104 is filled with hydraulic liquid). During the first part of the expansion, liquid is driven out of the circulator 2152 and the heat exchanger 2154, as shown in FIG. 21B through the auxiliary accumulator 2110 and used to produce power. When the auxiliary accumulator 2110 is empty of liquid and full of compressed gas, valves are closed as shown in FIG. 21C and the expansion and air circulation continues as described above with respect to FIG. 11. Overall, this method allows for dead-space volume to be filled with an incompressible liquid and thus the heat exchanger volume can be large and it can be located anywhere. Likewise, useful work is extracted when the air circulator 2152 and the heat exchanger 2154 are filled with compressed gas, such that overall efficiency is increased.

Figure 22A:
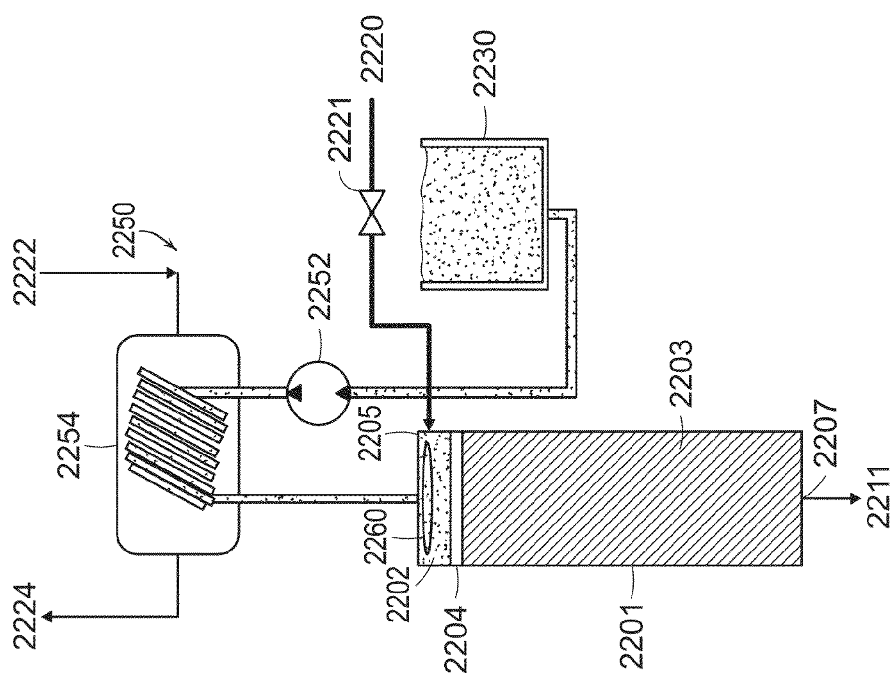
FIGS. 22A and 22B are schematic diagrams of a system and method for expedited heat transfer to gas expanding (or being compressed) in an open-air staged hydraulic-pneumatic system in accordance with another embodiment of the invention.
Figure 22B:
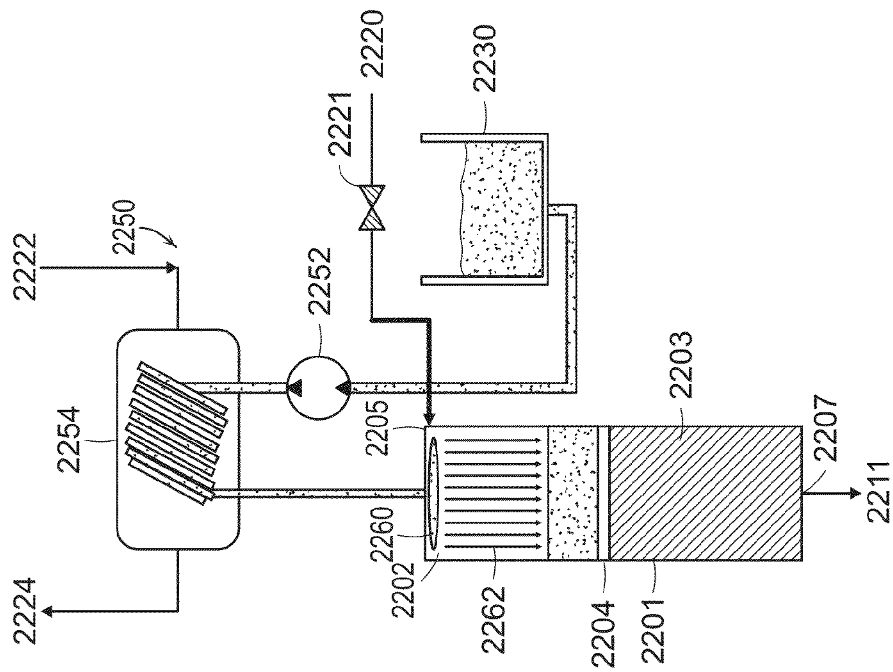

FIGS. 22A and 22B are schematic diagrams of another alternative system and method for expedited heat transfer to gas expanding (or being compressed) in an open-air staged hydraulic-pneumatic system. In this setup, water is sprayed downward into a vertically oriented hydraulic-pneumatic cylinder (accumulator or intensifier) 2201, with a hydraulic side 2203 separated from a pneumatic side 2202 by a moveable piston 2204. FIG. 22A depicts the cylinder 2201 in fluid communication with the heat transfer subsystem 2250 in a state prior to a cycle of compressed air expansion. It should be noted that the air side 2202 of the cylinder 2201 is completely filled with liquid, leaving no air space, (a circulator 2252 and a heat exchanger 2254 are filled with liquid as well) when the piston 2204 is fully to the top as shown in FIG. 22A.

Stored compressed gas in pressure vessels, not shown but indicated by 2220, is admitted via valve 2221 into the cylinder 2201 through air port 2205. As the compressed gas expands into the cylinder 2201, hydraulic fluid is forced out under pressure through fluid port 2207 to the remaining hydraulic system (such as a hydraulic motor as shown and described with respect to FIGS. 1 and 4) as indicated by 2211. During expansion (or compression), heat exchange liquid (e.g., water) is drawn from a reservoir 2230 by a circulator, such as a pump 2252, through a liquid to liquid heat exchanger 2254, which may be a shell and tube type with an input 2222 and an output 2224 from the shell running to an environmental heat exchanger or to a source of process heat, cold water, or other external heat exchange medium.

As shown in FIG. 22B, the liquid (e.g., water) that is circulated by pump 2252 (at a pressure similar to that of the expanding gas) is sprayed (as shown by spray lines 2262) via a spray head 2260 into the pneumatic side 2202 of the cylinder 2201. Overall, this method allows for an efficient means of heat exchange between the sprayed liquid (e.g., water) and the air being expanded (or compressed) while using pumps and liquid to liquid heat exchangers. It should be noted that in this particular arrangement, the hydraulic pneumatic cylinder 2201 would be oriented vertically, so that the heat exchange liquid falls with gravity. At the end of the cycle, the cylinder 2201 is reset, and in the process, the heat exchange liquid added to the pneumatic side 2202 is removed via the pump 2252, thereby recharging reservoir 2230 and preparing the cylinder 2201 for a successive cycling.

Figure 22C:
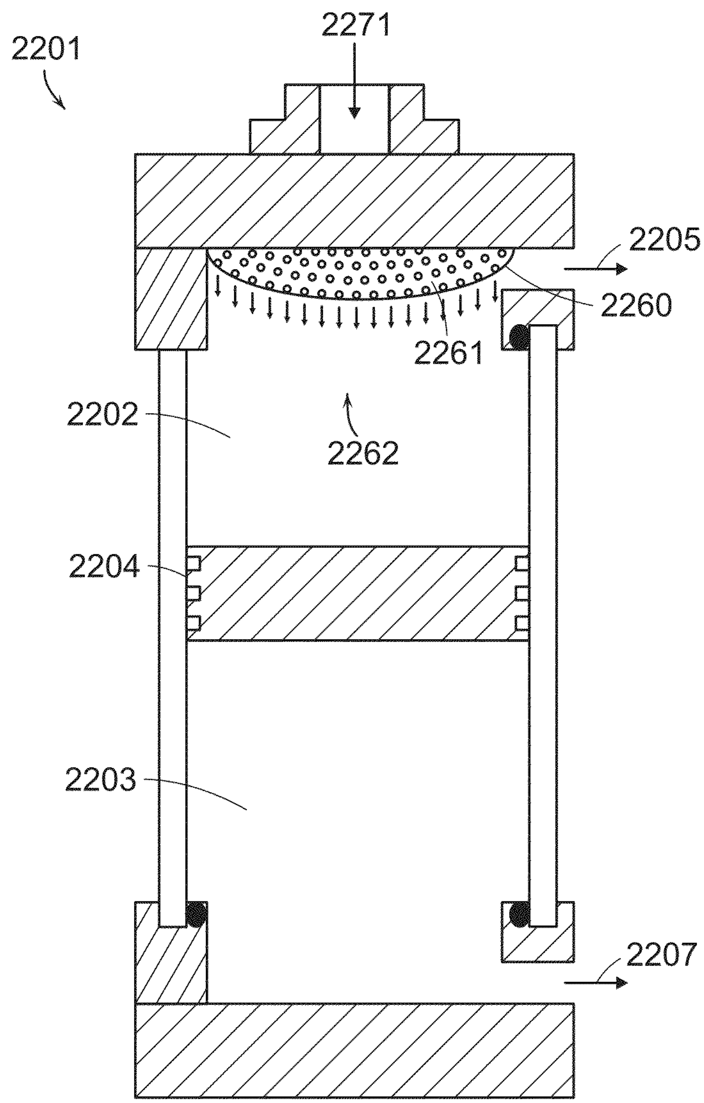
FIG. 22C is a schematic cross-sectional view of a cylinder assembly for use in the system and method of FIGS. 22A and 22B.

FIG. 22C depicts the cylinder 2201 in greater detail with respect to the spray head 2260. In this design, the spray head 2260 is used much like a shower head in the vertically oriented cylinder. In the embodiment shown, the nozzles 2261 are evenly distributed over the face of the spray head 2260; however, the specific arrangement and size of the nozzles can vary to suit a particular application. With the nozzles 2261 of the spray head 2260 evenly distributed across the end-cap area, the entire air volume (pneumatic side 2202) is exposed to the water spray 2262. As previously described, the heat transfer subsystem circulates/injects the water into the pneumatic side 2202 via port 2271 at a pressure slightly higher than the air pressure and then removes the water at the end of the return stroke at ambient pressure.

Figure 22D:
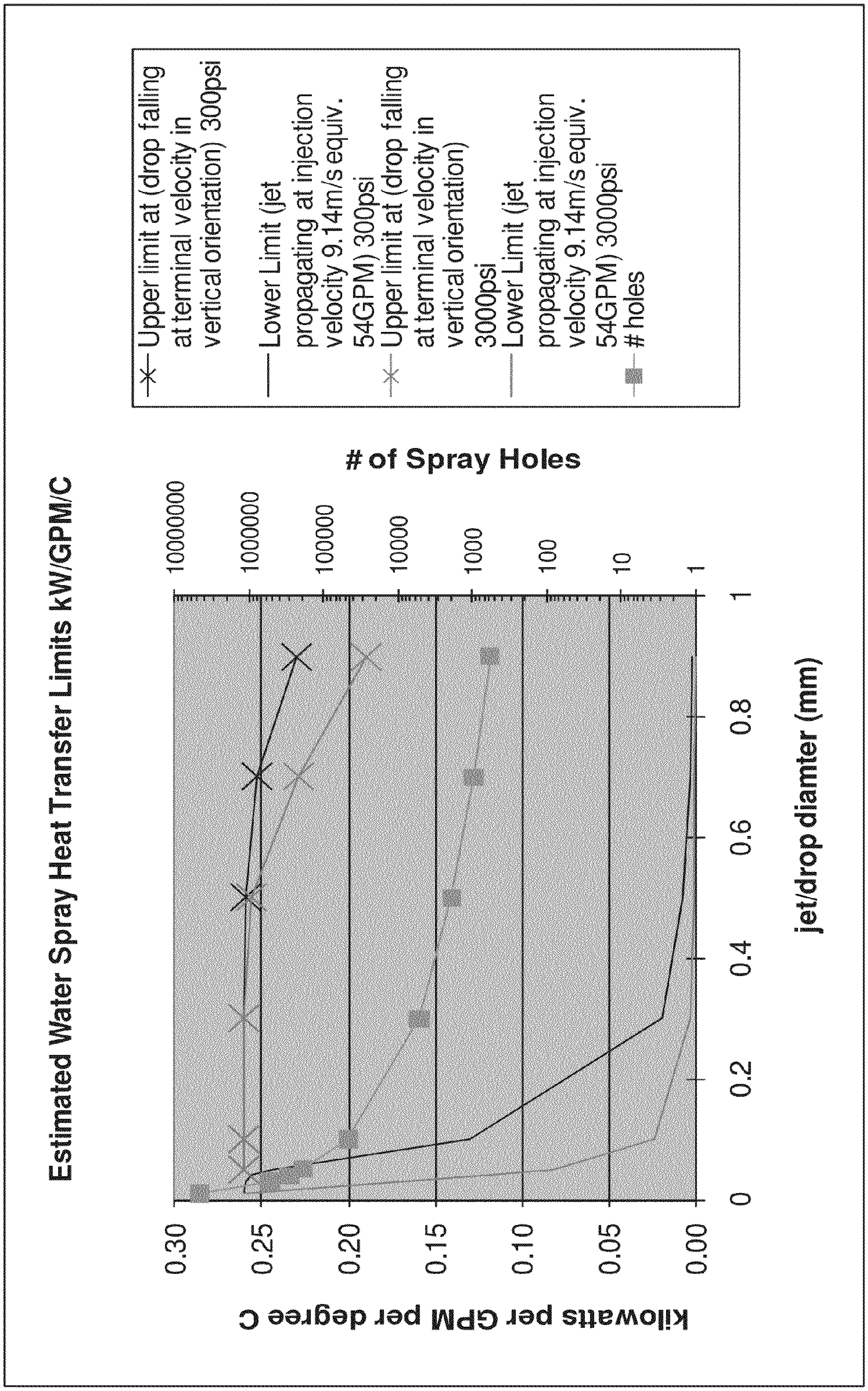
FIG. 22D is a graphical representation of the estimated water spray heat transfer limits for an implementation of the system and method of FIGS. 22A and 22B.

As previously discussed, the specific operating parameters of the spray will vary to suit a particular application. For a specific pressure range, spray orientation, and spray characteristics, heat transfer performance can be approximated through modeling. Considering an exemplary embodiment using an 8" diameter, 10 gallon cylinder with 3000 psi air expanding to 300 psi, the water spray flow rates can be calculated for various drop sizes and spray characteristics that would be necessary to achieve sufficient heat transfer to maintain an isothermal expansion. FIG. 22D represents the calculated thermal heat transfer power (in kW) per flow rate (in GPM) for each degree difference between the spray liquid and air at 300 and 3000 psi. The lines with the X marks show the relative heat transfer for a regime (Regime 1) where the spray breaks up into drops. The calculations assume conservative values for heat transfer and no recirculation of the drops, but rather provide a conservative estimate of the heat transfer for Regime 1. The lines with no marks show the relative heat transfer for a regime (Regime 2) where the spray remains in coherent jets for the length of the cylinder. The calculations assume conservative values for heat transfer and no recirculation after impact, but a conservative estimate of the heat transfer for Regime 2. Considering that an actual spray may be in between a jet and pure droplet formation, the two regimes provide a conservative upper bound and fixed lower bound on expected experimental performance. Considering a 0.1 kW requirement per gallons per minute (GPM) per ° C., drop sizes under 2 mm provide adequate heat transfer for a given flow rate and jet sizes under 0.1 mm provide adequate heat transfer.

Generally, FIG. 22D represents thermal transfer power levels (kW) achieved, normalized by flow rates required and each Celsius degree of temperature difference between liquid spray and air, at different pressures for a spray head (see FIG. 22C) and a vertically-oriented 10 gallon, 8" diameter cylinder. Higher numbers indicate a more efficient (more heat transfer for a given flow rate at a certain temperature difference) heat transfer between the liquid spray and the air. Also shown graphically is the relative number of holes required to provide a jet of a specific diameter. To minimize the number of spray holes required in the spray head requires that the spray break-up into droplets. The break-up of the spray into droplets versus a coherent jet can be estimated theoretically using simplifying assumptions on nozzle and fluid dynamics. In general, break-up occurs more predominantly at higher air pressure and higher flow rates (i.e., higher pressure drop across the nozzle). Break-up at high pressures can be analyzed experimentally with specific nozzles, geometries, fluids, and air pressures.

Generally, a nozzle size of 0.2 to 2.0 mm is appropriate for high pressure air cylinders (3000 to 300 psi). Flow rates of 0.2 to 1.0 liters/min per nozzle are sufficient in this range to provide medium to complete spray breakup into droplets using mechanically or laser drilled cylindrical nozzle shapes. For example, a spray head with 250 nozzles of 0.9 mm hole diameter operating at 25 gpm is expected to provide over 50 kW of heat transfer to 3000 to 300 psi air expanding (or being compressed) in a 10 gallon cylinder. Pumping power for such a spray heat transfer implementation was determined to be less than 1% of the heat transfer power. Additional specific and exemplary details regarding the heat transfer subsystem utilizing the spray technology are discussed with respect to FIGS. 24A and 24B.

Figure 23A:
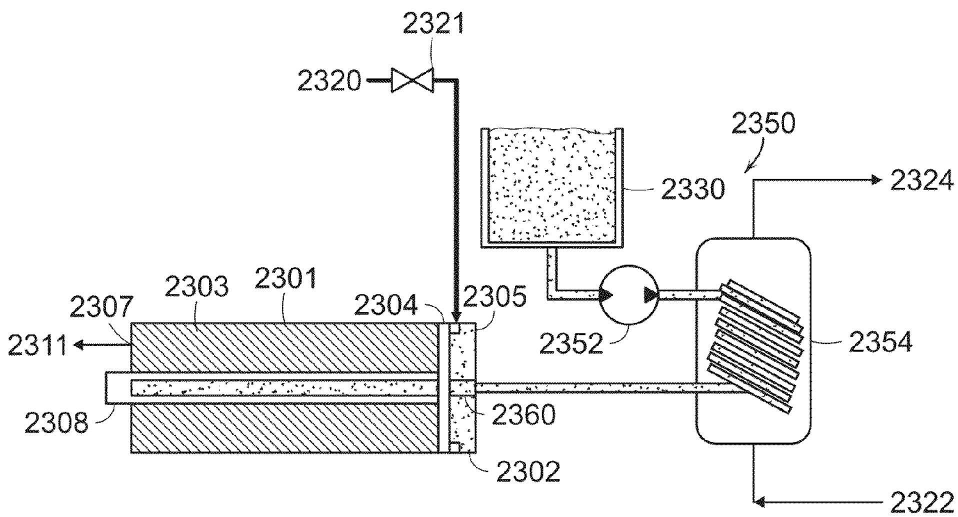
FIGS. 23A and 23B are schematic diagrams of a system and method for expedited heat transfer to gas expanding (or being compressed) in an open-air staged hydraulic-pneumatic system in accordance with another embodiment of the invention.
Figure 23B:
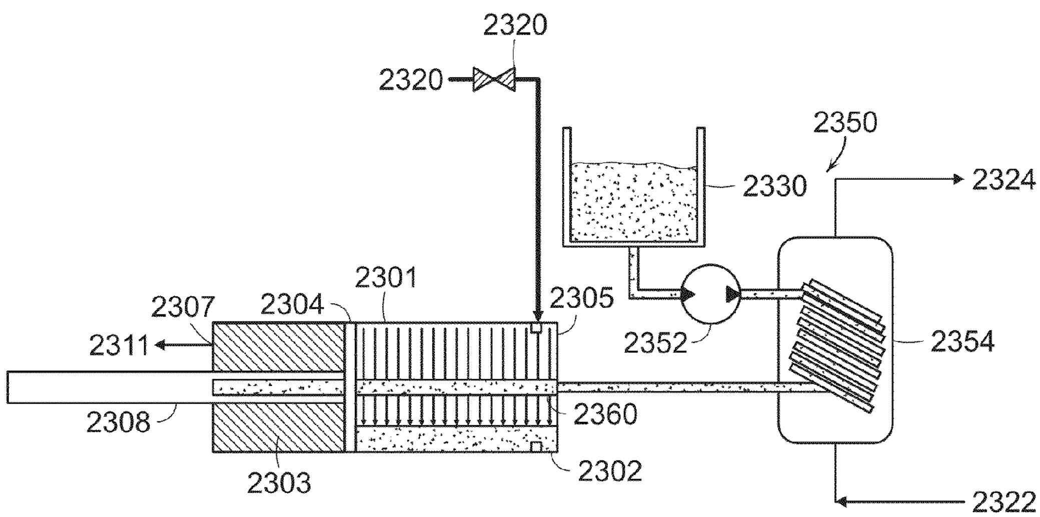

FIGS. 23A and 23B are schematic diagrams of another alternative system and method for expedited heat transfer to gas expanding (or being compressed) in an open-air staged hydraulic-pneumatic system. In this setup, water is sprayed radially into an arbitrarily oriented cylinder 2301. The orientation of the cylinder 2301 is not essential to the liquid spraying and is shown in a horizontal orientation in FIGS. 23A and 23B. The hydraulic-pneumatic cylinder (accumulator or intensifier) 2301 has a hydraulic side 2303 separated from a pneumatic side 2302 by a moveable piston 2304. FIG. 23A depicts the cylinder 2301 in fluid communication with the heat transfer subsystem 2350 in a state prior to a cycle of compressed air expansion. It should be noted that no air space is present on the pneumatic side 2302 in the cylinder 2301 (e.g., a circulator 2352 and a heat exchanger 2354 are filled with liquid) when the piston 2304 is fully retracted (i.e., the hydraulic side 2303 is filled with liquid) as shown in FIG. 23A.

Stored compressed gas in pressure vessels, not shown but indicated by 2320, is admitted via valve 2321 into the cylinder 2301 through air port 2305. As the compressed gas expands into the cylinder 2301, hydraulic fluid is forced out under pressure through fluid port 2307 to the remaining hydraulic system (such as a hydraulic motor as described with respect to FIGS. 1 and 4) as indicated by 2311. During expansion (or compression), heat exchange liquid (e.g., water) is drawn from a reservoir 2330 by a circulator, such as a pump 2352, through a liquid to liquid heat exchanger 2354, which may be a tube in shell setup with an input 2322 and an output 2324 from the shell running to an environmental heat exchanger or to a source of process heat, cold water, or other external heat exchange medium. As indicated in FIG. 23B, the liquid (e.g., water) that is circulated by pump 2352 (at a pressure similar to that of the expanding gas) is sprayed (as shown by spray lines 2362) via a spray rod 2360 into the pneumatic side 2302 of the cylinder 2301. The spray rod 2360 is shown in this example as fixed in the center of the cylinder 2301 with a hollow piston rod 2308 separating the heat exchange liquid (e.g., water) from the hydraulic side 2303. As the moveable piston 2304 is moved (for example, leftward in FIG. 23B)

forcing hydraulic fluid out of cylinder 2301, the hollow piston rod 2308 extends out of the cylinder 2301 exposing more of the spray rod 2360, such that the entire pneumatic side 2302 is exposed to the heat exchange spray as indicated by spray lines 2362. Overall, this method allows for an efficient means of heat exchange between the sprayed liquid (e.g., water) and the air being expanded (or compressed) while using pumps and liquid to liquid heat exchangers. It should be noted that in this particular arrangement, the hydraulic-pneumatic cylinder could be oriented in any manner and does not rely on the heat exchange liquid falling with gravity. At the end of the cycle, the cylinder 2301 is reset, and in the process, the heat exchange liquid added to the pneumatic side 2302 is removed via the pump 2352, thereby recharging reservoir 2330 and preparing the cylinder 2301 for a successive cycling.

Figure 23C:
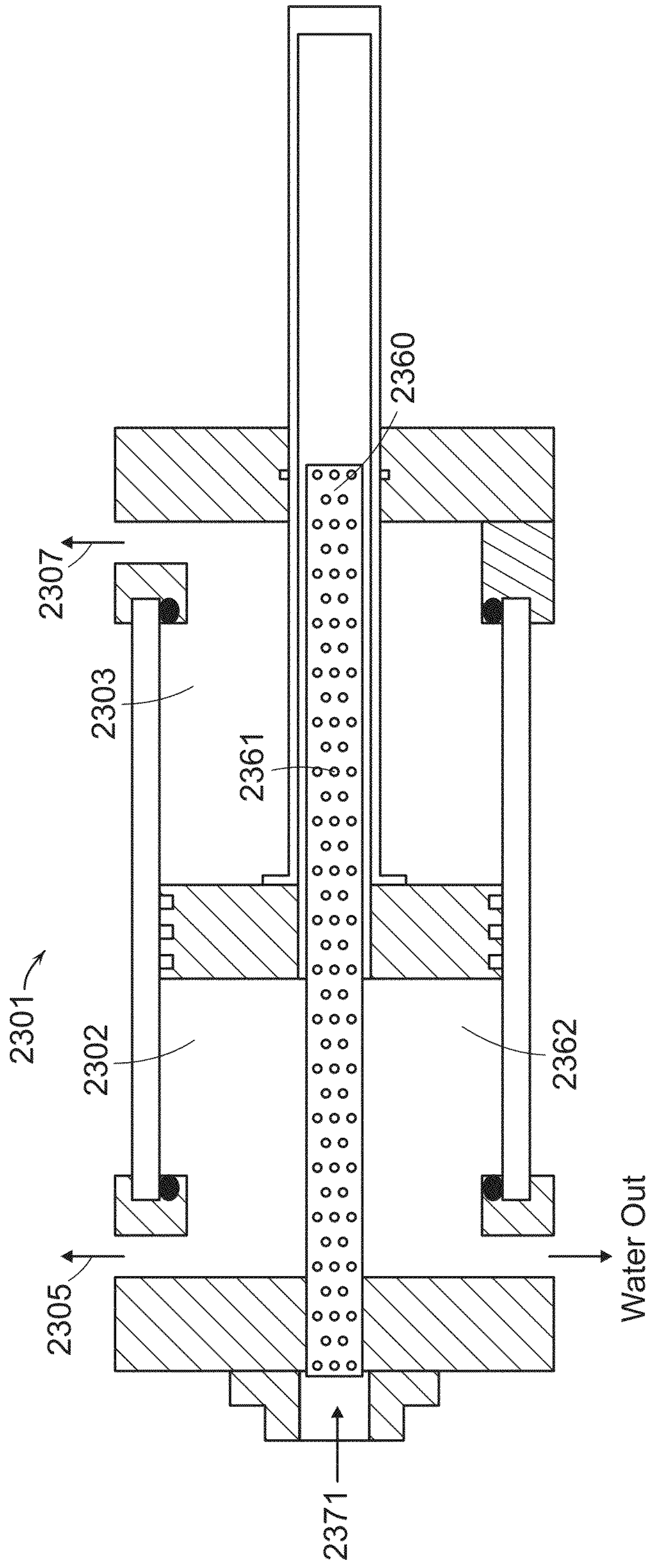
FIG. 23C is a schematic cross-sectional view of a cylinder assembly for use in the system and method of FIGS. 23A and 23B.

FIG. 23C depicts the cylinder 2301 in greater detail with respect to the spray rod 2360. In this design, the spray rod 2360 (e.g., a hollow stainless steel tube with many holes) is used to direct the water spray radially outward throughout the air volume (pneumatic side 2302) of the cylinder 2301. In the embodiment shown, the nozzles 2361 are evenly distributed along the length of the spray rod 2360; however, the specific arrangement and size of the nozzles can vary to suit a particular application. The water can be continuously removed from the bottom of the pneumatic side 2302 at pressure, or can be removed at the end of a return stroke at ambient pressure. This arrangement utilizes the common practice of center drilling piston rods (e.g., for position sensors). As previously described, the heat transfer subsystem 2350 circulates/injects the water into the pneumatic side 2302 via port 2371 at a pressure slightly higher than the air pressure and then removes the water at the end of the return stroke at ambient pressure.

Figure 23D:
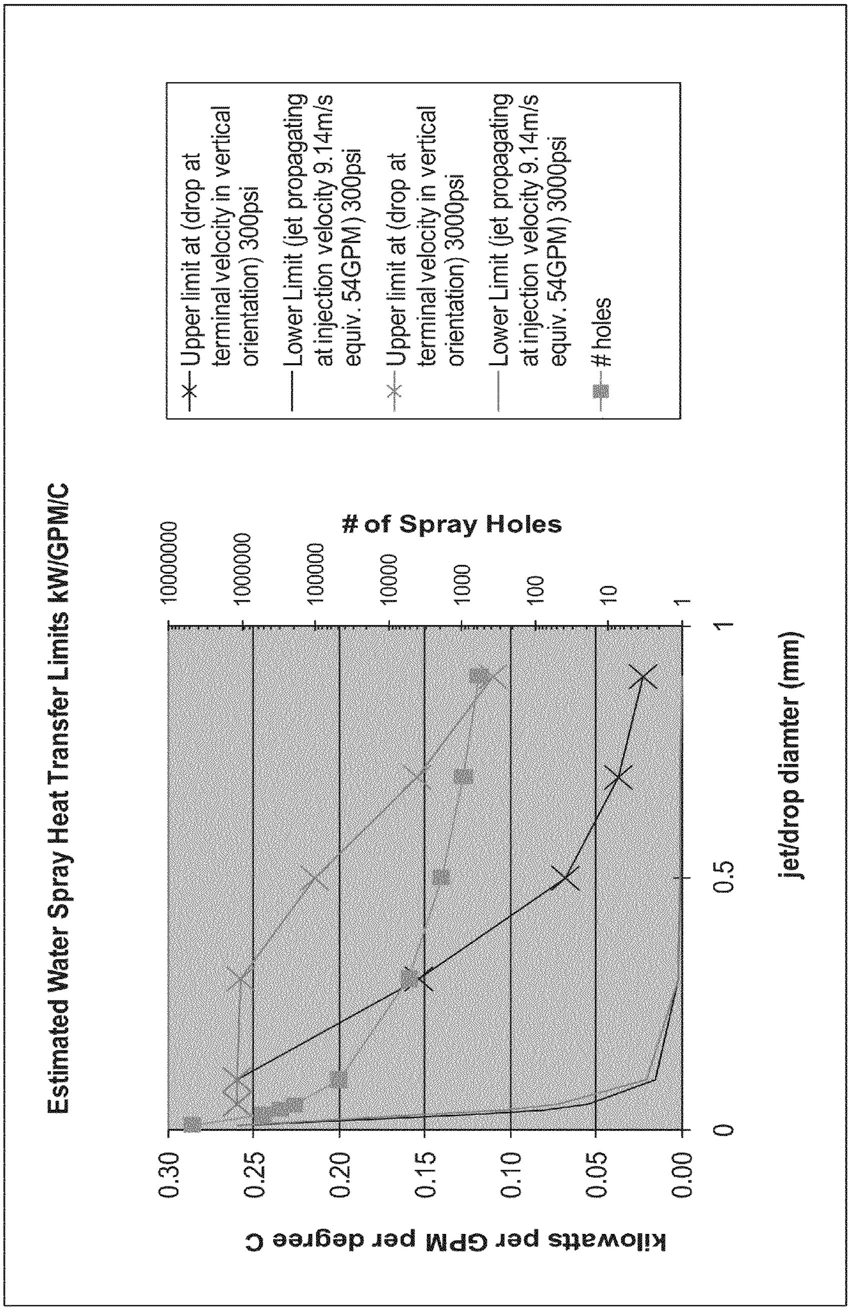
FIG. 23D is a graphical representation of the estimated water spray heat transfer limits for an implementation of the system and method of FIGS. 23A and 23B.

As previously discussed, the specific operating parameters of the spray will vary to suit a particular application. For a specific pressure range, spray orientation, and spray characteristics, heat transfer performance can be approximated through modeling. Again, considering an exemplary embodiment using an 8" diameter, 10 gallon cylinder with 3000 psi air expanding to 300 psi, the water spray flow rates can be calculated for various drop sizes and spray characteristics that would be necessary to achieve sufficient heat transfer to maintain an isothermal expansion. FIG. 23D represents the calculated thermal heat transfer power (in kW) per flow rate (in GPM) for each degree difference between the spray liquid and air at 300 and 3000 psi. The lines with the X marks show the relative heat transfer for Regime 1, where the spray breaks up into drops. The calculations assume conservative values for heat transfer and no recirculation of the drops, but rather provide a conservative estimate of the heat transfer for Regime 1. The lines with no marks show the relative heat transfer for Regime 2, where the spray remains in coherent jets for the length of the cylinder. The calculations assume conservative values for heat transfer and no recirculation after impact, but a conservative estimate of the heat transfer for Regime 2. Considering that an actual spray may be in between a jet and pure droplet formation, the two regimes provide a conservative upper bound and fixed lower bound on expected experimental performance. Considering a 0.1 kW requirement per gallons per minute (GPM) per ° C., drop sizes under 2 mm provide adequate heat transfer for a given flow rate and jet sizes under 0.1 mm provide adequate heat transfer.

Generally, FIG. 23D represents thermal transfer power levels (kW) achieved, normalized by flow rates required and each Celsius degree of temperature difference between liquid spray and air, at different pressures for a spray rod (see FIG. 23C) and a horizontally-oriented 10 gallon, 8" diameter cylinder. Higher numbers indicate a more efficient (more heat transfer for a given flow rate at a certain temperature difference) heat transfer between the liquid spray and the air. Also shown graphically is the relative number of holes required to provide a jet of a specific diameter. To minimize the number of spray holes required in the spray rod requires that the spray break-up into droplets. The break-up of the spray into droplets versus a coherent jet can be estimated theoretically using simplifying assumptions on nozzle and liquid dynamics. In general, break-up occurs more prominently at higher air pressure and higher flow rates (i.e., higher pressure drop across the nozzle). Break-up at high pressures can be analyzed experimentally with specific nozzles, geometries, fluids, and air pressures.

As discussed above with respect to the spray head arrangement, a nozzle size of 0.2 to 2.0 mm is appropriate for high pressure air cylinders (3000 to 300 psi). Flow rates of 0.2 to 1.0 liters/min per nozzle are sufficient in this range to provide medium to complete spray breakup into droplets using mechanically or laser drilled cylindrical nozzle shapes. Additional specific and exemplary details regarding the heat transfer subsystem utilizing the spray technology are discussed with respect to FIGS. 24A and 24B.

Generally, for the arrangements shown in FIGS. 22 and 23, the liquid spray heat transfer can be implemented using commercially-available pressure vessels, such as pneumatic and hydraulic/pneumatic cylinders with, at most, minor modifications. Likewise, the heat exchanger can be constructed from commercially-available, high-pressure components, thereby reducing the cost and complexity of the overall system. Since the primary heat exchanger area is external of the hydraulic/pneumatic vessel and dead-space volume is filled with an essentially incompressible liquid, the heat exchanger volume can be large and it can be located anywhere that is convenient. In addition, the heat exchanger can be attached to the vessel with common pipe fittings.

The basic design criteria for the spray heat transfer subsystem is to minimize operational energy used (i.e., parasitic loss), primarily related to liquid spray pumping power, while maximizing thermal transfer. While actual heat transfer performance is determined experimentally, theoretical analysis indicates the areas where maximum heat transfer for a given pumping power and flow rate of water will occur. As heat transfer between the liquid spray and surrounding air is dependent on surface area, the analysis discussed herein utilized the two spray regimes discussed above: 1) water droplet heat transfer and 2) water jet heat transfer.

In Regime 1, the spray breaks up into droplets, providing a larger total surface area. Regime 1 can be considered an upper-bound for surface area, and thus heat transfer, for a given set of other assumptions. In Regime 2, the spray remains in a coherent jet or stream, thus providing much less surface area for a given volume of water. Regime 2 can be considered a lower-bound for surface area and thus heat transfer for a given set of other assumptions.

Figure 24A:
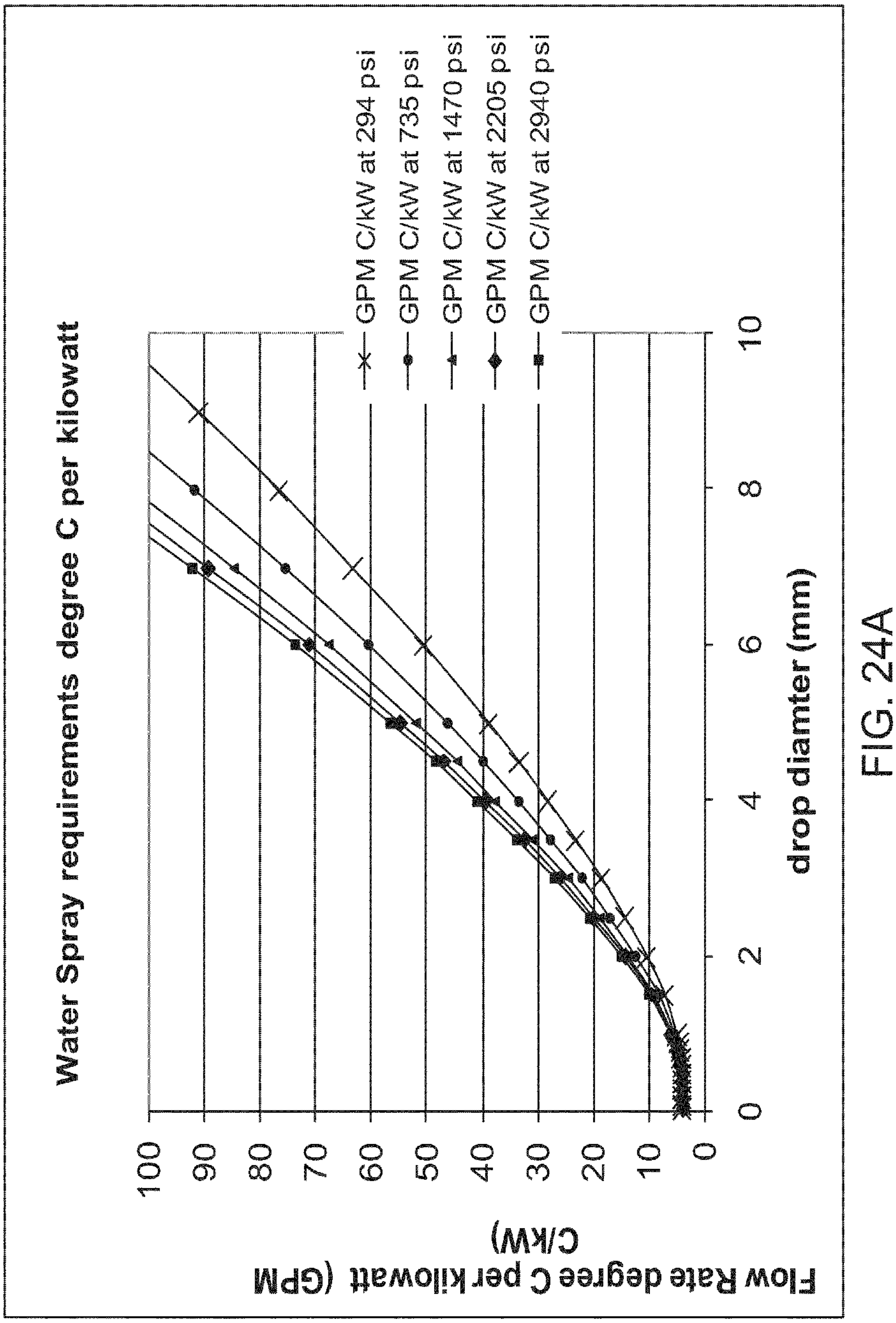
FIGS. 24A and 24B are graphical representations of the various water spray requirements for the systems and methods of FIGS. 22 and 23.
Figure 24B:
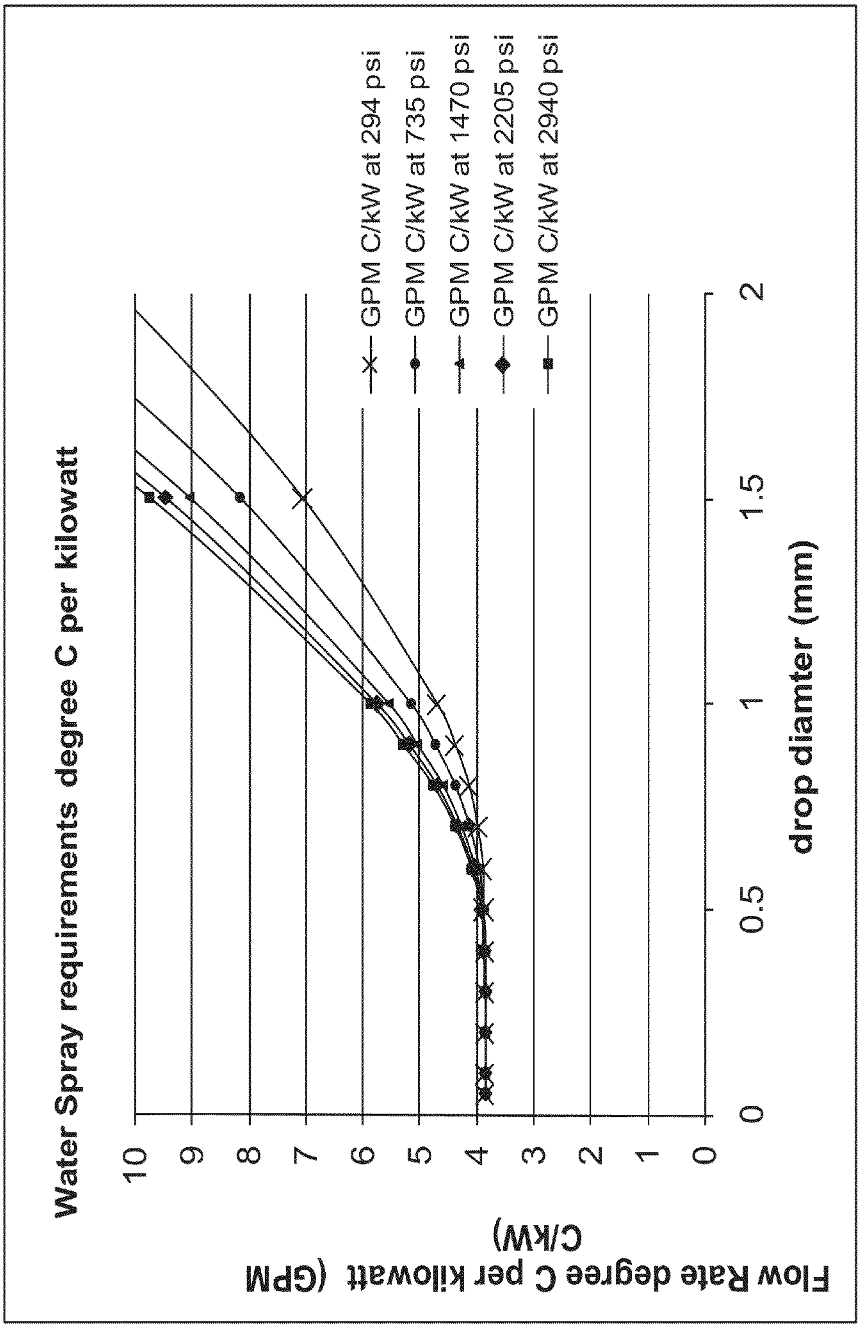

For Regime 1, where the spray breaks into droplets for a given set of conditions, it can be shown that drop sizes of less than 2 mm can provide sufficient heat transfer performance for an acceptably low flow rate (e.g., <10 GPM ° C./kW), as shown in FIG. 24A. FIG. 24A represents the flow rates required for each Celsius degree of temperature difference between liquid spray droplets and air at different pressures to achieve one kilowatt of heat transfer. Lower numbers indicate a more efficient (lower flow rate for given amount of heat transfer at a certain temperature difference) heat transfer between the liquid spray droplets and the air. For the given set of conditions illustrated in FIG. 24A, drop diameters below about 2 mm are desirable. FIG. 24B is an enlarged portion of the graph of FIG. 24A and represents that for the given set of conditions illustrated, drop diameters below about 0.5 mm no longer provide additional heat transfer benefit for a given flow rate.

As drop size continues to become smaller, eventually the terminal velocity of the drop becomes small enough that the drops fall too slowly to cover the entire cylinder volume (e.g. <100 microns). Thus, for the given set of conditions illustrated here, drop sizes between about 0.1 and 2.0 mm can be considered as preferred for maximizing heat transfer while minimizing pumping power, which increases with increasing flow rate. A similar analysis can be performed for Regime 2, where liquid spray remains in a coherent jet. Higher flow rates and/or narrower diameter jets are needed to provide similar heat transfer performance.

Figure 25:
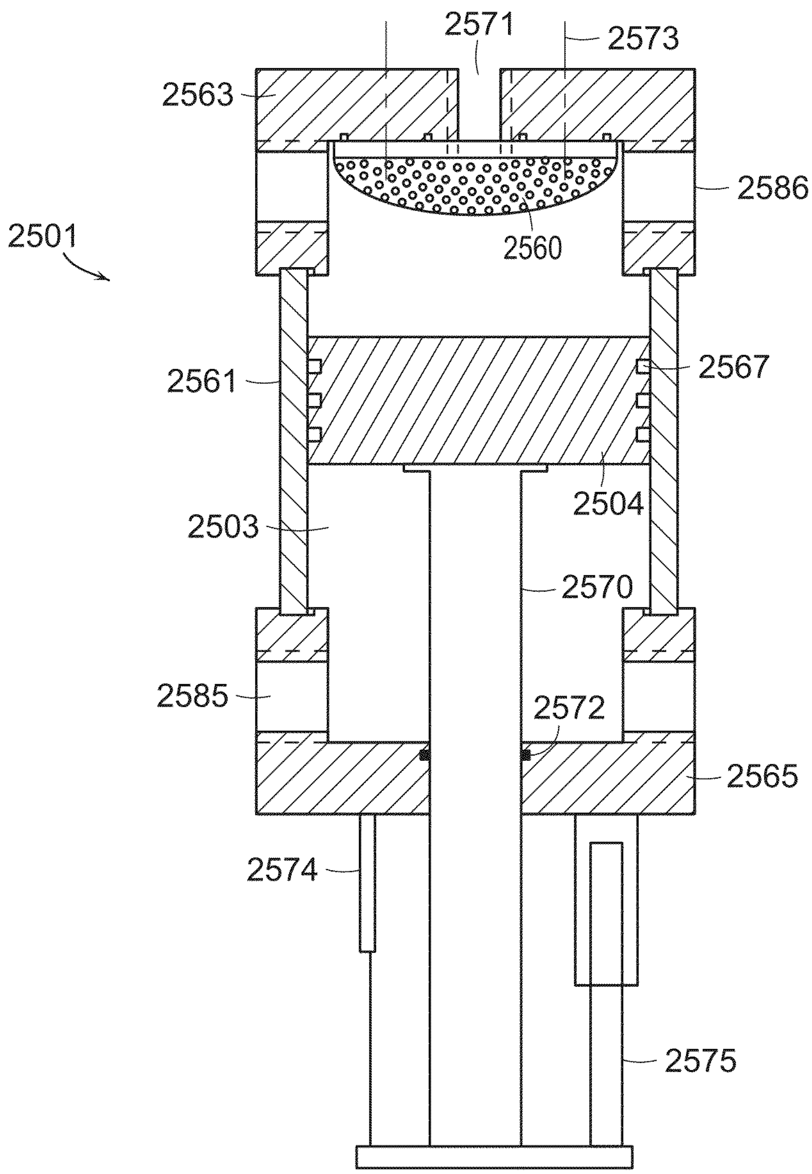
FIG. 25 is a detailed schematic plan view in partial cross-section of a cylinder design for use in any of the foregoing embodiments of the invention described herein for expedited heat transfer to gas expanding (or being compressed) in an open-air staged hydraulic-pneumatic system in accordance with one embodiment of the invention.

FIG. 25 is a detailed schematic diagram of a cylinder design for use with any of the previously described open-air staged hydraulic-pneumatic systems for energy storage and recovery using compressed gas. In particular, the cylinder 2501 depicted in partial cross-section in FIG. 25 includes a spray head arrangement 2560 similar to that described with respect to FIG. 22, where water is sprayed downward into a vertical cylinder. As shown, the vertically oriented hydraulic-pneumatic cylinder 2501 has a hydraulic side 2503 separated from a pneumatic side 2502 by a moveable piston 2504. The cylinder 2501 also includes two end caps (e.g., machined steel blocks) 2563, 2565, mounted on either end of a honed cylindrical tube 2561, typically attached via tie rods or other well-known mechanical means. The piston 2504 is slidably disposed in and sealingly engaged with the tube 2561 via seals 2567. End cap 2565 is machined with single or multiple ports 2585, which allow for the flow of hydraulic fluid. End cap 2563 is machined with single or multiple ports 2586, which can admit air and/or heat exchange fluid. The ports 2585, 2586 shown have threaded connections; however, other types of ports/connections are contemplated and within the scope of the invention (e.g., flanged).

Also illustrated is an optional piston rod 2570 that can be attached to the moveable piston 2504, allowing for position measurement via a displacement transducer 2574 and piston damping via an external cushion 2575, as necessary. The piston rod 2570 moves into and out of the hydraulic side 2503 through a machined hole with a rod seal 2572. The spray head 2560 in this illustration is inset within the end cap 2563 and attached to a heat exchange liquid (e.g., water) port 2571 via, for example, blind retaining fasteners 2573. Other mechanical fastening means are contemplated and within the scope of the invention.

Figure 26:
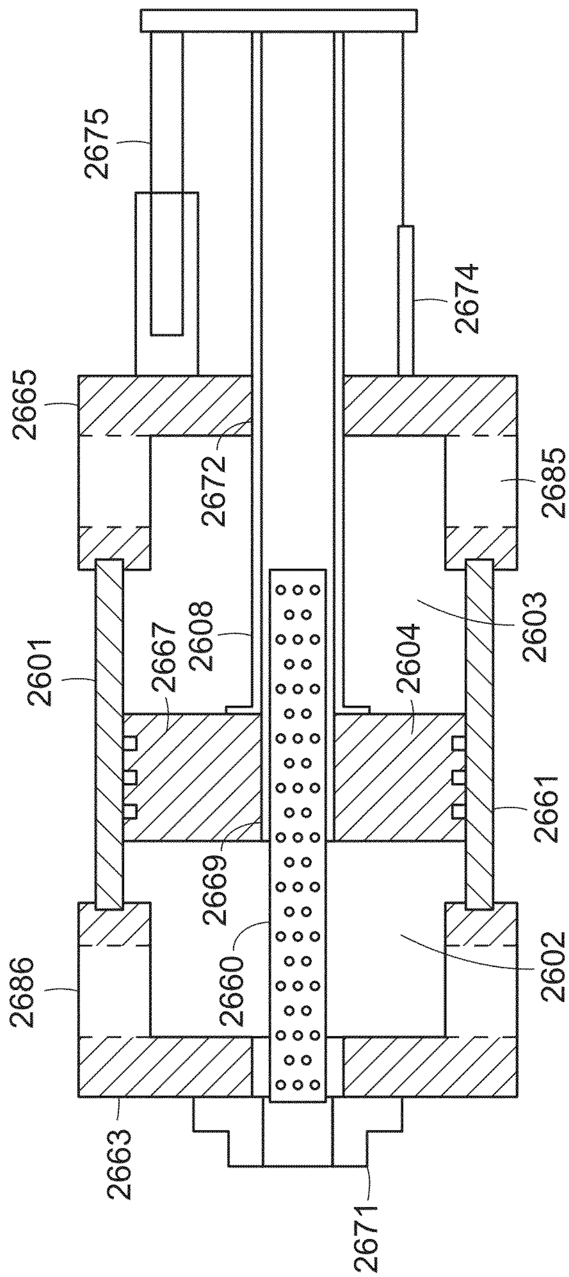
FIG. 26 is a detailed schematic plan view in partial cross-section of a cylinder design for use in any of the foregoing embodiments of the invention described herein for expedited heat transfer to gas expanding (or being compressed) in an open-air staged hydraulic-pneumatic system in accordance with one embodiment of the invention.

FIG. 26 is a detailed schematic diagram of a cylinder design for use with any of the previously described open-air staged hydraulic-pneumatic systems for energy storage and recovery using compressed gas. In particular, the cylinder 2601 depicted in partial cross-section in FIG. 26 includes a spray rod arrangement 2660 similar to that described with respect to FIG. 23, where water is sprayed radially via an installed spray rod into an arbitrarily-oriented cylinder. As shown, the arbitrarily-oriented hydraulic-pneumatic cylinder 2601 includes a hydraulic side 2603 separated from a pneumatic side 2602 by a moveable piston 2604. The cylinder 2601 includes two end caps (e.g., machined steel blocks) 2663, 2665, mounted on either end of a honed cylindrical tube 2661, typically attached via tie rods or other well-known mechanical means. The piston 2604 is slidably disposed in and sealingly engaged with the tube 2661 via seals 2667. End cap 2665 is machined with single or multiple ports 2685, which allow for the flow of hydraulic fluid. End cap 2663 is machined with single or multiple ports 2686, which can admit air and/or heat exchange liquid. The ports 2685, 2686 shown have threaded connections; however, other types of ports/connections are contemplated and within the scope of the invention (e.g., flanged).

A hollow piston rod 2608 is attached to the moveable piston 2604 and slides over the spray rod 2660 that is fixed to and oriented coaxially with the cylinder 2601. The spray rod 2660 extends through a machined hole 2669 in the piston 2604. The piston 2604 is configured to move freely along the length of the spray rod 2660. As the moveable piston 2604 moves towards end cap 2665, the hollow piston rod 2608 extends out of the cylinder 2601 exposing more of the spray rod 2660, such that the entire pneumatic side 2602 is exposed to heat exchange spray (see, for example, FIG. 23B). The spray rod 2660 in this illustration is attached to the end cap 2663 and in fluid communication with a heat exchange liquid port 2671. As shown in FIG. 26, the port 2671 is mechanically coupled to and sealed with the end cap 2663; however, the port 2671 could also be a threaded connection machined in the end cap 2663. The hollow piston rod 2608 also allows for position measurement via displacement transducer 2674 and piston damping via an external cushion 2675. As shown in FIG. 26, the piston rod 2608 moves into and out of the hydraulic side 2603 through a machined hole with rod seal 2672.

Figure 27:
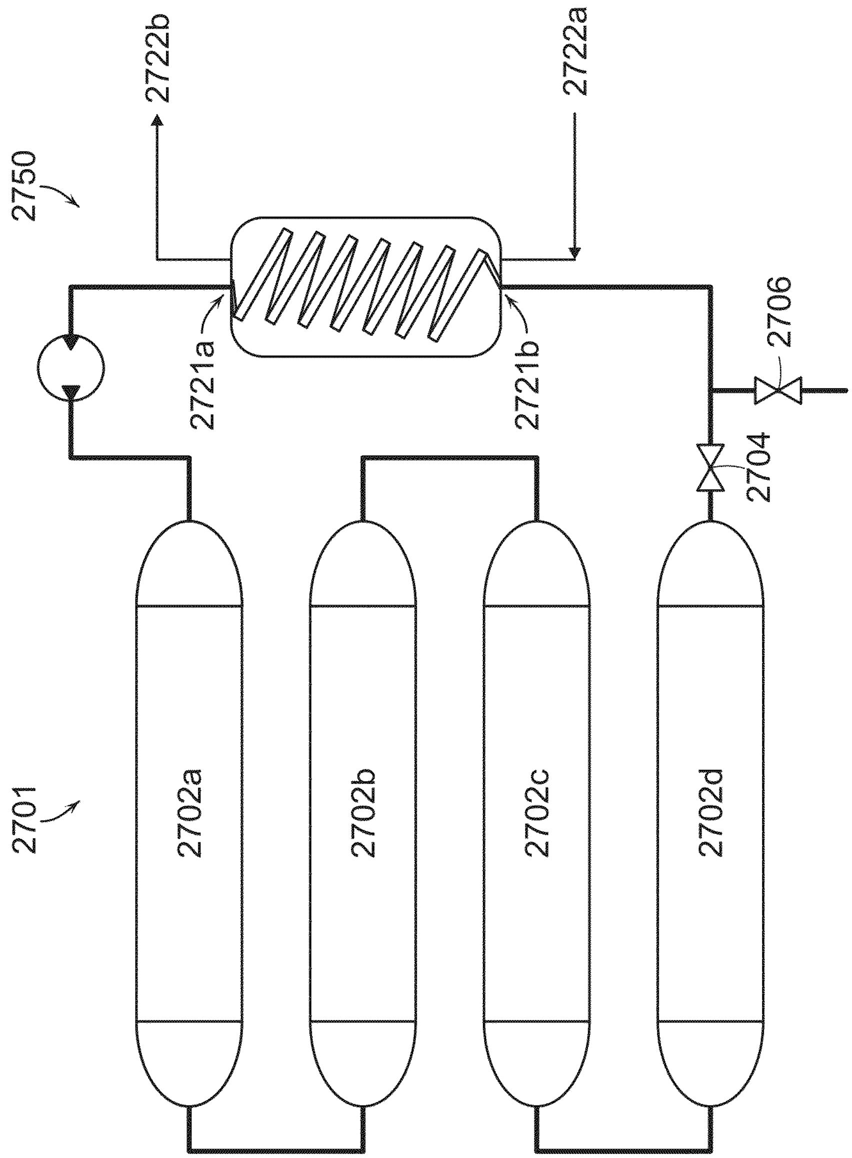
FIG. 27 is a schematic diagram of a compressed-gas storage subsystem for use with systems and methods for heating and cooling compressed gas in energy storage systems in accordance with one embodiment of the invention.
Figure 28:
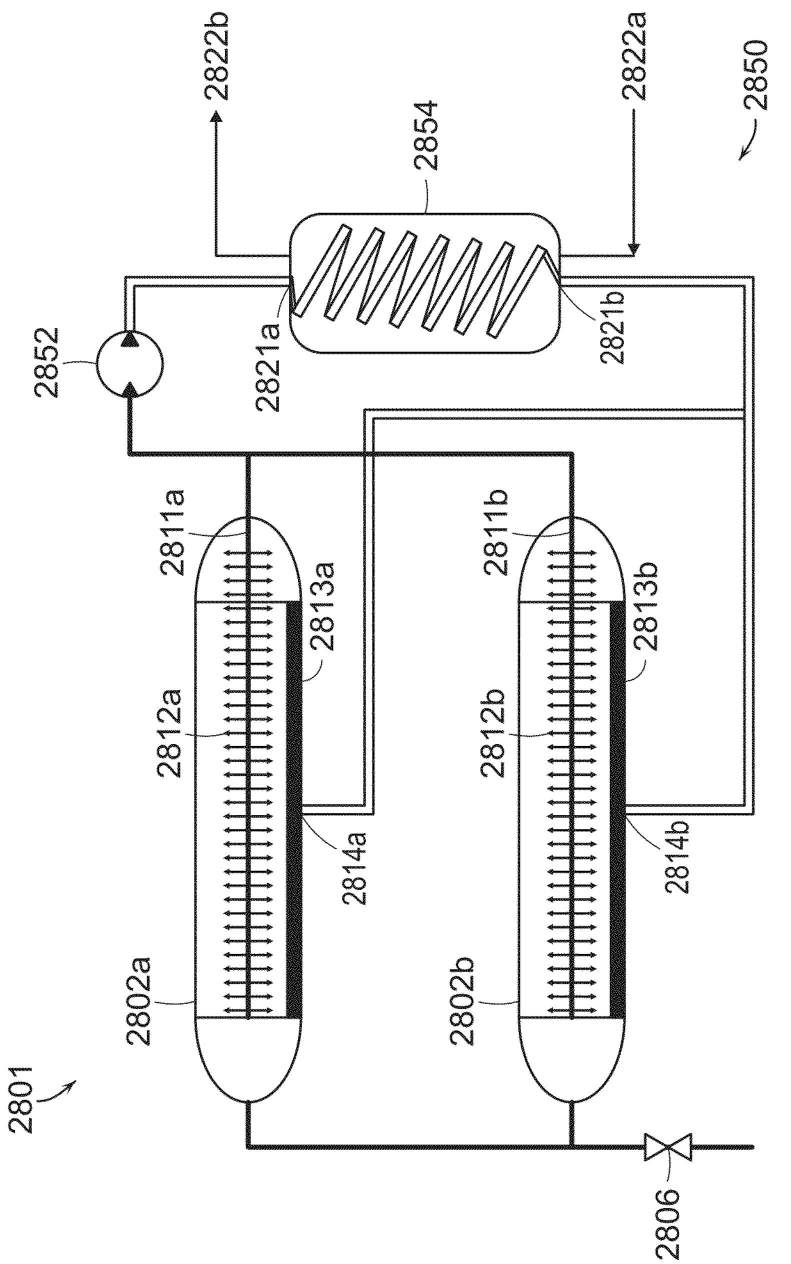
FIG. 28 is a schematic diagram of a compressed-gas storage subsystem for use with systems and methods for heating and cooling of compressed gas for energy storage systems in accordance with an alternative embodiment of the invention.

It should be noted that the heat transfer subsystems discussed above with respect to FIGS. 9-13 and 15-23 could also be used in conjunction with the high pressure gas storage systems (e.g., storage tanks 902) to thermally condition the pressurized gas stored therein, as shown in FIGS. 27 and 28. Generally, these systems are arranged and operate in the same manner as described above.

FIG. 27 depicts the use of a heat transfer subsystem 2750 in conjunction with a gas storage system 2701 for use with the compressed gas energy storage systems described herein, to expedite transfer of thermal energy to, for example, the compressed gas prior to and during expansion. Compressed air from the pressure vessels (2702*a*-2702*d*) is circulated through a heat exchanger 2754 using an air pump 2752 operating as a circulator. The air pump 2752 operates with a small pressure change sufficient for circulation, but within a housing that is able to withstand high pressures. The air pump 2752 circulates the high-pressure air through the heat exchanger 2754 without substantially increasing its pressure (e.g., a 50 psi increase for 3000 psi air). In this way, the stored compressed air can be pre-heated (or pre-cooled) by opening valve 2704 with valve 2706 closed and heated during expansion or cooled during compression by closing 2704 and opening 2706. The heat exchanger 2754 can be any sort of standard heat-exchanger design; illustrated here as a tube-in-shell type heat exchanger with high-pressure air inlet and outlet ports 2721*a* and 2721*b*, and low-pressure shell water ports 2722*a* and 2722*b*.

FIG. 28 depicts the use of a heat transfer subsystem 2850 in conjunction with a gas storage system 2801 for use with the compressed gas in energy storage systems described herein, to expedite transfer of thermal energy to the compressed gas prior to and during expansion. In this embodiment, thermal energy transfer to and from the stored compressed gas in pressure vessels (2802*a*-2802*b*) is expedited through a water circulation scheme using a water pump 2852 and heat exchanger 2854. The water pump 2852 operates with a small pressure change sufficient for circulation and spray, but within a housing that is able to withstand high pressures. The water pump 2852 circulates high-pressure water through heat exchanger 2854 and sprays the water into pressure vessels 2802, without substantially increasing its pressure (e.g., a 100 psi increase for circulating and spraying within 3000 psi stored compressed air). In this way, the stored compressed air can be pre-heated (or pre-cooled) using a water circulation and spraying method that also allows for active water monitoring of the pressure vessels 2802.

The spray heat exchange can occur both as pre-heating prior to expansion or pre-cooling prior to compression in the system when valve 2806 is opened. The heat exchanger 2854 can be any sort of standard heat exchanger design; illustrated here as a tube-in-shell type heat exchanger with high-pressure water inlet and outlet ports 2821*a* and 2821*b* and low pressure shell water ports 2822*a* and 2822*b*. As liquid to liquid heat exchangers tend to be more efficient than air to liquid heat exchangers, heat exchanger size can be reduced and/or heat transfer may be improved by use of the liquid to liquid heat exchanger. Heat exchange within the pressure vessels 2802 is expedited by active spraying of the liquid (e.g., water) into the pressure vessels 2802.

As shown in FIG. 28, a perforated spray rod 2811*a*, 2811*b* is installed within each pressure vessel 2802*a*, 2802*b*. The water pump 2852 increases the water pressure above the vessel pressure such that water is actively circulated and sprayed out of rods 2811*a* and 2811*b*, as shown by arrows 2812*a*, 2812*b*. After spraying through the volume of the pressure vessels 2802, the water settles to the bottom of the vessels 2802 (see 2813*a*, 2813*b*) and is then removed through a drainage port 2814*a*, 2814*b*. The water can be circulated through the heat exchanger 2854 as part of the closed-loop water circulation and spray system.

Alternative systems and methods for energy storage and recovery are described with respect to FIGS. 29-31. These systems and methods are similar to the energy storage and recovery systems described above, but use distinct pneumatic and hydraulic free-piston cylinders, mechanically coupled to each other by a mechanical boundary mechanism, rather than a single pneumatic-hydraulic cylinder, such as an intensifier. These systems allow the heat transfer subsystems for conditioning the gas being expanded (or compressed) to be separated from the hydraulic circuit. In addition, by mechanically coupling one or more pneumatic cylinders and/or one or more hydraulic cylinders so as to add (or share) forces produced by (or acting on) the cylinders, the hydraulic pressure range may be narrowed, allowing more efficient operation of the hydraulic motor/pump.

The systems and methods described with respect to FIGS. 29-31 generally operate on the principle of transferring mechanical energy between two or more cylinder assemblies using a mechanical boundary mechanism to mechanically couple the cylinder assemblies and translate the linear motion produced by one cylinder assembly to the other cylinder assembly. In one embodiment, the linear motion of the first cylinder assembly is the result of a gas expanding in one chamber of the cylinder and moving a piston within the cylinder. The translated linear motion in the second cylinder assembly is converted into a rotary motion of a hydraulic motor, as the linear motion of the piston in the second cylinder assembly drives a fluid out of the cylinder and to the hydraulic motor. The rotary motion is converted to electricity by using a rotary electric generator.

The basic operation of a compressed-gas energy storage system for use with the cylinder assemblies described with respect to FIGS. 29-31 is as follows: The gas is expanded into a cylindrical chamber (i.e., the pneumatic cylinder assembly) containing a piston or other mechanism that separates the gas on one side of the chamber from the other, thereby preventing gas movement from one chamber to the other while allowing the transfer of force/pressure from one chamber to the other.

A shaft attached to and extending from the piston is attached to an appropriately sized mechanical boundary mechanism that communicates force to the shaft of a hydraulic cylinder, also divided into two chambers by a piston. In one embodiment, the active area of the piston of the hydraulic cylinder is smaller than the area of the pneumatic piston, resulting in an intensification of pressure (i.e., the ratio of the pressure in the chamber undergoing compression in the hydraulic cylinder to the pressure in the chamber undergoing expansion in the pneumatic cylinder) proportional to the difference in piston areas. The hydraulic fluid pressurized in the hydraulic cylinder can be used to turn a hydraulic motor/pump, either fixed-displacement or variable-displacement, whose shaft may be affixed to that of a rotary electric motor/generator in order to produce electricity. Heat transfer subsystems, such as those described above, can be combined with these compressed-gas energy storage systems to expand/compress the gas as nearly isothermal as possible to achieve maximum efficiency.

Figure 29A:
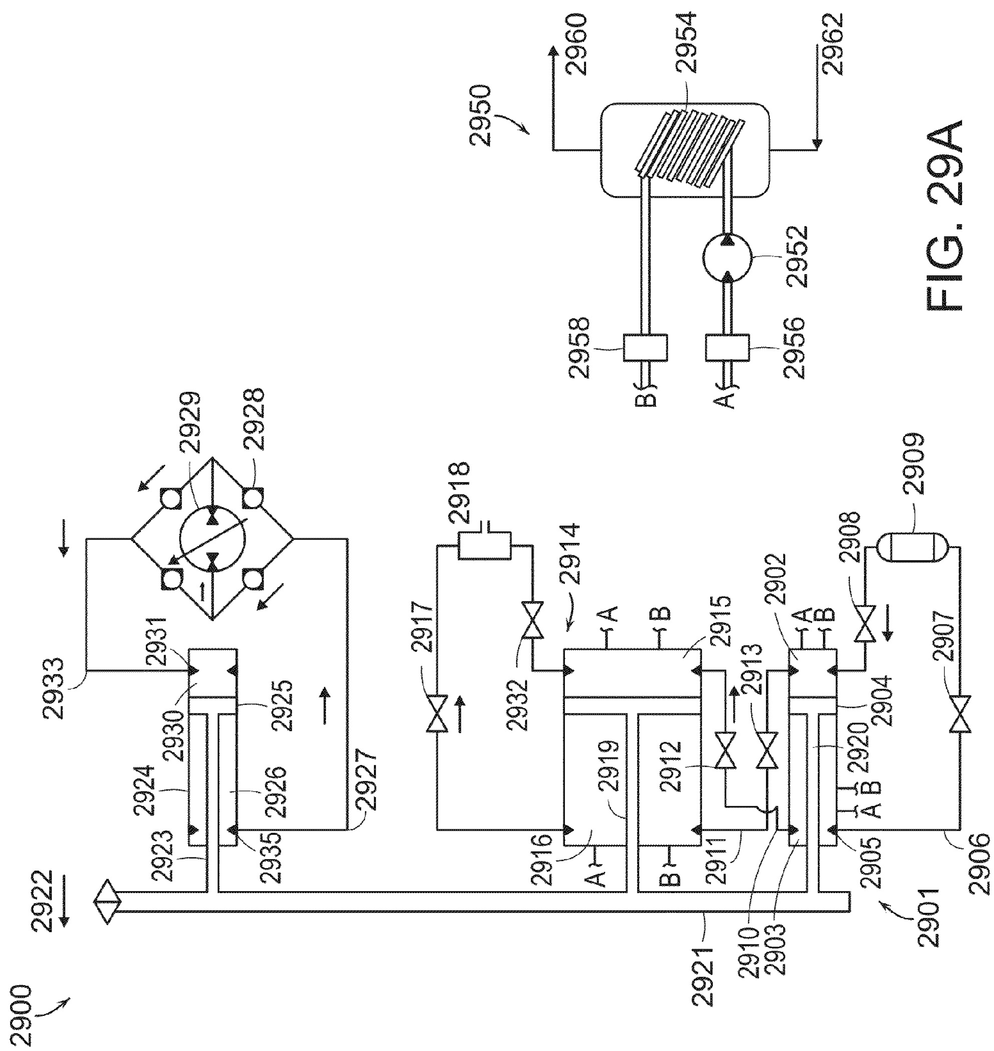
FIGS. 29A and 29B are schematic diagrams of a staged hydraulic-pneumatic energy conversion system including a heat transfer subsystem in accordance with one embodiment of the invention.
Figure 29B:
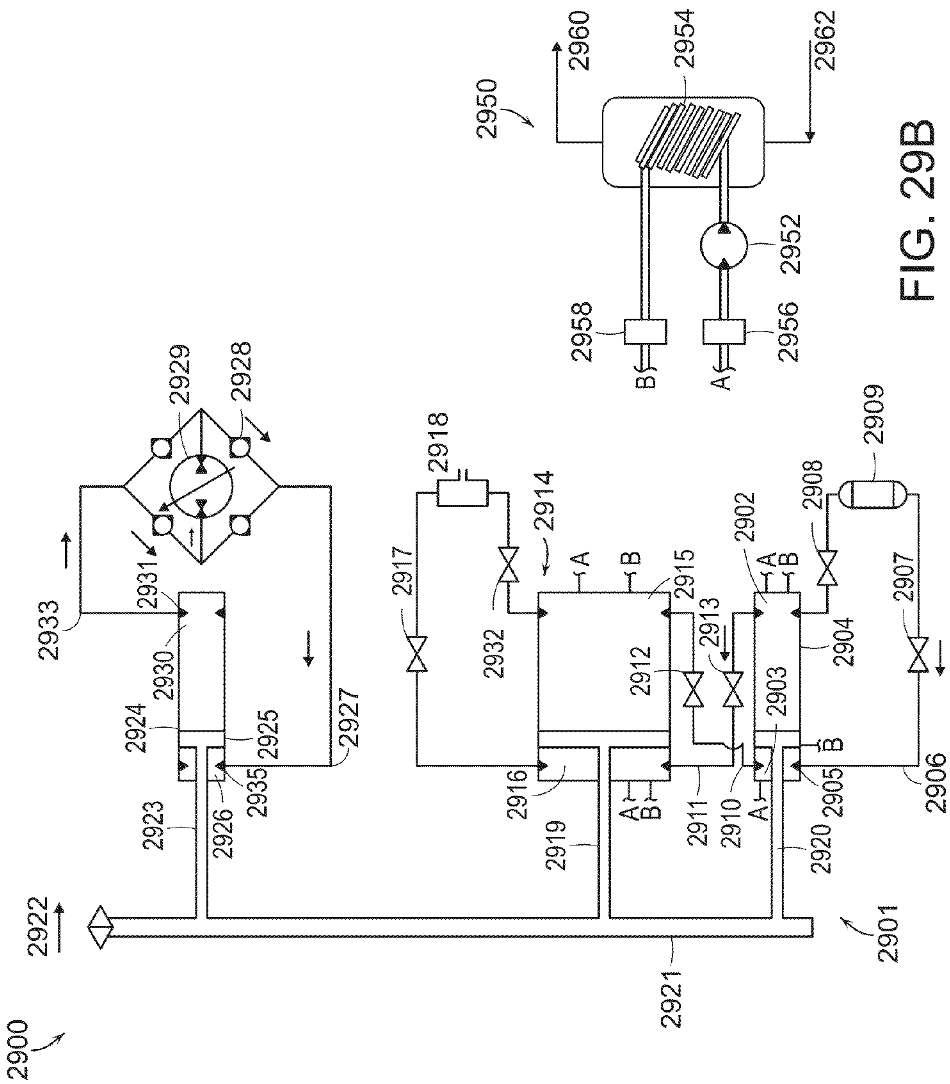

FIGS. 29A and 29B are schematic diagrams of a system for using compressed gas to operate two series-connected, double-acting pneumatic cylinders coupled to a single double-acting hydraulic cylinder to drive a hydraulic motor/generator to produce electricity (i.e., gas expansion). If the motor/generator is operated as a motor rather than as a generator, the identical mechanism can employ electricity to produce pressurized stored gas (i.e.; gas compression). FIG. 29A depicts the system in a first phase of operation and FIG. 29B depicts the system in a second phase of operation, where the high- and low-pressure sides of the pneumatic cylinders are reversed and the direction of hydraulic motor shaft motion is reversed, as discussed in greater detail hereinbelow.

Generally, the expansion of the gas occurs in multiple stages, using the low- and high-pressure pneumatic cylinders. For example, in the case of two pneumatic cylinders as shown in FIG. 29A, high-pressure gas is expanded in the high pressure pneumatic cylinder from a maximum pressure (e.g., 3000 PSI) to some mid-pressure (e.g., 300 PSI); then this mid-pressure gas is further expanded (e.g., 300 PSI to 30 PSI) in the separate low-pressure cylinder. These two stages are coupled to the common mechanical boundary mechanism that communicates force to the shaft of the hydraulic cylinder. When each of the two pneumatic pistons reaches the limit of its range of motion, valves or other mechanisms can be adjusted to direct higher-pressure gas to, and vent lower-pressure gas from, the cylinder's two chambers so as to produce piston motion in the opposite direction. In double-acting devices of this type, there is no withdrawal stroke or unpowered stroke, i.e., the stroke is powered in both directions.

The chambers of the hydraulic cylinder being driven by the pneumatic cylinders may be similarly adjusted by valves or other mechanisms to produce pressurized hydraulic fluid during the return stroke. Moreover, check valves or other mechanisms may be arranged so that regardless of which chamber of the hydraulic cylinder is producing pressurized fluid, a hydraulic motor/pump is driven in the same rotation by that fluid. The rotating hydraulic motor/pump and electrical motor/generator in such a system do not reverse their direction of rotation when piston motion reverses, so that with the addition of a short-term-energy-storage device, such as a flywheel, the resulting system can be made to generate electricity continuously (i.e., without interruption during piston reversal).

As shown in FIG. 29A, the system 2900 consists of a first pneumatic cylinder 2901 divided into two chambers 2902, 2903 by a piston 2904. The cylinder 2901, which is shown in a horizontal orientation in this illustrative embodiment, but may be arbitrarily oriented, has one or more gas circulation ports 2905 that are connected via piping 2906 and valves 2907, 2908 to a compressed reservoir or storage system 2909. The pneumatic cylinder 2901 is connected via piping 2910, 2911 and valves 2912, 2913 to a second pneumatic cylinder 2914 operating at a lower pressure than the first. Both cylinders 2901, 2914 are double-acting and are attached in series (pneumatically) and in parallel (mechanically). Series attachment of the two cylinders 2901, 2914 means that gas from the lower-pressure chamber of the high-pressure cylinder 2901 is directed to the higher-pressure chamber of the low-pressure cylinder 2914.

Pressurized gas from the reservoir 2909 drives the piston 2904 of the double-acting high-pressure cylinder 2901. Intermediate-pressure gas from the lower-pressure side 2903 of the high-pressure cylinder 2901 is conveyed through a valve 2912 to the higher-pressure chamber 2915 of the lower-pressure cylinder 2914. Gas is conveyed from the lower-pressure chamber 2916 of the lower-pressure cylinder 2914 through a valve 2917 to a vent 2918. The function of this arrangement is to reduce the range of pressures over which the cylinders jointly operate.

The piston shafts 2920, 2919 of the two cylinders 2901, 2914 act jointly to move the mechanical boundary mechanism 2921 in the direction indicated by the arrow 2922. The mechanical boundary mechanism is also connected to the piston shaft 2923 of the hydraulic cylinder 2924. The piston 2925 of the hydraulic cylinder 2924, impelled by the mechanical boundary mechanism 2921, compresses hydraulic fluid in the chamber 2926. This pressurized hydraulic fluid is conveyed through piping 2927 to an arrangement of check valves 2928 that allow the fluid to flow in one direction (shown by the arrows) through a hydraulic motor/pump, either fixed-displacement or variable-displacement, whose shaft drives an electric motor/generator. For convenience, the combination of hydraulic pump/motor and electric motor/generator is shown as a single hydraulic power unit 2929. Hydraulic fluid at lower pressure is conducted from the output of the hydraulic motor/pump 2929 to the lower-pressure chamber 2930 of the hydraulic cylinder 2924 through a hydraulic circulation port 2931.

Reference is now made to FIG. 29B, which depicts the system 2900 of FIG. 29A in a second operating state, where valves 2907, 2913, and 2932 are open and valves 2908, 2912, and 2917 are closed. In this state, gas flows from the high-pressure reservoir 2909 through valve 2907 into chamber 2903 of the high-pressure pneumatic cylinder 2901. Lower-pressure gas is vented from the other chamber 2902 via valve 2913 to chamber 2916 of the lower-pressure pneumatic cylinder 2914. The piston shafts 2919, 2920 of the two cylinders act jointly to move the mechanical boundary mechanism 2921 in the direction indicated by the arrow 2922. The mechanical boundary mechanism 2921 translates the movement of shafts 2919, 2920 to the piston shaft 2923 of the hydraulic cylinder 2924. The piston 2925 of the hydraulic cylinder 2924, impelled by the mechanical boundary mechanism 2921, compresses hydraulic fluid in the chamber 2930. This pressurized hydraulic fluid is conveyed through piping 2933 to the aforementioned arrangement of check valves 2928 and the hydraulic power unit 2929. Hydraulic fluid at a lower pressure is conducted from the output of the hydraulic motor/pump 2929 to the lower-pressure chamber 2926 of the hydraulic cylinder 2924 through a hydraulic circulation port 2935.

As shown in FIGS. 29A and 29B, the stroke volumes of the two chambers of the hydraulic cylinder 2924 differ by the volume of the shaft 2923. The resulting imbalance in fluid volumes expelled from the cylinder 2924 during the two stroke directions shown in FIGS. 29A and 29B can be corrected either by a pump (not shown) or by extending the shaft 2923 through the entire length of both chambers 2926, 2930 of the cylinder 2924, so that the two stroke volumes are equal.

As previously discussed, the efficiency of the various energy storage and recovery systems described herein can be increased by using a heat transfer subsystem. Accordingly, the system 2900 shown in FIGS. 29A and 29B includes a heat transfer subsystem 2950 similar to those described above. Generally, the heat transfer subsystem 2950 includes a fluid circulator 2952 and a heat exchanger 2954. The subsystem 2950 also includes two directional control valves 2956, 2958 that selectively connect the subsystem 2950 to one or more chambers of the pneumatic cylinders 2901, 2914 via pairs of gas ports on the cylinders 2901, 2914 identified as A and B. Typically, ports A and B are located on the ends/end caps of the pneumatic cylinders. For example, the valves 2956, 2958 can be positioned to place the subsystem 2950 in fluidic communication with chamber 2903 during gas expansion therein, so as to thermally condition the gas expanding in the chamber 2903. The gas can be thermally conditioned by any of the previously described methods, for example, the gas from the selected chamber can be circulated through the heat exchanger. Alternatively, a heat exchange liquid could be circulated through the selected gas chamber and any of the previously described spray arrangement for heat exchange can be used. During expansion (or compression), a heat exchange liquid (e.g., water) can be drawn from a reservoir (not shown, but similar to those described above with respect to FIG. 22) by the circulator 2954, circulated through a liquid to liquid version of the heat exchanger 2954, which may be a shell and tube type with an input 2960 and an output 2962 from the shell running to an environmental heat exchanger or to a source of process heat, cold water, or other external heat exchange medium.

FIGS. 30A-30D depict an alternative embodiment of the system of FIG. 29 modified to have a single pneumatic cylinder and two hydraulic cylinders. A decreased range of hydraulic pressures, with consequently increased motor/pump and motor/generator efficiencies, can be obtained by using two or more hydraulic cylinders. These two cylinders are connected to the aforementioned mechanical boundary mechanism for communicating force with the pneumatic cylinder. The chambers of the two hydraulic cylinders are attached to valves, lines, and other mechanisms in such a manner that either cylinder can, with appropriate adjustments, be set to present no resistance as its shaft is moved (i.e., compress no fluid).

Figure 30A:
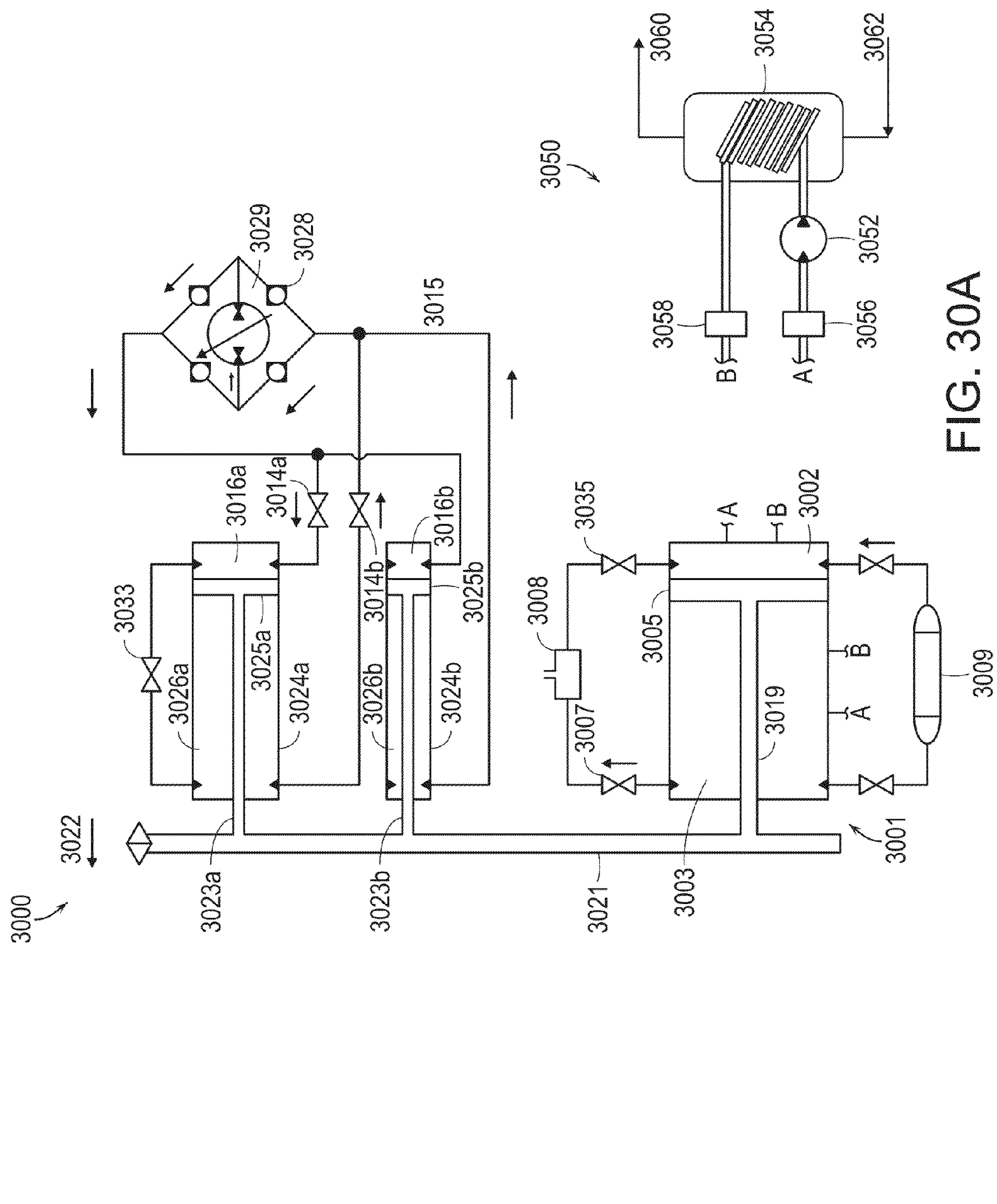
FIGS. 30A-30D are schematic diagrams of a staged hydraulic-pneumatic energy conversion system including a heat transfer subsystem in accordance with an alternative embodiment of the invention.
Figure 30B:
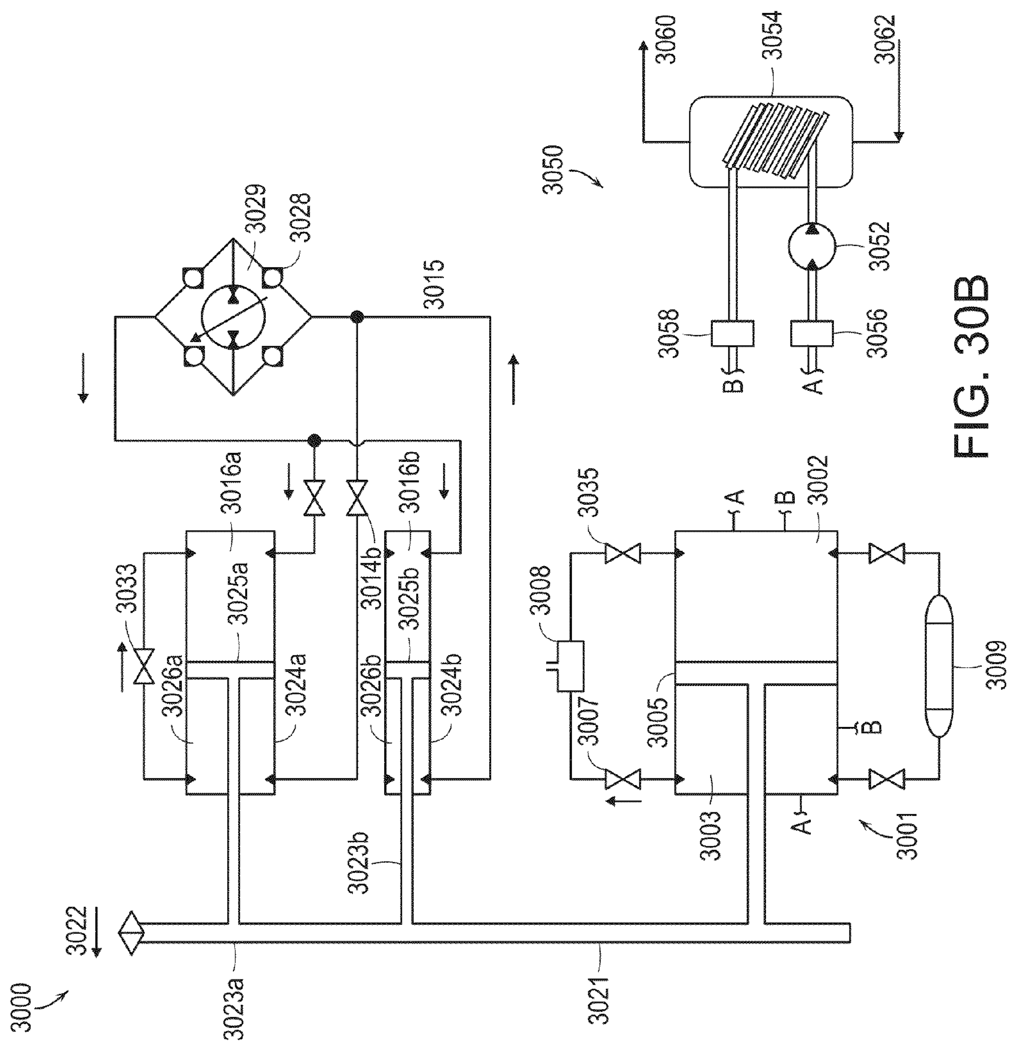
Figure 30C:
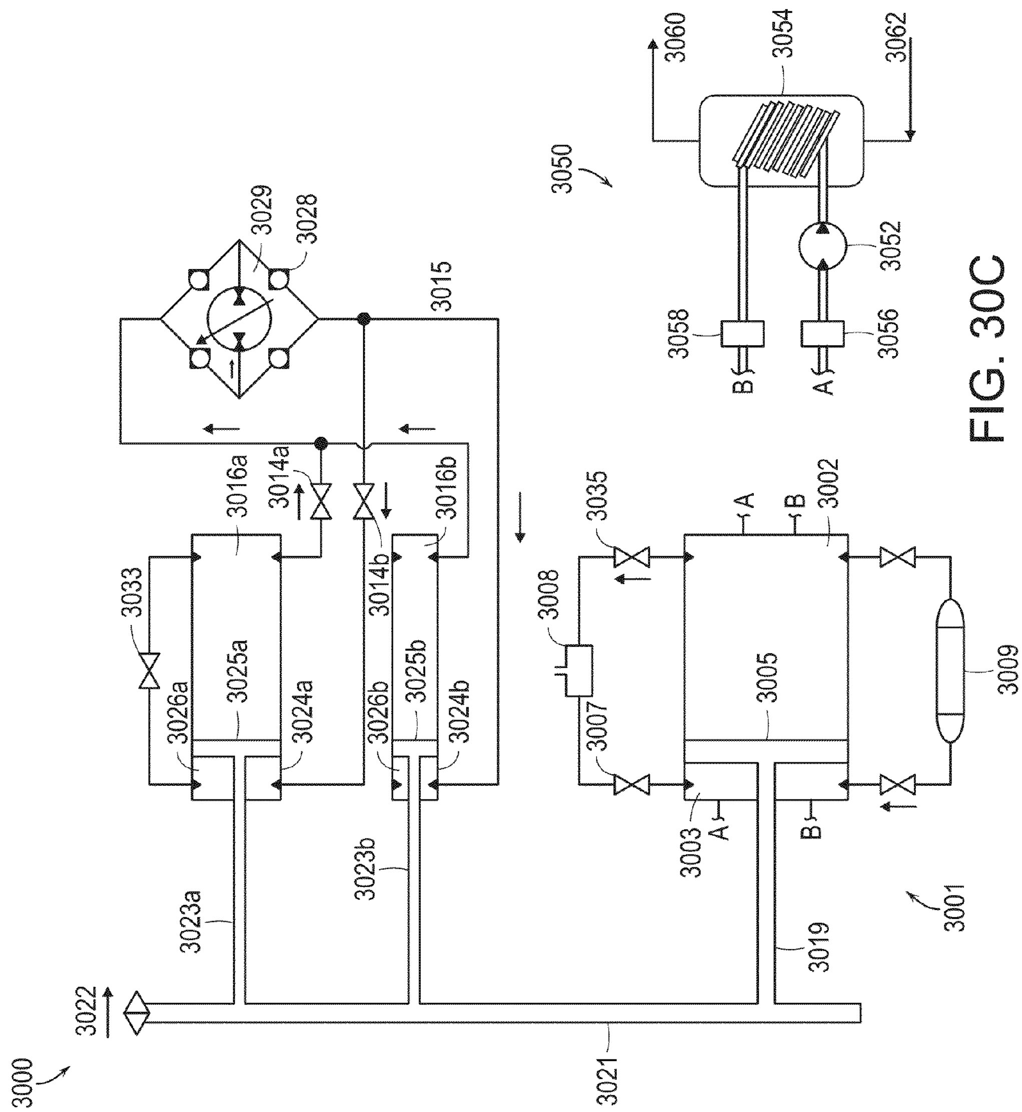
Figure 30D:
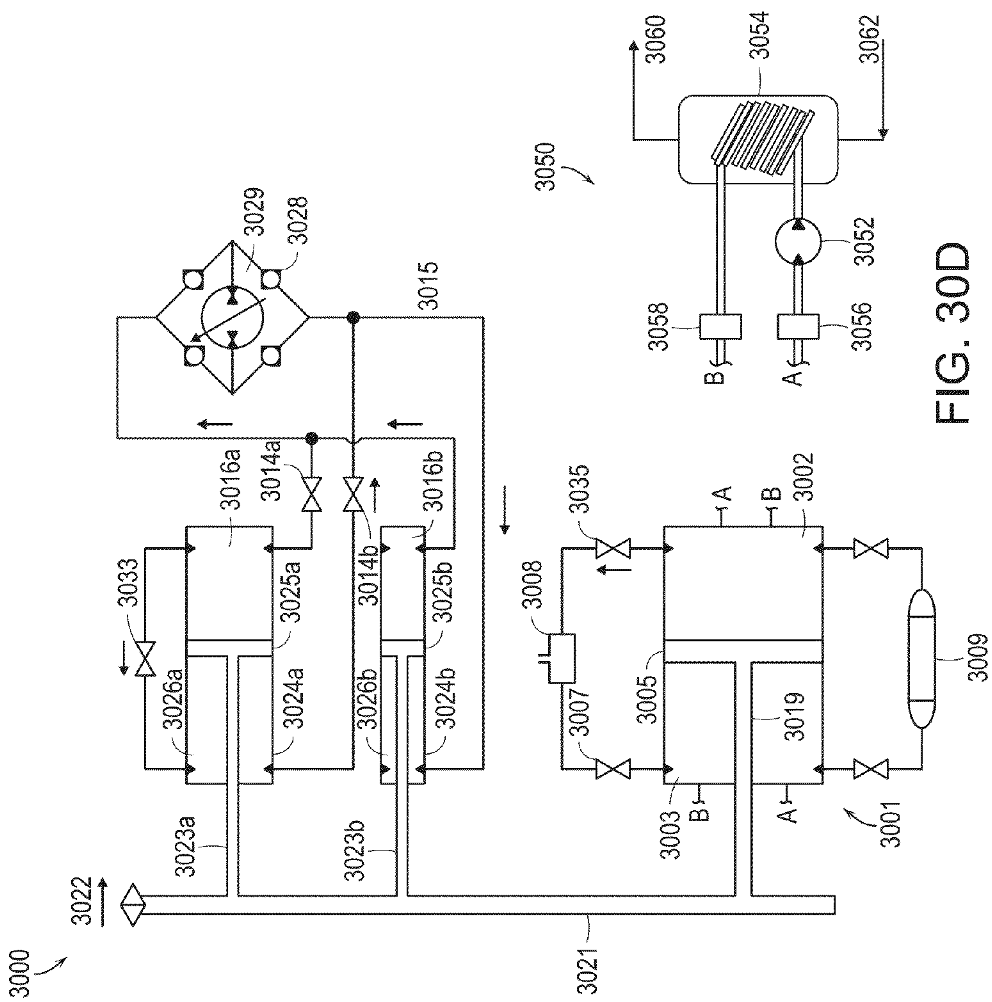

FIG. 30A depicts the system in a phase of operation where both hydraulic pistons are compressing hydraulic fluid. The effect of this arrangement is to decrease the range of hydraulic pressures delivered to the hydraulic motor as the force produced by the pressurized gas in the pneumatic cylinder decreases with expansion and as the pressure of the gas stored in the reservoir decreases. FIG. 30B depicts the system in a phase of operation where only one of the hydraulic cylinders is compressing hydraulic fluid. FIG. 30C depicts the system in a phase of operation where the high- and low-pressure sides of the hydraulic cylinders are reversed along with the direction of shafts and only the smaller bore hydraulic cylinder is compressing hydraulic fluid. FIG. 30D depicts the system in a phase of operation similar to FIG. 30C, but with both hydraulic cylinders compressing hydraulic fluid.

The system 3000 shown in FIG. 30A is similar to system 2900 described above and includes a single double-acting pneumatic cylinder 3001 and two double-acting hydraulic cylinders 3024*a*, 3024*b*, where one hydraulic cylinder 3024*a* has a larger bore than the other cylinder 3024*b*. In the state of operation shown, pressurized gas from the reservoir 3009 enters one chamber 3002 of the pneumatic cylinder 3001 and drives a piston 3005 slidably disposed in the pneumatic cylinder 3001. Low-pressure gas from the other chamber 3003 of the pneumatic cylinder 3001 is conveyed through a valve 3007 to a vent 3008. A shaft 3019 extending from the piston 3005 disposed in the pneumatic cylinder 3001 moves a mechanically coupled mechanical boundary mechanism 3021 in the direction indicated by the arrow 3022. The mechanical boundary mechanism 3021 is also connected to the piston shafts 3023*a*, 3023*b* of the double-acting hydraulic cylinders 3024*a*, 3024*b*.

In the current state of operation shown, valves 3014*a* and 3014*b* permit fluid to flow to hydraulic power unit 3029. Pressurized fluid from both cylinders 3024*a*, 3024*b* is conducted via piping 3015 to an arrangement of check valves 3028 and a hydraulic pump/motor connected to a motor/generator, thereby producing electricity. Hydraulic fluid at a lower pressure is conducted from the output of the hydraulic motor/pump to the lower-pressure chambers 3016*a*, 3016*b* of the hydraulic cylinders 3024*a*, 3024*b*. The fluid in the high-pressure chambers 3026*a*, 3026*b* of the two hydraulic cylinders 3024*a*, 3024*b* is at a single pressure, and the fluid in the low-pressure chambers 3016*a*, 3016*b* is also at a single pressure. In effect, the two cylinders 3024*a*, 3024*b* act as a single cylinder whose piston area is the sum of the piston areas of the two cylinders and whose operating pressure, for a given driving force from the pneumatic piston 3001, is proportionately lower than that of either hydraulic cylinder acting alone.

Reference is now made to FIG. 30B, which shows another state of operation of the system 3000 of FIG. 30A. The action of the pneumatic cylinder 3001 and the direction of motion of all pistons is the same as in FIG. 30A. In the state of operation shown, formerly closed valve 3033 is opened to permit fluid to flow freely between the two chambers 3016*a*, 3026*a* of the larger bore hydraulic cylinder 3024*a*, thereby presenting minimal resistance to the motion of its piston 3025*a*. Pressurized fluid from the smaller bore cylinder 3024*b* is conducted via piping 3015 to the aforementioned arrangement of check valves 3028 and the hydraulic power unit 3029, thereby producing electricity. Hydraulic fluid at a lower pressure is conducted from the output of the hydraulic motor/pump to the lower-pressure chamber 3016*b* of the smaller bore hydraulic cylinder 3024*b*. In effect, the acting hydraulic cylinder 3024*b* having a smaller piston area provides a higher hydraulic pressure for a given force, than in the state shown in FIG. 30A, where both hydraulic cylinders 3024*a*, 3024*b* were acting with a larger effective piston area. Through valve actuations disabling one of the hydraulic cylinders, a narrowed hydraulic fluid pressure range is obtained.

Reference is now made to FIG. 30C, which shows another state of operation of the system 3000 of FIGS. 30A and 30B. In the state of operation shown, pressurized gas from the reservoir 3009 enters chamber 3003 of the pneumatic cylinder 3001, driving its piston 3005. Low-pressure gas from the other side 3002 of the pneumatic cylinder 3001 is conveyed through a valve 3035 to the vent 3008. The action of the mechanical boundary mechanism 3021 on the pistons 3023*a*, 3023*b* of the hydraulic cylinders 3024*a*, 3024*b* is in the opposite direction as that shown in FIG. 30B, as indicated by arrow 3022.

As in FIG. 30A, valves 3014*a*, 3014*b* are open and permit fluid to flow to the hydraulic power unit 3029. Pressurized fluid from both hydraulic cylinders 3024*a*, 3024*b* is conducted via piping 3015 to the aforementioned arrangement of check valves 3028 and the hydraulic power unit 3029, thereby producing electricity. Hydraulic fluid at a lower pressure is conducted from the output of the hydraulic motor/pump to the lower-pressure chambers 3026*a*, 3026*b* of the hydraulic cylinders 3024*a*, 3024*b*. The fluid in the high-pressure chambers 3016*a*, 3016*b* of the two hydraulic cylinders 3024*a*, 3024*b* is at a single pressure, and the fluid in the low-pressure chambers 3026*a*, 3026*b* is also at a single pressure. In effect, the two hydraulic cylinders 3024*a*, 3024*b* act as a single cylinder whose piston area is the sum of the piston areas of the two cylinders and whose operating pressure, for a given driving force from the pneumatic piston 3001, is proportionately lower than that of either hydraulic cylinder 3024*a*, 3024*b* acting alone.

Reference is now made to FIG. 30D, which shows another state of operation of the system 3000 of FIGS. 30A-30C. The action of the pneumatic cylinder 3001 and the direction of motion of all moving pistons is the same as in FIG. 30C. In the state of operation shown, formerly closed valve 3033 is opened to permit fluid to flow freely between the two chambers 3026*a*, 3016*a* of the larger bore hydraulic cylinder 3024*a*, thereby presenting minimal resistance to the motion of its piston 3025*a*. Pressurized fluid from the smaller bore cylinder 3024*b* is conducted via piping 3015 to the aforementioned arrangement of check valves 3028 and the hydraulic power unit 3029, thereby producing electricity. Hydraulic fluid at a lower pressure is conducted from the output of the hydraulic motor/pump to the lower-pressure chamber 3026*b* of the smaller bore hydraulic cylinder 3024*b*. In effect, the acting hydraulic cylinder 3024*b* having a smaller piston area provides a higher hydraulic pressure for a given force, than the state shown in FIG. 30C, where both cylinders were acting with a larger effective piston area. Through valve actuations disabling one of the hydraulic cylinders, a narrowed hydraulic fluid pressure range is obtained.

Additional valving could be added to cylinder 3024*b* such that it could be disabled to provide another effective hydraulic piston area (considering that 3024*a* and 3024*b* are not the same diameter cylinders) to somewhat further reduce the hydraulic fluid range for a given pneumatic pressure range. Likewise, additional hydraulic cylinders and valve arrangements could be added to substantially further reduce the hydraulic fluid range for a given pneumatic pressure range.

The operation of the exemplary system 3000 described above, where two or more hydraulic cylinders are driven by a single pneumatic cylinder, is as follows. Assuming that a quantity of high-pressure gas has been introduced into one chamber of that cylinder, as the gas begins to expand, moving the piston, force is communicated by the piston shaft and the mechanical boundary mechanism to the piston shafts of the two hydraulic cylinders. At any point during the expansion phase, the hydraulic pressure will be equal to the force divided by the acting hydraulic piston area. At the beginning of a stroke, when the gas in the pneumatic cylinder has only begun to expand, it is producing a maximum force; this force (ignoring frictional losses) acts on the combined total piston area of the hydraulic cylinders, producing a certain hydraulic output pressure, $HP_{max}$.

As the gas in the pneumatic cylinder continues to expand, it exerts a decreasing force. Consequently, the pressure developed in the compression chamber of the active cylinders decreases. At a certain point in the process, the valves and other mechanisms attached to one of the hydraulic cylinders is adjusted so that fluid can flow freely between its two chambers and thus offer no resistance to the motion of the piston (again ignoring frictional losses). The effective piston area driven by the force developed by the pneumatic cylinder thus decreases from the piston area of both hydraulic cylinders to the piston area of one of the hydraulic cylinders. With this decrease of area comes an increase in output hydraulic pressure for a given force. If this switching point is chosen carefully, the hydraulic output pressure immediately after the switch returns to $HP_{max}$. For an example where two identical hydraulic cylinders are used, the switching pressure would be at the half pressure point.

As the gas in the pneumatic cylinder continues to expand, the pressure developed by the hydraulic cylinder decreases. As the pneumatic cylinder reaches the end of its stroke, the force developed is at a minimum and so is the hydraulic output pressure, $HP_{min}$. For an appropriately chosen ratio of hydraulic cylinder piston areas, the hydraulic pressure range $HR=HP_{max}/HP_{min}$ achieved using two hydraulic cylinders will be the square root of the range HR achieved with a single pneumatic cylinder. The proof of this assertion is as follows.

Let a given output hydraulic pressure range $HR_1$ from high pressure $HP_{max}$ to low pressure $HP_{min}$, namely $HR_1=HP_{max}/HP_{min}$, be subdivided into two pressure ranges of equal magnitude $HR_2$. The first range is from $HP_{max}$ down to some intermediate pressure $HP_I$ and the second is from $HP_I$ down to $HP_{min}$. Thus, $HR_2=HP_{max}/HP_I=HP_I/HP_{min}$. From this identity of ratios, $HP_I=(HP_{max}/HP_{min})^{1/2}$. Substituting for $HP_I$ in $HR_2=HP_{max}/HP_I$, we obtain $HR_2=HP_{max}/(HP_{max}/HP_{min})^{1/2}=(HP_{max}HP_{min})^{1/2}=HR_1^{1/2}$.

Since $HP_{max}$ is determined (for a given maximum force developed by the pneumatic cylinder) by the combined piston areas of the two hydraulic cylinders ($HA_1+HA_2$), whereas $HP_I$ is determined jointly by the choice of when (i.e., at what force level, as force declines) to deactivate the second cylinder and by the area of the single acting cylinder $HA_1$, it is possible to choose the switching force point and $HA_1$ so as to produce the desired intermediate output pressure. It can be similarly shown that with appropriate cylinder sizing and choice of switching points, the addition of a third cylinder/stage will reduce the operating pressure range as the cube root, and so forth. In general, N appropriately sized cylinders can reduce an original operating pressure range $HR_1$ to $HR_1^{1/N}$.

In addition, for a system using multiple pneumatic cylinders (i.e., dividing the air expansion into multiple stages), the hydraulic pressure range can be further reduced. For M appropriately sized pneumatic cylinders (i.e., pneumatic air stages) for a given expansion, the original pneumatic operating pressure range $PR_I$ of a single stroke can be reduced to $PR_1^{1/M}$. Since for a given hydraulic cylinder arrangement the output hydraulic pressure range is directly proportional to the pneumatic operating pressure range for each stroke, simultaneously combining M pneumatic cylinders with N hydraulic cylinders can realize a pressure range reduction to the $1/(N\times M)$ power.

Furthermore, the system 3000 shown in FIGS. 30A-30D can also include a heat transfer subsystem 3050 similar to those described above. Generally, the heat transfer subsystem 3050 includes a fluid circulator 3052 and a heat exchanger 3054. The subsystem 3050 also includes two directional control valves 3056, 3058 that selectively connect the subsystem 3050 to one or more chambers of the pneumatic cylinder 3001 via pairs of gas ports on the cylinder 3001 identified as A and B. For example, the valves 3056, 3058 can be positioned to place the subsystem 3050 in fluidic communication with chamber 3003 during gas expansion therein, so as to thermally condition the gas expanding in the chamber 3003. The gas can be thermally conditioned by any of the previously described methods. For example, during expansion (or compression), a heat exchange liquid (e.g., water) can be drawn from a reservoir (not shown, but similar to those described above with respect to FIG. 22) by the circulator 3054, circulated through a liquid to liquid version of the heat exchanger 3054, which may be a shell and tube type with an input 3060 and an output 3062 from the shell running to an environmental heat exchanger or to a source of process heat, cold water, or other external heat exchange medium.

Figure 31A:
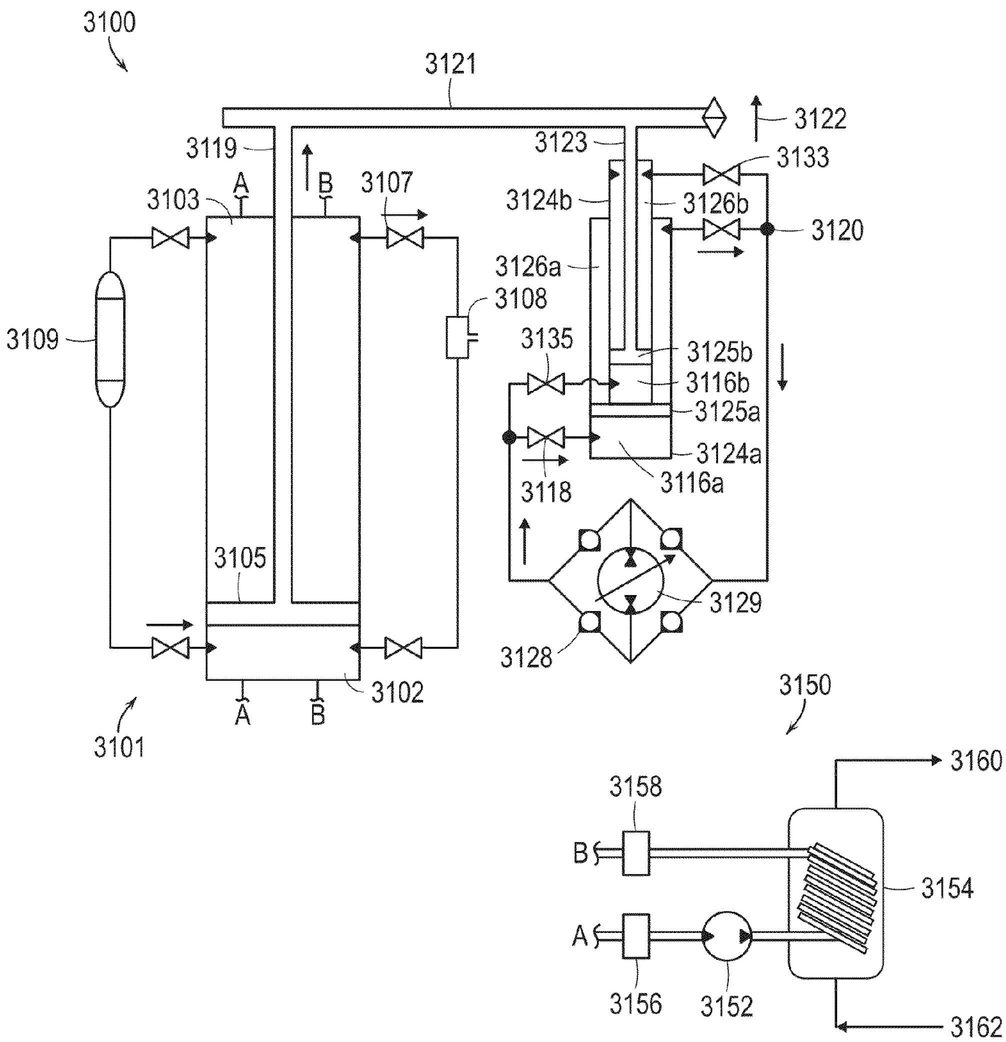
FIGS. 31A-31C are schematic diagrams of a staged hydraulic-pneumatic energy conversion system including a heat transfer subsystem in accordance with another alternative embodiment of the invention.
Figure 31B:
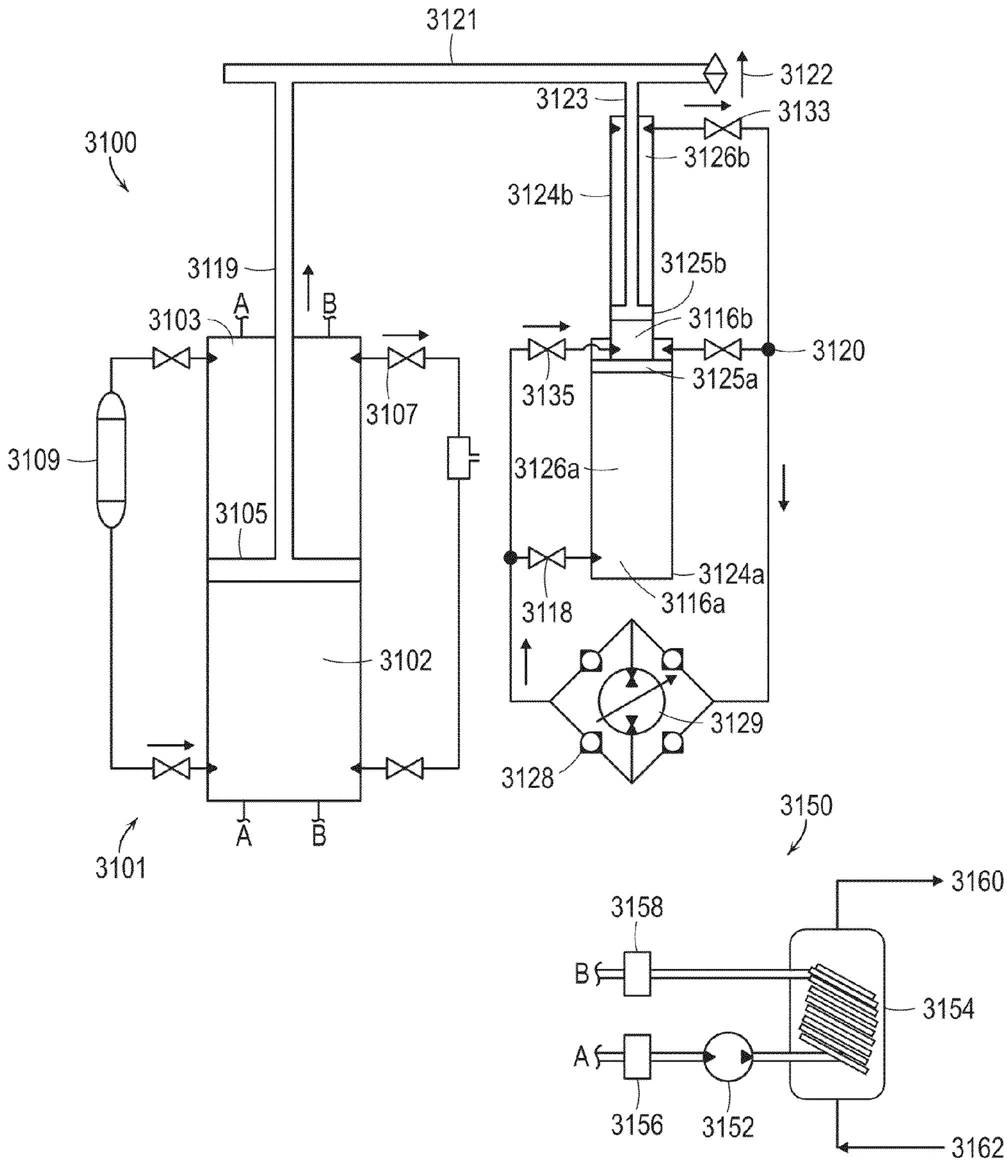
Figure 31C:
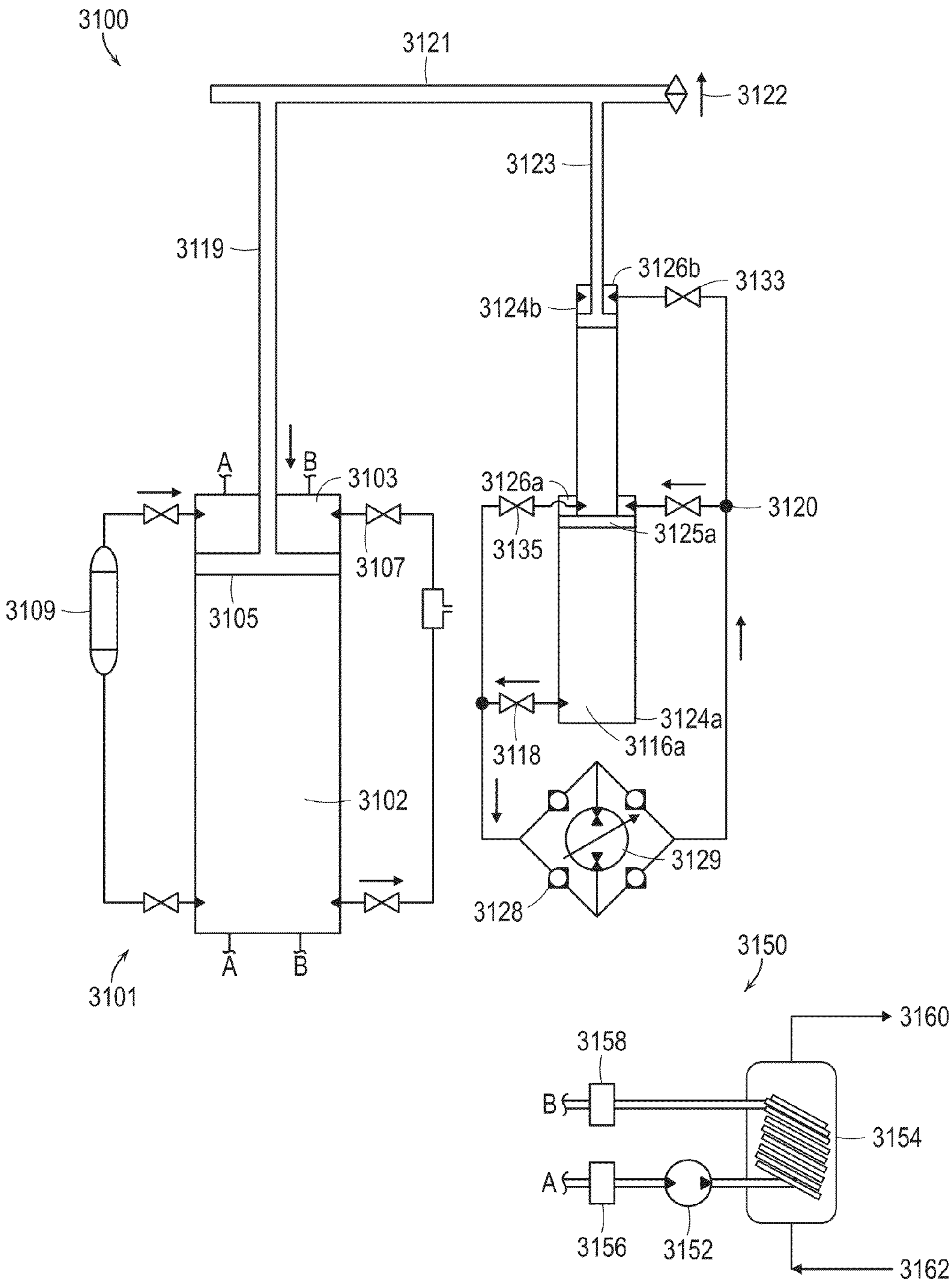

FIGS. 31A-31C depict an alternative embodiment of the system of FIG. 30, where the two side-by-side hydraulic cylinders have been replaced by two telescoping hydraulic cylinders. FIG. 31A depicts the system in a phase of operation where only the inner, smaller bore hydraulic cylinder is compressing hydraulic fluid. The effect of this arrangement is to decrease the range of hydraulic pressures delivered to the hydraulic motor as the force produced by the pressurized gas in the pneumatic cylinder decreases with expansion, and as the pressure of the gas stored in the reservoir decreases. FIG. 31B depicts the system in a phase of operation where the inner cylinder piston has moved to its limit in the direction of motion and is no longer compressing hydraulic fluid, and the outer, larger bore cylinder is compressing hydraulic fluid and the fully-extended inner cylinder acts as the larger bore cylinder's piston shaft. FIG. 31C depicts the system in a phase of operation where the direction of the motion of the cylinders and motor are reversed and only the inner, smaller bore cylinder is compressing hydraulic fluid.

The system 3100 shown in FIG. 31A is similar to those described above and includes a single double-acting pneumatic cylinder 3101 and two double-acting hydraulic cylinders 3124*a*, 3124*b*, where one cylinder 3124*b* is telescopically disposed inside the other cylinder 3124*a*. In the state of operation shown, pressurized gas from the reservoir 3109 enters a chamber 3102 of the pneumatic cylinder 3101 and drives a piston 3105 slidably disposed with the pneumatic cylinder 3101. Low-pressure gas from the other chamber 3103 of the pneumatic cylinder 3101 is conveyed through a valve 3107 to a vent 3108. A shaft 3119 extending from the piston 3105 disposed in the pneumatic cylinder 3101 moves a mechanically coupled mechanical boundary mechanism 3121 in the direction indicated by the arrow 3122. The mechanical boundary mechanism 3121 is also connected to the piston shafts 3123 of the telescopically arranged double-acting hydraulic cylinders 3124*a*, 3124*b*.

In the state of operation shown, the entire smaller bore cylinder 3124*b* acts as the shaft 3123 of the larger piston 3125*a* of the larger bore hydraulic cylinder 3124*a*. The piston 3125*a* and smaller bore cylinder 3124*b* (i.e., the shaft of the larger bore hydraulic cylinder 3124*a*) are moved by the mechanical boundary mechanism 3121 in the direction indicated by the arrow 3122. Compressed hydraulic fluid from the higher-pressure chamber 3126*a* of the larger bore cylinder 3124*a* passes through a valve 3120 to an arrangement of check valves 3128 and the hydraulic power unit 3129, thereby producing electricity. Hydraulic fluid at a lower pressure is conducted from the output of the hydraulic motor/pump through valve 3118 to the lower-pressure chamber 3116*a* of the hydraulic cylinder 3124*a*. In this state of operation, the piston 3125*b* of the smaller bore cylinder 3124*b* remains stationary with respect thereto, and no fluid flows into or out of either of its chambers 3116*b*, 3126*b*.

Reference is now made to FIG. 31B, which shows another state of operation of the system 3100 of FIG. 31A. The action of the pneumatic cylinder 3101 and the direction of motion of the pistons is the same as in FIG. 31A. In FIG. 31B, the piston 3125*a* and smaller bore cylinder 3124*b* (i.e., shaft of the larger bore hydraulic cylinder 3124*a*) have moved to the extreme of its range of motion and has stopped moving relative to the larger bore cylinder 3124*a*. Valves are now opened such that the piston 3125*b* of the smaller bore cylinder 3124*b* acts. Pressurized fluid from the higher-pressure chamber 3126*b* of the smaller bore cylinder 3124*b* is conducted through a valve 3133 to the aforementioned arrangement of check valves 3128 and the hydraulic power unit 3129, thereby producing electricity. Hydraulic fluid at a lower pressure is conducted from the output of the hydraulic motor/pump through valve 3135 to the lower-pressure chamber 3116*b* of the smaller bore hydraulic cylinder 3124*b*. In this manner, the effective piston area on the hydraulic side is changed during the pneumatic expansion, narrowing the hydraulic pressure range for a given pneumatic pressure range.

Reference is now made to FIG. 31C, which shows another state of operation of the system 3100 of FIGS. 31A and 31B. The action of the pneumatic cylinder 3101 and the direction of motion of the pistons are the reverse of those shown in FIG. 31A. As in FIG. 31A, only the larger bore hydraulic cylinder 3124*a* is active. The piston 3124*b* of the smaller bore cylinder 3124*b* remains stationary, and no fluid flows into or out of either of its chambers 3116*b*, 3126*b*. Compressed hydraulic fluid from the higher-pressure chamber 3116*a* of the larger bore cylinder 3124*a* passes through a valve 3118 to the aforementioned arrangement of check valves 3128 and the hydraulic power unit 3129, thereby producing electricity. Hydraulic fluid at a lower pressure is conducted from the output of the hydraulic motor/pump through valve 3120 to the lower-pressure chamber 3126*a* of the larger bore hydraulic cylinder 3124*a*.

Additionally, in yet another state of operation of the system 3100, the piston 3125*a* and the smaller bore hydraulic cylinder 3124*b* (i.e., the shaft of the larger bore hydraulic cylinder 3124*a*) have moved as far as they can in the direction indicated in FIG. 31C. Then, as in FIG. 31B, but in the opposite direction of motion, the smaller bore hydraulic cylinder 3124*b* becomes the active cylinder driving the motor/generator 3129.

It should also be clear that the principle of adding cylinders operating at progressively lower pressures in series (pneumatic and/or hydraulic) and in parallel or telescopic fashion (mechanically) could be carried out to two or more cylinders on the pneumatic side, the hydraulic side, or both.

Furthermore, the system 3100 shown in FIGS. 31A-31C can also include a heat transfer subsystem 3150 similar to those described above. Generally, the heat transfer subsystem 3150 includes a fluid circulator 3152 and a heat exchanger 3154. The subsystem 3150 also includes two directional control valves 3156, 3158 that selectively connect the subsystem 3150 to one or more chambers of the pneumatic cylinder 3101 via pairs of gas ports on the cylinder 3101 identified as A and B. For example, the valves 3156, 3158 can be positioned to place the subsystem 3150 in fluidic communication with chamber 3103 during gas expansion therein, so as to thermally condition the gas expanding in the chamber 3103. The gas can be thermally conditioned by any of the previously described methods. For example, during expansion (or compression), a heat exchange liquid (e.g., water) can be drawn from a reservoir (not shown, but similar to those described above with respect to FIG. 22) by the circulator 3154, circulated through a liquid to liquid version of the heat exchanger 3154, which may be a shell and tube type with an input 3160 and an output 3162 from the shell running to an environmental heat exchanger or to a source of process heat, cold water, or other external heat exchange medium.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. An energy-conversion system that stores and recovers electrical energy using compressed gas, the system comprising:

a cylinder assembly including a cylinder having a first chamber and a second chamber, the chambers being separated by a piston slideably disposed within the cylinder;

a drive system coupled to the cylinder assembly, wherein the drive system is configured to convert potential energy to electrical energy during an expansion phase and convert electrical energy to potential energy during a compression phase, movement of the piston in the cylinder assembly compressing gas in one of the first or second chambers during the compression phase, and expanding gas in one of the first or second chambers moving the piston in the cylinder assembly during the expansion phase;

a heat-transfer subsystem in fluid communication with at least one of the first chamber or the second chamber of the cylinder assembly;

for sensing at least one of a fluid state, a fluid flow, a temperature, a pressure, or a position of the piston, at least one sensor in communication with at least one of the first chamber of the cylinder assembly, the second chamber of the cylinder assembly, or fluid exiting the heat-transfer subsystem; and a control system for receiving telemetry from the at least one sensor to control operation of the heat-transfer subsystem based at least in part on the received telemetry.

2. The system of claim 1, wherein the cylinder assembly comprises a pneumatic cylinder.

3. The system of claim 1, wherein the heat-transfer subsystem further comprises:

a fluid circulation apparatus; and a heat transfer fluid reservoir, wherein the fluid circulation apparatus is arranged to pump a heat transfer fluid from the reservoir into the gas.

4. The system of claim 3, wherein the heat-transfer subsystem further comprises a heat exchanger, the heat exchanger comprising:

a first side in fluid communication with the fluid circulation apparatus and the heat transfer fluid reservoir; and a second side in fluid communication with a source of heat transfer fluid, wherein the fluid circulation apparatus circulates fluid from heat transfer fluid reservoir, through the heat exchanger and to the cylinder assembly.

5. The system of claim 1, wherein the heat-transfer subsystem comprises a spray mechanism for introducing heat transfer fluid into the gas.

6. The system of claim 5, wherein the spray mechanism comprises at least one of a spray head or a spray rod.

7. The system of claim 1, wherein the drive system comprises a hydraulic power unit fluidly coupled to the cylinder assembly and configured to drive an electric motor/generator to recover electrical energy and be driven by the electric motor/generator to store potential energy.

8. The system of claim 1, wherein the drive system comprises a hydraulic motor/pump in fluid communication with the cylinder assembly for causing compression of gas or receiving energy from expansion of gas, the control system controlling the hydraulic motor/pump based at least in part on the received telemetry.

9. The system of claim 8, wherein the hydraulic motor/pump comprises a shaft, the control system controlling at least one of a speed or a torque of the rotating shaft based on the received telemetry.

10. The system of claim 1, further comprising, selectively fluidly connected to the cylinder assembly, a storage vessel for storage of the gas after compression or before expansion.

11. The system of claim 1, further comprising a valve for venting the gas to atmosphere after expansion thereof.

12. The system of claim 1, further comprising a second cylinder assembly fluidly connectable to the cylinder assembly, the control system operating the cylinder assembly and the second cylinder assembly in a staged manner to provide a predetermined pressure profile at least at one outlet.

13. The system of claim 12, wherein (i) the cylinder assembly transfers mechanical energy at a first pressure ratio, and (ii) the second cylinder assembly transfers mechanical energy at a second pressure ratio greater than the first pressure ratio.

14. The system of claim 12, wherein the cylinder assembly and the second cylinder assembly are connected in parallel.

* * * * *